(12) United States Patent
Kumada

(10) Patent No.: US 6,331,897 B1
(45) Date of Patent: *Dec. 18, 2001

(54) IMAGE PROCESSING METHOD AND APPARATUS IN WHICH A TABLE STORES BY A SCAN LINE UNIT MEMORY ADDRESSES AT EACH OF WHICH A FUNCTION IS STORED FOR DEVELOPING AN IMAGE FOR ONE LINE INTO A MEMORY

(75) Inventor: Shuichi Kumada, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/788,574

(22) Filed: Jan. 24, 1997

Related U.S. Application Data

(63) Continuation of application No. 08/098,053, filed on Jul. 28, 1993, now abandoned.

(30) Foreign Application Priority Data

Jul. 31, 1992 (JP) .................................................. 4-205421
Jul. 31, 1992 (JP) .................................................. 4-205542
Jul. 31, 1992 (JP) .................................................. 4-205543

(51) Int. Cl.[7] .................................................. G06F 15/00
(52) U.S. Cl. .......................................... 358/1.9; 358/1.17
(58) Field of Search ................................. 395/101, 102, 395/105, 106, 109, 110, 111, 113, 115, 116; 358/500, 501, 505, 518, 524, 401, 448, 451, 458; 382/162, 163, 164, 167

(56) References Cited

U.S. PATENT DOCUMENTS

| | | | |
|---|---|---|---|
| 4,219,151 | * 8/1980 | Havuki | 235/379 |
| 4,535,416 | * 8/1985 | Kano et al. | 364/710.01 |
| 4,660,999 | * 4/1987 | Tsuneki | 400/61 |
| 4,879,595 | * 11/1989 | Niki et al. | 358/539 |
| 4,974,171 | * 11/1990 | Yeh et al. | 364/519 |
| 5,043,713 | * 8/1991 | Katsura et al. | 345/200 |
| 5,129,046 | * 7/1992 | Tanabe et al. | 395/100 |
| 5,313,611 | * 5/1994 | Franulin et al. | 395/425 |
| 5,825,994 | * 10/1998 | Kumada | 358/1.17 |

FOREIGN PATENT DOCUMENTS

| | | | |
|---|---|---|---|
| 158902 | 10/1985 | (EP) | G09G/1/28 |
| 199272 | 10/1986 | (EP) | G09G/1/16 |
| 469882 | 2/1992 | (EP) | H04N/1/40 |

\* cited by examiner

Primary Examiner—Garcia Gabriel
(74) Attorney, Agent, or Firm—Fitzpatrick, Cella, Harper & Scinto

(57) ABSTRACT

An image processor includes an input device which inputs coded recording data, and a table generator generates a table which stores, by a scan line unit, memory addresses at each of which a function is stored for developing an image for one line into a memory, the function being generated based on the input coded recording data. The image processor also includes a developing unit which develops the input coded recording data into the memory in accordance with functions stored in the generated table.

14 Claims, 122 Drawing Sheets

FIG. 4 (PRIOR ART)

| COMMAND NO. | THE NO. OF DATA | Y VALUE | M VALUE | C VALUE | Bk VALUE |
|---|---|---|---|---|---|

FIG. 5 (PRIOR ART)

| COMMAND NO. | THE NO. OF DATA | X VALUE IN COORDINATE 1 | Y VALUE IN COORDINATE 1 | X VALUE IN COORDINATE 2 | Y VALUE IN COORDINATE 2 | - - - - - - | X VALUE IN COORDINATE N | Y VALUE IN COORDINATE N |
|---|---|---|---|---|---|---|---|---|

FIG. 6 (PRIOR ART)

| COMMAND NO. | THE NO. OF DATA | Y VALUE | M VALUE | C VALUE | Bk VALUE |
|---|---|---|---|---|---|

FIG. 7 (PRIOR ART)

| MIN BAND NO. | MAX BAND NO. | COMMAND NO. | THE NO. OF DATA | $X_1$ | $Y_1$ | $X_2$ | $Y_2$ | ---- | $X_N$ | $Y_N$ | $X_1$ | $Y_1$ |
|---|---|---|---|---|---|---|---|---|---|---|---|---|

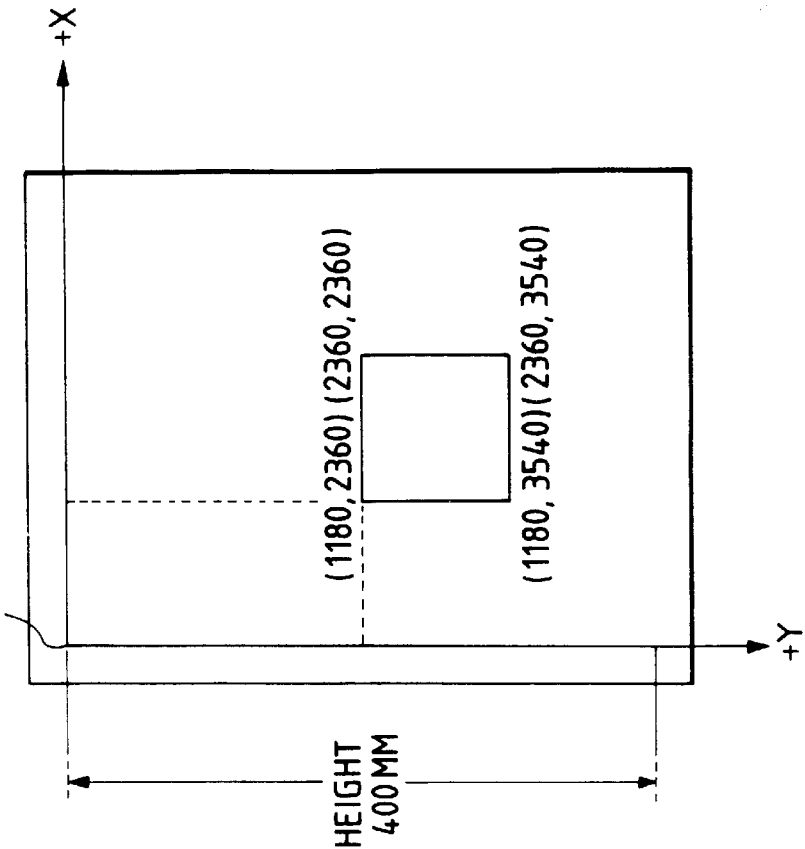
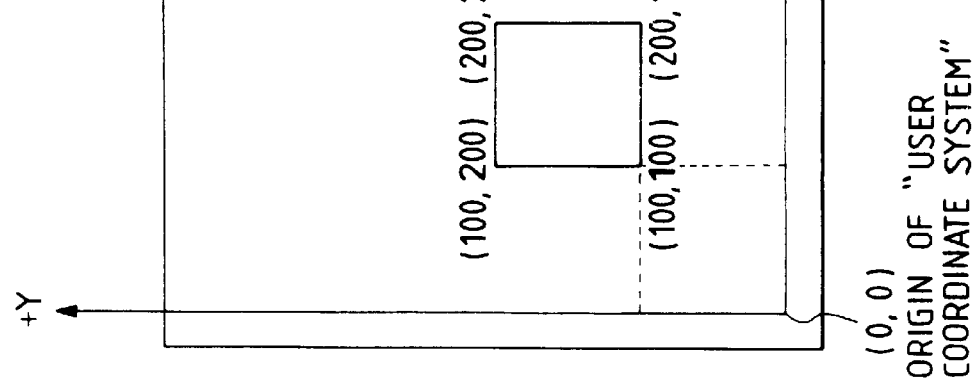

FIG. 9 (PRIOR ART)

| COMMAND NO. | 8 | 100 | 200 | 200 | 200 | 200 | 100 | 100 | 100 |
|---|---|---|---|---|---|---|---|---|---|

FIG. 11 (PRIOR ART)

| COMMAND NO. | 10 | 1180 | 2360 | 2360 | 2360 | 2360 | 3540 | 3540 | 1180 | 2360 |
|---|---|---|---|---|---|---|---|---|---|---|

FIG. 12 (PRIOR ART)

| COMMAND NO. | 4 | 255 | 0 | 0 | 0 |
|---|---|---|---|---|---|

FIG. 13 (PRIOR ART)

| COMMAND NO. | 1 | 51 |
|---|---|---|

○ : LEFTX
□ : RIGHTX

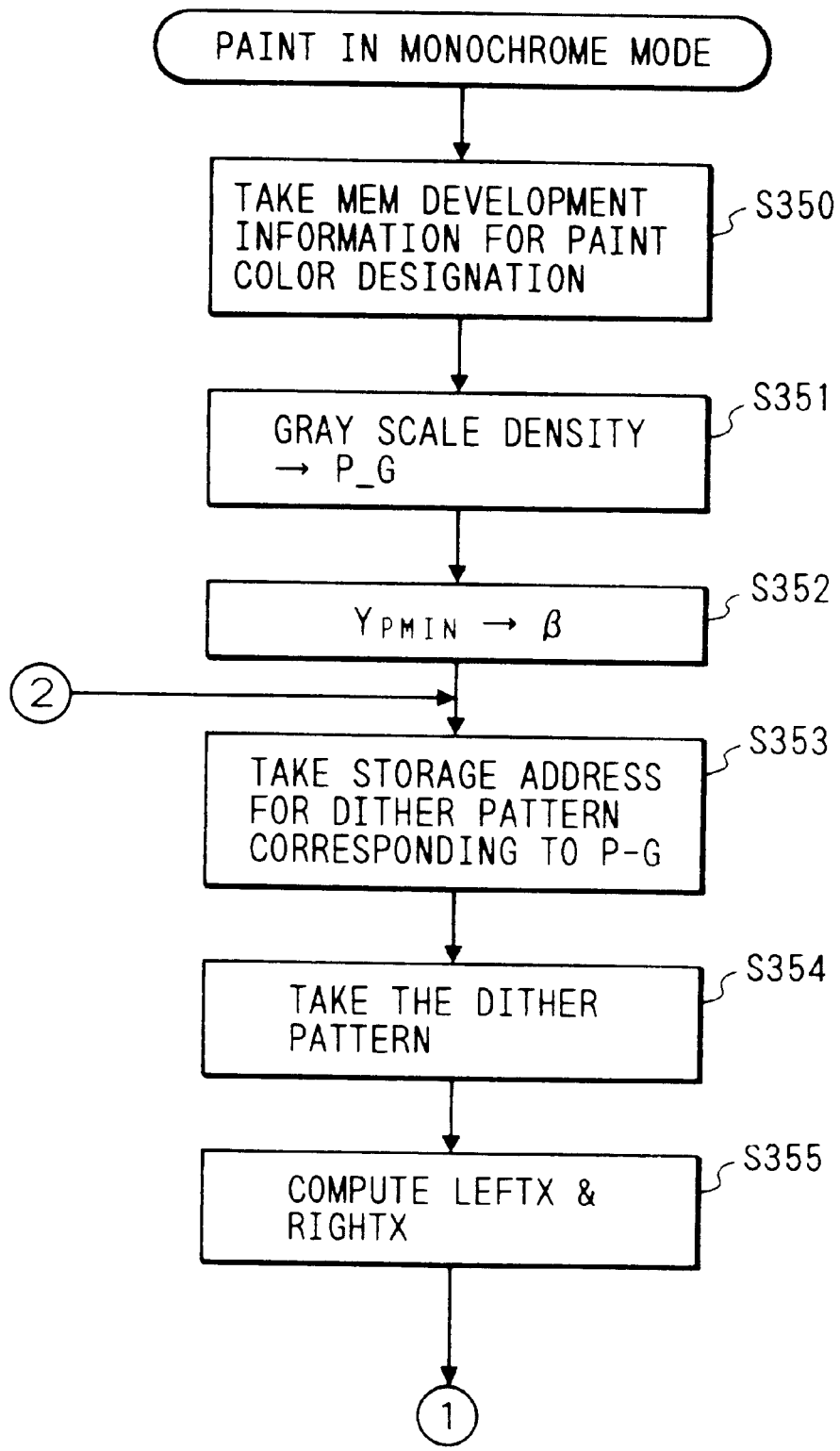

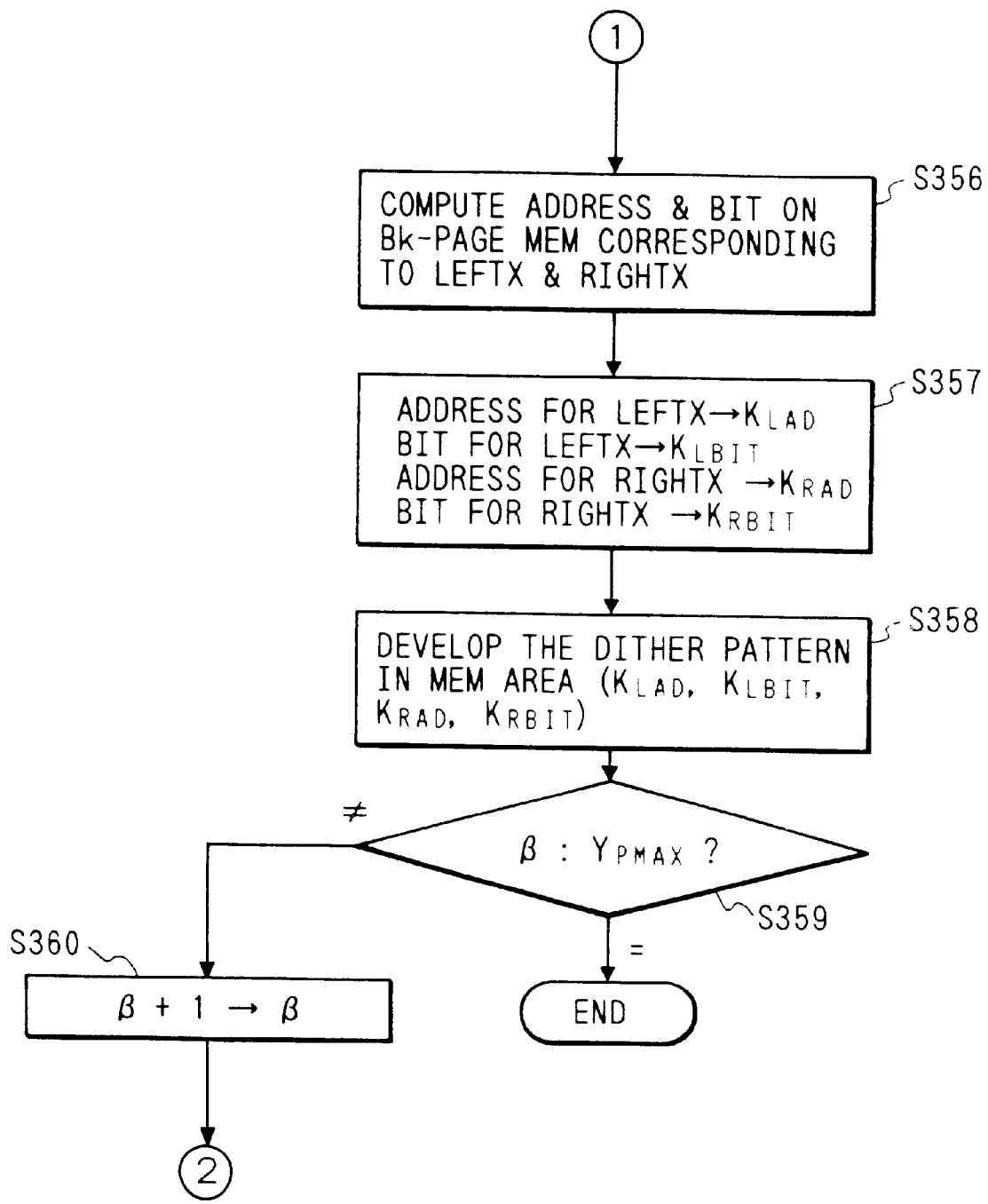

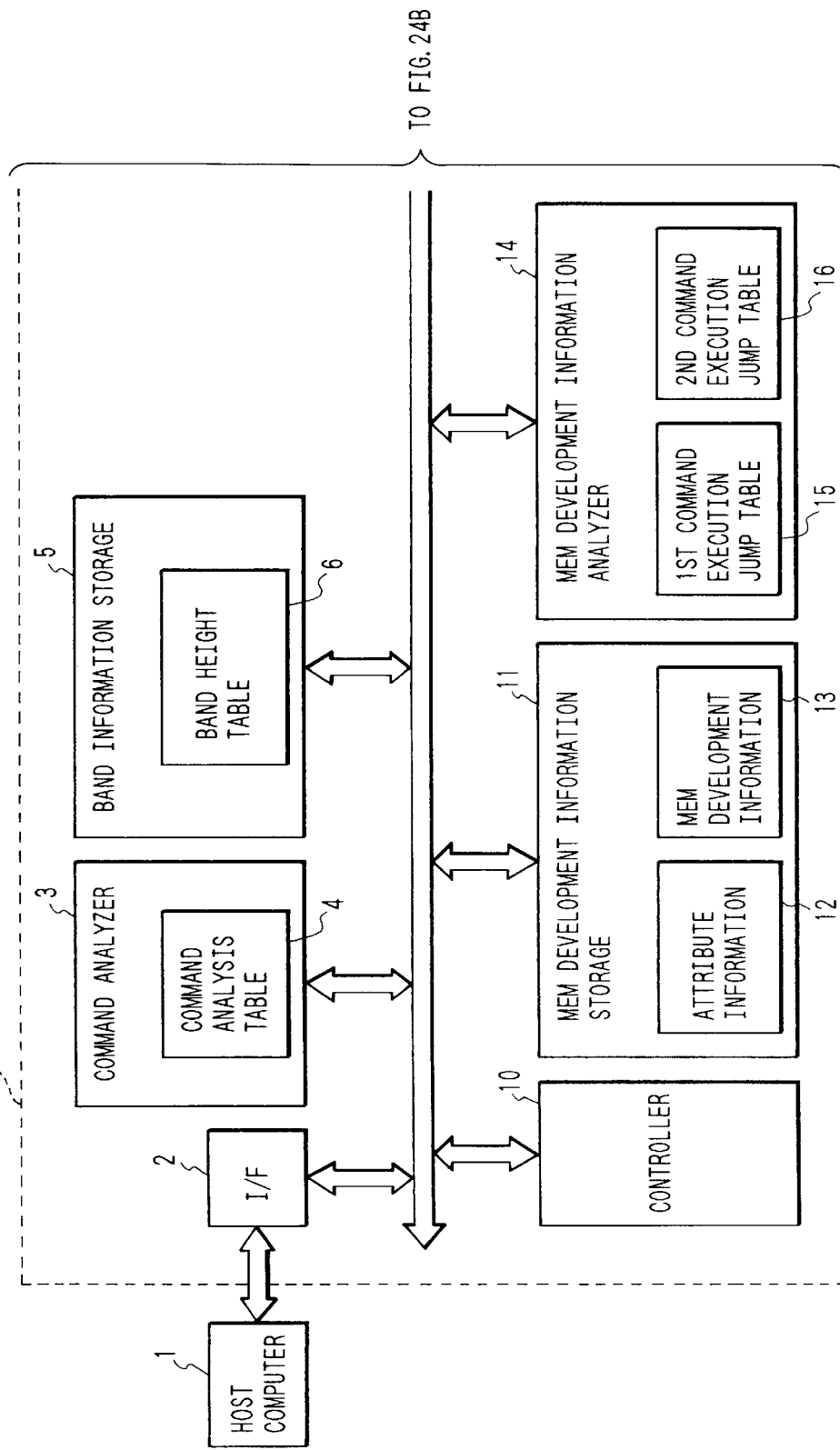

FIG. 31

| RETREAT AREA | VARIABLES AREA |
|---|---|
| LINE WIDTH | $L_{WIDTH}$ VALUE |
| LINE COLOR | $L_{YMCK}$ VALUE |
| PAINT COLOR | $F_{YMCK}$ VALUE |
| CHR COLOR | $T_{YMCK}$ VALUE |
| CLIP AREA | $D_{SPXMI}$ VALUE |
| CLIP AREA | $D_{SPYMI}$ VALUE |
| CLIP AREA | $D_{SPXMX}$ VALUE |
| CLIP AREA | $D_{SPYMX}$ VALUE |
| PAINT PATTERN | $F_{PAT}$ VALUE |
| PRESENCE/ABSENCE OF OUTLINE | $F_{PERMT}$ VALUE |
| DRAWING LOGIC | $L_{OGSTY}$ VALUE |
| ⋮ | |
| m-1 | |
| m | |

| COMMAND NO. | THE NO. OF DATA | TYPE FLAG | R VALUE | G VALUE | B VALUE |

⋮
0

| COMMAND NO. | THE NO. OF DATA | TYPE FLAG | L* VALUE | a* VALUE | b* VALUE |

⋮
1

| COMMAND NO. | THE NO. OF DATA | TYPE FLAG | Y VALUE | M VALUE | C VALUE | Bk VALUE |

| COMMAND NO. | THE NO. OF DATA | LINE WIDTH |
|---|---|---|

FIG. 36B

| COMMAND NO. | THE NO. OF DATA | X MIN | Y MIN | X MAX | Y MAX |
|---|---|---|---|---|---|

FIG. 36C

| COMMAND NO. | THE NO. OF DATA | PAINT PATTERN NO. | OUTLINE FLAG |
|---|---|---|---|

FIG. 36D

| COMMAND NO. | THE NO. OF DATA | DRAWING LOGIC |
|---|---|---|

FIG. 37

| COMMAND NO. | THE NO. OF DATA | X VALUE IN COORDINATE 1 | Y VALUE IN COORDINATE 1 | X VALUE IN COORDINATE 2 | Y VALUE IN COORDINATE 2 | ------ | X VALUE IN COORDINATE N | Y VALUE IN COORDINATE N |

FIG. 38

| COMMAND NO. | THE NO. OF DATA | X COORDINATE OF DRAWING POSITION | Y COORDINATE OF DRAWING POSITION | CHR DATA |

FIG. 39

| | | COMMAND NO. |
|---|---|---|
| POINTER → | JUMP ADDRESS TO COMMAND ANALYSIS FUNCTION FOR STRAIGHT LINE DRAWING | ------- 0 |
| | JUMP ADDRESS TO COMMAND ANALYSIS FUNCTION FOR POLYGON DRAWING | ------- 1 |
| | JUMP ADDRESS TO COMMAND ANALYSIS FUNCTION FOR CHR DRAWING | ------- 2 |
| | ⋮ | |
| | JUMP ADDRESS TO COMMAND ANALYSIS FUNCTION FOR LINE WIDTH DESIGNATION | ------- 10 |
| | JUMP ADDRESS TO COMMAND ANALYSIS FUNCTION FOR LINE COLOR DESIGNATION | ------- 11 |
| | JUMP ADDRESS TO COMMAND ANALYSIS FUNCTION FOR PAINT COLOR DESIGNATION | ------- 12 |
| | JUMP ADDRESS TO COMMAND ANALYSIS FUNCTION FOR CHR COLOR DESIGNATION | ------- 13 |
| | JUMP ADDRESS TO COMMAND ANALYSIS FUNCTION FOR CLIP AREA DESIGNATION | ------- 14 |
| | JUMP ADDRESS TO COMMAND ANALYSIS FUNCTION FOR PAINT DEFINITION DESIGNATION | ------- 15 |
| | JUMP ADDRESS TO COMMAND ANALYSIS FUNCTION FOR DRAWING LOGIC DESIGNATION | ------- 16 |
| | ⋮ | |
| | | ------- n-1 |
| | | ------- n |

FIG. 51

$$X = X_n \left( \frac{L^* + 16}{116} + \frac{a^*}{500} \right)^3 \quad \text{------ (a)}$$

$$Y = \begin{cases} Y_n \left( \frac{L^* + 16}{116} \right)^3 & (L^* > 8) \quad \text{------ (b)} \\ Y_n \frac{L^*}{903.3} & (L^* < 8) \quad \text{------ (c)} \end{cases}$$

$$Z = Z_n \left( \frac{L^* + 16}{116} - \frac{b^*}{200} \right)^3 \quad \text{------ (d)}$$

FIG. 52

$$\begin{pmatrix} R \\ G \\ B \end{pmatrix} = \begin{pmatrix} 3.497 & -1.734 & -0.543 \\ -1.065 & 1.975 & 0.034 \\ -0.055 & -0.197 & 1.051 \end{pmatrix} \begin{pmatrix} X \\ Y \\ Z \end{pmatrix}$$

FIG. 75A

| COMMAND NO. | THE NO. OF DATA | Y VALUE | M VALUE | C VALUE | Bk VALUE |
|---|---|---|---|---|---|

FIG. 75B

| COMMAND NO. | THE NO. OF DATA | GRAY SCALE DENSITY | 0 | 0 | 0 |
|---|---|---|---|---|---|

FIG. 76A

| MIN BAND NO. | MAX BAND NO. | COMMAND NO. | THE NO. OF DATA | LINE WIDTH |
|---|---|---|---|---|

FIG. 76B

| MIN BAND NO. | MAX BAND NO. | COMMAND NO. | THE NO. OF DATA | CLIP $X_{MIN}$ | CLIP $Y_{MIN}$ | CLIP $X_{MAX}$ | CLIP $Y_{MAX}$ |
|---|---|---|---|---|---|---|---|

FIG. 76C

| MIN BAND NO. | MAX BAND NO. | COMMAND NO. | THE NO. OF DATA | PAINT PATTERN NO. | OUTLINE FLAG |
|---|---|---|---|---|---|

FIG. 76D

| MIN BAND NO. | MAX BAND NO. | COMMAND NO. | THE NO. OF DATA | DRAWING LOGIC |
|---|---|---|---|---|

FIG. 77A

| MIN BAND NO. | MAX BAND NO. | COMMAND NO. | THE NO. OF DATA | X₁ | Y₁ | X₂ | Y₂ | ---- | Xₙ | Yₙ |

FIG. 77B

| MIN BAND NO. | MAX BAND NO. | COMMAND NO. | THE NO. OF DATA | X₁ | Y₁ | X₂ | Y₂ | ---- | Xₙ | Yₙ | X₁ | Y₁ |

FIG. 78

| MIN BAND NO. | MAX BAND NO. | COMMAND NO. | THE NO. OF DATA | Xr | Yr | INTERNAL CODE |

FIG. 81

PAINT DEFINITION DESIGNATION

| 0 | 3 | 15 | 2 | 1 | 0 |
|---|---|----|---|---|---|

PAINT COLOR DESIGNATION

| 0 | 3 | 12 | 4 | 0 | 255 | 0 | 0 |
|---|---|----|---|---|-----|---|---|

POLYGON DRAWING

| 0 | 1 | 1 | 8 | $X_1$ | $Y_1$ | $X_2$ | $Y_2$ | $X_3$ | $Y_3$ | $X_1$ | $Y_1$ |
|---|---|---|---|-------|-------|-------|-------|-------|-------|-------|-------|

CHR COLOR DESIGNATION

| 0 | 3 | 13 | 4 | 255 | 0 | 0 | 0 |
|---|---|----|---|-----|---|---|---|

CHR DRAWING

| 3 | 3 | 3 | 3 | Xr | Yr | INTERNAL CODE |
|---|---|---|---|----|----|---------------|

FIG. 83

LINE WIDTH DESIGNATION

| 0 | 3 | 10 | 1 | 3 |
|---|---|----|---|---|

LINE COLOR DESIGNATION

| 0 | 3 | 11 | 4 | 255 | 255 | 0 | 0 |
|---|---|----|---|-----|-----|---|---|

CLIP AREA DESIGNATION

| 0 | 3 | 14 | 4 | $C_{XMIN}$ | $C_{YMIN}$ | $C_{XMAX}$ | $C_{YMAX}$ |
|---|---|----|---|------------|------------|------------|------------|

STRAIGHT LINE DRAWING

| 1 | 2 | 0 | 8 | $X_1$ | $Y_1$ | $X_2$ | $Y_2$ | $X_3$ | $Y_3$ | $X_4$ | $Y_4$ |
|---|---|---|---|-------|-------|-------|-------|-------|-------|-------|-------|

FIG. 84

| | COMMAND NO. |
|---|---|
| POINTER → JUMP ADDRESS TO FUNCTION FOR STRAIGHT LINE DRAWING | ------- 0 |
| JUMP ADDRESS TO FUNCTION FOR POLYGON DRAWING | ------- 1 |
| JUMP ADDRESS TO FUNCTION FOR CHR DRAWING | ------- 2 |
| ⋮ | |
| JUMP ADDRESS TO FUNCTION FOR LINE WIDTH DESIGNATION | ------- 10 |
| JUMP ADDRESS TO FUNCTION FOR LINE COLOR DESIGNATION | ------- 11 |
| JUMP ADDRESS TO FUNCTION FOR PAINT COLOR DESIGNATION | ------- 12 |
| JUMP ADDRESS TO FUNCTION FOR CHR COLOR DESIGNATION | ------- 13 |
| JUMP ADDRESS TO FUNCTION FOR CLIP AREA DESIGNATION | ------- 14 |
| JUMP ADDRESS TO FUNCTION FOR PAINT DEFINITION DESIGNATION | ------- 15 |
| JUMP ADDRESS TO FUNCTION FOR DRAWING LOGIC DESIGNATION | ------- 16 |
| ⋮ | |
| | ------- n-1 |
| | ------- n |

FIG. 85

| | Content | COMMAND NO. |
|---|---|---|
| POINTER → | JUMP ADDRESS TO SKIP FUNCTION | ------- 0 |
| | JUMP ADDRESS TO SKIP FUNCTION | ------- 1 |
| | JUMP ADDRESS TO SKIP FUNCTION | ------- 2 |
| | JUMP ADDRESS TO SKIP FUNCTION | ------- 3 |
| | ⋮ | |
| | JUMP ADDRESS TO FUNCTION FOR LINE WIDTH DESIGNATION | ------- 10 |
| | JUMP ADDRESS TO FUNCTION FOR LINE COLOR DESIGNATION | ------- 11 |
| | JUMP ADDRESS TO FUNCTION FOR PAINT COLOR DESIGNATION | ------- 12 |
| | JUMP ADDRESS TO FUNCTION FOR CHR COLOR DESIGNATION | ------- 13 |
| | JUMP ADDRESS TO FUNCTION FOR CLIP AREA DESIGNATION | ------- 14 |
| | JUMP ADDRESS TO FUNCTION FOR PAINT DEFINITION DESIGNATION | ------- 15 |
| | JUMP ADDRESS TO FUNCTION FOR DRAWING LOGIC DESIGNATION | ------- 16 |
| | ⋮ | |
| | | ------- n-1 |
| | | ------- n |

| | YELLOW ↓ | MAGENTA ↓ | CYAN ↓ | BLACK ↓ |
|---|---|---|---|---|
| POINTER → | ○ | □ | △ | ◇ |
| | ○ | □ | △ | ◇ |
| | ○ | □ | △ | ◇ |
| | ○ | □ | △ | ◇ |
| | ○ | □ | △ | ◇ |
| | ○ | □ | △ | ◇ |
| | ○ | □ | △ | ◇ |
| | ○ | □ | △ | ◇ |
| | ○ | □ | △ | ◇ |
| | ○ | □ | △ | ◇ |
| | ○ | □ | △ | ◇ |
| | ○ | □ | △ | ◇ |
| | ○ | □ | △ | ◇ |
| | ○ | □ | △ | ◇ |
| | ○ | □ | △ | ◇ |
| | ○ | □ | △ | ◇ |
| | * | ※ | ※ | ※ |

FIG. 114

| | YELLOW ↓ | MAGENTA ↓ | CYAN ↓ | BLACK ↓ |
|---|---|---|---|---|
| POINTER → | W | X | V | Z |
| | W | X | V | Z |
| | W | X | V | Z |
| | W | X | V | Z |
| | W | X | V | Z |
| | W | X | V | Z |
| | W | X | V | Z |
| | W | X | V | Z |
| | W | X | V | Z |
| | W | X | V | Z |
| | W | X | V | Z |
| | W | X | V | Z |
| | W | X | V | Z |
| | W | X | V | Z |
| | W | X | V | Z |
| | W | X | V | Z |
| | ◎ | ※ | ※ | ※ |

○ : LEFTX
□ : RIGHTX

○ : LEFTX
□ : RIGHTX

FIG. 135
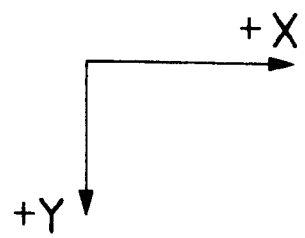
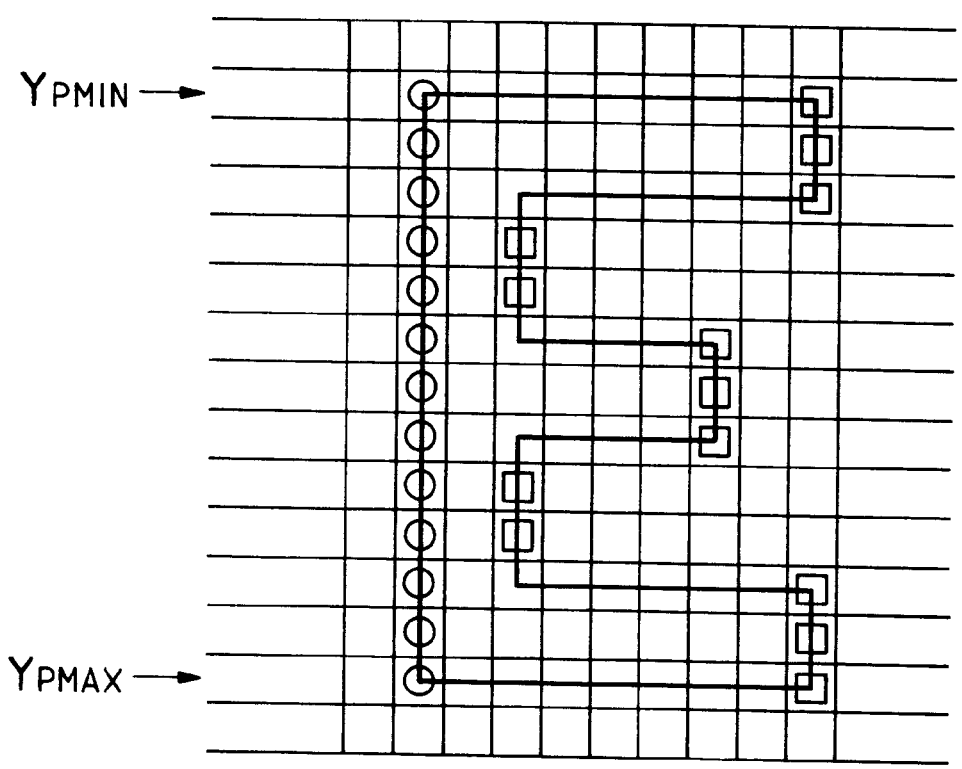

|  | RED | GREEN | BLUE |
|---|---|---|---|
| POINTER → | ○ | □ | △ |
|  | ○ | □ | △ |
|  | ○ | □ | △ |
|  | ○ | □ | △ |
|  | ○ | □ | △ |
|  | ○ | □ | △ |
|  | ○ | □ | △ |
|  | ○ | □ | △ |
|  | * | ※ | ※ |

| 0 | 0 | 0 | 0 | 1 | 0 | 0 | 0 |
|---|---|---|---|---|---|---|---|

① : LEFTX$_1$

☐ : RIGHTX$_1$

② : LEFTX$_2$

☐ : RIGHTX$_2$

IMAGE PROCESSING METHOD AND APPARATUS IN WHICH A TABLE STORES BY A SCAN LINE UNIT MEMORY ADDRESSES AT EACH OF WHICH A FUNCTION IS STORED FOR DEVELOPING AN IMAGE FOR ONE LINE INTO A MEMORY

This application is a continuation of application Ser. No. 08/098,053 filed Jul. 28, 1993, now abandoned.

BACKGROUND OF THE INVENTION

1. Field of the Invention

The present invention relates to an image processing method and apparatus and, more particularly, to an image processing method and apparatus, which can color-output a character, figure, raster image, and the like on the basis of print data, a command, and the like sent from a host computer.

2. Related Background Art

FIG. 1 shows a coordinate system serving as a reference for, e.g., coordinate points designated when a figure or character is drawn using a PDL (Page Description Language) or a page description command (this coordinate system will be referred to as a user coordinate system hereinafter).

A hatched rectangular portion in FIG. 1 indicates an effective print area (a possible draw area in a print sheet). As shown in FIG. 1, the length of the effective print area will be referred to as an effective print area height hereinafter, and the width will be referred to as an effective print area width hereinafter.

The coordinate system shown in FIG. 1 is a two-dimensional x-y orthogonal coordinate system, and has an origin at the lower left corner of the effective print area, as shown in FIG. 1.

The coordinate unit of this coordinate system can be desirably set (e.g., 0.01 mm, 1/72 inch, and the like).

Description elements of the PDL for figure drawing and page description commands, which are set based on the above-mentioned user coordinate system, are analyzed in an image processing apparatus in the order of reception, and are converted into information to be developed on a memory.

FIG. 2 shows a coordinate system serving as a reference for creating the above-mentioned memory development information (this coordinate system will be referred to as a printer coordinate system hereinafter).

The coordinate unit of this coordinate system is determined by the resolution of an image processing apparatus used (for example, when the resolution is 300 dpi, the coordinate unit is 1/300 inch).

A hatched rectangular portion in FIG. 2 is the same as the effective print area in FIG. 1.

This coordinate system is a two-dimensional x-y orthogonal coordinate system, and has an origin at the upper left corner of the effective print area.

FIG. 3 shows a memory map in an internal RAM area of a conventional image processing apparatus for performing color recording on the basis of the PDL or the page description command.

The RAM area is constituted by a system work memory, a vacant area, and page development memories (each corresponding to the size of the effective print area shown in FIG. 2) for Y (Yellow), M (Magenta), C (Cyan), and Bk (Black).

The system work memory is used as a storage area for information (variables, and the like) used in internal control of the image processing apparatus, a fixed work area, and the like.

The vacant area is used as an area for storing memory development information, a character cache memory, and the like.

FIG. 4 shows a paint color designation command of drawing attribute designation commands.

This command is used for designating a color for painting a portion inside a closed figure.

A command No. varies depending on drawing attribute designation, and is used for identifying command functions.

The content of a number-of-data parameter indicates the number of data following the number-of-data parameter.

For example, the content of a number-of-data parameter of a line color designation command is 4.

Y, M, C, and Bk values indicate density data values of Y (Yellow), M (Magenta), C (Cyan), and Bk (Black) as primary colors of coloring materials.

FIG. 5 shows an example of a polygon drawing command of drawing commands.

A command No. varies depending on drawing attribute designation, and is used for identifying command functions.

The content of a number-of-data parameter indicates the number of data following the number-of-data parameter.

Note that X and Y values of coordinates 1 to n are coordinates on the user coordinate system.

FIG. 6 shows an example of memory development information generated by analyzing the paint color designation command shown in FIG. 4.

A command table No. is used for identifying each memory development information.

The contents of other parameters are the same as those in FIG. 4.

FIG. 7 shows an example of memory development information generated by analyzing the polygon drawing command shown in FIG. 5.

A command table No. is used for identifying each memory development information.

The content of a number-of-data parameter indicates the number of data following the number-of-data parameter.

X1, Y1, . . . , Xn, and Yn are coordinates converted into those on the printer coordinate system on the basis of the resolution of the image processing apparatus.

FIG. 8 shows a case wherein drawing of a polygon defined by four coordinates (100, 200), (200, 200), (200, 100), and (100, 100) is set on the user coordinate system shown in FIG. 1 to have a coordinate unit of 1 mm.

FIG. 9 shows an example of a command issued when the polygon drawing shown in FIG. 8 is set.

FIG. 10 shows a case wherein polygon drawing on the user coordinate system shown in FIG. 8 is converted into polygon drawing on the printer coordinate system having a coordinate unit of 1/300 inch (about 1/11.8 mm).

As shown in FIG. 10, the effective print area height in this case is set to be 400 mm.

The four coordinates are (1,180, 2,360), (2,360, 2,360), (2,360, 3,540), and (1,180, 3,540).

FIG. 11 shows an example of memory development information of polygon drawing shown in FIG. 10, which information is generated by analyzing the polygon drawing command shown in FIG. 9.

FIG. 12 shows an example of memory development information set for paint color designation shown in FIG. 6.

In this case, each of Y, M, C, and Bk values ranges from 0 to 255. The Y value is set to be 255, and other values are set to be 0.

FIG. 13 shows an example of memory development information set for paint color designation shown in FIG. 6 in a monochrome mode.

In the monochrome mode, a gray scale process using the coloring material Bk is performed in place of a color process using Y, M, C, and Bk.

The gray scale density value ranges from 0 to 255. In this example, a value "51" indicates a density "20" [(51/255)%].

FIG. 14 shows a state wherein the polygon shown in FIG. 10 is divided using the coordinate unit of the printer coordinate system.

The minimum value of the Y-coordinate of this polygon is $Y_{PMIN}$, and the maximum value of the Y-coordinate is $Y_{PMAX}$.

In order to paint a portion inside this polygon, a paint pattern is developed on a development memory corresponding to a value between LEFTX and RIGHTX shown in FIG. 14.

FIG. 15 is a flow chart showing an example of a process for painting a portion inside the polygon shown in FIG. 14.

A drawing logic for the development memory of this example is "overwrite".

In step S300, it is checked if a color mode is selected.

If YES in step S300, the flow advances to step S301, and a paint process in the color mode is performed, thus ending the process.

If NO in step S300, the flow advances to step S302, and a paint process in the monochrome mode is performed, thus ending the process.

FIGS. 16 to 21 are flow charts showing a summary of the paint process in the color mode in step S301 in FIG. 15.

In step S310, memory development information for paint color designation shown in FIG. 6 is taken, and the flow advances to step S311.

In step S311, Y, M, C, and Bk values of paint colors are taken from the taken memory development information for paint color designation, and are respectively set in P_Y, P_M, P_C, and P_Bk. Thereafter, the flow advances to step S312.

In step S312, $Y_{PMIN}$ in FIG. 14 is set in β, and the flow advances to step S313.

In step S313, LEFTX and RIGHTX defining a range of X to be painted are computed, and the flow advances to step S314.

In step S314, addresses and bits on a Y-page memory in FIG. 3 corresponding to LEFTX and RIGHTX are computed, and the flow advances to step S315.

In step S315, the address and bit corresponding to LEFTX computed in step S314 are respectively set in $Y_{LAD}$ and $Y_{LBIT}$, and the address and bit corresponding to RIGHTX are respectively set in $Y_{RAD}$ and $Y_{RBIT}$. Thereafter, the flow advances to step S316.

In step S316, P_Y is compared with 0.

If it is determined in step S316 that P_Y=0, the flow advances to step S317, and a memory area ($Y_{LAD}$, $Y_{LBIT}$, $Y_{RAD}$, $Y_{RBIT}$) is cleared. The flow then advances to step S321.

If it is determined in step S316 that P_Y≠0, the flow advances to step S318, and the storage address of a dither pattern corresponding to the value P_Y is taken. The flow then advances to step S319.

In step S319, the dither pattern is taken from the storage address, and the flow advances to step S320.

In step S320, the dither pattern taken in step S318 is developed on the memory area ($Y_{LAD}$, $Y_{LBIT}$, $Y_{RAD}$, $Y_{RBIT}$), and the flow advances to step S321.

In step S321, the addresses and bits on an M-page memory in FIG. 3 corresponding to LEFTX and RIGHTX are computed, and the flow advances to step S322.

In step S322, the address and bit corresponding to LEFTX computed in step S321 are respectively set in $M_{LAD}$ and $M_{LBIT}$, and the address and bit corresponding to RIGHTX are respectively set in $M_{RAD}$ and $M_{RBIT}$. Thereafter, the flow advances to step S323.

In step S323, P_M is compared with 0.

If it is determined in step S323 that P_M=0, the flow advances to step S324, and a memory area ($M_{LAD}$, $M_{LBIT}$, $M_{RAD}$, $M_{RBIT}$) is cleared. The flow then advances to step S328.

If it is determined in step S323 that P_M≠0, the flow advances to step S325, and the storage address of a dither pattern corresponding to the value P_M is taken. Thereafter, the flow advances to step S326.

In step S326, the dither pattern is taken from the storage address, and the flow advances to step S327.

In step S327, the dither pattern taken in step S326 is developed on the memory area ($M_{LAD}$, $M_{LBIT}$, $M_{RAD}$, $M_{RBIT}$), and the flow advances to step S328.

In step S328, the addresses and bits on a C-page memory in FIG. 3 corresponding to LEFTX and RIGHTX are computed, and the flow advances to step S329.

In step S329, the address and bit corresponding to LEFTX computed in step S328 are respectively set in $C_{LAD}$ and $C_{LBIT}$, and the address and bit corresponding to RIGHTX are respectively set in $C_{RAD}$ and $C_{RBIT}$. Thereafter, the flow advances to step S330.

In step S330, P_C is compared with 0.

If it is determined in step S330 that P_C=0, the flow advances to step S331 to clear a memory area ($C_{LAD}$, $C_{LBIT}$, $C_{RAD}$, $C_{RBIT}$), and the flow advances to step S335.

If it is determined in step S330 that P_C≠0, the flow advances to step S332 to take the storage address of a dither pattern corresponding to the value P_C, and the flow advances to step S333.

In step S333, the dither pattern is taken from the storage address, and the flow advances to step S334.

In step S334, the dither pattern taken in step S333 is developed on the memory area ($C_{LAD}$, $C_{LBIT}$, $C_{RAD}$, $C_{RBIT}$), and the flow advances to step S335.

In step S335, the addresses and bits on a Bk-page memory in FIG. 3 corresponding to LEFTX and RIGHTX are computed, and the flow advances to step S336.

In step S336, the address and bit corresponding to LEFTX computed in step S335 are respectively set in $K_{LAD}$ and $K_{LBIT}$, and the address and bit corresponding to RIGHTX are respectively set in $K_{RAD}$ and $K_{RBIT}$. The flow then advances to step S337.

In step S337, P_Bk is compared with 0.

If it is determined in step S337 that P_Bk=0, the flow advances to step S338 to clear a memory area ($K_{LAD}$, $K_{LBIT}$, $K_{RAD}$, $K_{RBIT}$), and the flow advances to step S342.

If it is determined in step S337 that P_Bk≠0, the flow advances to step S339 to take the storage address of a dither pattern corresponding to the value P_Bk, and the flow advances to step S340.

In step S340, the dither pattern is taken from the storage address, and the flow advances to step S341.

In step S341, the dither pattern taken in step S340 is developed on the memory area ($K_{LAD}$, $K_{LBIT}$, $K_{RAD}$, $K_{RBIT}$), and the flow advances to step S342.

In step S342, it is checked if $\beta = Y_{PMAX}$, in FIG. 14.

If it is determined in step S342 that $\beta = Y_{PMAX}$, the process is ended.

If it is determined in step S342 that $\beta \neq Y_{PMAX}$, the flow advances to step S343 to increment $\beta$ by one, and the flow returns to step S313.

FIGS. 22 and 23 are flow charts showing a summary of the paint process in the monochrome mode in step S302 in FIG. 15.

In step S350, memory development information for paint color designation shown in FIG. 13 is taken, and the flow advances to step S351.

In step S351, a gray scale density value of a paint color is taken from the taken memory development information for paint color designation, and is set in P_G. The flow then advances to step S352.

In step S352, $\beta$ is set in $Y_{PMIN}$ in FIG. 14, and the flow advances to step S353.

In step S353, the storage address of a dither pattern corresponding to the value P_G is taken, and the flow advances to step S354.

In step S354, the dither pattern is taken from the storage address, and the flow advances to step S355.

In step S355, LEFTX and RIGHTX as a range of X to be painted are computed, and the flow advances to step S356.

In step S356, the addresses and bits on the Bk-page memory in FIG. 3 corresponding to LEFTX and RIGHTX are computed, and the flow advances to step S357.

In step S357, the address and bit corresponding to LEFTX computed in step S356 are respectively set in $K_{LAD}$ and $K_{LBIT}$, and the address and bit corresponding to RIGHTX are respectively set in $K_{RAD}$ and $K_{RBIT}$. The flow then advances to step S358.

In step S358, the dither pattern taken in step S354 is developed on a memory area ($K_{LAD}$, $K_{LBIT}$, $K_{RAD}$, $K_{RBIT}$), and the flow advances to step S359.

In step S359, it is checked if $\beta = Y_{MAX}$ in FIG. 14.

If it is determined in step S359 that $\beta = Y_{PMAX}$, the processing is ended.

If it is determined in step S359 that $\beta \neq Y_{PMAX}$, the flow advances to step S360 to increment $\beta$ by one, and the flow returns to step S353.

As described above, in the control of the conventional image processing apparatus for performing color recording on the basis of the PDL or page description commands, a drawing pattern of each of Y (Yellow), M (Magenta), C (Cyan), and Bk (Black) as coloring materials of toners or inks is developed based on memory development information obtained by analyzing commands on a development memory having a size corresponding to the effective print area of a print sheet.

A portion inside the polygon shown in FIG. 14 is painted by the processes shown in FIGS. 15 to 23.

However, the prior art suffers from the following drawbacks.

(1) In the paint process for each scan line, each of the Y, M, C, and Bk density values is detected, and the paint process of a figure drawing on each of the Y-, M-, C-, and Bk-page memories is controlled based on the detected value, resulting in a long drawing time.

(2) In the paint process for each scan line, each of Y, M, C, and Bk dither patterns corresponding to the Y, M, C, and Bk density values is taken from the storage area, and the paint process of a figure drawing on each page memory is controlled, resulting in a long drawing time.

(3) Since paint processes of figure drawings with different drawing logics are performed in units of drawing logics, the program amount or hardware scale necessary for control increases as the number of types of corresponding drawing logics is increased.

(4) When the color mode and the monochrome mode (a mode for outputting color data as gray scale data) can be switched, paint processes of figure drawings are performed in units of modes, and the program amount or hardware scale necessary for control increases.

SUMMARY OF THE INVENTION

It is an object of the present invention to shorten the development process time onto a memory by improving paint process efficiency of, e.g., a figure for bit map memories in units of coloring materials, i.e., Y, M, C, and Bk, in a development process of data onto the bit map memories so as to output color data, and to reduce cost of an apparatus by executing switching of drawing logics or switching between a color mode and a monochrome mode under identical control as much as possible.

The present invention has a table for storing addresses of functions for developing a drawing such as a figure, a character, and the like in units of scan lines with respect to bit map memories in units of coloring materials or elements, and performs a development process using this table. Therefore, computation control need not be performed in units of scan lines, and the process time can be shortened.

When each function indicated by the address stored in the table is set in correspondence with the presence/absence of a value of a coloring material or element, the process time can be further shortened.

According to the present invention, the storage address of a binary pattern, corresponding to the density value of each coloring material or element, of data to be developed on bit map memories in units of coloring materials or elements, is computed and stored. Thus, a binary pattern used when the data is developed on the bit map memory can be easily obtained, and the drawing time can be shortened.

According to the present invention, a plurality of tables each for storing addresses of functions for developing a drawing such as a figure, a character, and the like are prepared in correspondence with the number of designatable drawing logics. Thus, programs or hardware arrangements corresponding to the drawing logics need not be prepared.

According to the present invention, a table for storing addresses of functions for developing a drawing such as a figure, a character, and the like is set in correspondence with both the color output mode and the gray scale mode. Thus, programs or hardware arrangements in units of modes need not be prepared.

BRIEF DESCRIPTION OF THE DRAWINGS

FIG. 4 is a view of an example of a paint color designation command of drawing attribute commands;

FIG. 5 is a view of an example of a polygon drawing command of drawing commands;

FIG. 6 is a view of an example of memory development information for paint color designation of those for drawing attribute functions;

FIG. 7 is a view of memory development information for polygon drawing of those for drawing attribute functions;

FIG. 8 is a view of an example of polygon drawing on the user coordinate system;

FIG. 9 is a view of an example of a polygon drawing command issued when polygon drawing shown in FIG. 8 is set;

FIG. 10 is a view of an example of conversion of polygon drawing shown in FIG. 8 onto the printer coordinate system;

FIG. 11 is a view of an example of memory development information of polygon drawing shown in FIGS. 8 and 10;

FIG. 12 is a view of an example of memory development information used when a portion inside the polygon shown in FIG. 8 is painted in yellow (coloring material Yellow= 100%);

FIG. 13 is a view of an example of memory development information used when a portion inside the polygon shown in FIG. 8 is painted in a gray scale color (coloring material Black=20%);

FIG. 22 is a flow chart showing a process in step S302 in FIG. 15;

FIG. 23 is a flow chart showing the process in step S302 in FIG. 15;

FIG. 31 is a view of an example of an attribute information storage area for storing drawing attribute information used when data is developed on a memory;

FIGS. 36A to 36D are views respectively showing examples of a line width designation command, a clip area designation command, a paint definition designation command, and a drawing logic designation command of drawing attribute designation commands;

FIG. 37 is a view of an example of a straight line drawing command/polygon drawing command of drawing commands;

FIG. 38 is a view of an example of a character drawing command of drawing commands;

FIG. 39 shows a command analysis jump table 4 in FIGS. 24A and 24B, which stores jump addresses to functions for analyzing drawing commands and drawing attribute commands;

FIG. 51 shows equations as an example of a color conversion process shown in step S703 in FIG. 43 and step S713 in FIG. 44;

FIG. 52 shows an equation as an example of a color conversion process shown in step S704 in FIG. 43 and step S714 in FIG. 44;

FIGS. 75A and 75B are views of examples of memory development information for color designation generated by analyzing the color designation command in FIGS. 35A to 35C on the basis of the flow charts of FIGS. 41 to 44, in which FIG. 75A shows an example in a color mode, and FIG. 75B shows an example in a monochrome mode;

FIG. 76A is a view of an example of memory development information generated by analyzing the line width designation command in FIG. 36A on the basis of the flow chart of FIG. 45, FIG. 76B is a view of an example of memory development information generated by analyzing the clip area designation command in FIG. 36B on the basis of the flow chart of FIG. 46, FIG. 76C is a view of an example of memory development information generated by analyzing the paint definition designation command in FIG. 36C on the basis of the flow chart of FIG. 47, and FIG. 76D is a view of an example of memory development information generated by analyzing the drawing logic designation command in FIG. 36D on the basis of the flow chart of FIG. 48;

FIG. 77A is a view of an example of memory development information generated by analyzing the straight line drawing command in FIG. 37 on the basis of the flow charts of FIGS. 54 to 56, and FIG. 77B is a view of an example of memory development information generated by analyzing the polygon drawing command in FIG. 37 on the basis of the flow charts of FIGS. 57 to 59;

FIG. 78 is a view of an example of memory development information generated by analyzing the character drawing command in FIG. 38 on the basis of the flow charts of FIGS. 63 to 66;

FIG. 81 is a view of memory development information used in drawing in FIG. 79;

FIG. 83 is a view of memory development information used in drawing in FIG. 82;

FIG. 84 shows a command execution jump table 1, which stores jump addresses to functions for practically performing pattern development of a drawing onto a memory, and jump addresses to functions for designating drawing attributes (setting attributes in internal variables, and the like);

FIG. 85 shows a command execution jump table 2 in which all jump addresses to functions for performing pattern development of a drawing onto a memory are replaced with jump addresses to skip functions in FIG. 84;

FIG. 113 shows an example of a paint function address storage table for drawing logic designation=overwrite;

FIG. 114 shows an example of a paint function address storage table for drawing logic designation=transparent;

FIG. 120 is a view of an example of a straight line connecting two points on the printer coordinate system;

FIG. 121 is a flow chart showing a process in step S479 in FIG. 101 and step S511 in FIG. 105;

FIG. 122 is a flow chart showing the process in step S479 in FIG. 101 and step S511 in FIG. 105;

FIG. 123 is a flow chart showing the process in step S479 in FIG. 101 and step S511 in FIG. 105;

FIG. 124 is a view of an example of a polygon defined by five points on the printer coordinate system;

FIG. 125 is a view of an example of a character "E" defined by 12 outline points on the printer coordinate system;

FIG. 126 is a flow chart showing a process in step S502 in FIG. 103 and step S529 in FIG. 107;

FIG. 127 is a flow chart showing a process in step S860 in FIG. 122 and step S871 in FIG. 126;

FIG. 128 is a flow chart showing the process in step S860 in FIG. 122 and step S871 in FIG. 126;

FIG. 129 is a flow chart showing the process in step S862 in FIG. 123 and step S873 in FIG. 126;

FIG. 130 is a flow chart showing the process in step S862 in FIG. 123 and step S873 in FIG. 126;

FIG. 131 is a flow chart showing the process in step S862 in FIG. 123 and step S873 in FIG. 126;

Figure 116A:
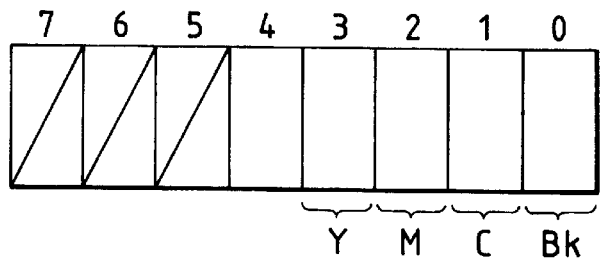
FIGS. 116A and 116B are views of examples of a BITSET flag.
Figure 116B:
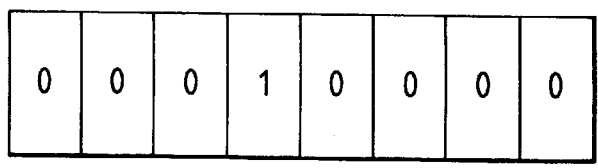
Figure 120:
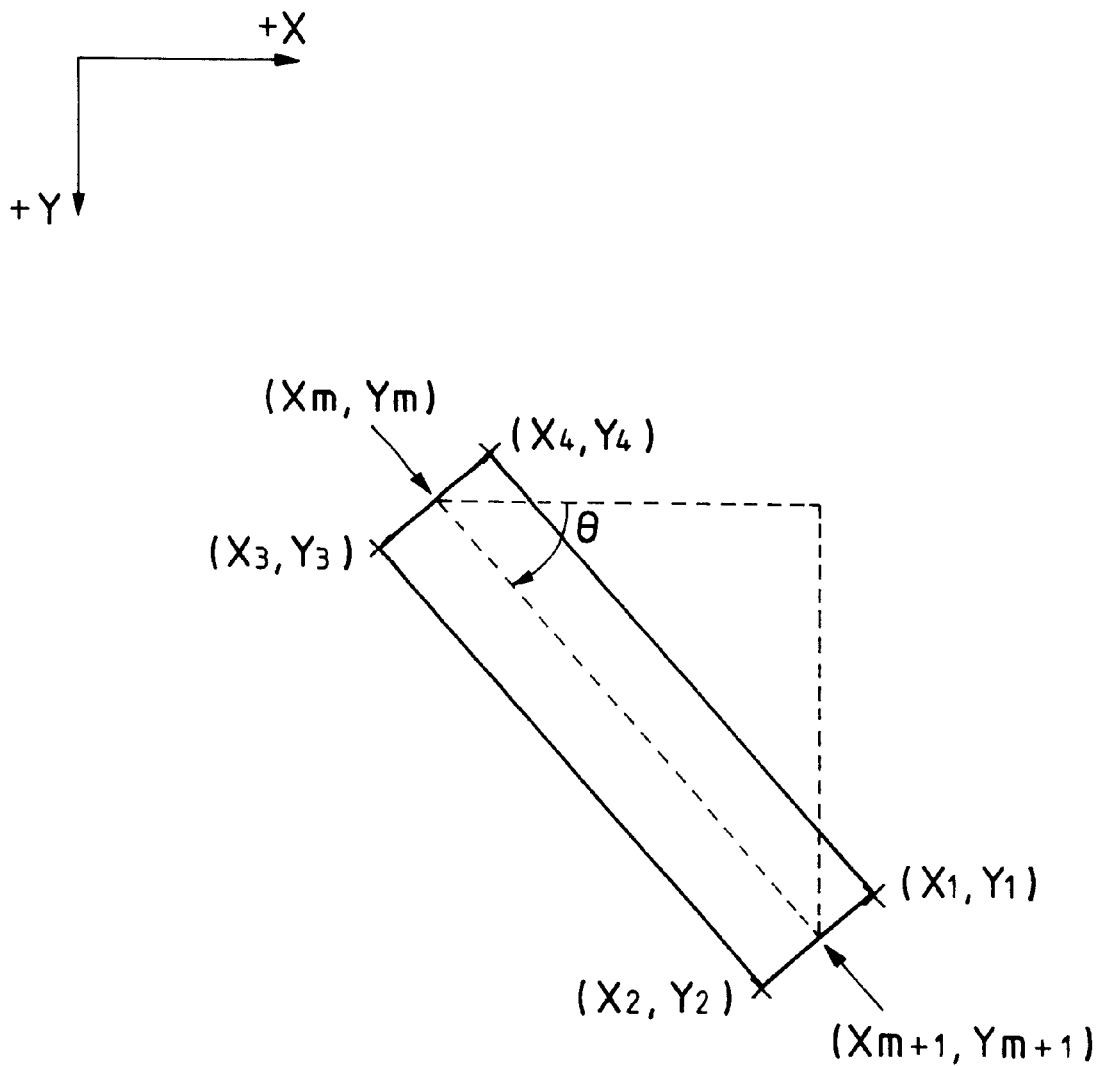
Figure 123:
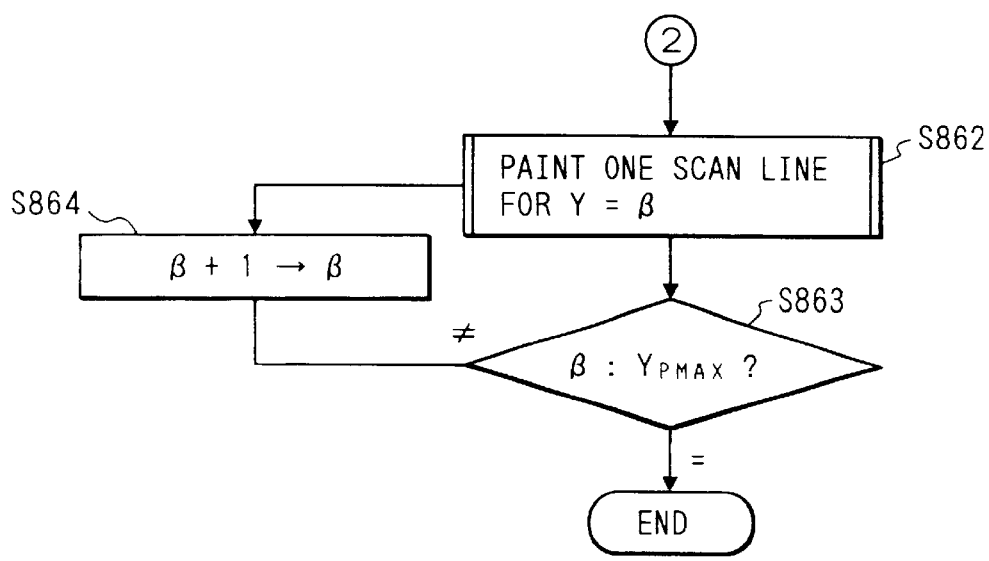
Figure 124:
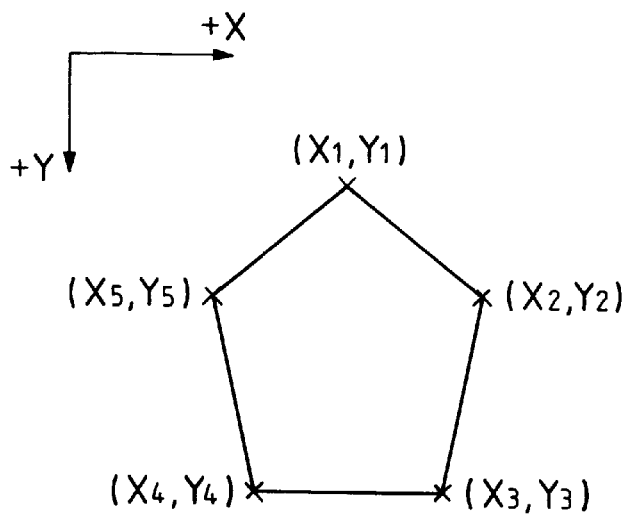
Figure 125:
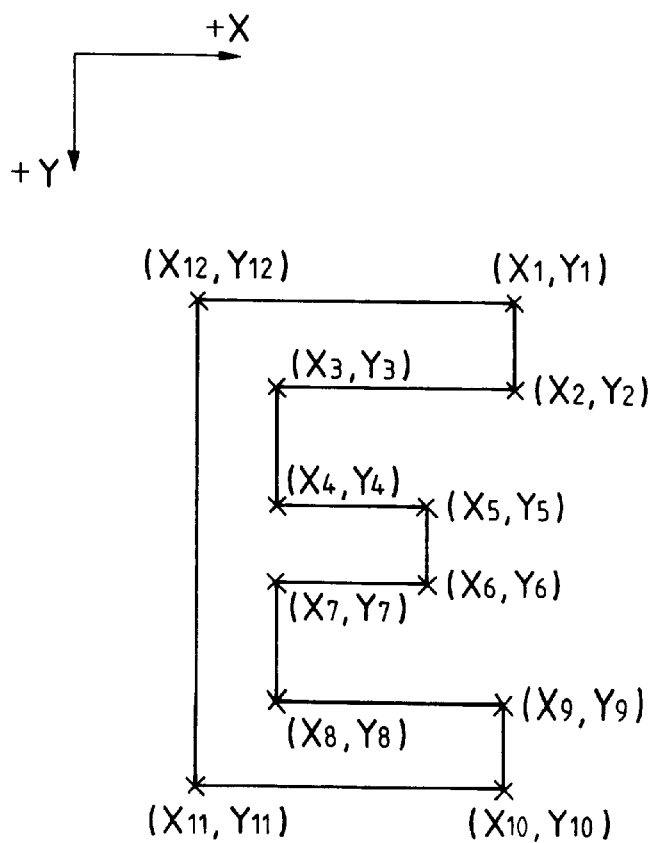
Figure 126:
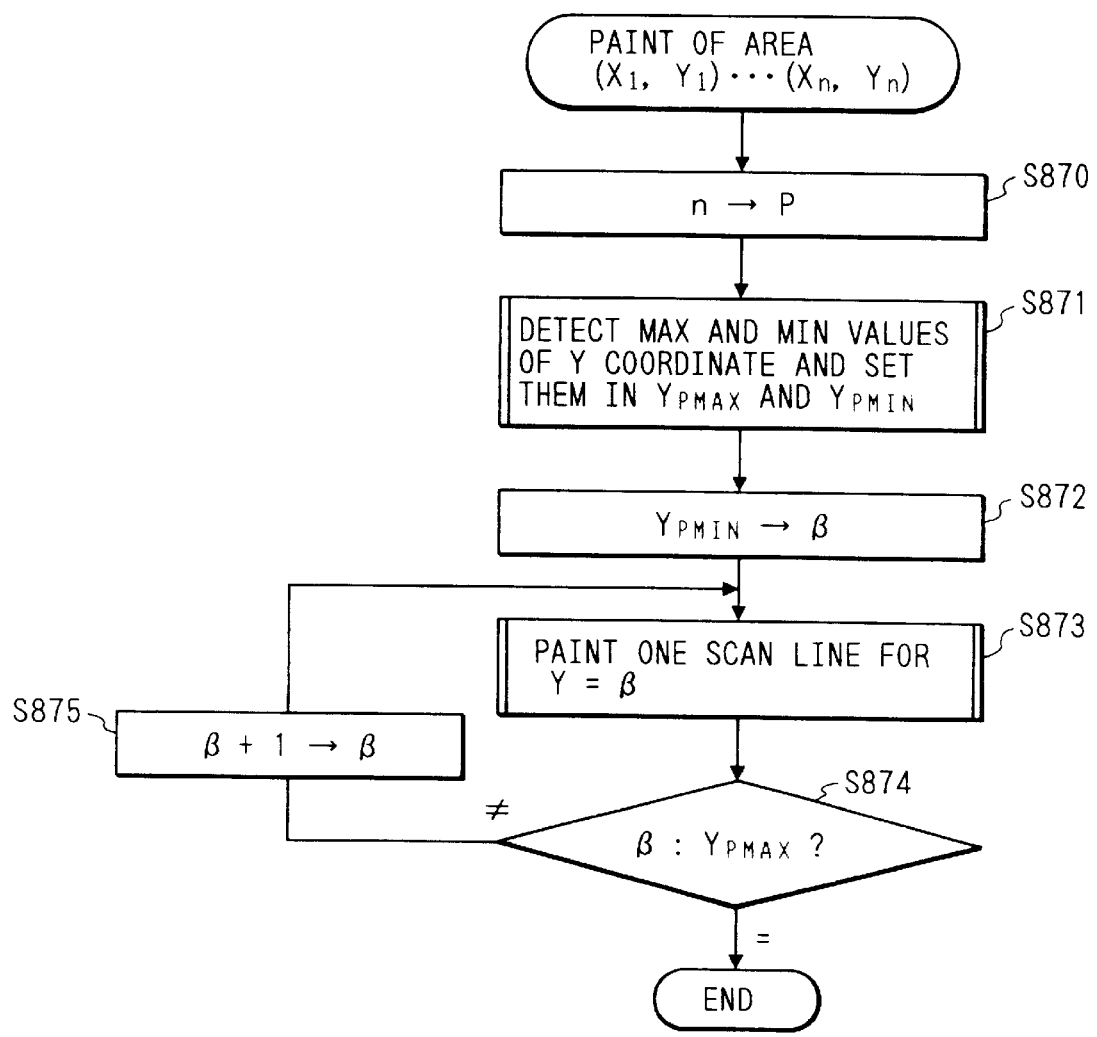
Figure 132:
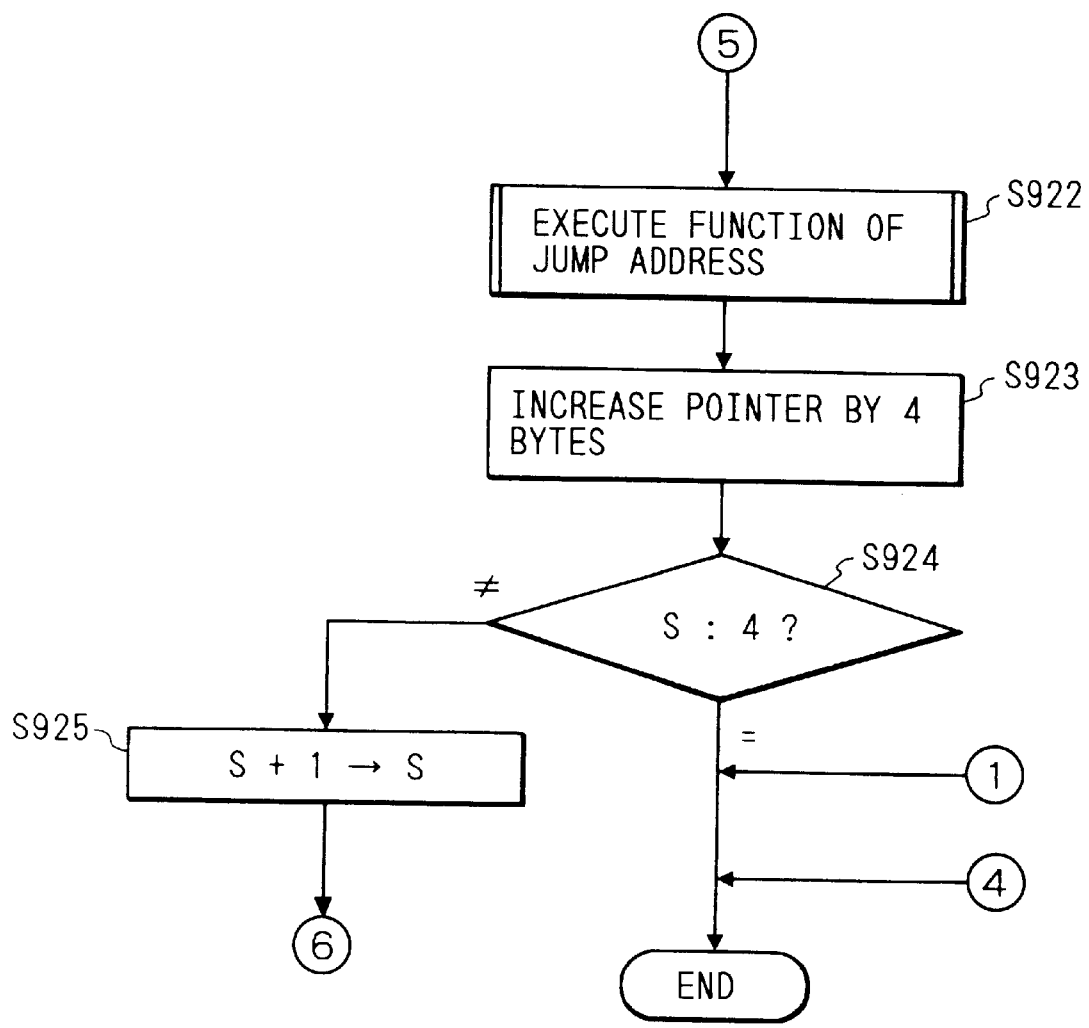
Figure 133:
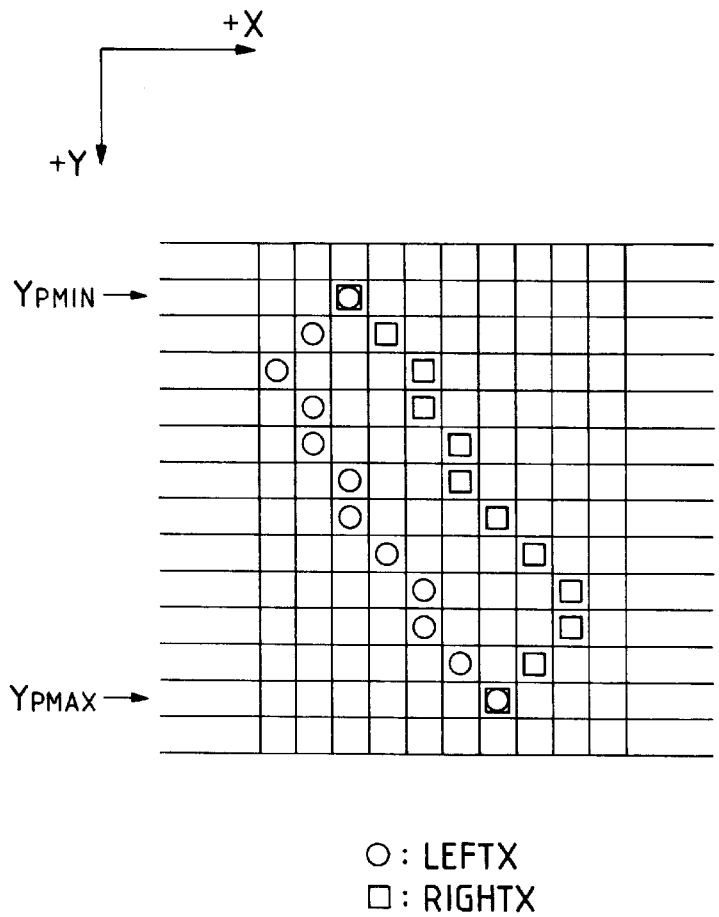
Figure 134:
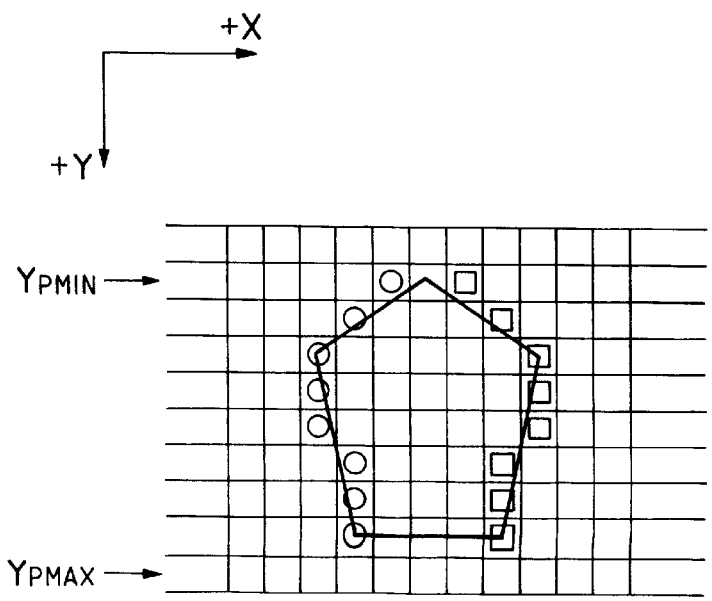
Figure 136:
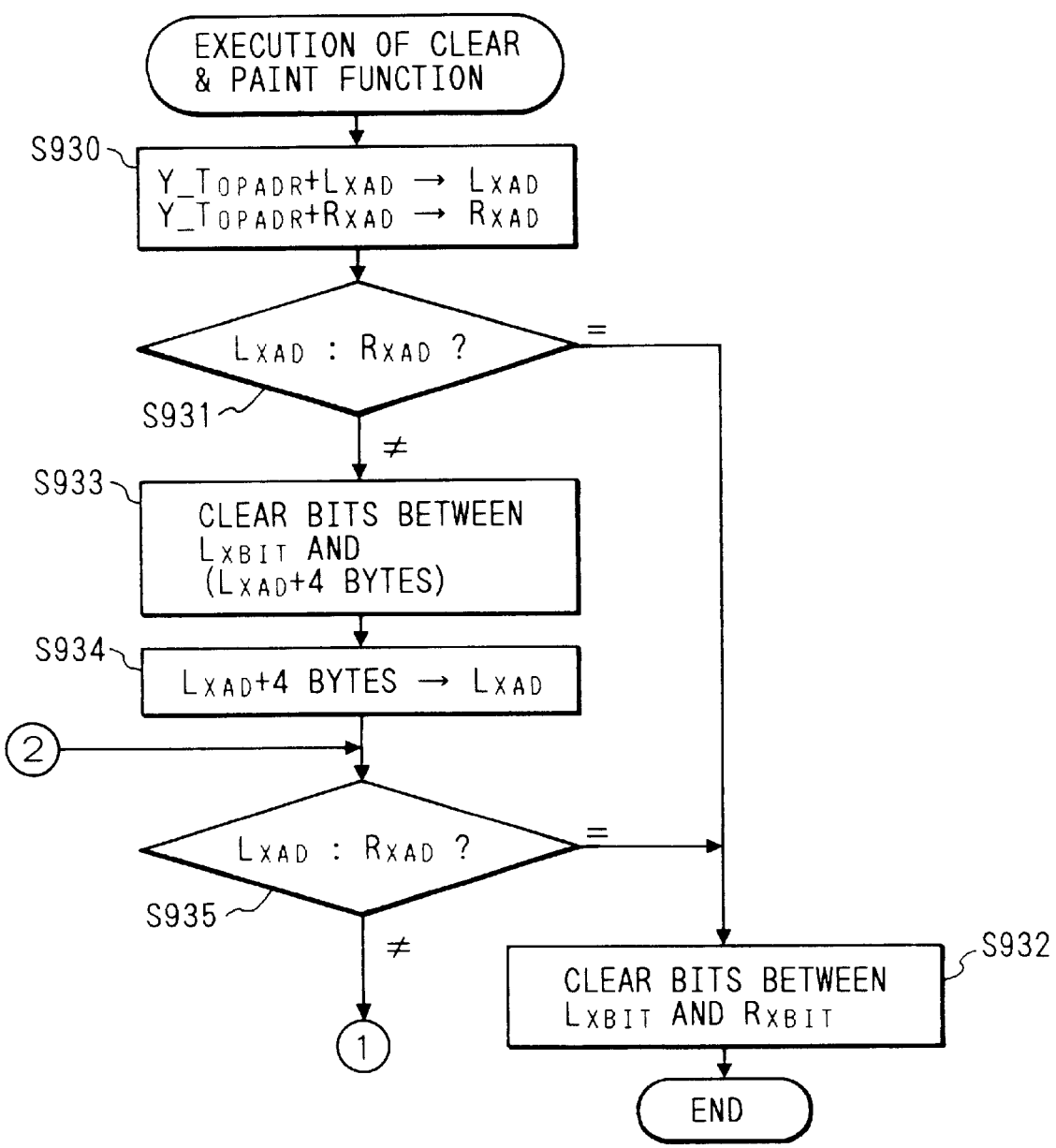
Figure 137:
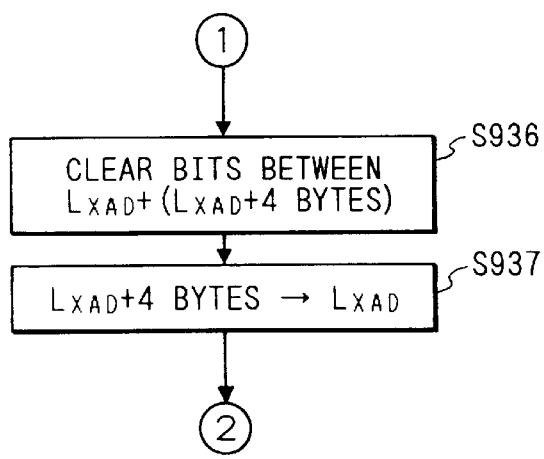
Figure 138:
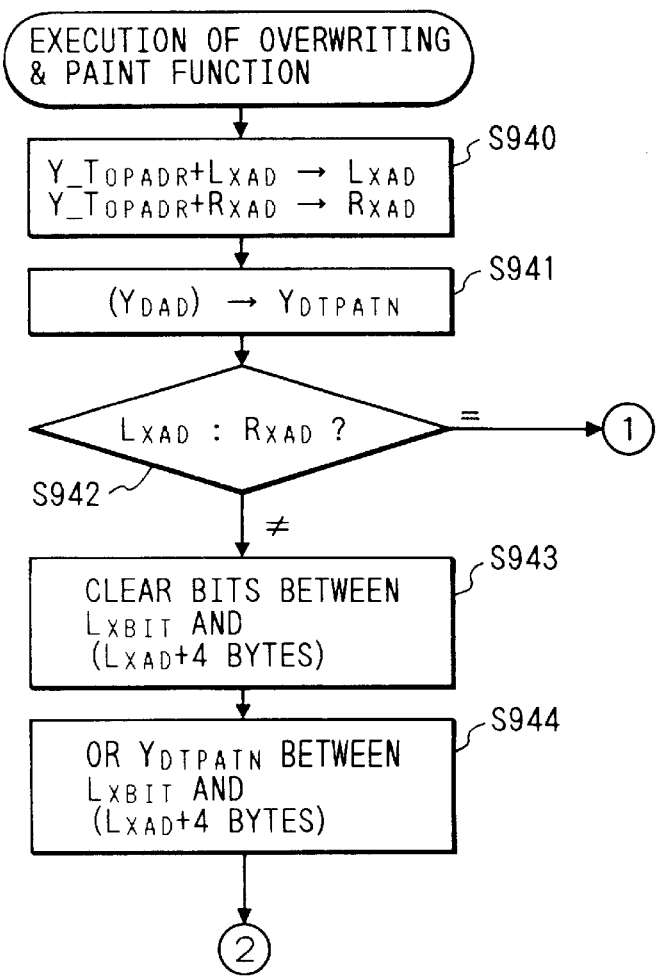
Figure 139:
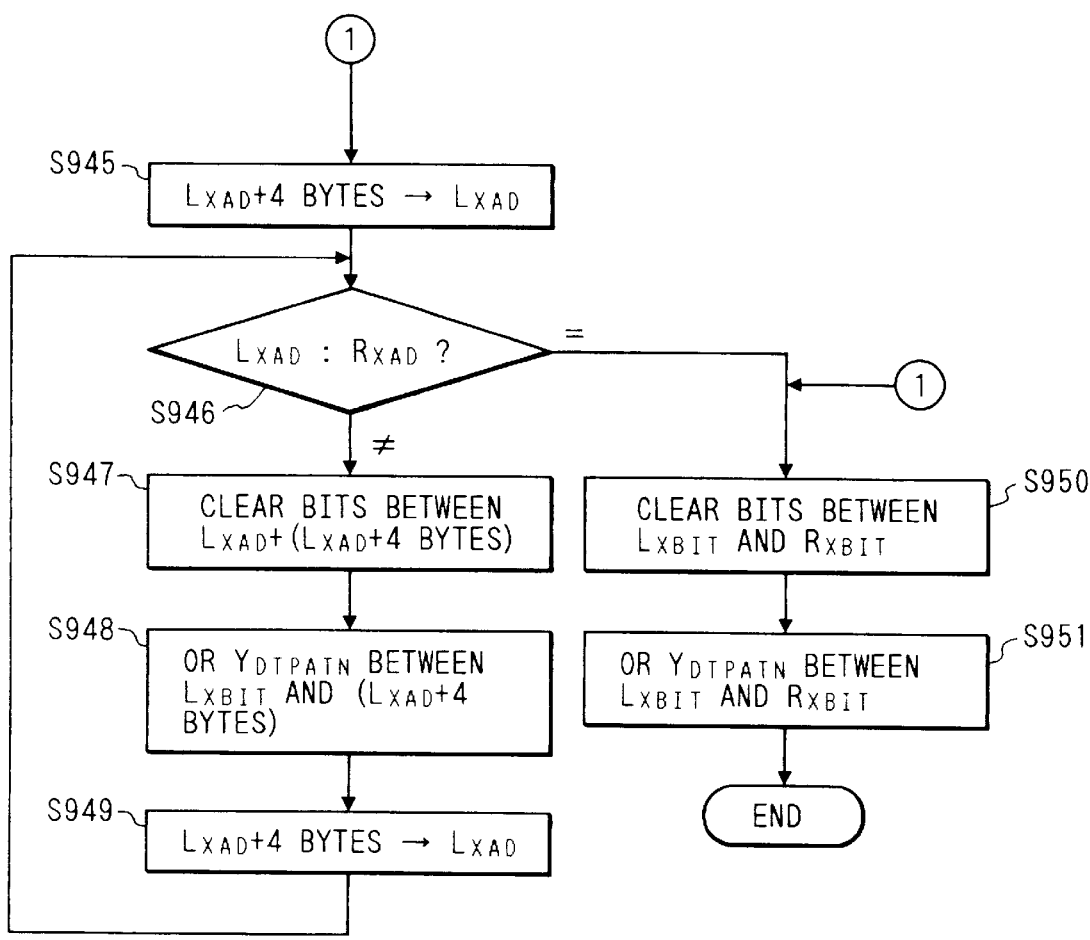
Figure 140:
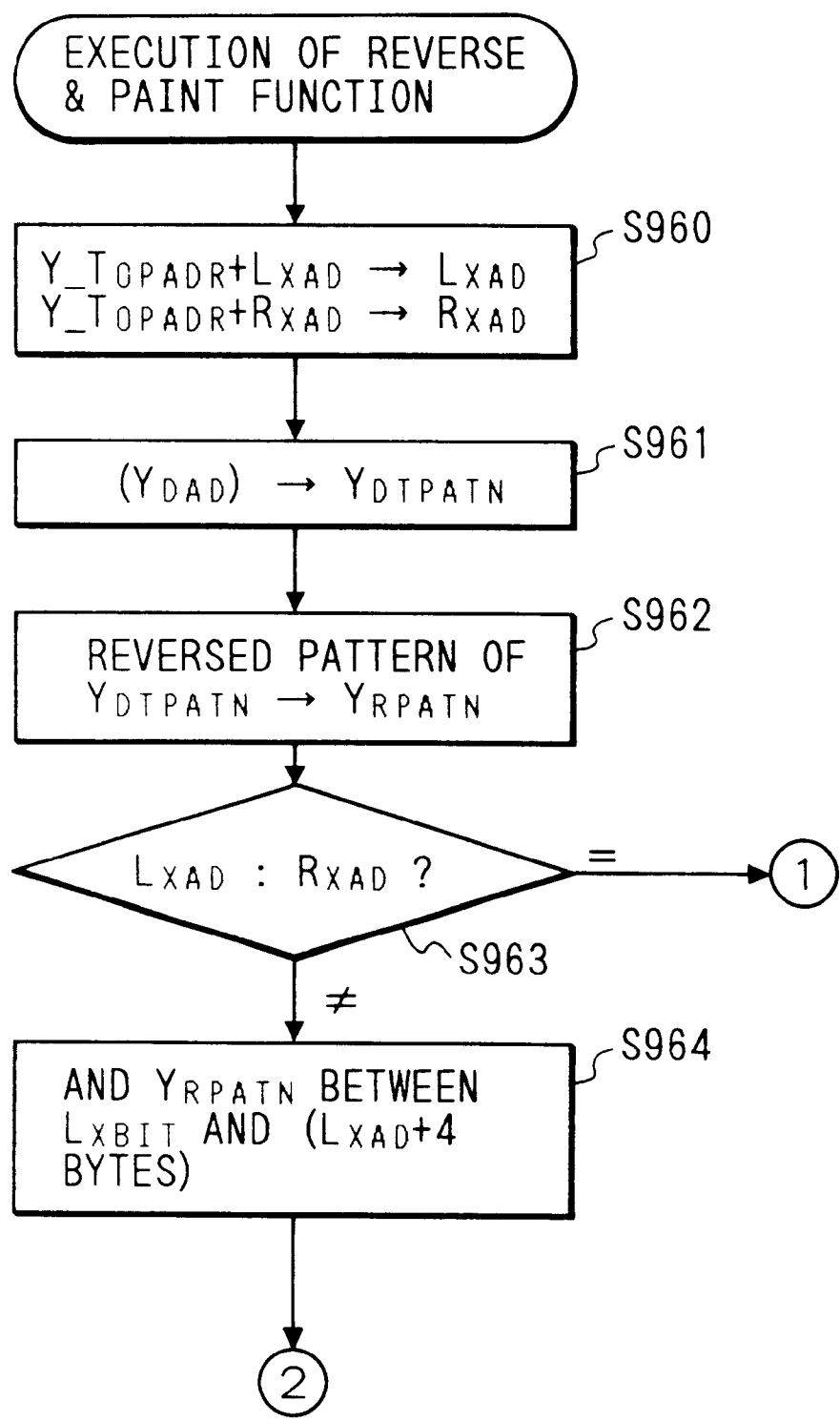
Figure 141:
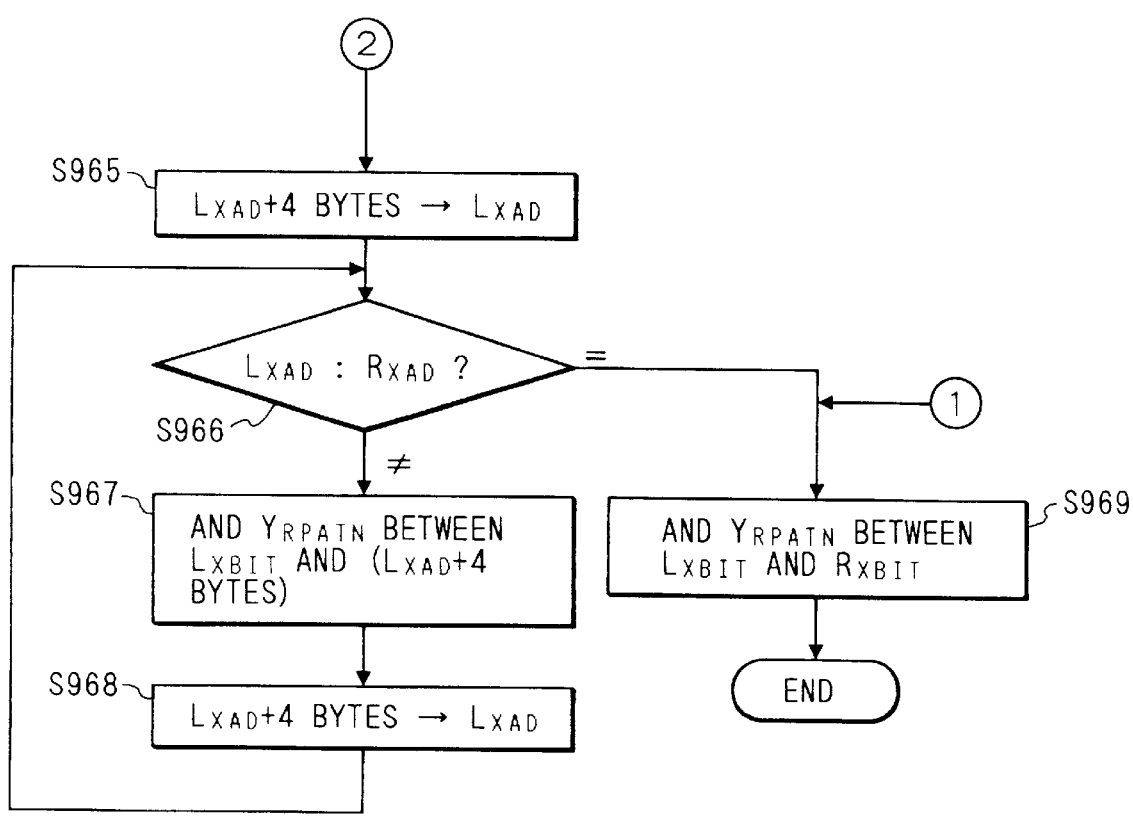
Figure 142:
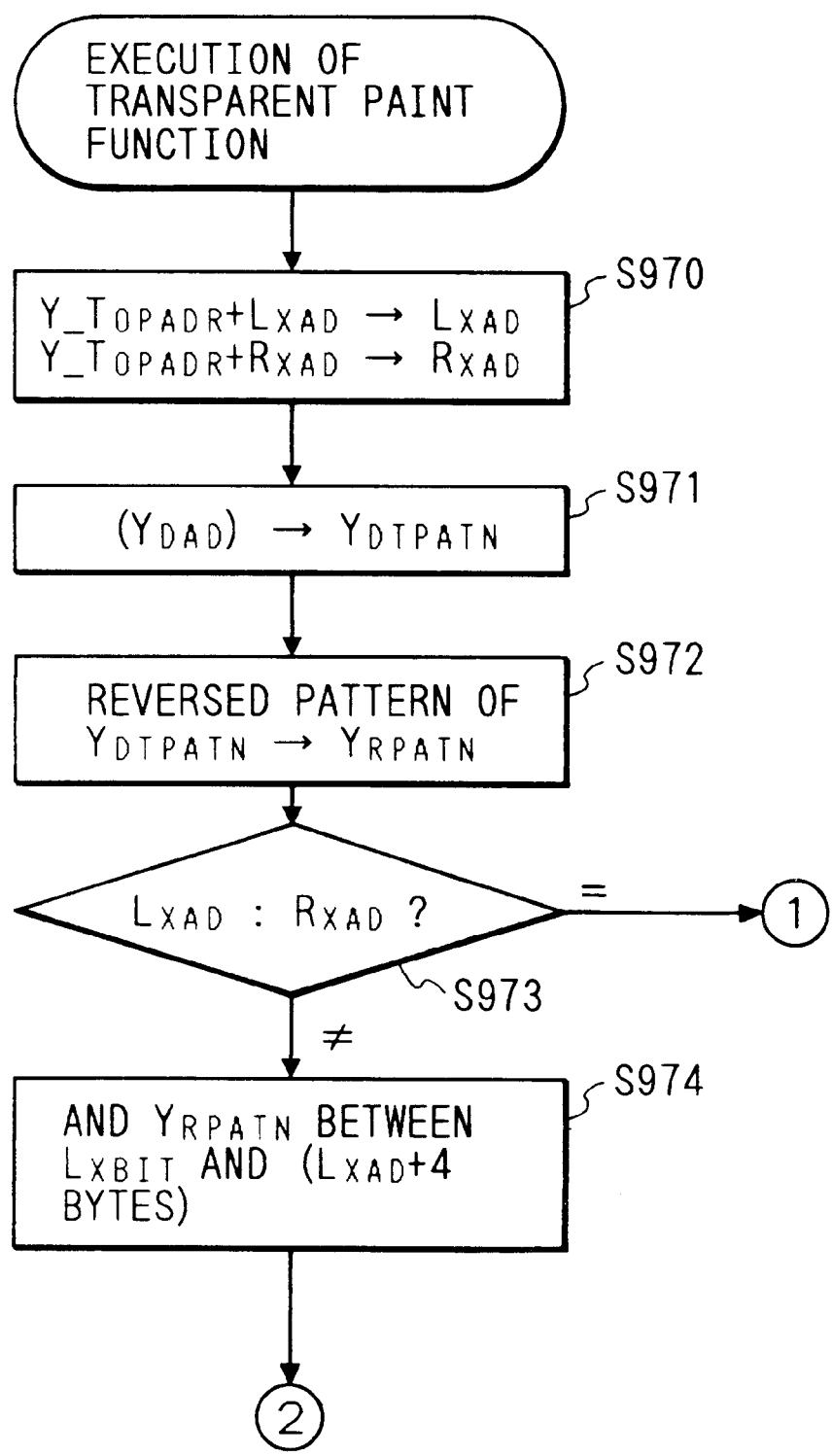
Figure 143:
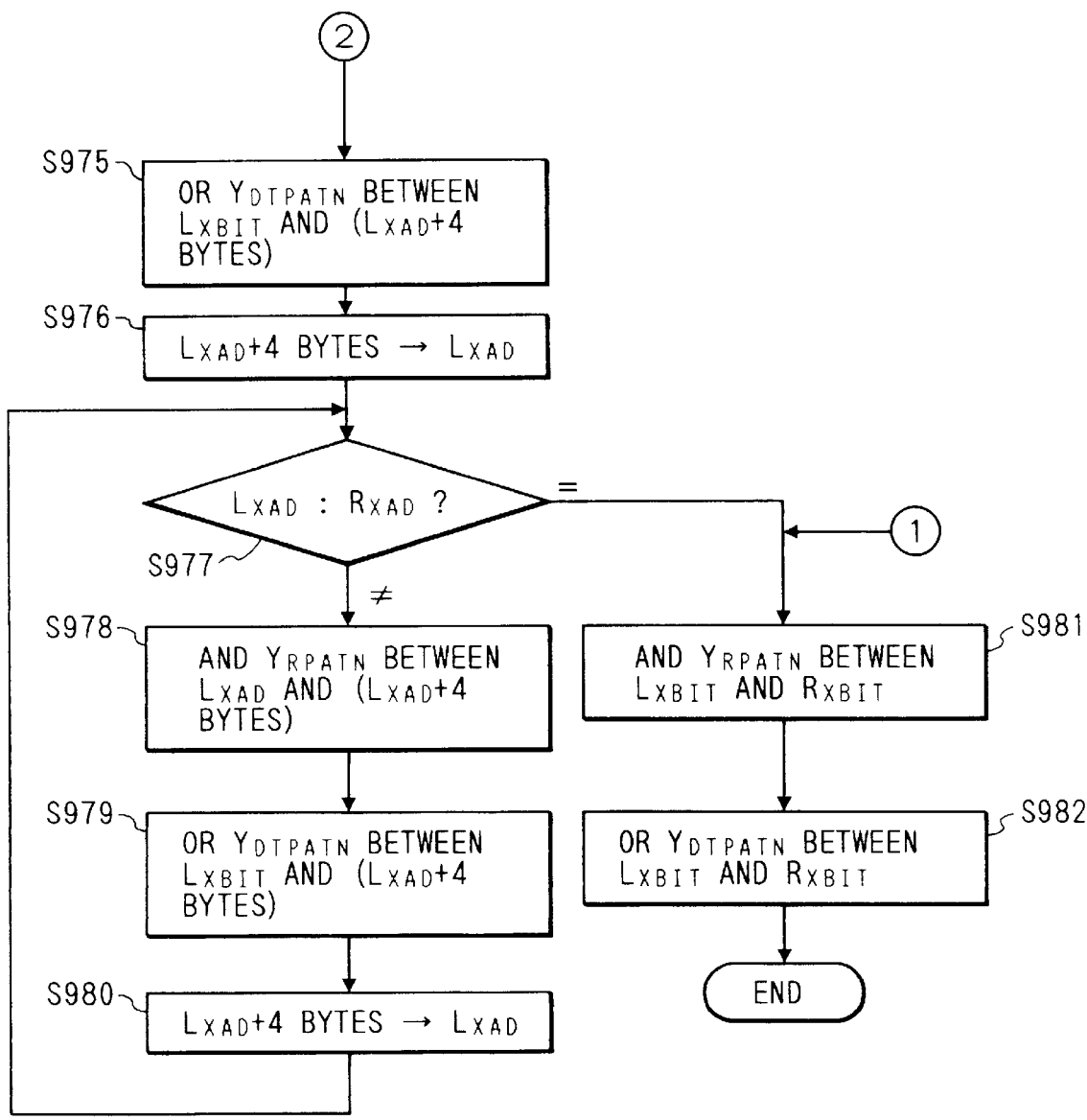
Figure 144:
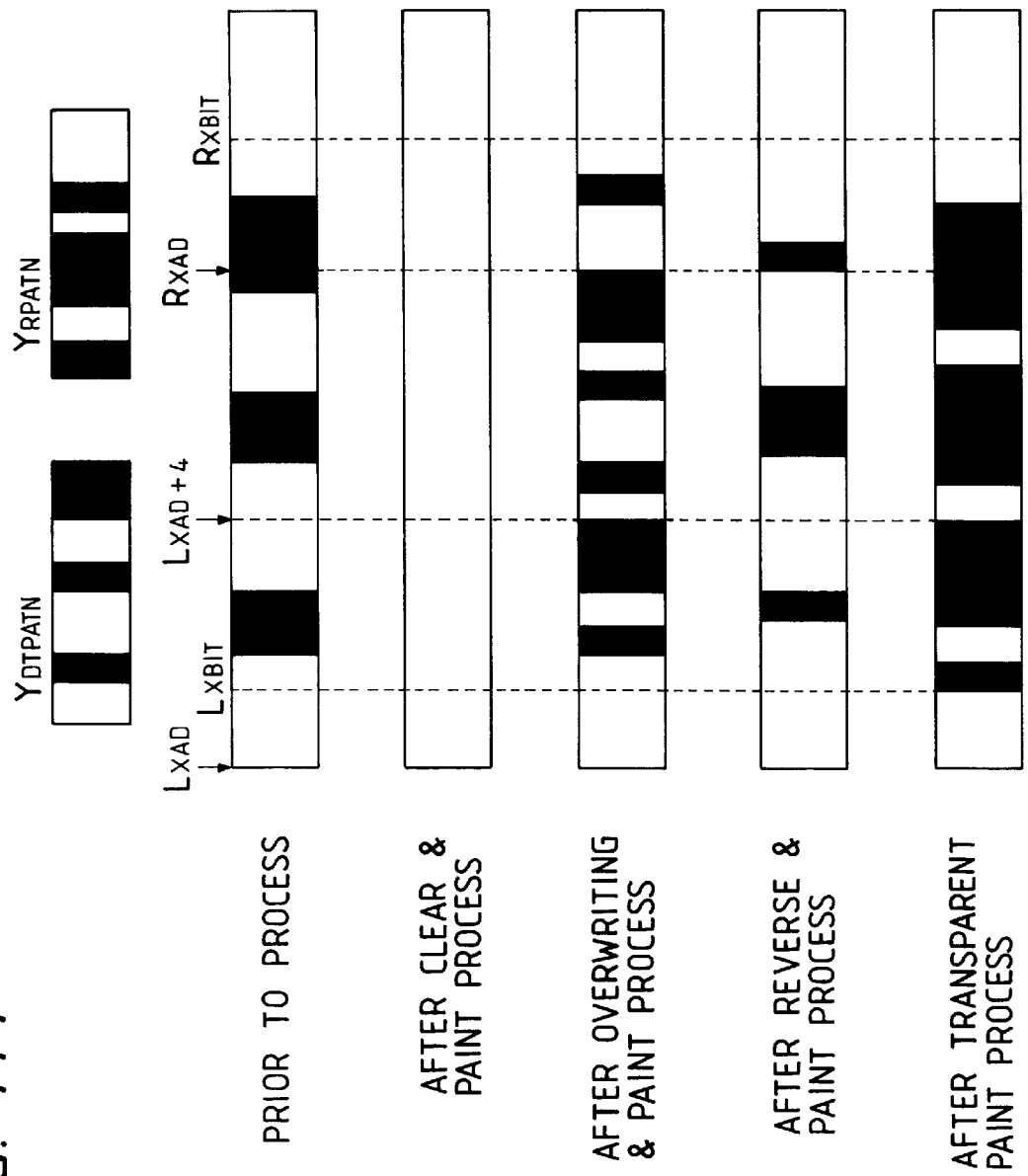
Figures 145, 146A, 146B:
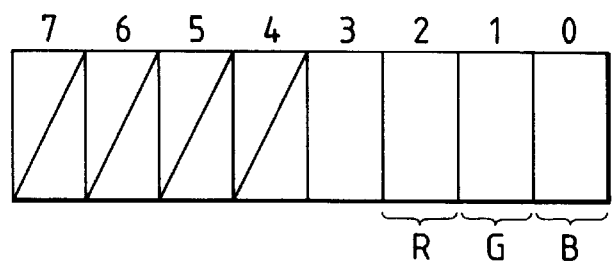
Figure 147:
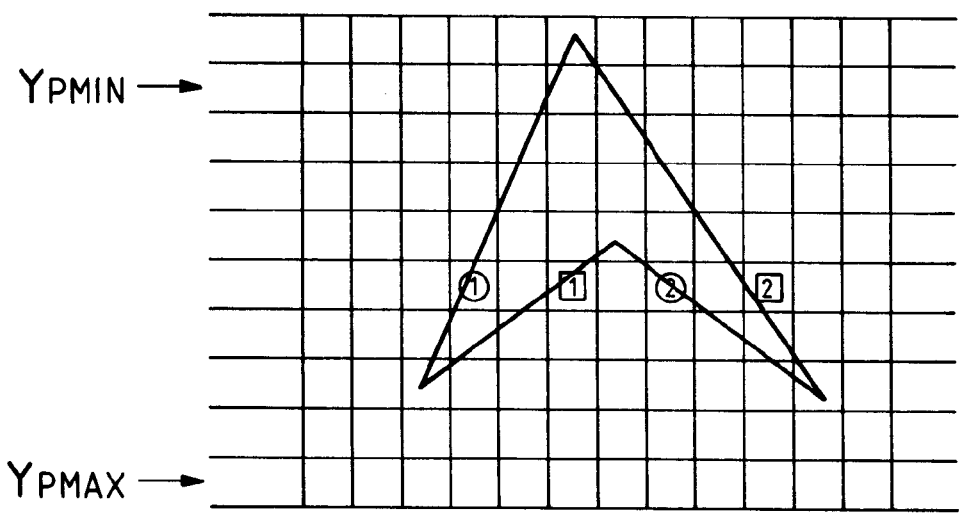

FIG. 132 is a flow chart showing the process in step S862 in FIG. 123 and step S873 in FIG. 126;

FIG. 133 is a view showing information necessary for explaining drawing of the straight line shown in FIG. 120;

FIG. 134 is a view showing information necessary for explaining a process for painting a portion inside the polygon in FIG. 124;

FIG. 135 is a view showing information necessary for explaining a process for painting a portion inside the character in FIG. 125;

FIG. 136 is a flow chart showing an example of a clear paint process in the process in step S922 in FIG. 132;

FIG. 137 is a flow chart showing an example of the clear paint process in the process in step S922 in FIG. 132;

FIG. 138 is a flow chart showing an example of an overwrite paint process of the process in step S922 in FIG. 132;

FIG. 139 is a flow chart showing an example of the overwrite paint process of the process in step S922 in FIG. 132;

FIG. 140 is a flow chart showing an example of a reverse paint process of the process in step S922 in FIG. 132;

FIG. 141 is a flow chart showing an example of the reverse paint process of the process in step S922 in FIG. 132;

FIG. 142 is a flow chart showing an example of a transparent paint process of the process in step S922 in FIG. 132;

FIG. 143 is a flow chart showing an example of the transparent paint process of the process in step S922 in FIG. 132;

FIG. 144 is a view showing an example of the paint processes shown in FIGS. 136 to 143;

FIG. 145 is a view showing another embodiment of FIG. 133;

FIGS. 146A and 146B are views showing other embodiments of FIGS. 116A and 116B; and FIG. 147 is a view showing a polygon including two portions to be painted with respect to one scan line of a Y coordinate.

DESCRIPTION OF THE PREFERRED EMBODIMENT

The preferred embodiment of the present invention will be described in detail hereinafter with reference to the accompanying drawings.

FIG. 24 is comprised of FIGS. 24A and 25B block diagrams showing a circuit arrangement of an image processing apparatus according to an embodiment of the present invention.

Figure 1:
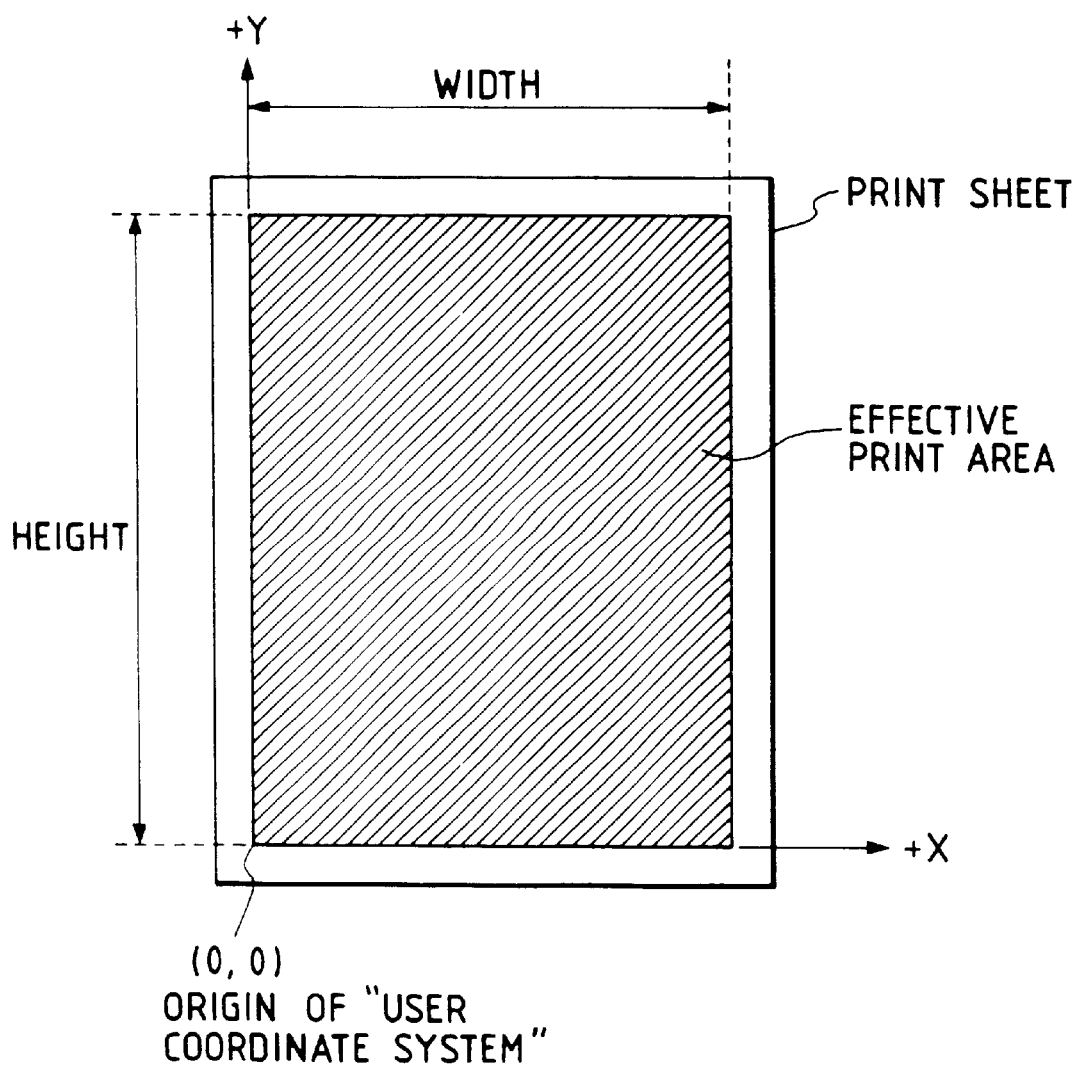
FIG. 1 is a view of an example of a user coordinate system.
Figure 2:
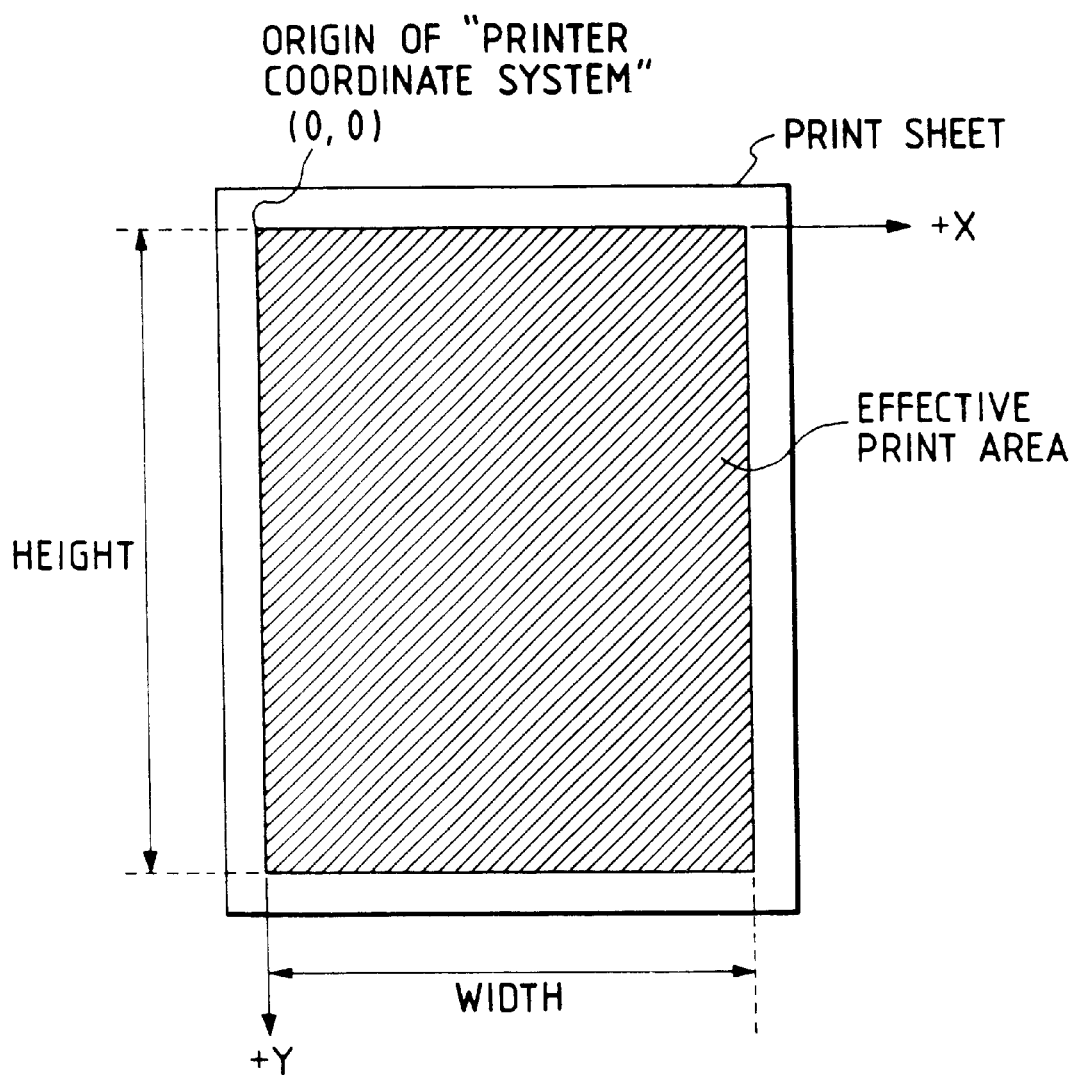
FIG. 2 is a view of an example of a printer coordinate system.
Figure 3:
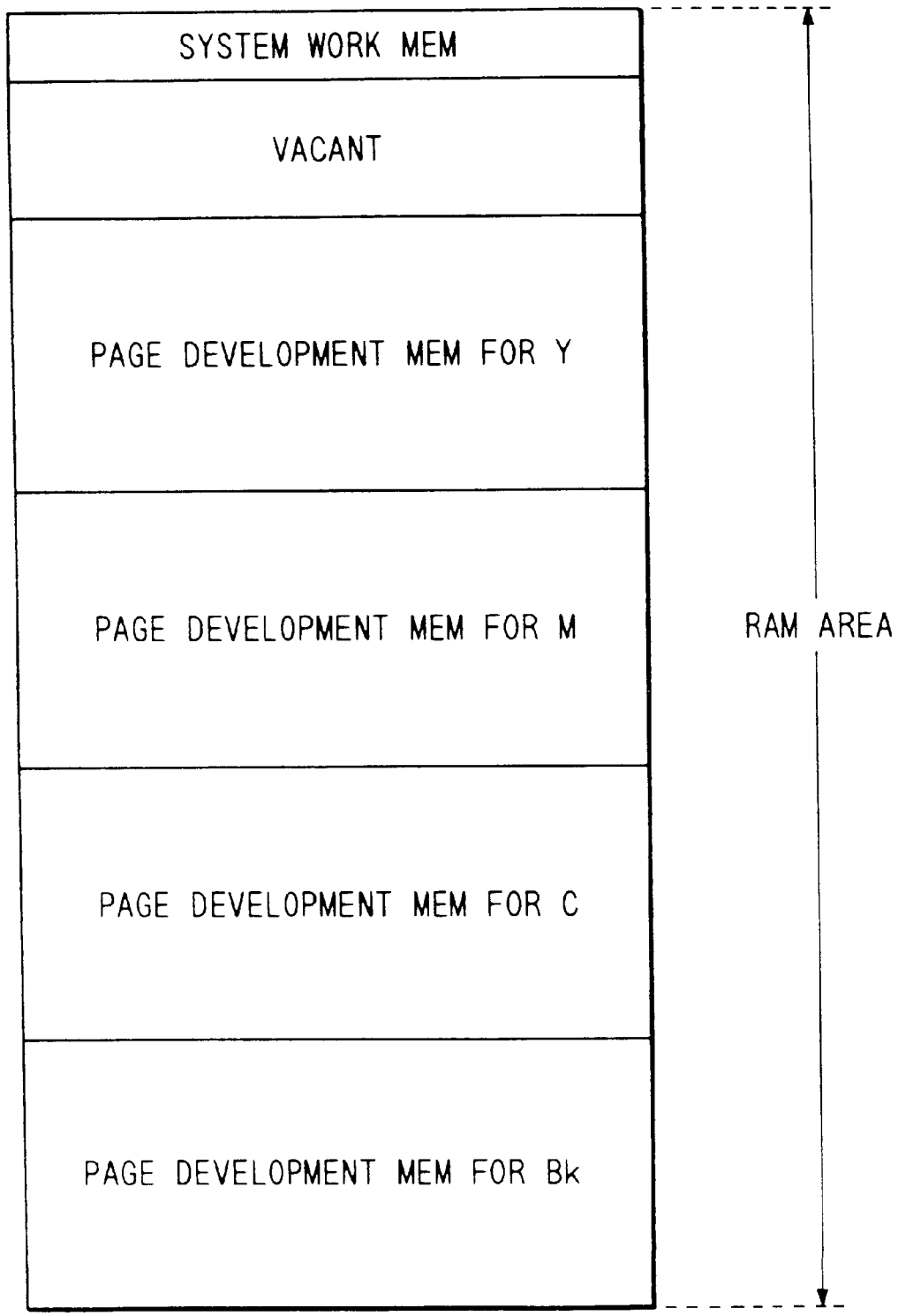
FIG. 3 is a view of an example of a memory map of a RAM area in a color image processing apparatus when each of Y, M, C, and Bk has a memory area corresponding to the size of an effective print area of a print sheet.
Figure 14:
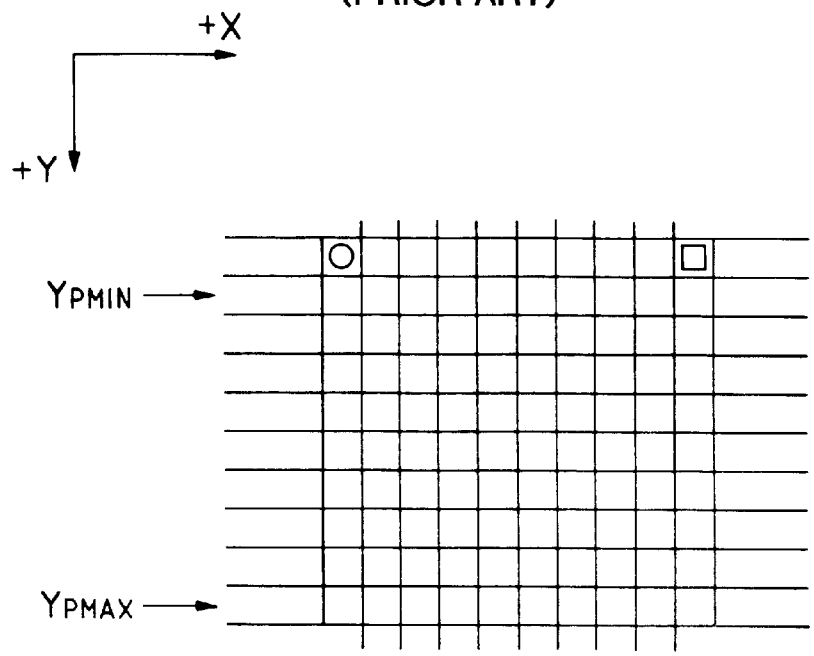
FIG. 14 is a view of the polygon shown in FIG. 10 divided in coordinate units of the printer coordinate system.
Figure 15:
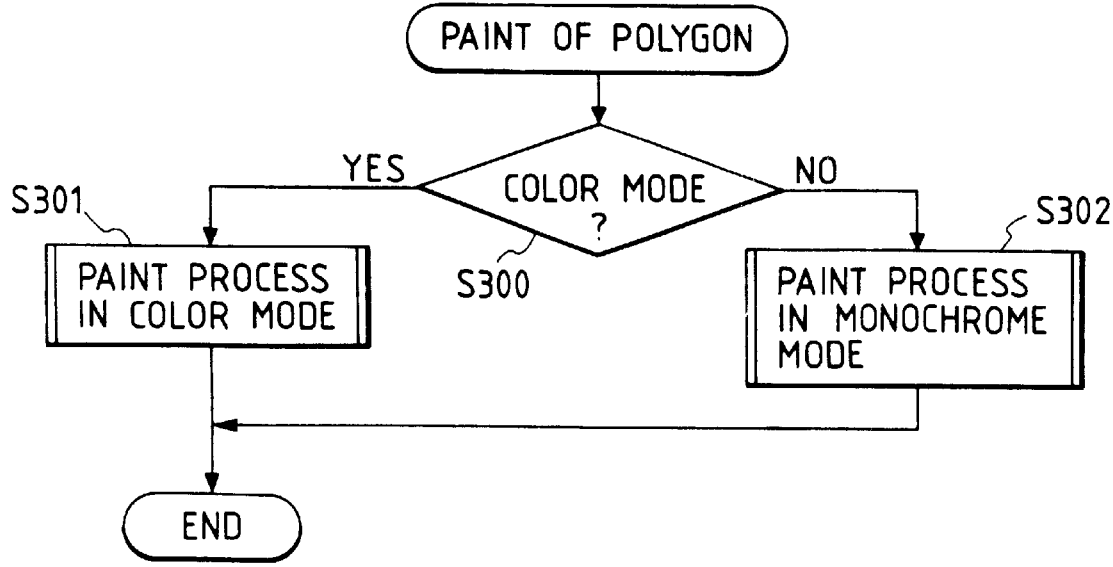
FIG. 15 is a flow chart showing an example of a process for painting a portion inside the polygon shown in FIG. 14.
Figure 16:
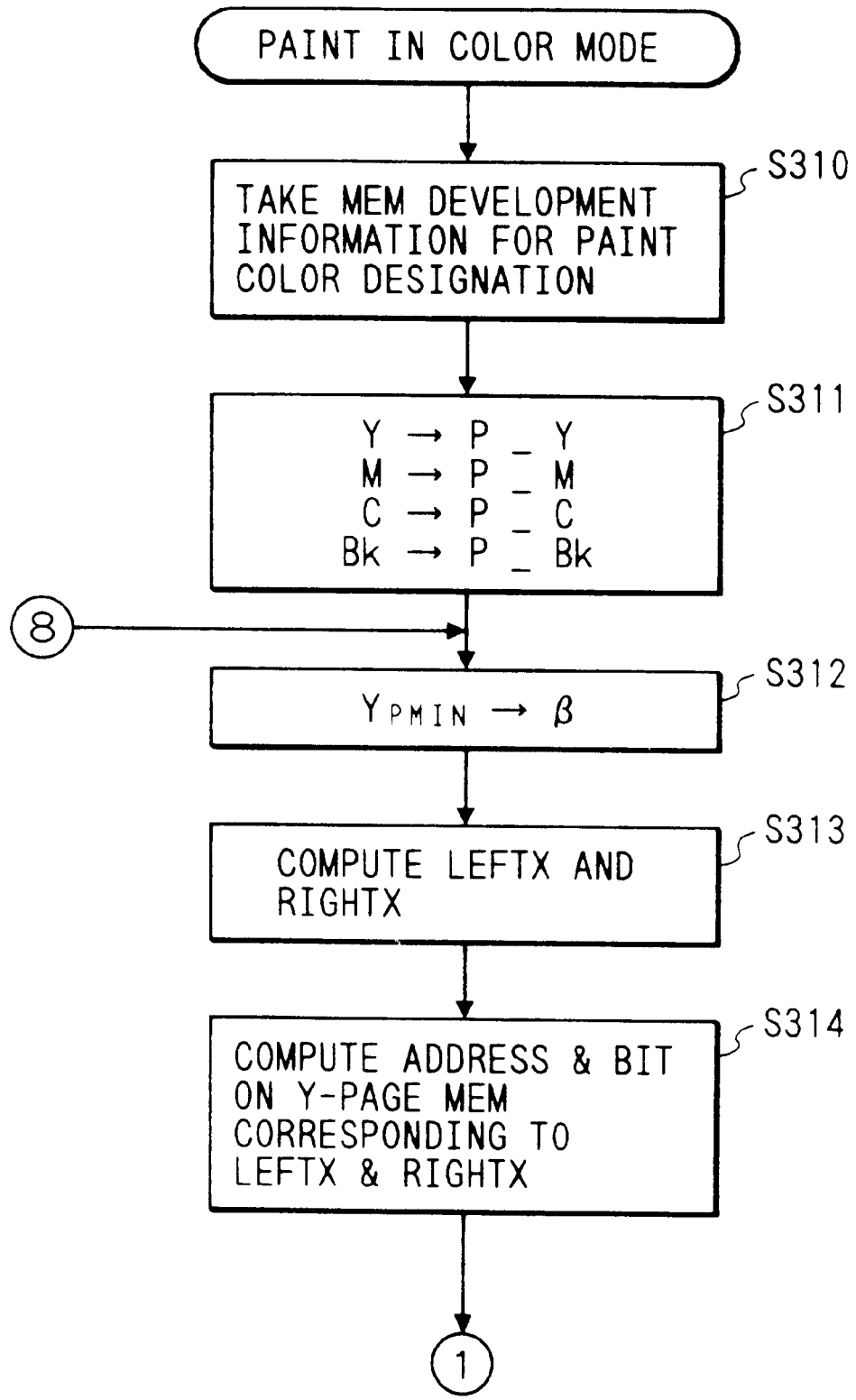
FIG. 16 is a flow chart showing a process in step S301 in FIG. 15.
Figure 17:
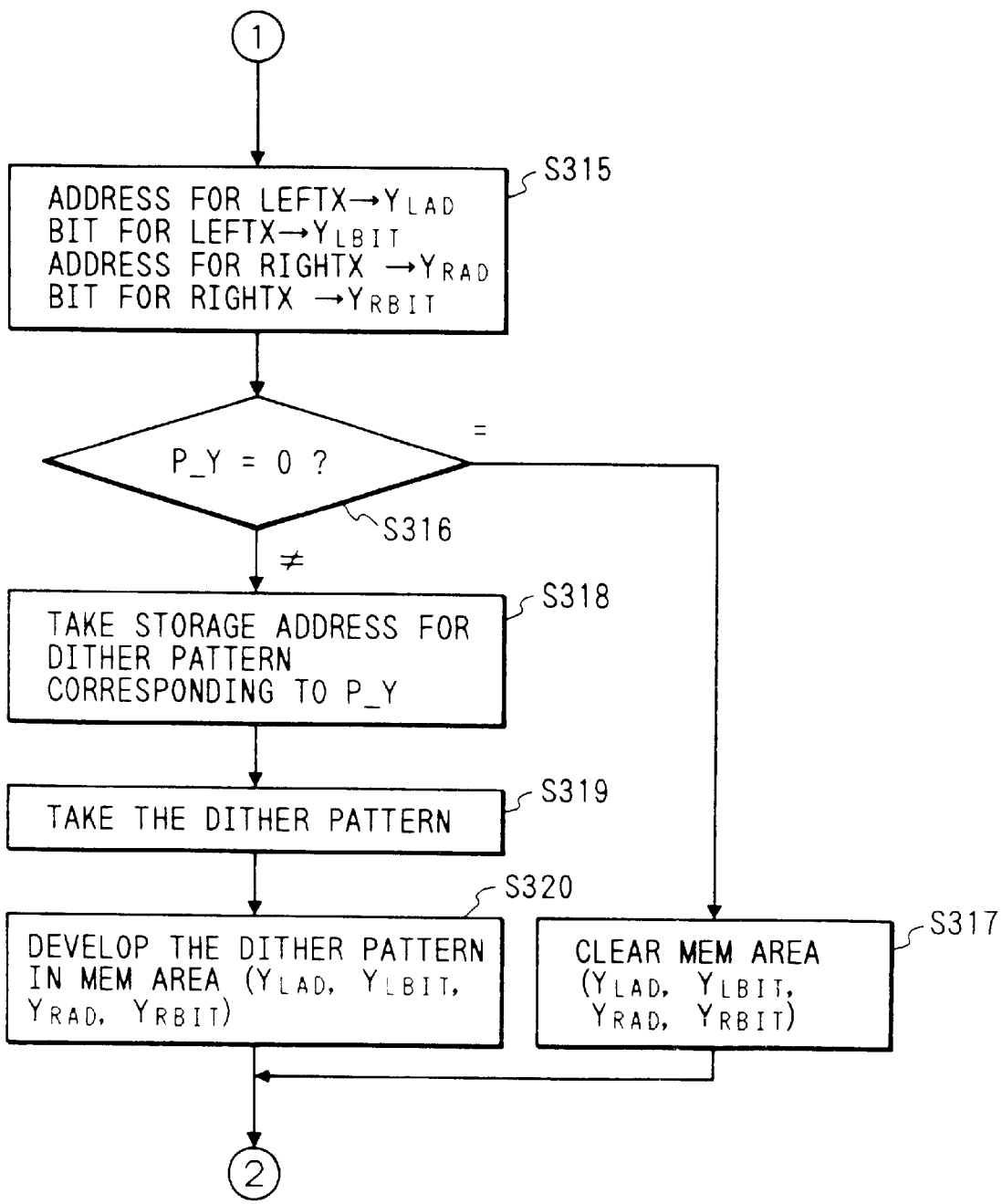
FIG. 17 is a flow chart showing the process in step S301 in FIG. 15.
Figure 18:
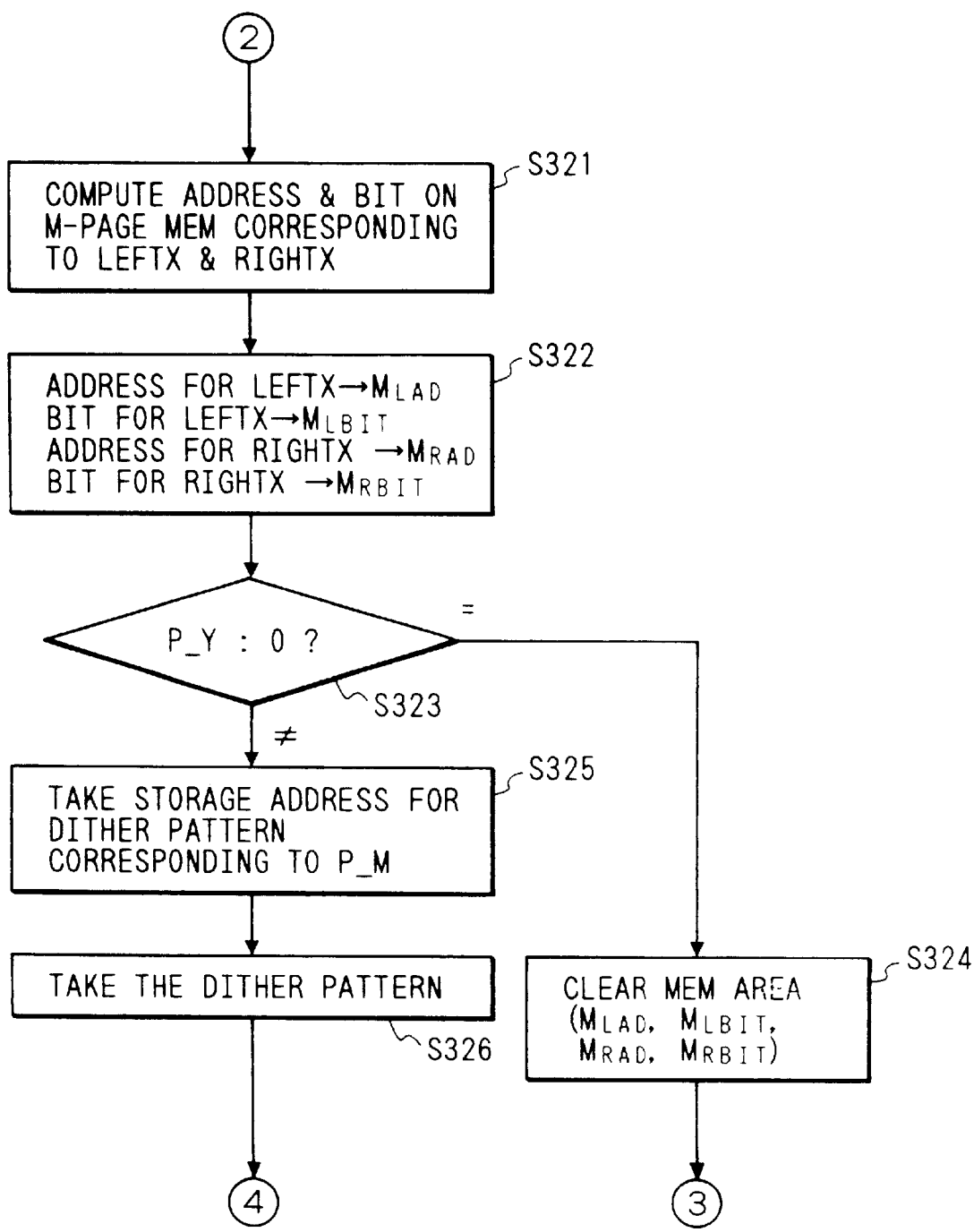
FIG. 18 is a flow chart showing the process in step S301 in FIG. 15.
Figure 19:
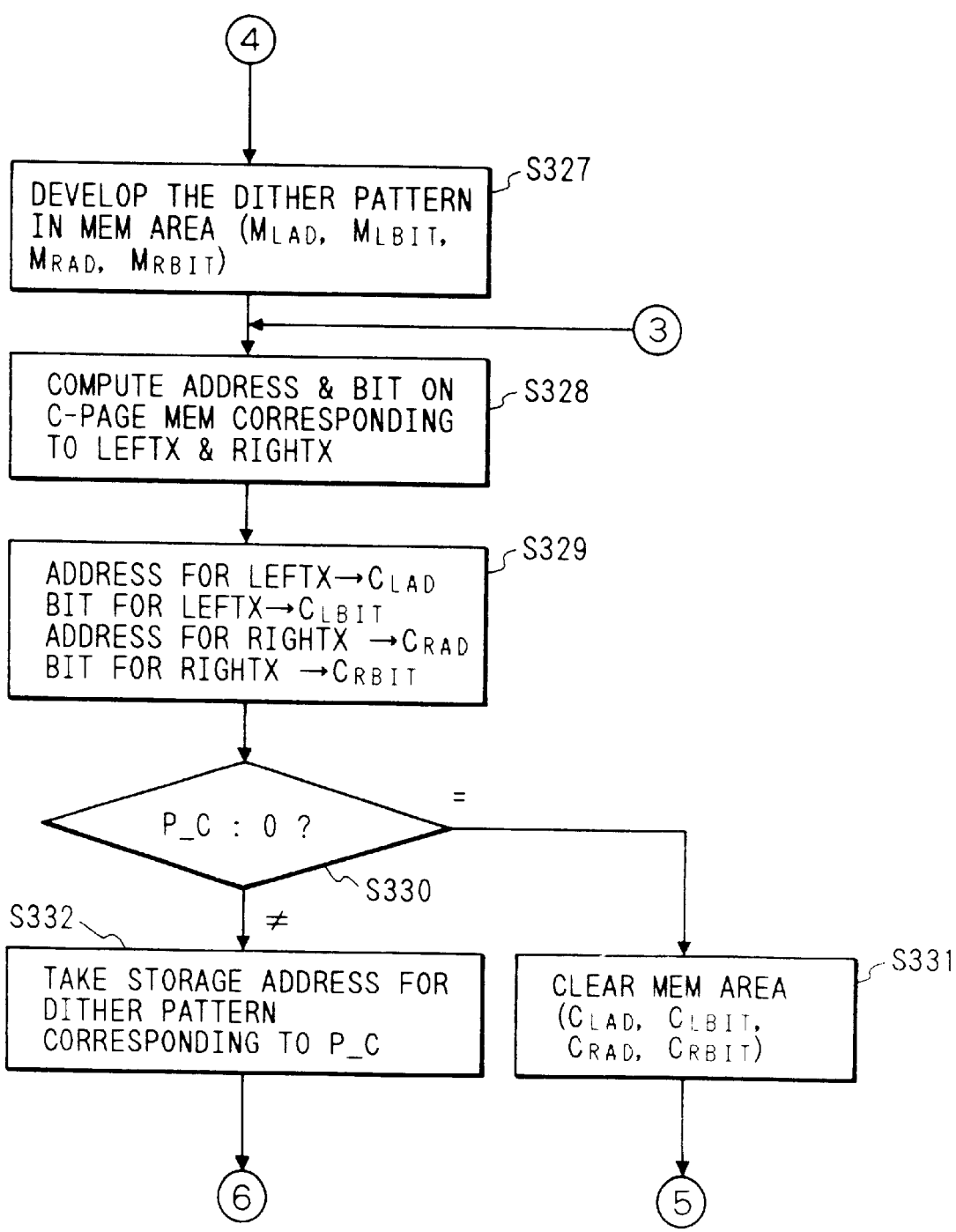
FIG. 19 is a flow chart showing the process in step S301 in FIG. 15.
Figure 20:
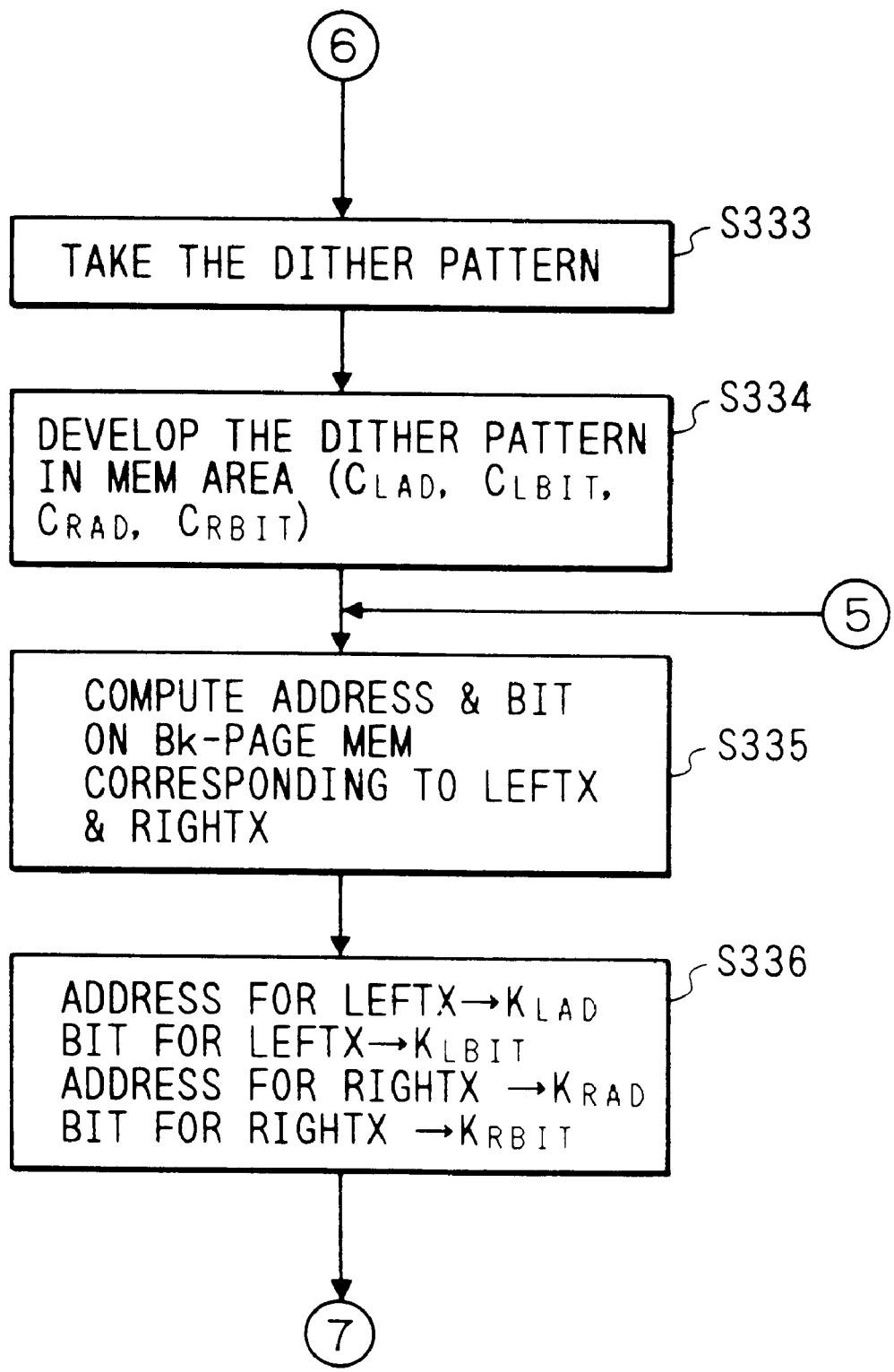
FIG. 20 is a flow chart showing the process in step S301 in FIG. 15.
Figure 21:
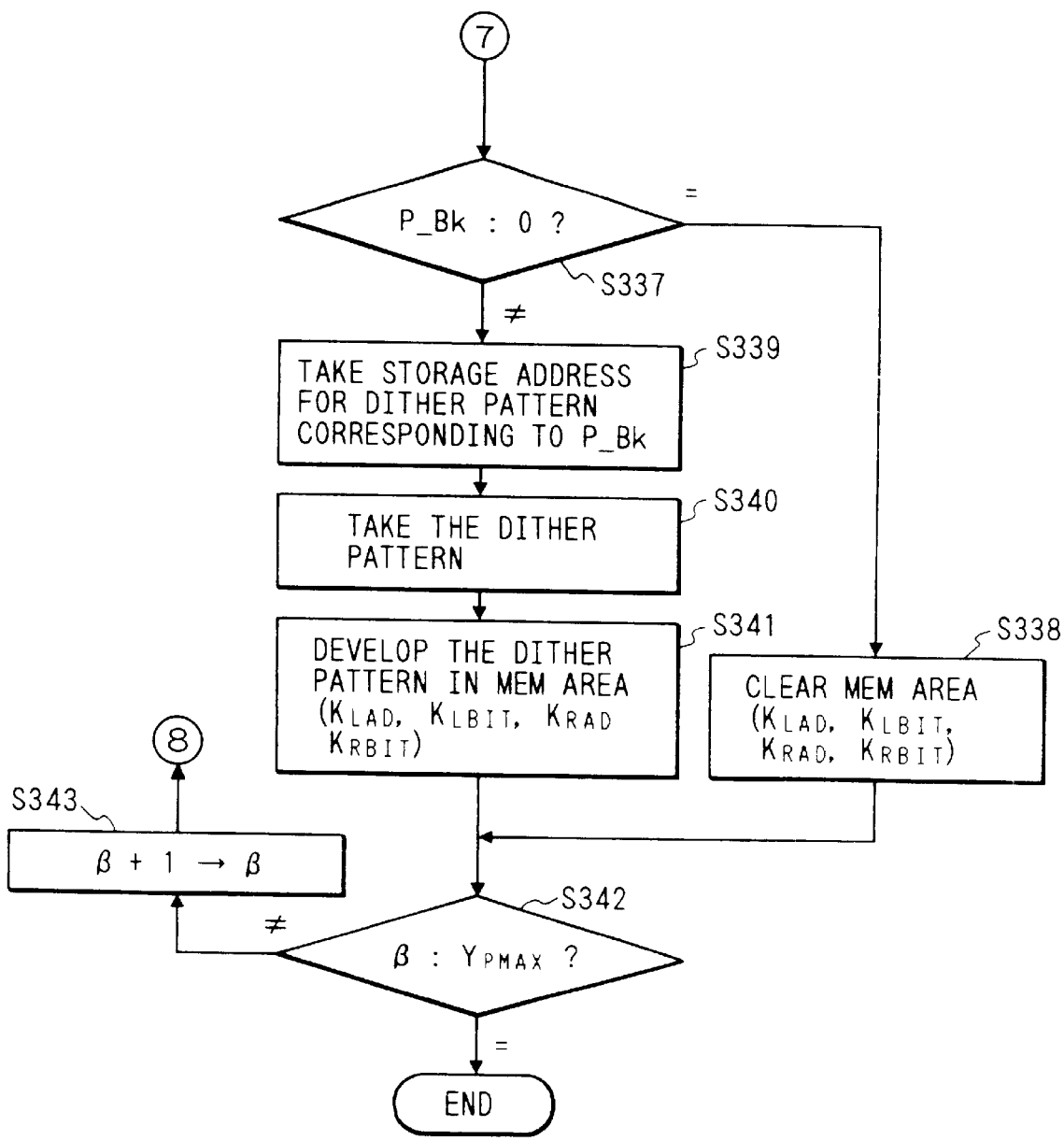
FIG. 21 is a flow chart showing the process in step S301 in FIG. 15.
Figure 24B:
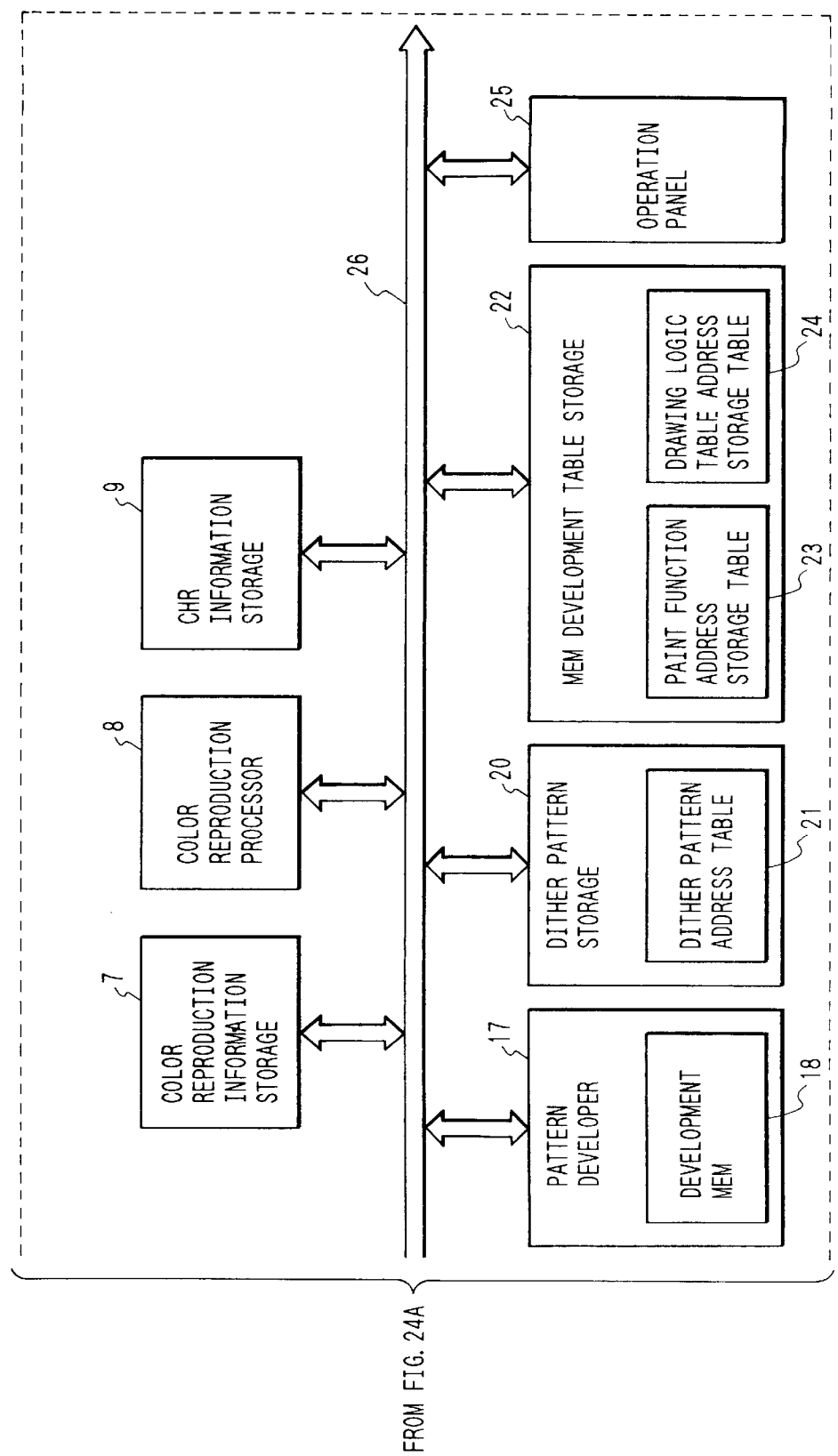
FIG. 24 is comprised of FIGS. 24A and 24B block diagrams showing a circuit arrangement of an image processing apparatus according to an embodiment of the present invention.

As shown in FIGS. 24A and 24B, an image processing apparatus according to this embodiment is constituted by a host computer 1 and an image processing apparatus main body 1000.

The host computer 1 supplies print data, a print command, and the like to the image processing apparatus, and causes the image processing apparatus to perform a recording process. The image processing apparatus has a microprocessor system including a CPU, a ROM, and a RAM. More specifically, the image processing apparatus main body comprises: an interface 2 for exchanging data with the host computer 1; a command analyzer 3 which includes a command analysis table 4 storing jump addresses to analysis programs corresponding to command Nos. of commands sent from the host computer 1, and which analyzes print data or a command sent from the host computer 1, and generates information for one page, which can be developed on a development memory; a band information storage 5 which includes a band height information table 6 storing a band height and information (memory capacity) of a development memory for a corresponding coloring material, and which stores information of band heights, and the like; a color reproduction information storage 7 storing information required in a color reproduction process; a color reproduction processor 8 for performing the color reproduction process; a character information storage 9 storing information for drawing a character; a controller 10 for controlling the apparatus; a memory development information storage 11 including an attribute information storage area 12 for storing attribute information, and a memory development information storage area 13 for storing information to be developed on a memory; a memory development information analyzer 14 which includes a command execution jump table 1 (15) and a command execution jump table 2 (16), and analyzes memory development information; a pattern developer 17 for developing analyzed memory development information on a development memory 18 consisting of four memories, i.e., Y, M, C, and Bk memories; an output unit 19 for outputting developed data onto a print sheet as a permanently visual image; a dither pattern storage 20 which includes a dither pattern address table 21 storing header addresses of dither pattern storage areas corresponding to Y, M, C, and Bk values used in development onto Y, M, C, and Bk development memories, and which stores Y, M, C, and Bk dither patterns; a memory development table storage 22 including paint function address storage tables 23 in units of drawing logics, which tables store jump addresses to paint functions used in development onto the Y, M, C, and Bk development memories, and a drawing logic address table address storage table 24 which stores header addresses of the paint function address storage tables in units of drawing logics; an operation panel 25 capable of changing and setting parameters of a print environment; and a data bus 26.

Figure 25:
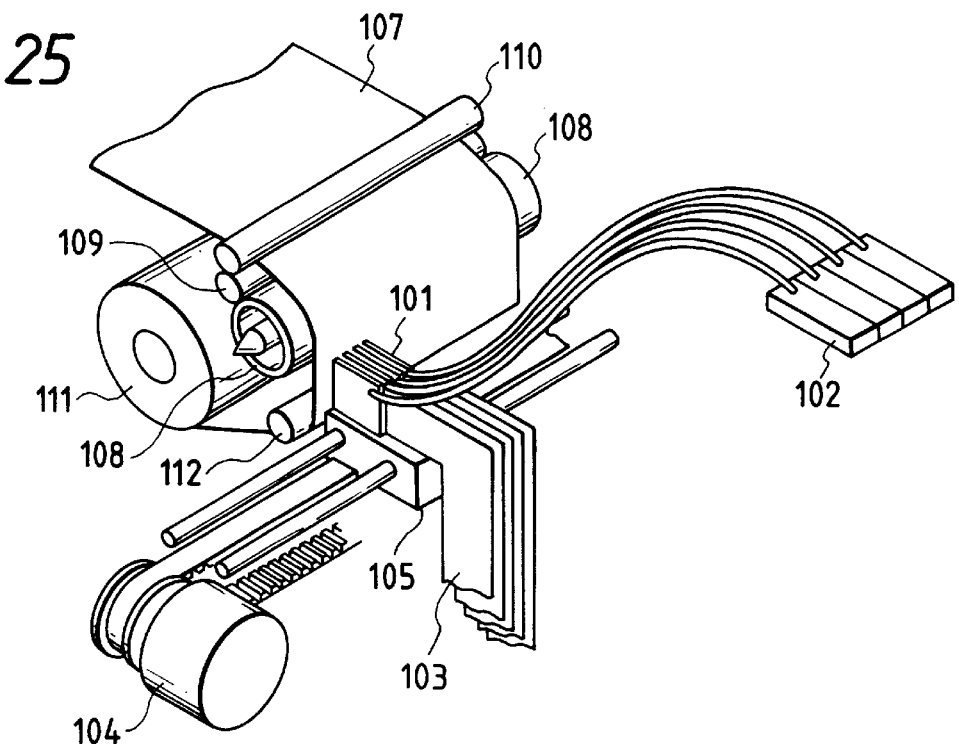
FIG. 25 is a perspective view showing the details of an arrangement around a head unit of an ink jet type image processing apparatus.

FIG. 25 is a perspective view showing details of an arrangement around a head unit of an ink jet type image processing apparatus.

Head units 101 consist of Y, M, C, and Bk head units each including a large number of ink jet heads arranged in the sub-scan direction for one coloring material.

Ink tanks 102 for the head units 101, and signal lines 103 are connected to the head units 101. A carriage drive motor 104 moves a carriage, which mounts the head units, along a rail in cooperation with a conveyor belt.

A recording sheet 107 fed from a recording sheet roll 111 is wound around a platen 108 via a guide roller 112, and is fed by recording sheet convey rollers 109 and 110.

Figure 26:
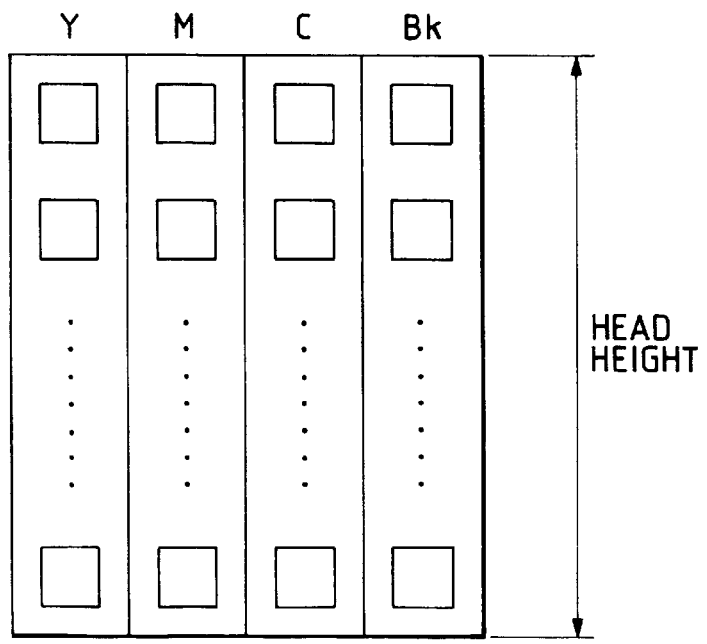
FIG. 26 is a view showing the details of a head unit 101 shown in FIG. 25.

Each head unit 101 consists of a plurality of ink jet heads utilizing heat generation elements, as shown in FIG. 26. For example, ink jet heads using electro-mechanical conversion means such as piezo elements may be used instead.

FIG. 26 shows the details of the head units 101 shown in FIG. 25.

Referring to FIG. 26, each head unit has Y, M, C, or Bk nozzles corresponding in number to each head height.

More specifically, the head units 101 respectively have yellow ink ejection nozzles, magenta ink ejection nozzles, cyan ink ejection nozzles, and black ink ejection nozzles.

Figure 27:
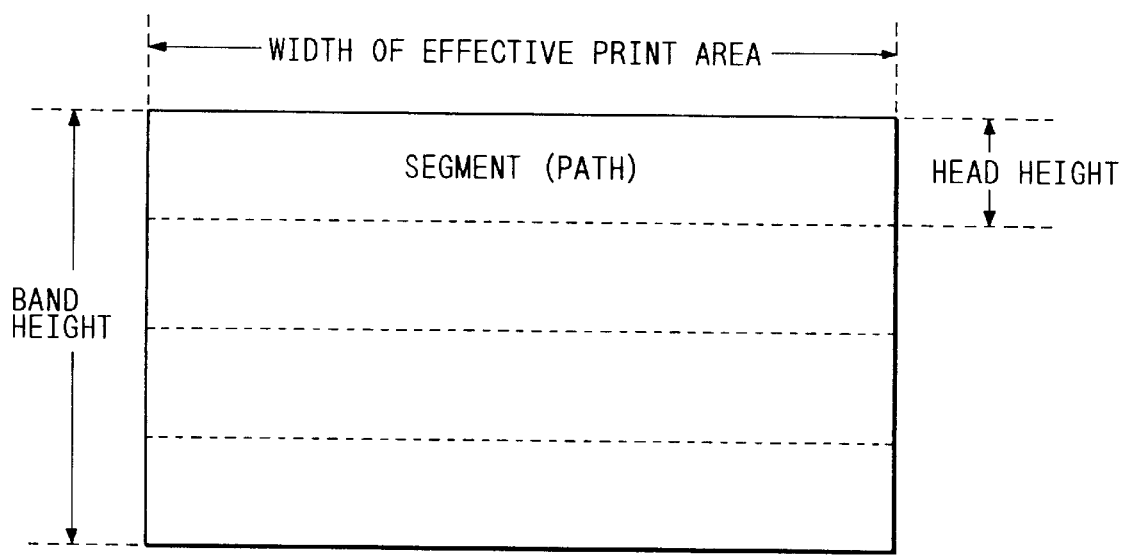
FIG. 27 is a view of an example of a band structure.

FIG. 27 shows an example of a band structure.

As shown in FIG. 27, a rectangular area having an effective print area width of a print sheet as a horizontal length, and a head height as a vertical length is defined as a segment.

One band is an area obtained by vertically arranging the segments, as shown in FIG. 27, and has a size corresponding to an integer multiple of the segment size.

Therefore, the band height (the height of the band) corresponds to an integer multiple of the head height.

In this example, one band is constituted by four segments.

Figure 28:
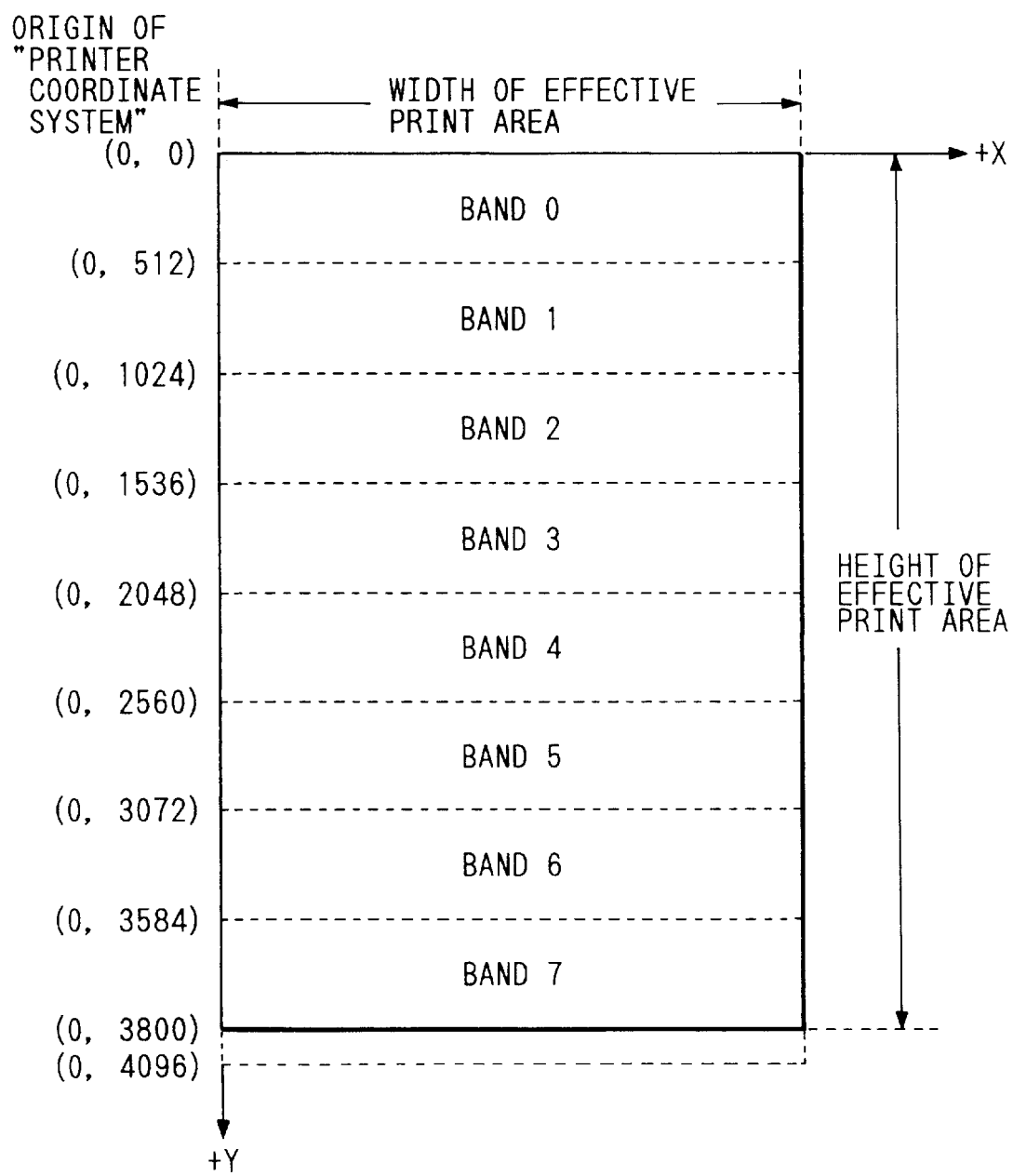
FIG. 28 is a view of an example when an effective print area of a print sheet is divided into eight bands each having a band height of 512 scan lines.

FIG. 28 shows a case wherein the effective print area of a print sheet is divided into eight bands each having a band height of 512 scan lines.

As shown in FIG. 28, band Nos. 0 to 7 are assigned to the eight bands.

If the number of bands is n, the band No. ranges from 0 to (n−1).

Points such as (0, 512) on the printer coordinate system shown in FIG. 28 indicate points at the upper left corners of the bands, and are computed by (0, (n−1)×512).

The effective print area height is not always equal to an integer multiple of the band height, and the height of the final band (band 7 in FIG. 28) may often become equal to or smaller than the band height.

Figure 29:
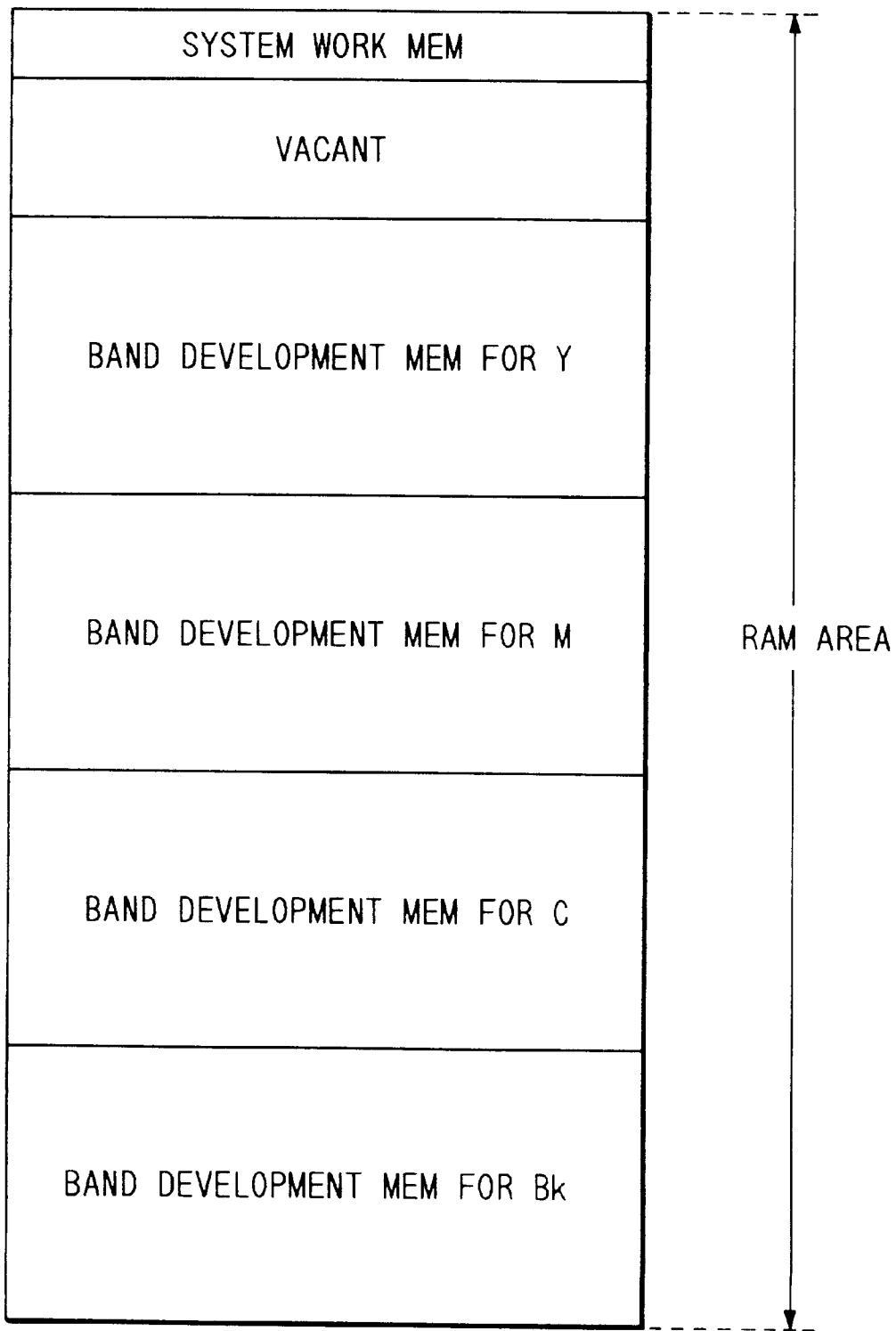
FIG. 29 is a view of an example of a memory map of a RAM area in a color mode.

FIG. 29 shows an example of a memory map of an internal RAM area of the color image processing apparatus in a color mode.

The RAM area in the color mode is constituted by a system work memory, a vacant area, and 1-band memories for Y (Yellow), M (Magenta), C (Cyan), and Bk (Black) as coloring materials (toners or inks) (memories each having a size corresponding to one band area in FIG. 28).

Figure 30:
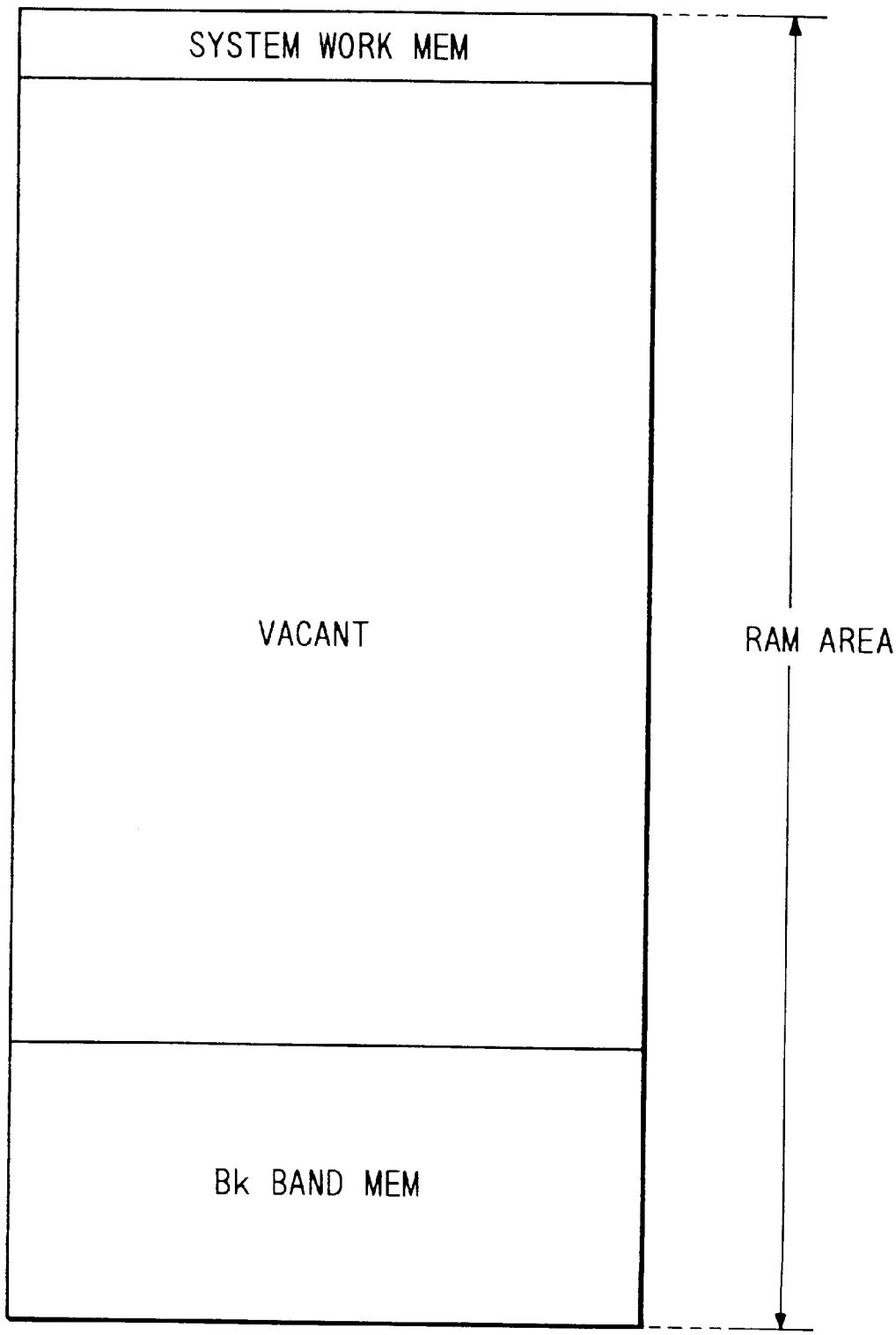
FIG. 30 is a view of an example of a memory map of a RAM area in a monochrome mode.

FIG. 30 shows an example of a memory map of the internal RAM area of the color image processing apparatus in a monochrome mode.

In the monochrome mode, since a print operation is performed using a coloring material Bk (Black) alone, the RAM area in the monochrome mode is constituted by a system work memory, a vacant area, and a 1-band memory for Bk (Black) as a coloring material (toner or ink) (a memory having a size corresponding to one band area in FIG. 28).

More specifically, the 1-band memories for Y (Yellow), M (Magenta), and C (Cyan) can be effectively utilized as a vacant area.

The system work memory is used as a storage area of information (e.g., variables) used in internal control of the image processing apparatus, a permanent work area, and the like.

The vacant area is used as an area for storing memory development information, a character cache memory, and the like.

FIG. 31 shows the attribute information storage area (RAM) 12 shown in FIGS. 24A and 24B.

The attribute information storage area is constituted by areas for temporarily retreating drawing attribute information used upon development data onto a memory, and variable areas set with the drawing attribute information.

As shown in FIG. 31, retreat areas are determined in correspondence with drawing attributes, and m pieces of information can be retreated.

$L_{WIDTH}$, $L_{YMCK}$, and the like represent variables in each of which the drawing attribute information is set.

Figure 32:
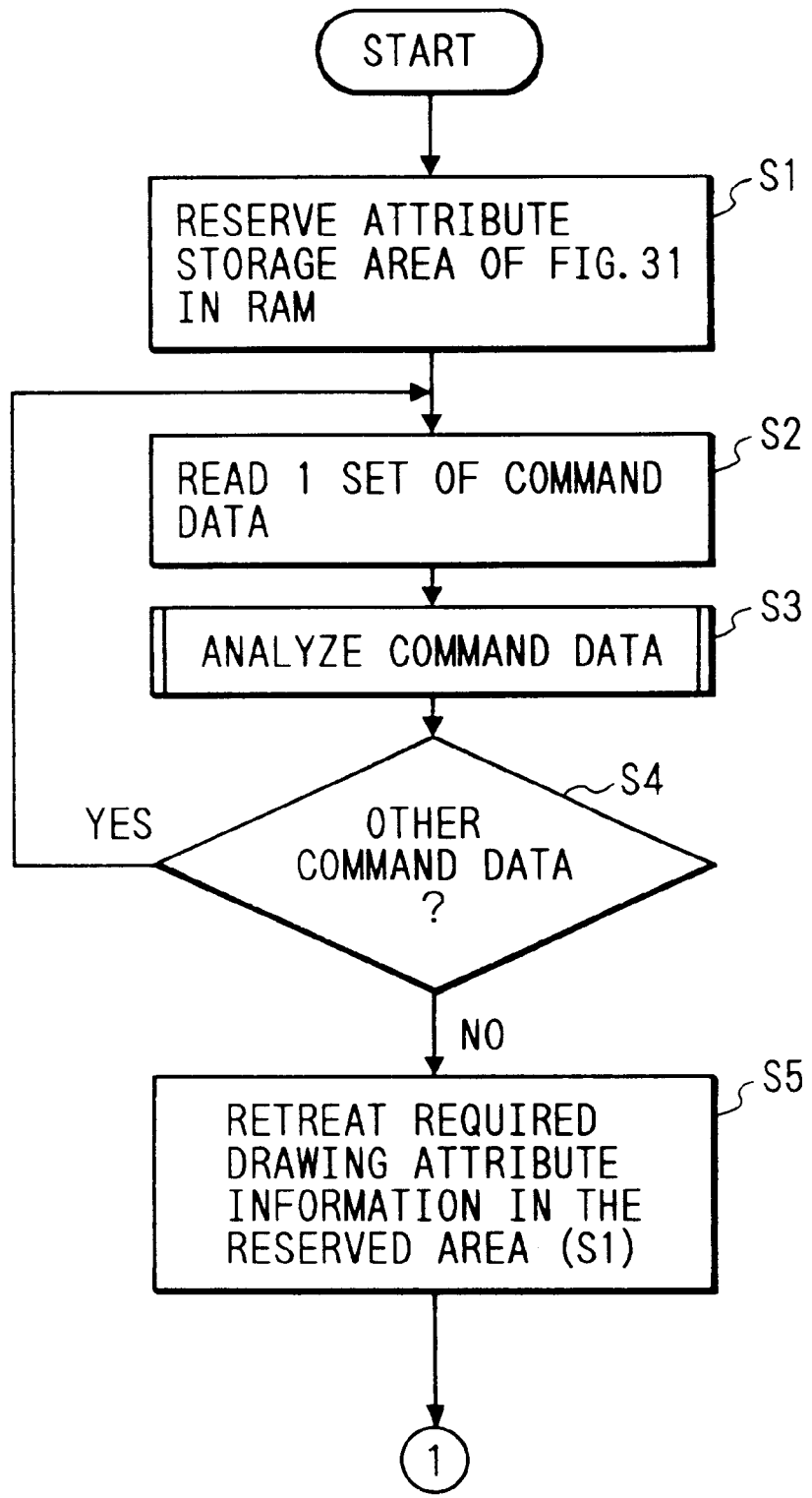
FIG. 32 is a flow chart when color recording is performed using a memory for one band for each of Y (Yellow), M (Magenta), C (Cyan), and Bk (Black) in a color image processing apparatus for receiving page description command data in units of pages, and performing recording control in units of pages.
Figure 33:
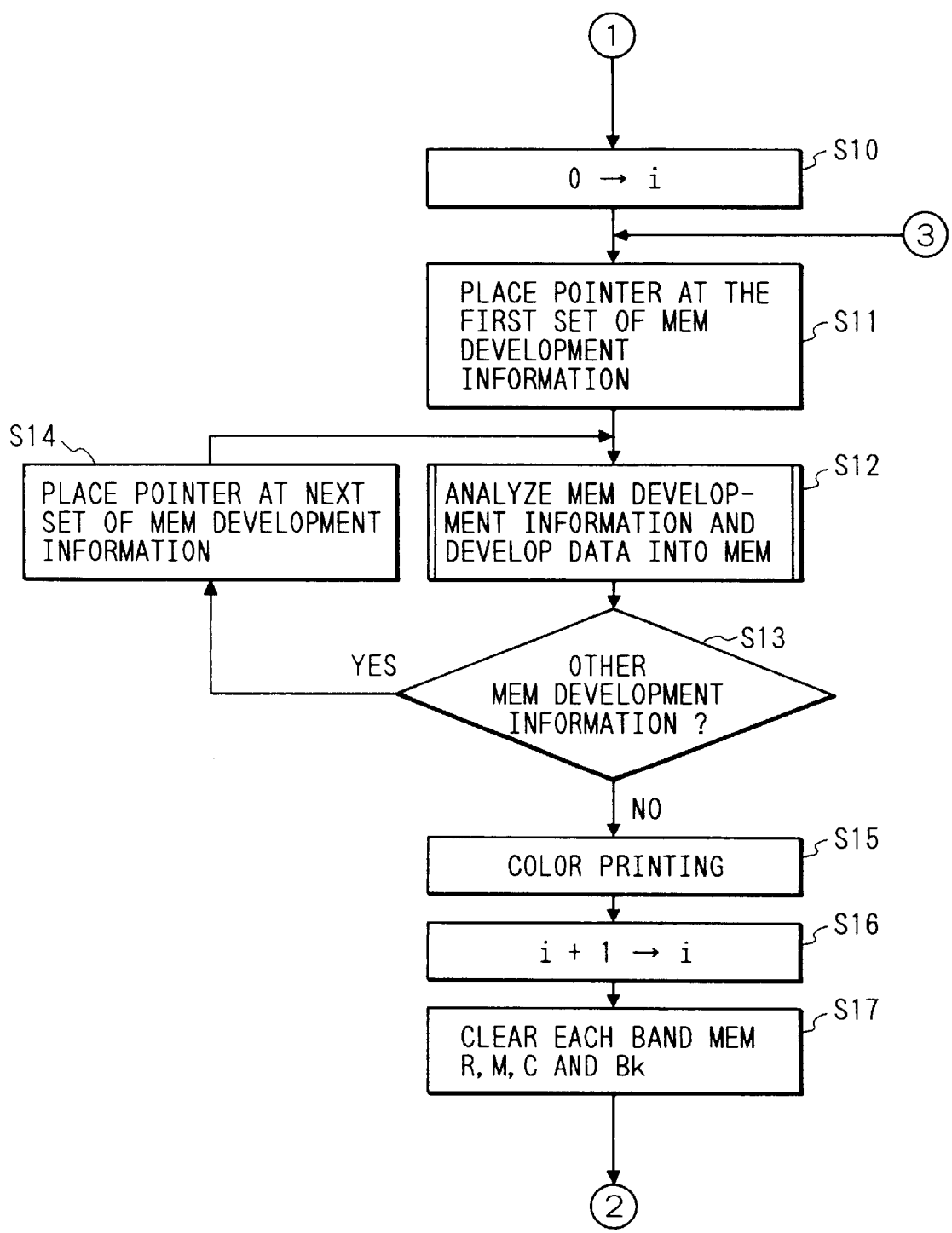
FIG. 33 is a flow chart when color recording is performed using a memory for one band for each of Y (Yellow), M (Magenta), C (Cyan), and Bk (Black) in a color image processing apparatus for receiving page description command data in units of pages, and performing recording control in units of pages.
Figures 34, 35A, 35B, 35C:
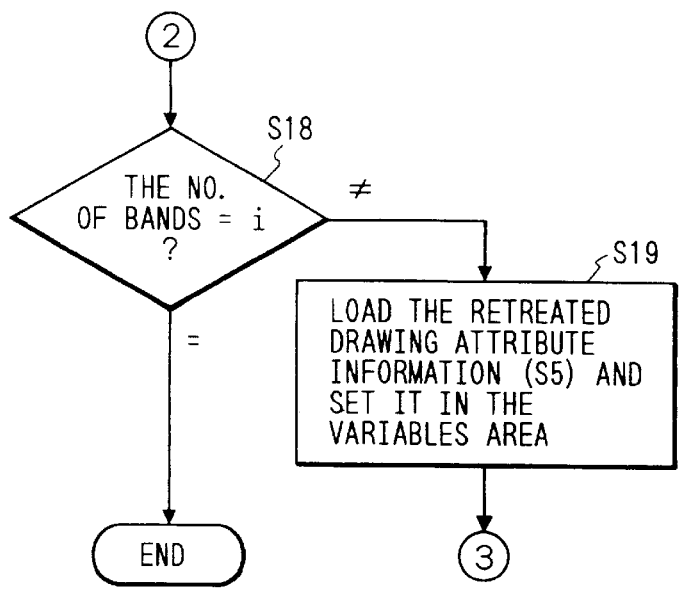
FIG. 34 is a flow chart when color recording is performed using a memory for one band for each of Y (Yellow), M (Magenta), C (Cyan), and Bk (Black) in a color image processing apparatus for receiving page description command data in units of pages, and performing recording control in units of pages.
FIGS. 35A to 35C are views of examples of a color designation command of drawing attribute designation commands.

FIGS. 32, 33, and 34 are flow charts for performing color recording using only the 1-band memories for Y (Yellow), M (Magenta), C (Cyan), and Bk (Black) in the color image processing apparatus for receiving page description command data in units of pages, and performing recording control in units of pages.

In step S1, the attribute information storage area shown in FIG. 31 is assured on a RAM, and the flow advances to step S2.

In step S2, a set of command data (a drawing command, a drawing attribute command, and the like) are read, and the flow advances to step S3.

In step S3, the command analyzer 3 analyzes the command data, and the flow advances to step S4.

If it is determined in step S4 that command data for one page remain, the flow returns to step S2; otherwise, the flow advances to step S5.

In step S5, drawing attribute information required for data development onto the memories at this time is temporarily retreated on the retreat area in the attribute information storage area 12 assured in step S1, and the flow advances to step S10.

In step S10, "0" is set in a constant i, and the flow advances to step S11.

In step S11, a pointer is placed at the head of the first set of memory development information stored in the memory development information area 13, and the flow advances to step S12.

In step S12, the memory development information read in step S11 is analyzed by the memory development information analyzer 14, and is developed on the development memories corresponding to a band i portion (i.e., the Y, M, C, and Bk band memories). Thereafter, the flow advances to step S13.

If it is determined in step S13 that memory development information remains, the flow advances to step S14, and the pointer is placed at the head of the next set of memory development information. The flow then returns to step S12.

If it is determined in step S13 that no memory development information remains, the flow advances to step S15.

In step S15, the contents of the memories developed in step S12 are color-recorded by the output unit 19, and the flow advances to step S16.

In step S16, i is incremented by one, and the flow advances to step S17.

In step S17, the Y, M, C, and Bk band memories are cleared, and the flow advances to step S18.

In step S18, the number of bands is compared with i. If the number of bands is equal to i, the process ends.

If the number of bands is not equal to i, the flow advances to step S19. In step S19, the drawing attributes temporarily retreated in the retreat areas in the attribute information storage area 12 in step S5 are loaded, and are set in the variable areas of the attribute information storage area 12. Thereafter, the flow returns to step S11.

With the above-mentioned process, color recording can be performed using only the 1-band memories for Y (Yellow), M (Magenta), C (Cyan), and Bk (Black).

FIGS. 35A, 35B, and 35C show examples of color designation commands (line color designation, paint color designation, and character color designation) of the drawing attribute designation commands.

A line color designation command is used for designating a color of a straight line or an outline of a figure.

A paint color designation command is used for designating a color for painting a portion inside a closed figure.

A character color designation command is used for designating a color of a character.

A command No. varies depending on color designation commands, and is used for identifying a command.

The content of a number-of-data parameter indicates the number of data following the number-of-data parameter.

The content of a type flag parameter indicates the type of color designation data.

FIG. 35A shows a case wherein a type flag value=0, and represents that color designation data are brightness data values of R (Red), G (Green), and B (Blue) as primaries of light.

FIG. 35B shows a case wherein a type flag value=1, and represents that color designation data are L*, a*, and b* data values of the uniform perceptual space determined by the CIE (Commission Internationale de l'Eclairage) in 1976.

FIG. 35C shows a case wherein a type flag value=2, and represents that color designation data are density data values of Y (Yellow), M (Magenta), C (Cyan), and Bk (Black) as primary colors of coloring materials (toners or inks).

FIGS. 36A to 36D show examples of a line width designation command, a clip area designation command, a paint definition designation command, and a drawing logic designation command of the drawing attribute designation commands.

A command No. varies depending on drawing attribute designation commands, and is used for identifying a command.

The content of a number-of-data parameter indicates the number of data following the number-of-data parameter.

A line width designation command shown in FIG. 36A is used for designating a line width of a straight line or an outline of a figure.

The line width value also uses the coordinate unit of the user coordinate system as a unit.

A clip area designation command shown in FIG. 36B is used for designating a drawable range of a figure, a character, or the like.

In FIG. 36B, X and Y MIN and MAX values use the coordinate unit of the user coordinate system as a unit.

A paint definition designation command shown in FIG. 36C is used for designating a paint pattern inside an outline of a closed figure, and the presence/absence of an outline.

In FIG. 36C, a paint pattern No. is used for identifying a paint pattern. When the pattern No.=0, it indicates the absence (blank) of a paint pattern; when the pattern No. is other than 0, it indicates a corresponding paint pattern such as a hatch pattern.

An outline flag indicates the absence of an outline when it is "0", and indicates the presence of an outline when it is "1".

A drawing logic designation command shown in FIG. 36D is used for designating a drawing logic of a figure, a character, or the like, i.e., a drawing logic (overwrite, transparent, or the like) for a memory upon development of a pattern on a development memory.

For example, when a drawing logic is "overwrite", a drawing logic value "0" is designated; when a drawing logic is "transparent", a drawing logic value "1" is designated.

FIG. 37 shows an example of a straight line drawing command or a polygon drawing command of the drawing commands.

A command No. varies depending on drawing functions, and is used for identifying a command.

The content of a number-of-data parameter indicates the number of data following the number-of-data parameter.

A straight line drawing command is used for drawing a straight line.

A polygon drawing command is used for drawing a polygon.

In FIG. 37, X and Y values in coordinates 1 to n are coordinate values on the user coordinate system.

FIG. 38 shows an example of a character drawing command of the drawing commands.

A command No. varies depending on drawing functions, and is used for identifying a command.

The content of a number-of-data parameter indicates the number of data following the number-of-data parameter.

A character drawing command is used for drawing a character.

In FIG. 38, X and Y coordinates of a drawing position are coordinates on the user coordinate system, which indicate a start reference position of character drawing.

Character data represents a character string (e.g., ABC) to be printed.

FIG. 39 shows the command analysis jump table (ROM) 4 (FIGS. 24A and 24B), which stores jump addresses to functions for analyzing drawing commands and drawing attribute commands.

The table 4 stores jump addresses to command analysis functions in correspondence with command Nos. (0 to n).

Figure 40:
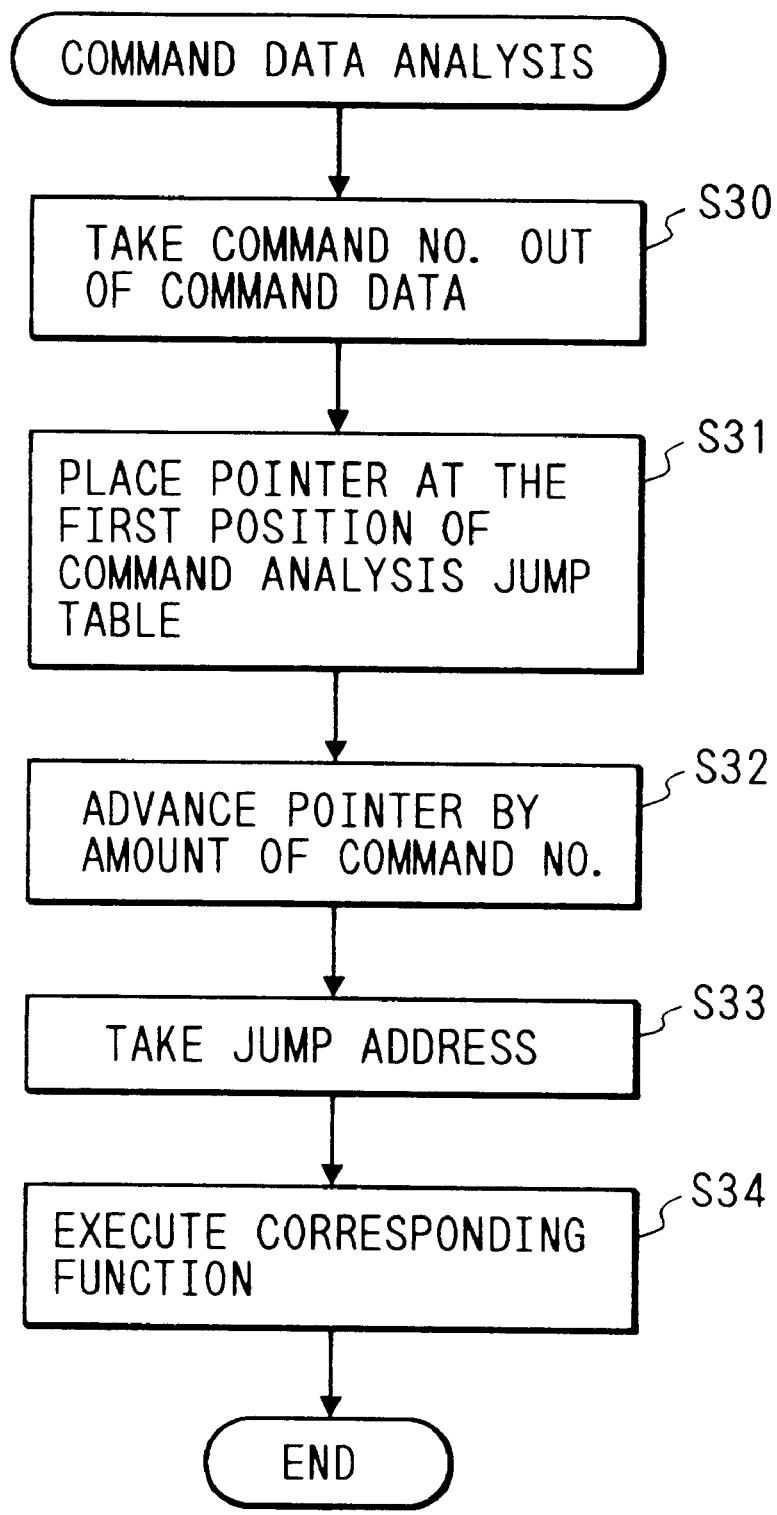
FIG. 40 is a flow chart showing the details of a command data analysis process in step S3 in FIG. 32.

FIG. 40 is a flow chart showing the details of the command data analysis process in step S3 in FIG. 32.

In step S30, a command No. is taken out of a set of command data, and the flow advances to step S31.

In step S31, a pointer is placed at the head of the command analysis jump table shown in FIG. 39, and the flow advances to step S32.

In step S32, the pointer is advanced by an amount corresponding to the command No., and the flow advances to step S33.

In step S33, the content (jump address) indicated by the pointer is taken, and the flow advances to step S34.

In step S34, a function indicated by the taken jump address is executed, and the process ends.

Figure 41:
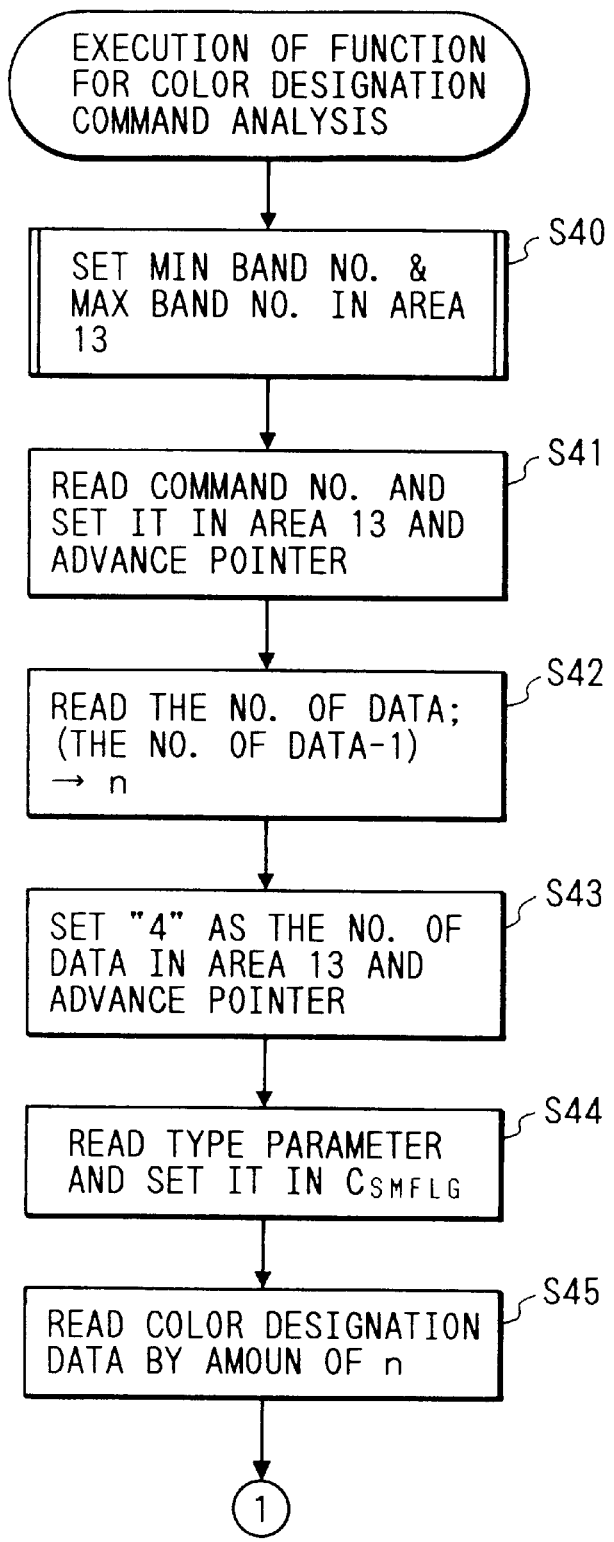
FIG. 41 is a flow chart showing the details of a process upon execution of a color designation command analysis function in step S34 in FIG. 40.
Figure 42:
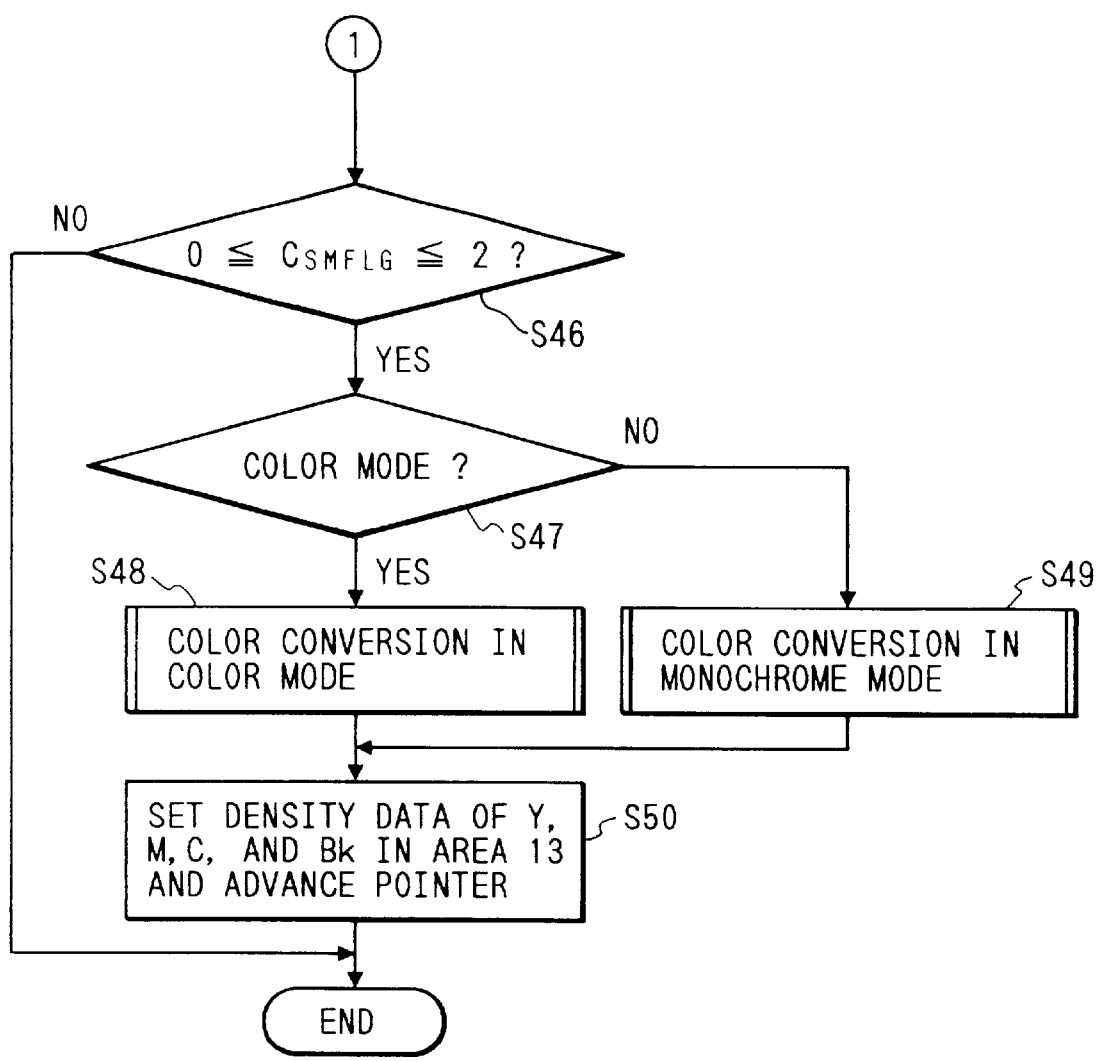
FIG. 42 is a flow chart showing the details of the process upon execution of the color designation command analysis function in step S34 in FIG. 40.

FIGS. 41 and 42 are flow charts showing the details of a process upon execution of a color designation command analysis function in step S34 in FIG. 40.

In step S40, MIN and MAX band Nos. are set in the memory development information storage area 13, and the flow advances to step S41.

In step S41, a command No. is read from a command, and is set in the memory development information storage area 13 to advance a pointer. Thereafter, the flow advances to step S42.

In step S42, the number of data is read from the command, and (the number of data−1) is set in a constant n. The flow then advances to step S43.

In step S43, "4" is set as the number of data in the memory development information storage area 13 to advance a pointer, and the flow advances to step S44.

In step S44, a type parameter is read from the command and is set in a type flag $C_{SMFLG}$. The flow then advances to step S45.

In step S45, color designation data corresponding in number to the constant n are read, and the flow advances to step S46.

It is checked in step S46 if the value of the type flag $C_{SMFLG}$ is one of 0, 1, and 2.

If NO in step S46, the process ends.

If YES in step S46, the flow advances to step S47 to check if the color mode is set.

If YES in step S47, the flow advances to step S48 to execute a color conversion process in the color mode, and the flow then advances to step S50.

However, if NO in step S47, the flow advances to step S49 to execute a color conversion process in the monochrome mode, and the flow then advances to step S50.

In step S50, Y, M, C, and Bk density data are set in the memory development information storage area 13, and a pointer is advanced, thus ending the process.

In this manner, the color designation command is analyzed, and memory development information for color designation is generated.

Figure 43:
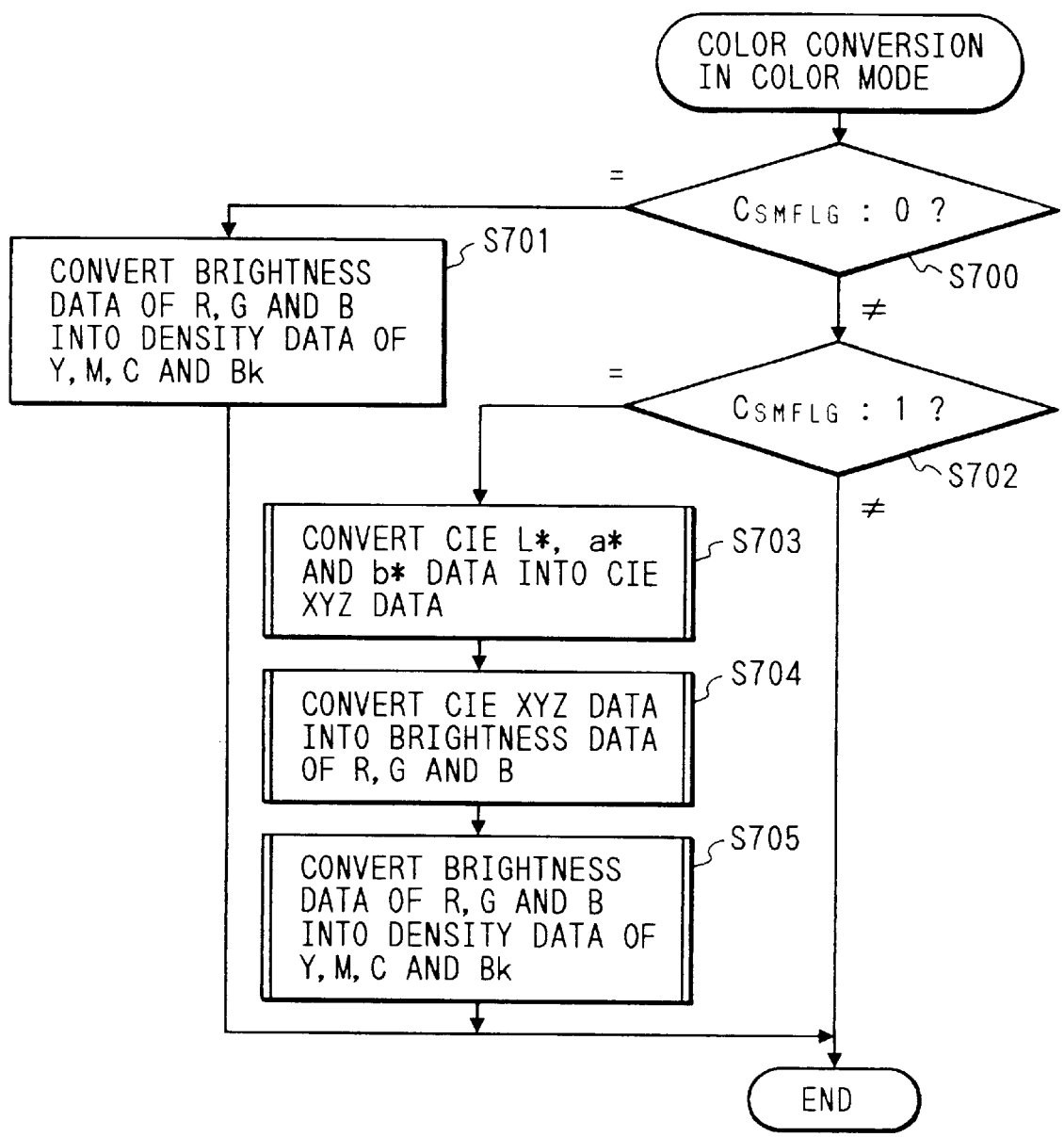
FIG. 43 is a flow chart showing the details of the process upon execution of the color designation command analysis function in step S34 in FIG. 40.

FIG. 43 is a flow chart showing the details of a process upon execution of the color conversion process in the color mode in step S48 in FIG. 42.

In step S700, the value of the type flag $C_{SMFLG}$ is compared with 0.

If $C_{SMFLG}=0$, since it indicates that color designation data read in step S45 are R, G, and B brightness data, the flow advances to step S701, and the R, G, and B brightness data are converted into Y, M, C, and Bk density data, thus ending the process.

If $C_{SMFLG}\neq 0$, the flow directly advances to step S702.

In step S702, the value of the type flag $C_{SMFLG}$ is compared with 1.

If $C_{SMFLG}=1$, since it indicates that color designation data read in step S45 are L*, a*, and b* data of the uniform perceptual space determined by the CIE (Commission Internationale de l'Eclairage) in 1976, the flow advances to step S703, and the CIE L*, a*, and b* data are converted into CIE XYZ data (the XYZ colorimetric system determined by the CIE in 1931). The flow then advances to step S704.

In step S704, the CIE XYZ data are converted into R, G, and B brightness data, and the flow advances to step S705.

In step S705, the R, G, and B brightness data are converted into Y, M, C, and Bk density data, and the process ends.

If it is determined in step S702 that the type flag $C_{SMFLG}\neq 1$, the process ends.

If $C_{SMFLG}\neq 2$, the process ends.

In this manner, in the color mode, color designation data are converted into Y, M, C, and Bk density data.

Figure 44:
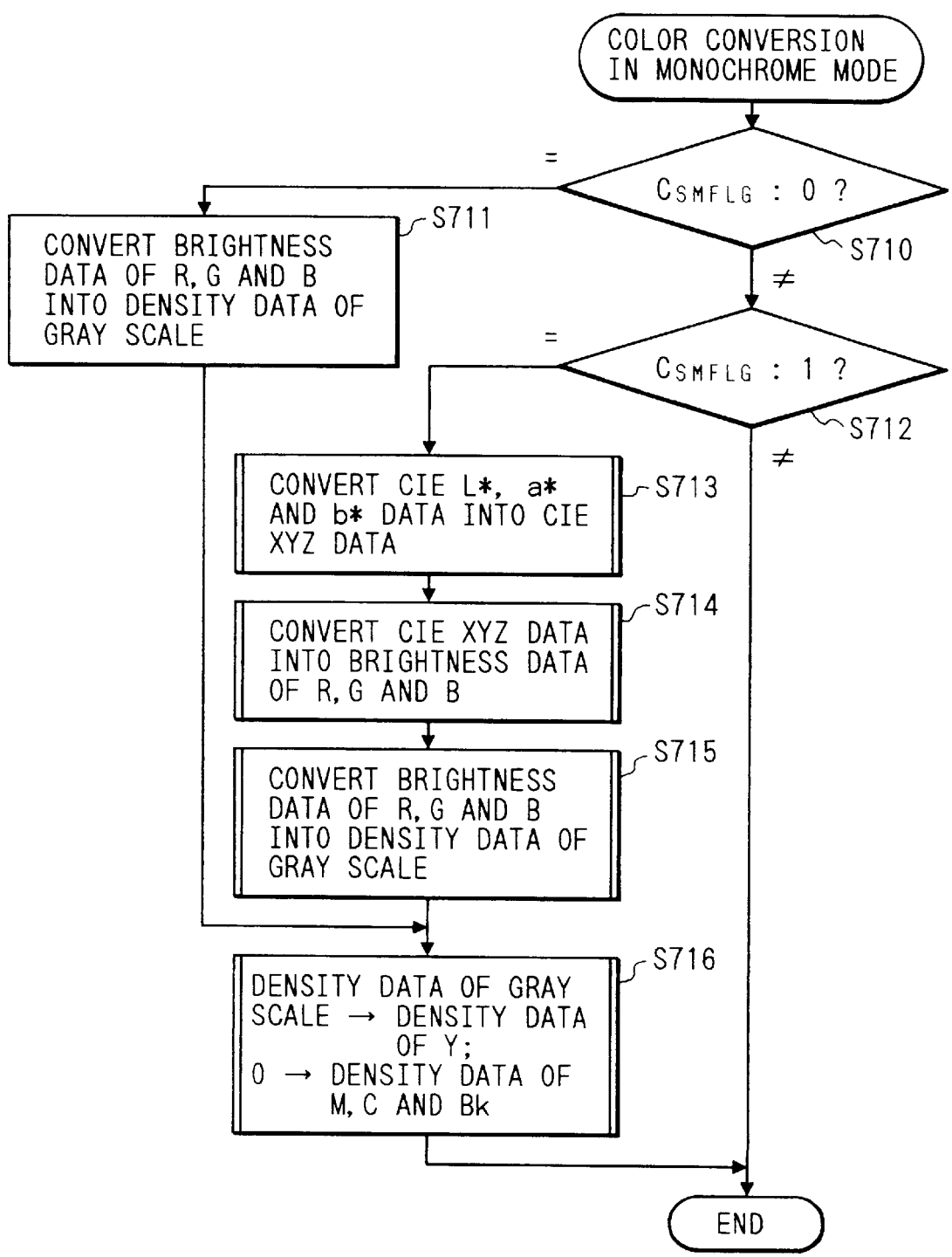
FIG. 44 is a flow chart showing the details of the process upon execution of the color designation command analysis function in step S34 in FIG. 40.

FIG. 44 is a flow chart showing the details of a process upon execution of the color conversion process in the monochrome mode in step S49 in FIG. 42.

In step S710, the value of the type flag $C_{SMFLG}$ is compared with 0.

If $C_{SMFLG}=0$, since it indicates that color designation data read in step S45 are R, G, and B brightness data, the flow advances to step S711, and the R, G, and B brightness data are converted into gray scale density data. The flow then advances to step S716.

If $C_{SMFLG}\neq 0$, the flow advances to step S712, and the value of the type flag $C_{SMFLG}$ is compared with 1.

If $C_{SMFLG}=1$, since it indicates that color designation data read in step S45 are L*, a*, and b* data of the uniform perceptual space determined by the CIE (Commission Internationale de l'Eclairage) in 1976, the flow advances to step S713, and the CIE L*, a*, and b* data are converted into CIE XYZ data (the XYZ colorimetric system determined by the CIE in 1931). The flow then advances to step S714.

In step S714, the CIE XYZ data are converted into R, G, and B brightness data, and the flow advances to step S715.

In step S715, the R, G, and B brightness data are converted into gray scale density data, and the flow advances to step S716.

In step S716, gray scale density data Gray is set in Y density data, and 0 is set in M, C, and Bk density data, thus ending the process.

More specifically, gray scale density data, 0, 0, 0, are stored in a color information portion of the memory development information of the gray scale density data.

In this manner, in the monochrome mode, color designation data are converted into gray scale density data.

Figure 45:
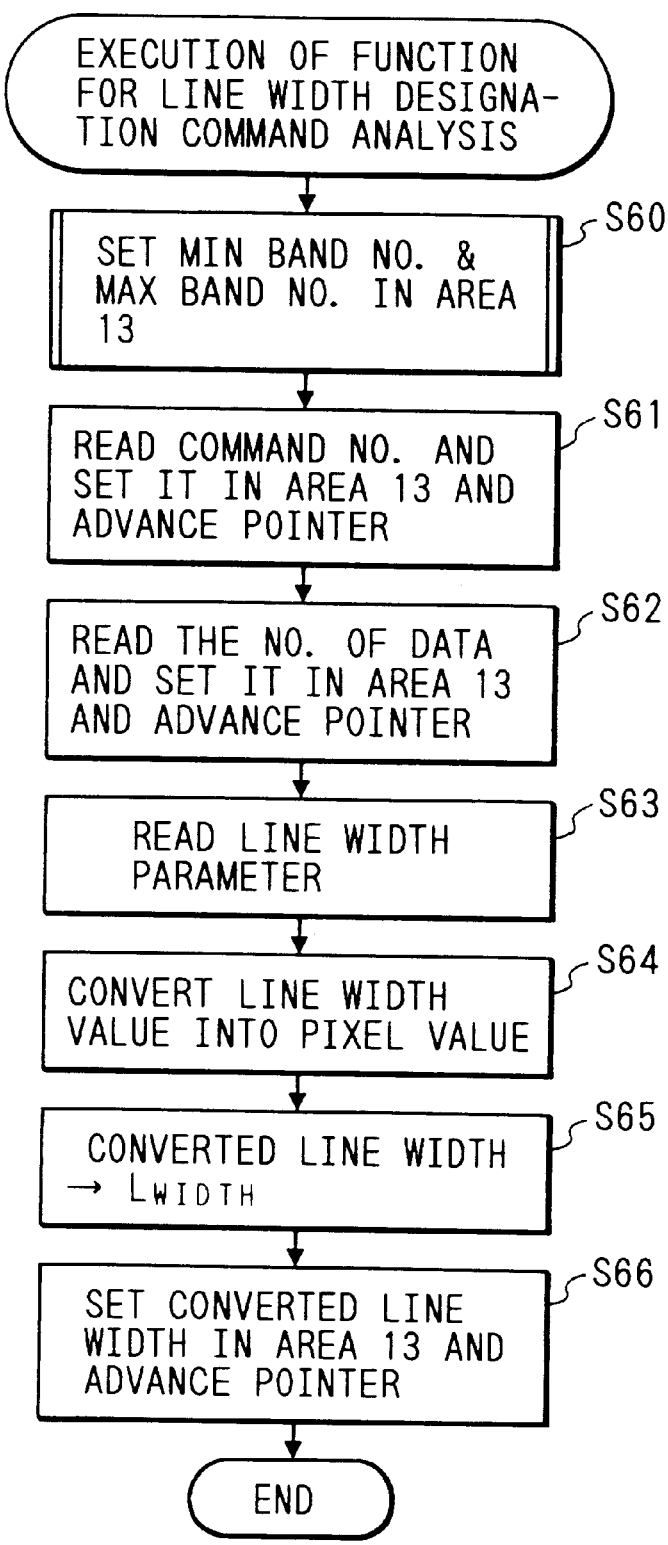
FIG. 45 is a flow chart showing the details of a process upon execution of a line width designation command analysis function in step S34 in FIG. 40.

FIG. 45 is a flow chart showing the details of a process upon execution of a line width designation command analysis function in step S34 in FIG. 40.

In step S60, MIN and MAX band Nos. are set in the memory development information storage area 13, and the flow advances to step S61.

In step S61, a command No. is read from a command, and is set in the memory development information storage area 13 to advance a pointer. The flow then advances to step S62.

In step S62, the number of data is read from the command, and is set as the number of data in the memory development information storage area 13 to advance a pointer. The flow then advances to step S63.

In step S63, a line value parameter is read from the command, and the flow advances to step S64.

In step S64, the read line width value is converted into a pixel (dot) value on the basis of the resolution of the image processing apparatus, and the flow advances to step S65.

In step S65, the converted line width value is set in an internal variable $L_{WIDTH}$, and the flow advances to step S66.

In step S66, the converted line width value is set in the memory development information storage area 13 to advance a pointer, and the process ends.

In this manner, the line width designation command is analyzed, and memory development information for line width designation is generated.

Figure 46:
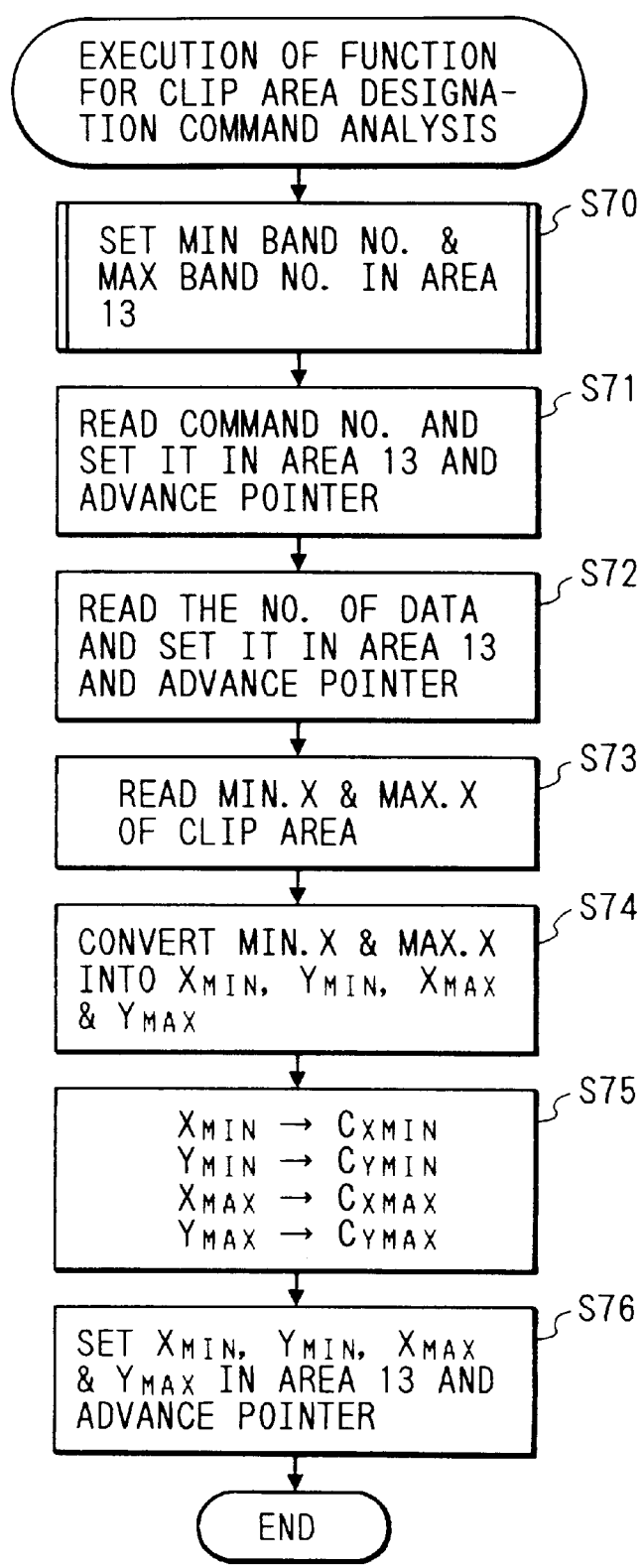
FIG. 46 is a flow chart showing the details of a process upon execution of a clip area designation command analysis function in step S34 in FIG. 40.

FIG. 46 is a flow chart showing the details of a process upon execution of a clip area designation command analysis function in step S34 in FIG. 40.

In step S70, MIN and MAX band Nos. are set in the memory development information storage area 13, and the flow advances to step S71.

In step S71, a command No. is read from a command, and is set in the memory development information storage area 13 to advance a pointer. The flow then advances to step S72.

In step S72, the number of data is read from the command, and is set as the number of data in the memory development information storage area 13 to advance a pointer. The flow advances to step S73.

In step S73, X and Y MIN and MAX value parameters of a clip area are read from the command, and the flow advances to step S74.

In step S74, the read X and Y MIN and MAX values are converted into values $X_{MIN}$, $Y_{MIN}$, $X_{MAX}$ and $Y_{MAX}$ on the printer coordinate system on the basis of the resolution of the image processing apparatus, and the flow advances to step S75.

In step S75, the values $X_{MIN}$, $Y_{MIN}$, $X_{MAX}$, and $Y_{MAX}$ are respectively set in $C_{XMIN}$, $C_{YMIN}$, $C_{XMAX}$, and $C_{YMAX}$, and the flow advances to step S76.

In step S76, the value s $X_{MIN}$, $Y_{MIN}$, $X_{MAX}$, and $Y_{MAX}$ are set in the memory development information storage area 13 to advance a pointer, and the process ends.

In this manner, the clip area designation command is analyzed, and memory development information for clip area designation is generated.

Figure 47:
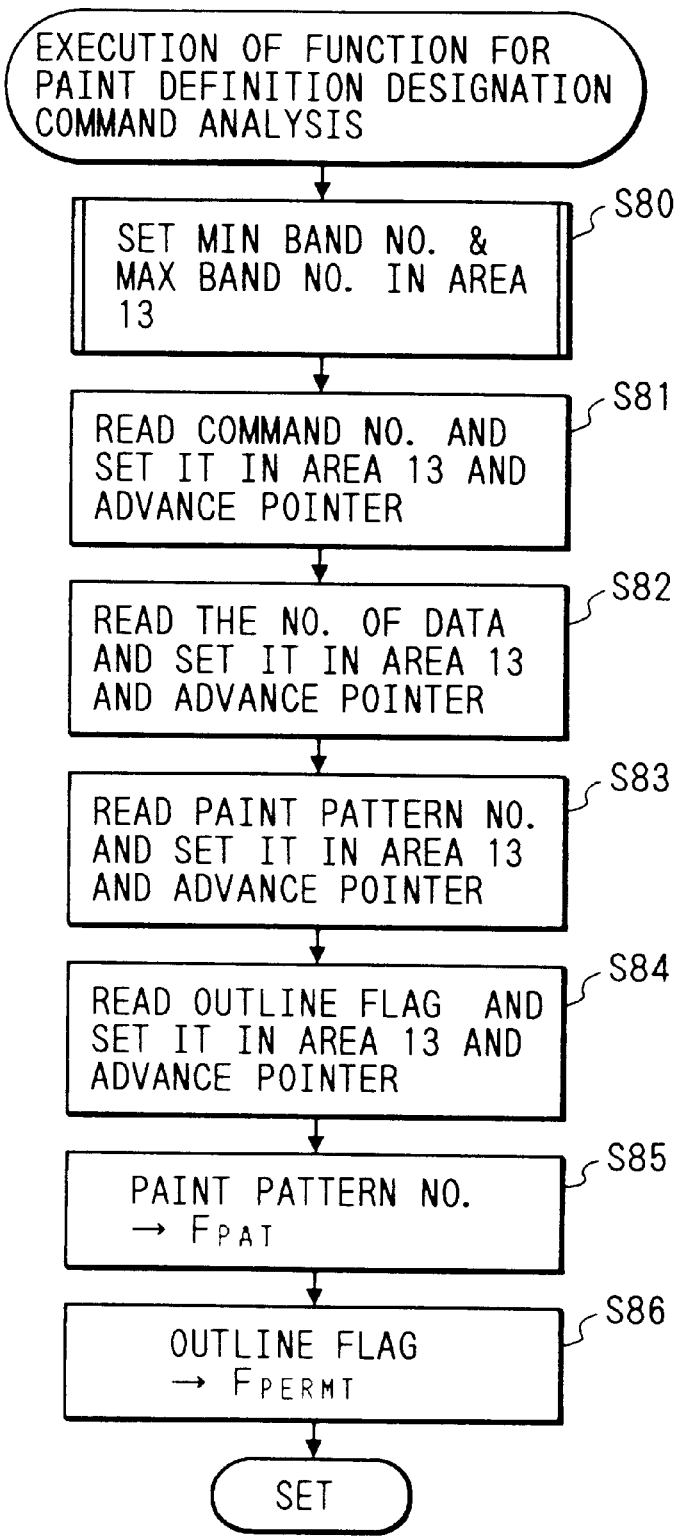
FIG. 47 is a flow chart showing the details of a process upon execution of a paint definition designation command analysis function in step S34 in FIG. 40.

FIG. 47 is a flow chart showing the details of a process upon execution of a paint definition designation command analysis function in step S34 in FIG. 40.

In step S80, MIN and MAX band Nos. are set in the memory development information storage area 13, and the flow advances to step S81.

In step S81, a command No. is read from a command, and is set in the memory development information storage area 13 to advance a pointer. The flow then advances to step S82.

In step S82, the number of data is read from the command, and is set as the number of data in the memory development information storage area 13 to advance a pointer. The flow then advances to step S83.

In step S83, a paint pattern No. is read from the command, and is set in the memory development information storage area 13 to advance a pointer. The flow then advances to step S84.

In step S84, an outline flag is read from the command, and is set in the memory development information storage area 13 to advance a pointer. The flow then advances to step S85.

In step S85, the paint pattern No. is set in an internal variable $F_{PAT}$, and the flow advances to step S86.

In step S86, the content of the outline flag is set in an internal variable $F_{PERMT}$, and the process ends.

In this manner, the paint definition designation command is analyzed, and memory development information for paint definition designation is generated.

Figure 48:
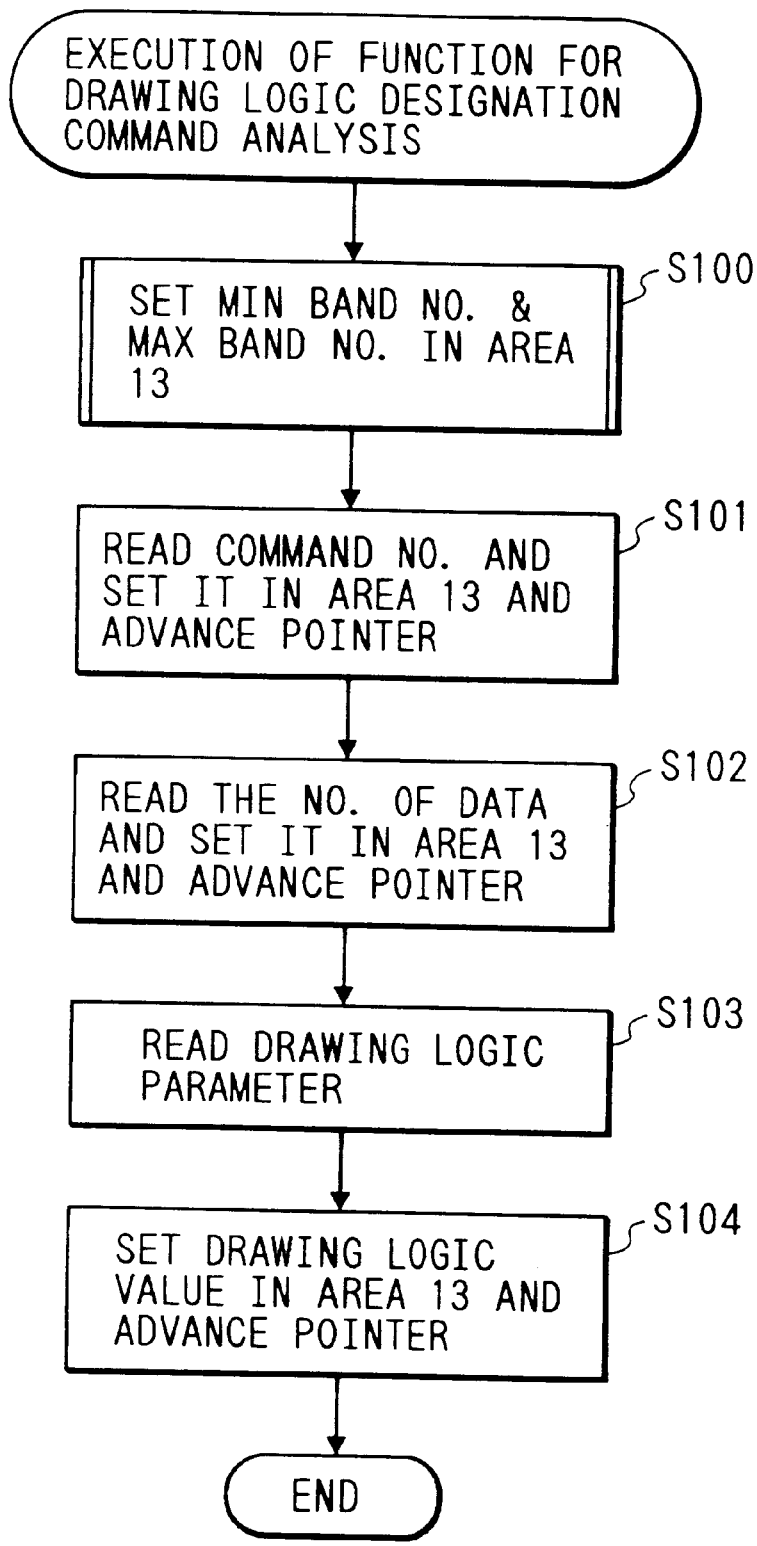
FIG. 48 is a flow chart showing the details of a process upon execution of a drawing logic definition designation command analysis function in step S34 in FIG. 40.

FIG. 48 is a flow chart showing the details of a process upon execution of a drawing logic designation command analysis function in step S34 in FIG. 40.

In step S100, MIN and MAX band Nos. are set in the memory development information storage area 13, and the flow advances to step S101.

In step S101, a command No. is read from a command, and is set in the memory development information storage area 13 to advance a pointer. The flow then advances to step S102.

In step S102, the number of data is read from the command, and is set as the number of data in the memory development information storage area 13 to advance a pointer. The flow then advances to step S103.

In step S103, a drawing logic parameter is read from the command, and the flow advances to step S104.

In step S104, the drawing logic is set in the memory development information storage area 13 to advance a pointer, and the process ends.

In this manner, the drawing logic designation command is analyzed, and memory development information for drawing logic designation is generated.

Figure 49:
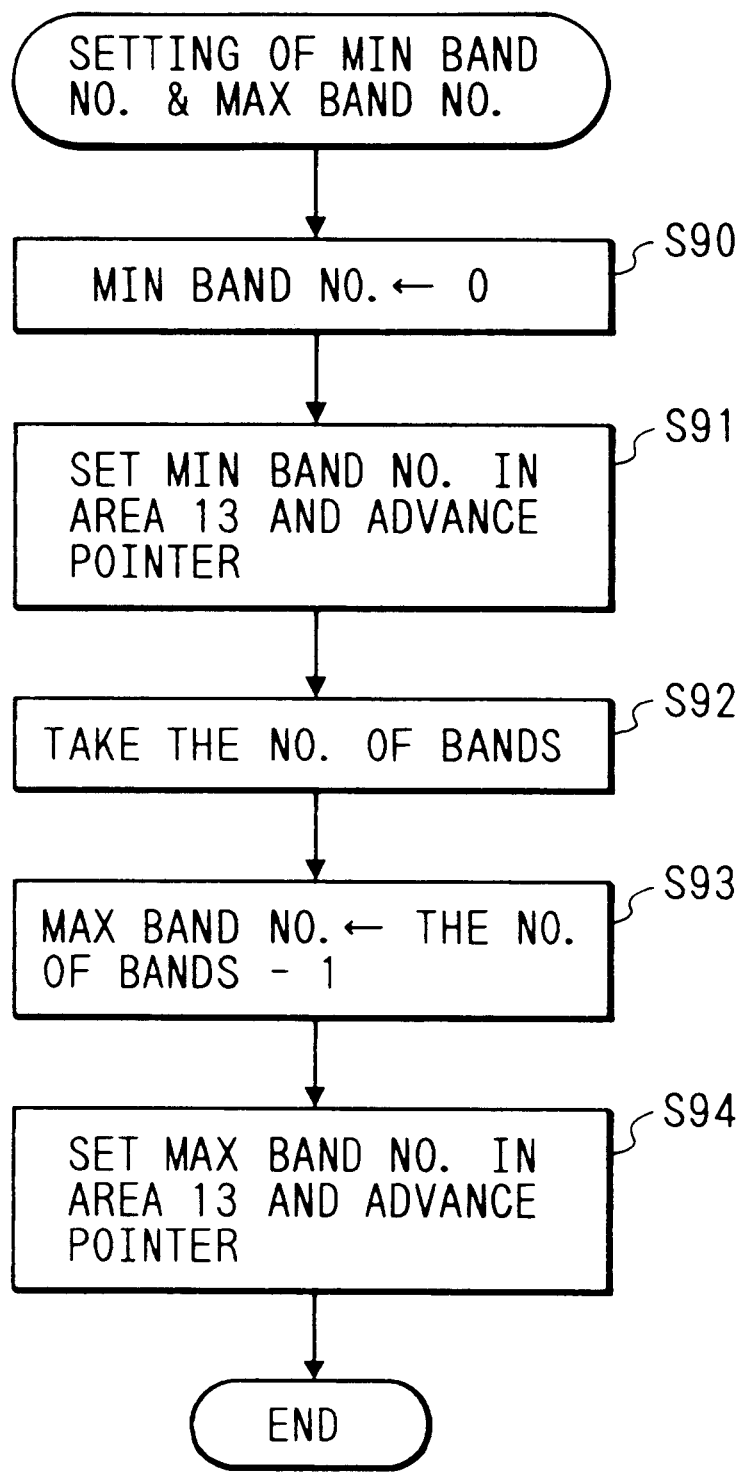
FIG. 49 is a flow chart showing the details of a process for setting MIN band No. and MAX band No. in a memory development information area in steps S40, S60, S70, S80, and S100 in FIGS. 41, 45, 46, 47, and 48.

FIG. 49 is a flow chart showing the details of the process for setting the MIN and MAX band Nos. in the memory development information storage area in steps S40, S60, S70, S80, and S100 in FIGS. 41 to 48.

In step S90, "0" is set in the MIN band No., and the flow advances to step S91.

In step S91, the MIN band No. is set in the memory development information storage area 13 to advance a pointer, and the flow advances to step S92.

In step S92, information of the present number of bands is taken out of the band information storage 5, and the flow advances to step S93.

In step S93, a value (the number of bands−1) is set in the MAX band No., and the flow advances to step S94.

In step S94, the MAX band No. is set in the memory development information storage area 13 to advance a pointer, and the process ends.

In this manner, in memory development information for a drawing attribute, "0" is set in the MIN band No., and the value (the number of bands−1) is set in the MAX band No., so that memory development information is analyzed in a process of each band.

Figure 50:
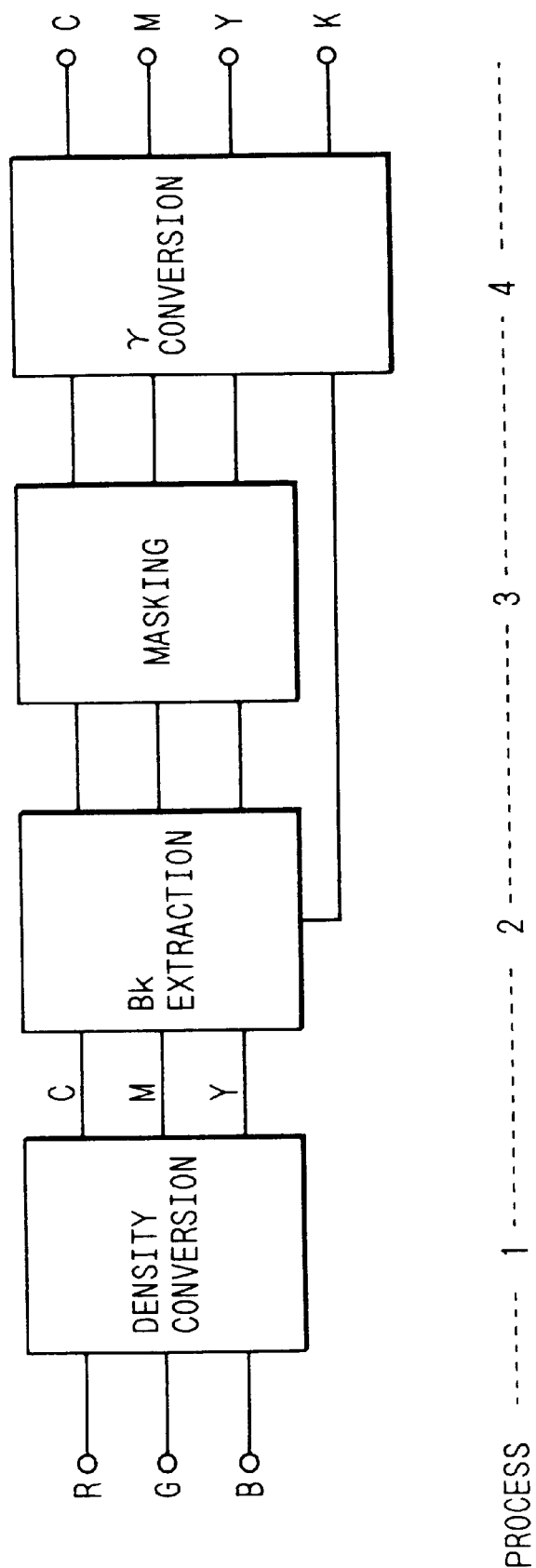
FIG. 50 is a diagram of an example of a color reproduction process shown in steps S701 and S705 in FIG. 43.

FIG. 50 is a diagram showing an example of a color reproduction process in steps S701 and S705 in FIG. 43.

In process 1, a density conversion process for LOG-converting R, B, and B values as brightness information into C, M, and Y as density information is performed.

In process 2, a Bk extraction process for extracting a value Bk from the C, M, and Y values is performed.

In process 3, a masking process for correcting unnecessary absorption characteristics of C, M, and Y toners or inks to achieve proper color reproduction is performed.

In process 4, a γ conversion process is performed so as to adjust the contrast and brightness in correspondence with an image.

The above-mentioned processes are performed in the color reproduction processor 8 using information from the color reproduction information storage 7.

Assume that the mutual conversion method of the above-mentioned R, G, and B data with CIE XYZ data is predetermined in advance.

FIG. 51 shows an example of the color conversion process in steps S703 and S713 in FIGS. 43 and 44.

CIE L*, a*, and b* data can be converted into CIE XYZ data by equations (a) to (d).

In FIG. 51, Xn, Yn, and Zn are values determined depending on a CIE standard source.

FIG. 52 shows an example of the color conversion process in steps S704 and S714 in FIGS. 43 and 44.

CIE XYZ data can be converted into R, G, and B brightness data by a matrix conversion formula shown in FIG. 52.

In FIG. 52, parameter values of the matrix are determined depending on a CIE standard source, and the values of this embodiment are those obtained when the CIE standard source D65 is used.

Figure 53:
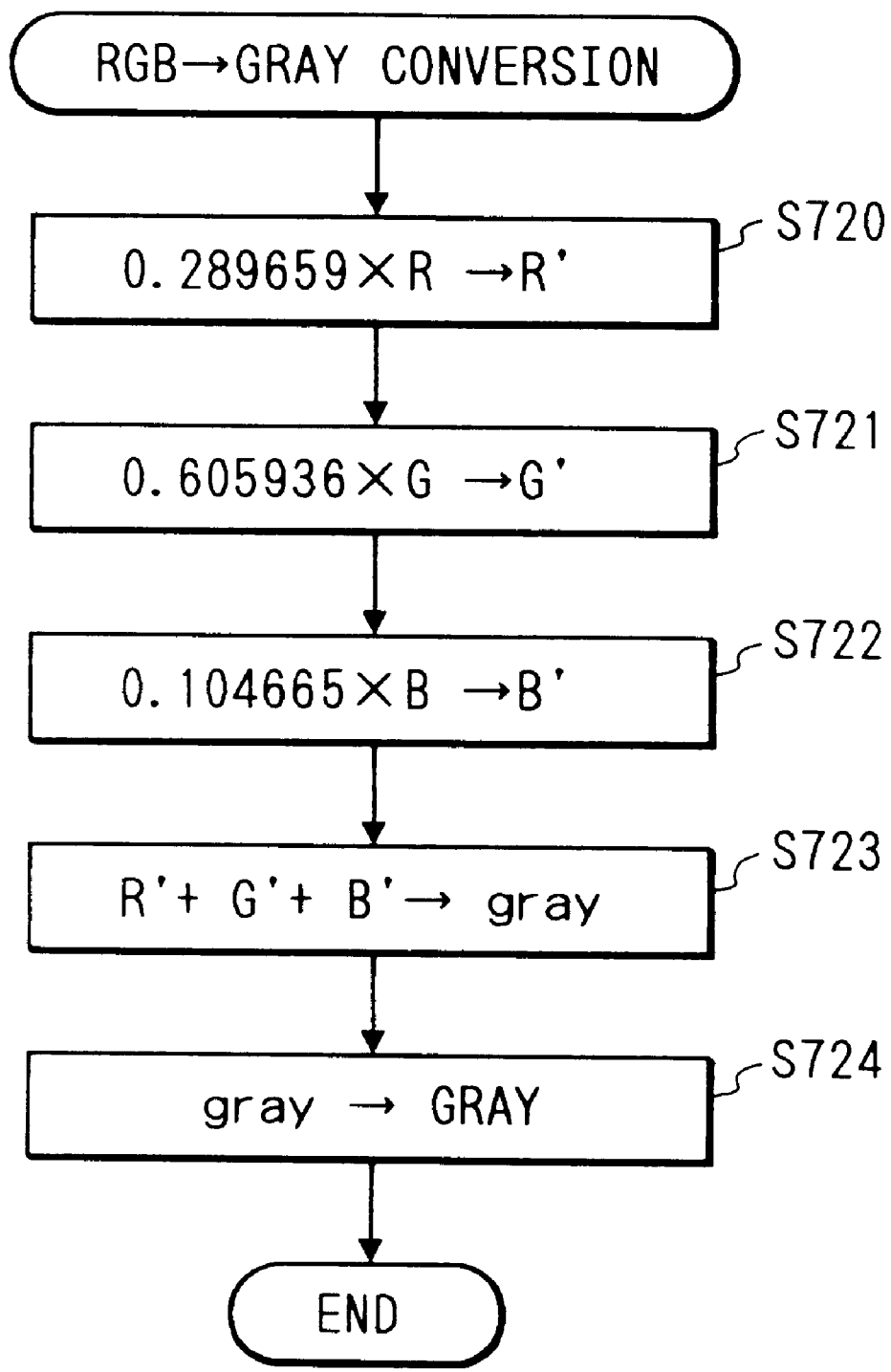
FIG. 53 is a flow chart showing an example of a color conversion process shown in steps S711 and S715 in FIG. 44.

FIG. 53 is a flow chart showing the details of the color conversion process in steps S711 and S715 in FIG. 44.

In step S720, an R brightness data value is multiplied with 0.289659, and the product is set in R'. The flow then advances to step S721.

In step S721, a G brightness data value is multiplied with 0.605936, and the product is set in G'. The flow advances to step S722.

In step S722, a B brightness data value is multiplied with 0.104665, and the product is set in B'. The flow then advances to step S723.

In step S723, a sum of R'+G'+B' is set in gray, and the flow advances to step S724.

In step S724, gray is converted by the same density conversion as in process 1 in FIG. 50, and the converted value is set in Gray, thus ending the process.

Figure 54:
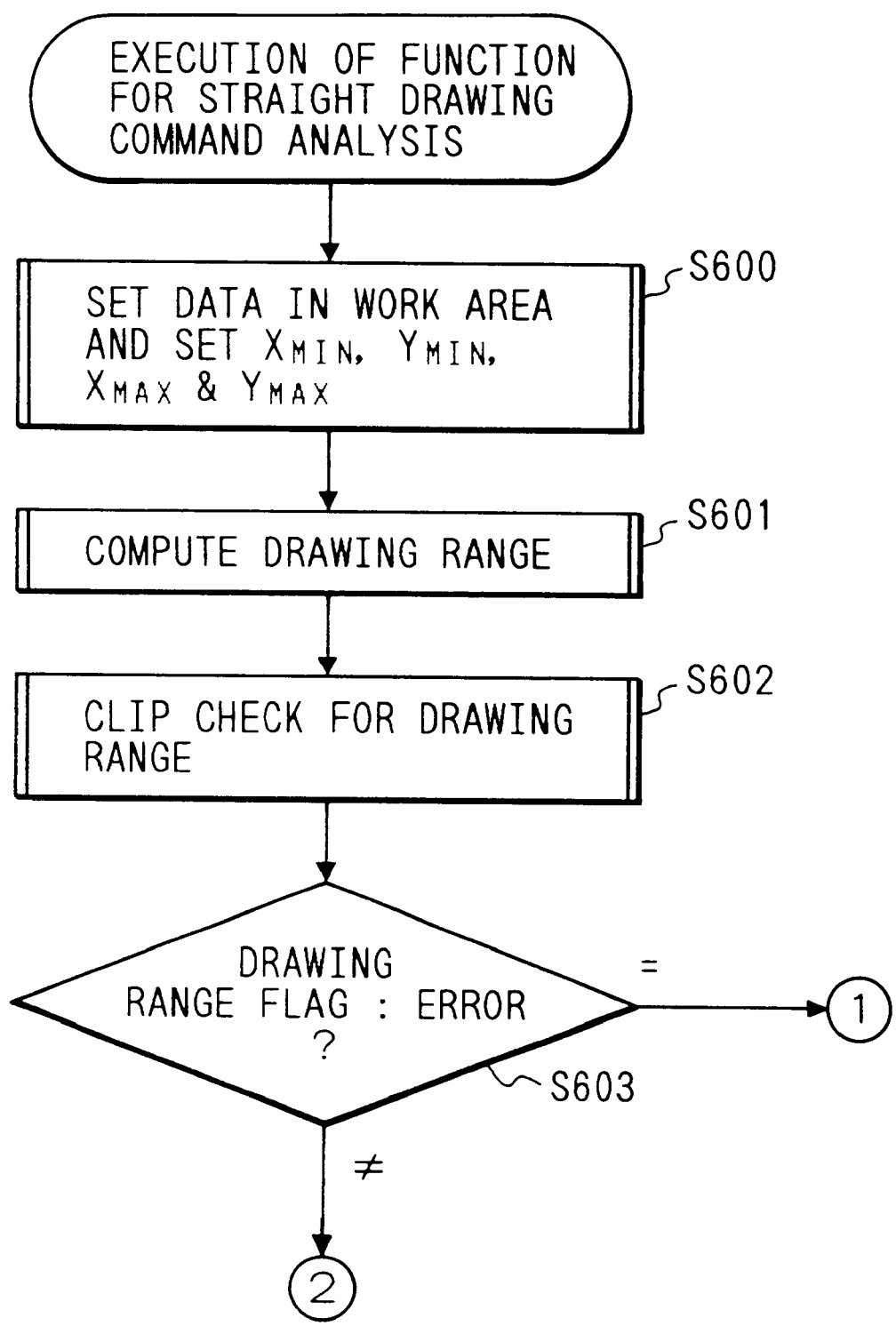
FIG. 54 is a flow chart showing a process upon execution of a straight line drawing command analysis function in step S34 in FIG. 40.
Figure 55:
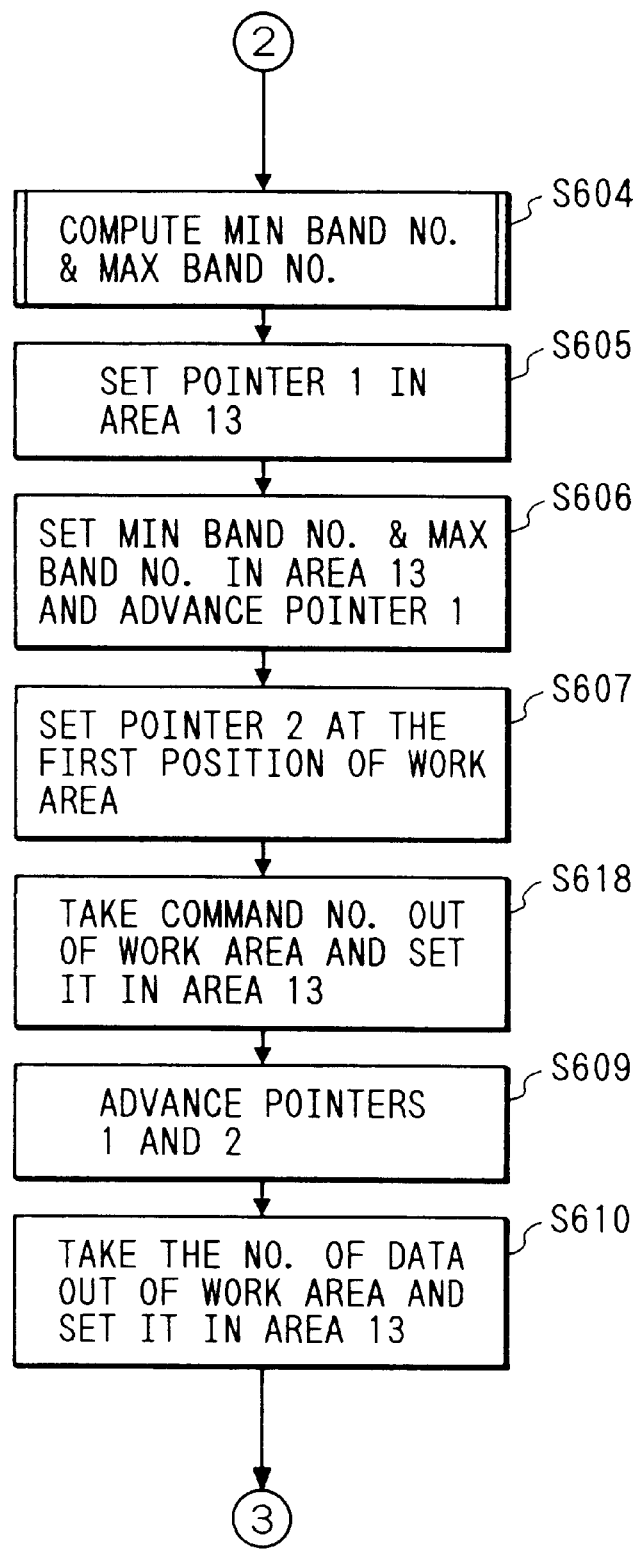
FIG. 55 is a flow chart showing the process upon execution of the straight line drawing command analysis function in step S34 in FIG. 40.
Figure 56:
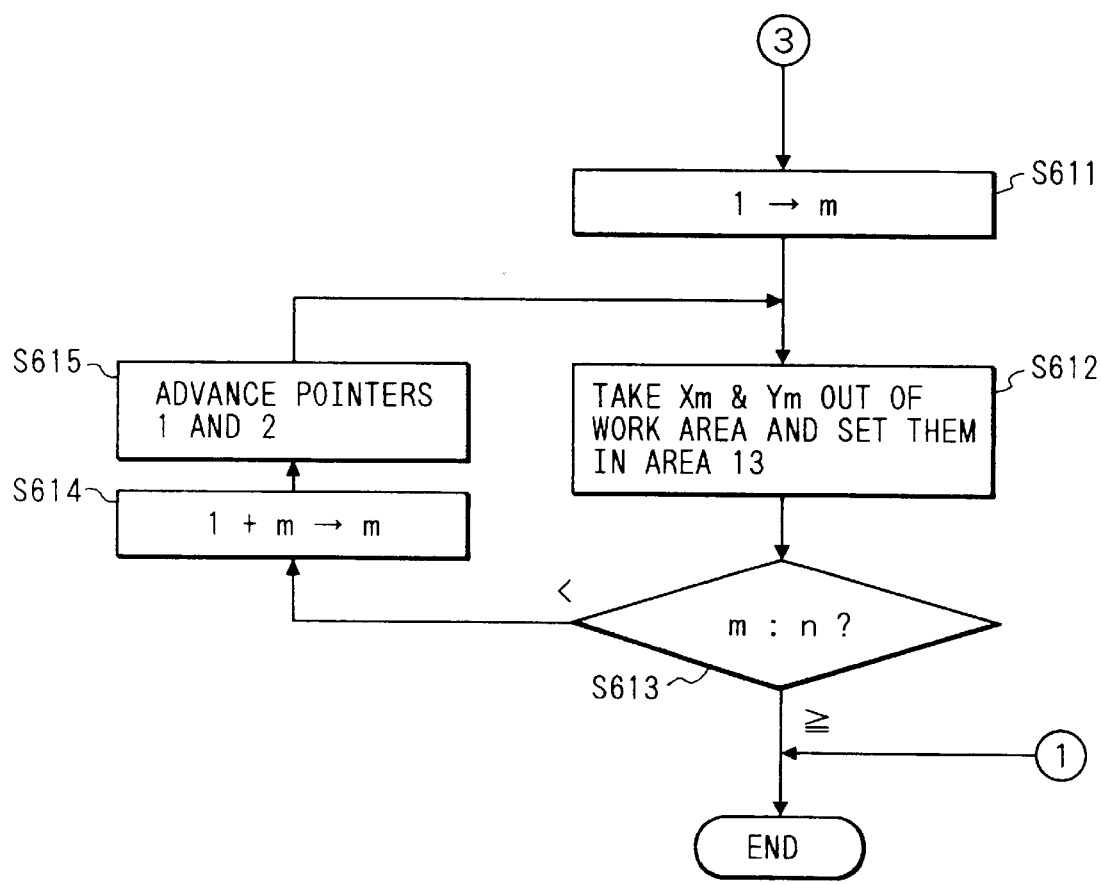
FIG. 56 is a flow chart showing the process upon execution of the straight line drawing command analysis function in step S34 in FIG. 40.

FIGS. 54 to 56 are flow charts showing a process upon execution of a straight line drawing command analysis function in step S34 in FIG. 40.

In step S600, data is set in a work area, and $X_{MIN}$, $Y_{MIN}$, $X_{MAX}$, and $Y_{MAX}$ are set. The flow advances to step S601.

In step S601, a drawing range is computed (straight line and polygon), and the flow advances to step S602.

In step S602, a clip check process of a drawing range is performed, and the flow advances to step S603.

In step S603, a drawing range flag set in the clip check process of the drawing range is checked.

If the drawing range flag is ERROR, the process ends.

However, if the drawing range flag is not ERROR, the flow advances to step S604 to compute MIN and MAX band Nos., and the flow then advances to step S605.

In step S605, pointer 1 is placed in the memory development information storage area 13, and the flow advances to step S606.

In step S606, the MIN and MAX band Nos. are set in the memory development information storage area 13 to advance pointer 1, and the flow advances to step S607.

In step S607, pointer 2 is placed at the first position of a work area, and the flow advances to step S608.

In step S608, a command No. is taken out of the work area, and is set in the memory development information storage area 13. The flow then advances to step S609.

In step S609, pointer 1 and pointer 2 are advanced, and the flow advances to step S610.

In step S610, the number of data is taken out of the work area, and is set in the memory development information storage area 13. Thereafter, the flow advances to step S611.

In step S611, "1" is set in m, and the flow advances to step S612.

In step S612, $X_m$ and $Y_m$ are taken out of the work area, and are set in the memory development information storage area 13. The flow then advances to step S613.

In step S613, m and n (the number of coordinates) are compared with each other.

If m≧n, the process ends.

If n>m, the flow advances to step S614, and m is incremented by 1. The flow then advances to step S615.

In step S615, pointer 1 and pointer 2 are advanced, and the flow returns to step S612.

In this manner, the straight line drawing command is analyzed, and memory development information for straight line drawing is generated.

Figure 57:
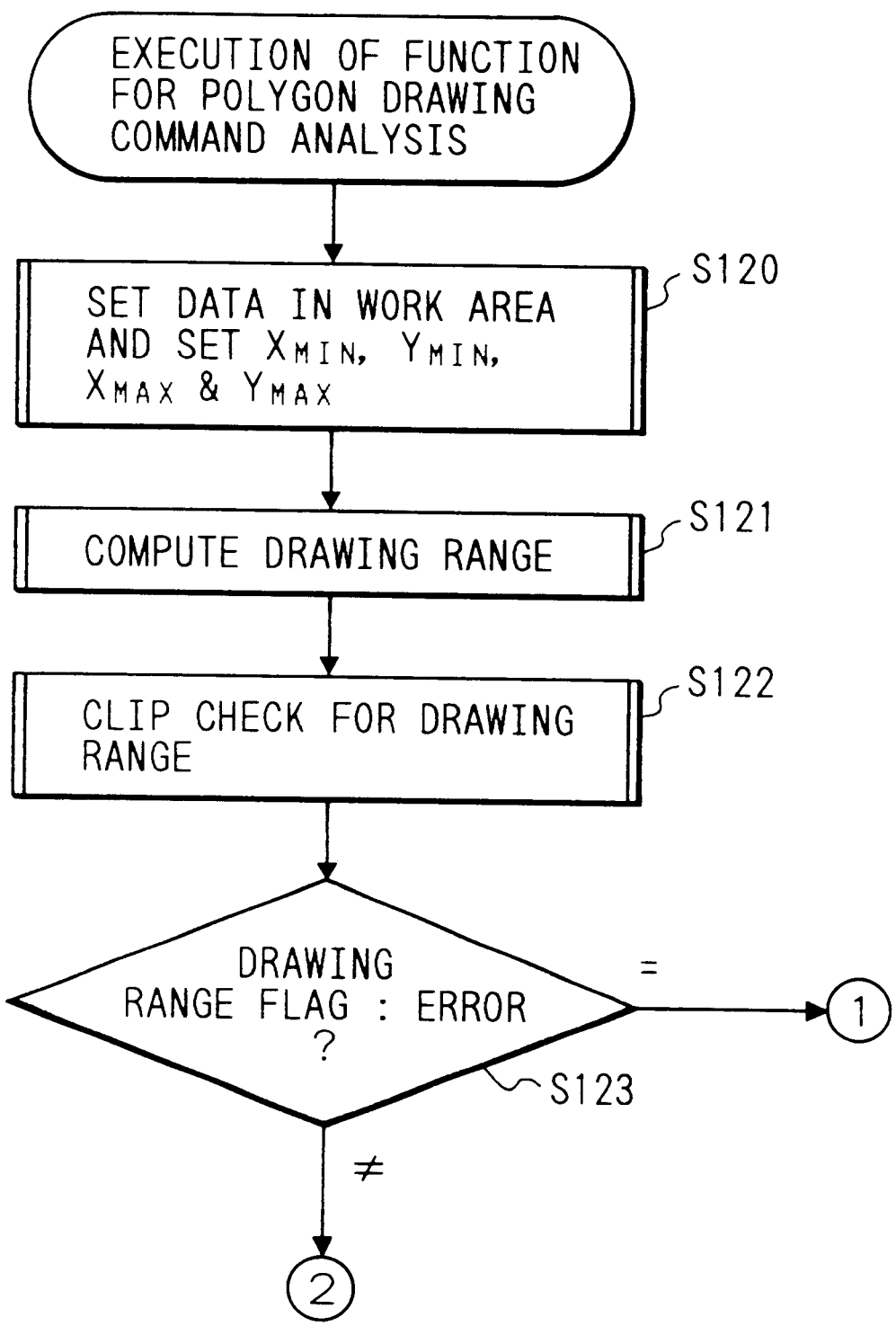
FIG. 57 is a flow chart showing the process upon execution of a polygon drawing command analysis function in step S34 in FIG. 40.
Figure 58:
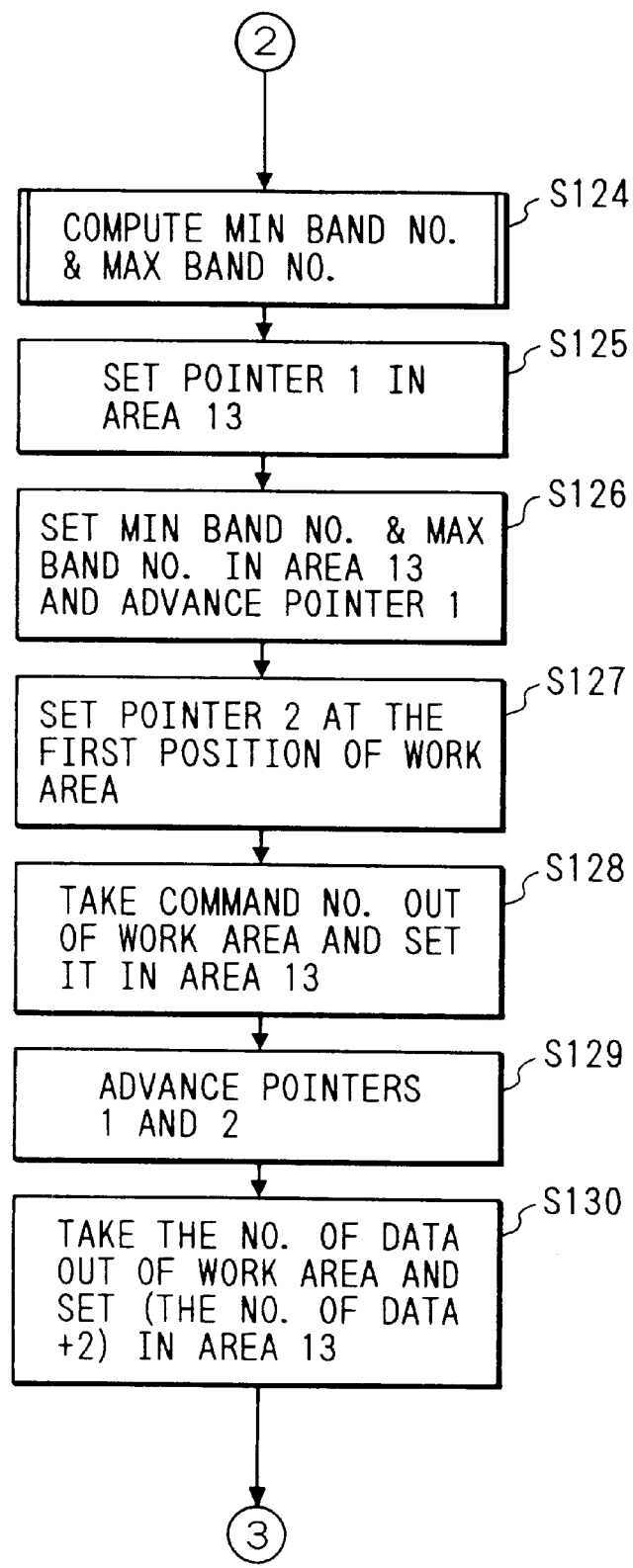
FIG. 58 is a flow chart showing the process upon execution of the polygon drawing command analysis function in step S34 in FIG. 40.
Figure 59:
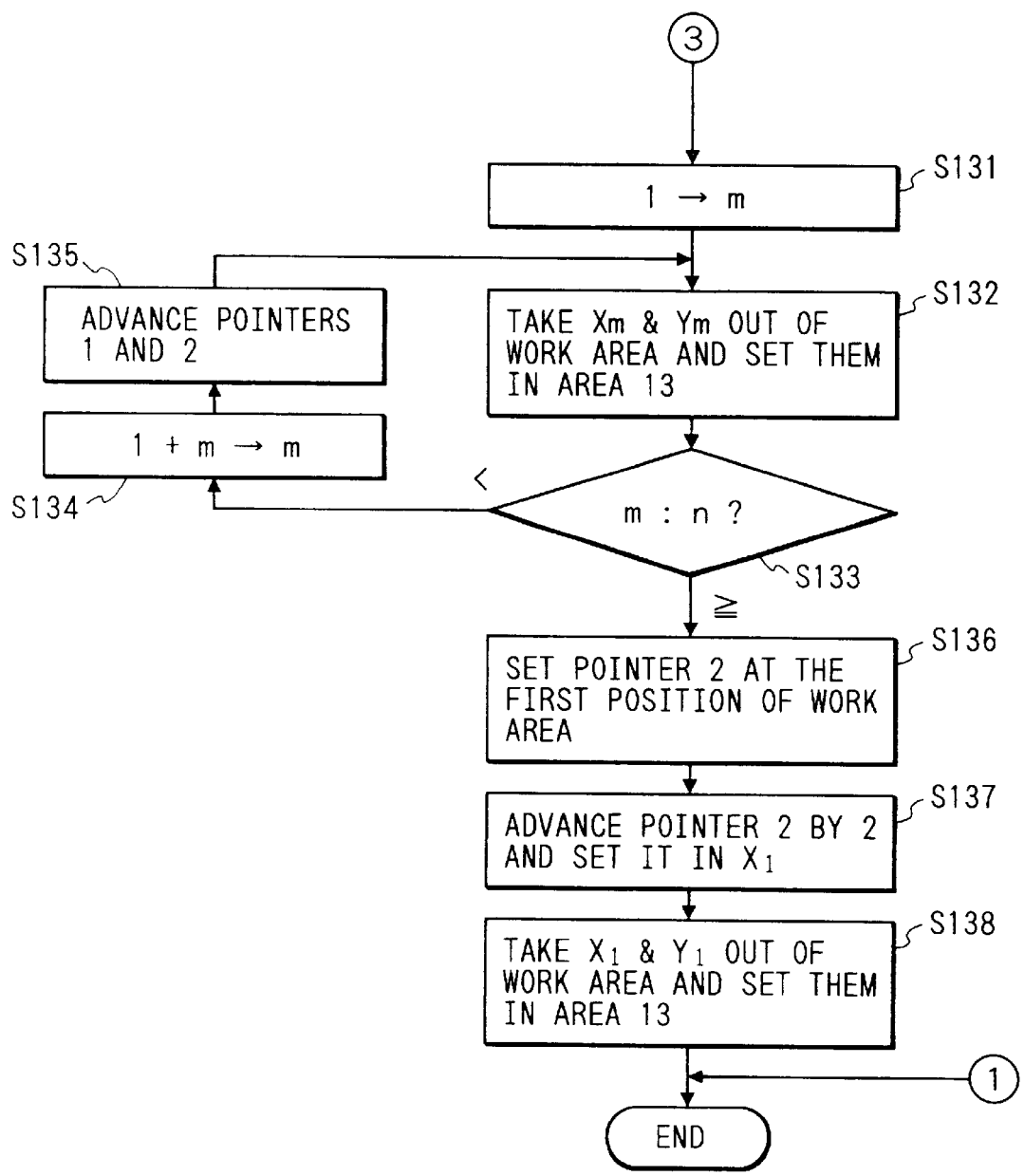
FIG. 59 is a flow chart showing the process upon execution of the polygon drawing command analysis function in step S34 in FIG. 40.

FIGS. 57 to 59 are flow charts showing a process upon execution of a polygon drawing command analysis function in step S34 in FIG. 40.

In step S120, data is set in a work area, and $X_{MIN}$, $Y_{MIN}$, $X_{MAX}$, and $Y_{MAX}$ are set. The flow advances to step S121.

In step S121, a drawing range is computed (straight line and polygon), and the flow advances to step S122.

In step S122, a clip check process of the drawing range is performed, and the flow advances to step S123.

In step S123, a drawing range flag set in the clip check process of the drawing range is checked.

If the drawing range flag is ERROR, the process ends.

If the drawing range flag is not ERROR, the flow advances to step S124 to compute MIN and MAX band Nos., and the flow advances to step S125.

In step S125, pointer 1 is placed in the memory development information storage area 13, and the flow advances to step S126.

In step S126, the MIN and MAX band Nos. are set in the memory development information storage area 13 to advance pointer 1, and the flow advances to step S127.

In step S127, pointer 2 is placed at the first position of the work area, and the flow advances to step S128.

In step S128, a command No. is taken out of the work area, and is set in the memory development information storage area 13. Thereafter, the flow advances to step S129.

In step S129, pointer 1 and pointer 2 are advanced, and the flow advances to step S130.

In step S130, the number of data is taken out of the work area, and (the number of data+2) is set in the memory development information storage area 13. The flow then advances to step S131.

In step S131, "1" is set in m, and the flow advances to step S132.

In step S132, $X_m$ and $Y_m$ are taken out of the work area, and are set in the memory development information storage area 13. The flow then advances to step S133.

In step S133, m and n (the number of coordinates) are compared with each other.

If n>m, the flow advances to step S134, and m is incremented by 1. Thereafter, the flow advances to step S135.

In step S135, pointer 1 and pointer 2 are advanced, and the flow returns to step S132.

If m≧n, the flow advances to step S136.

In step S136, pointer 2 is placed at the first position of the work area, and the flow advances to step S137.

In step S137, pointer 2 is advanced by two, and is set in $X_1$. The flow then advances to step S138.

In step S138, $X_1$ and $Y_1$ are taken out of the work area, and are set in the memory development information storage area 13, thus ending the process.

In this manner, the polygon drawing command is analyzed, and memory development information for polygon drawing is generated.

Figure 60:
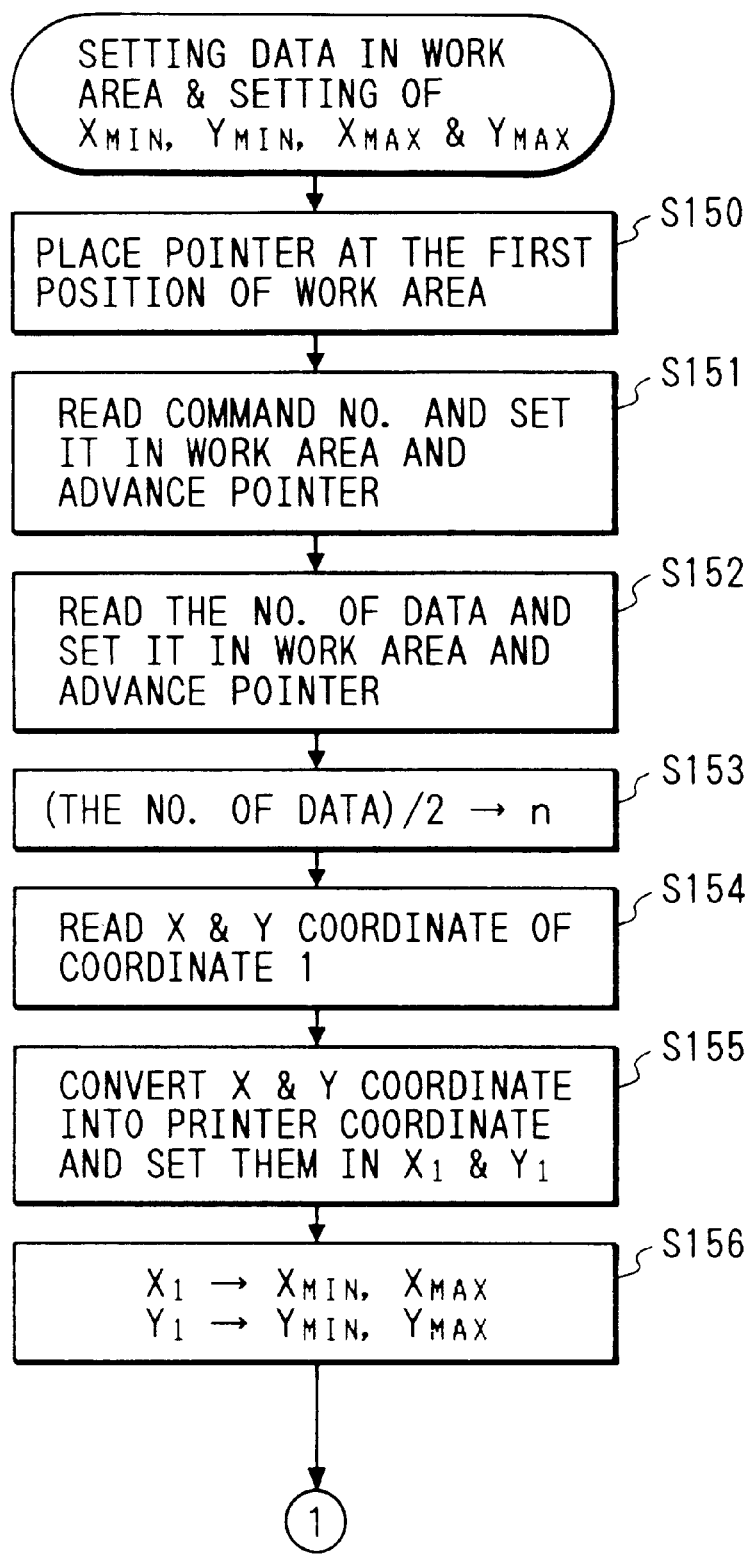
FIG. 60 is a flow chart showing a process for setting data in a work area, and setting $X_{MIN}$, $Y_{MIN}$, $X_{MAX}$, and $Y_{MAX}$ in step S600 in FIG. 54 and step S120 in FIG. 57.
Figure 61:
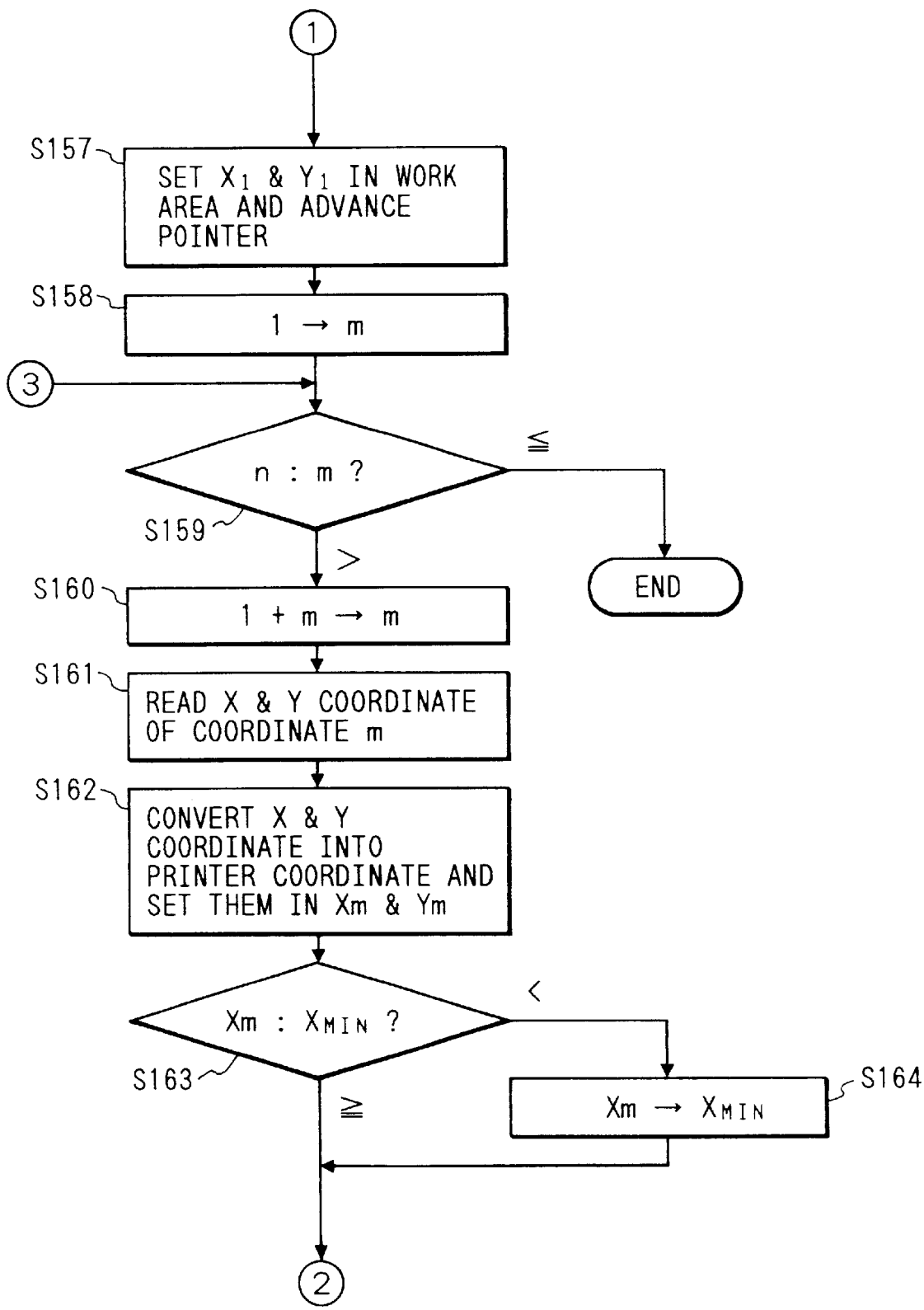
FIG. 61 is a flow chart showing the process for setting data in a work area, and setting $X_{MIN}$, $Y_{MIN}$, $X_{MAX}$, and $Y_{MAX}$ in step S600 in FIG. 54 and step S120 in FIG. 57.
Figure 62:
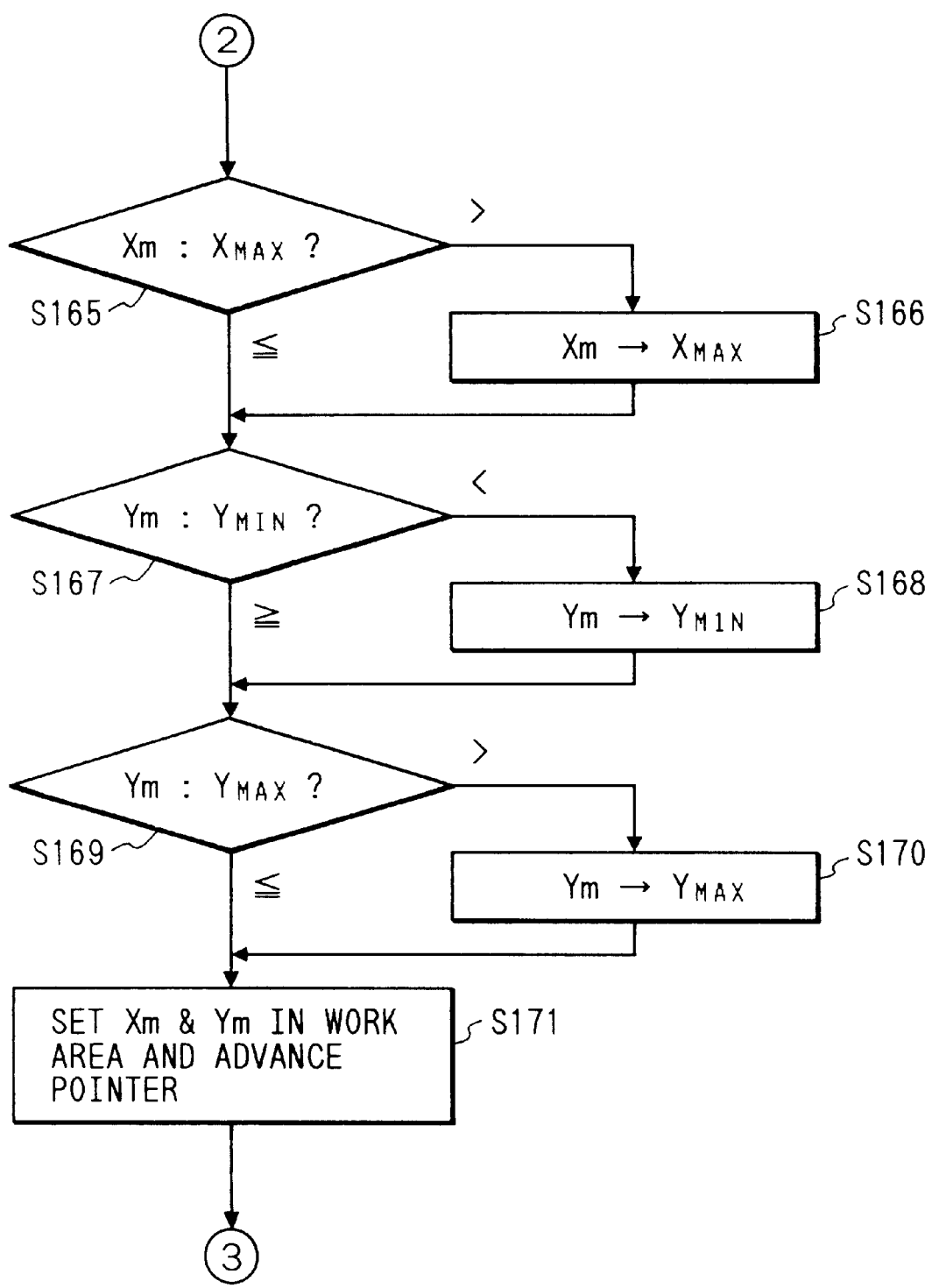
FIG. 62 is a flow chart showing the process for setting data in a work area, and setting $X_{MIN}$, $Y_{MIN}$, $X_{MAX}$, and $Y_{MAX}$ in step S600 in FIG. 54 and step S120 in FIG. 57.
Figure 63:
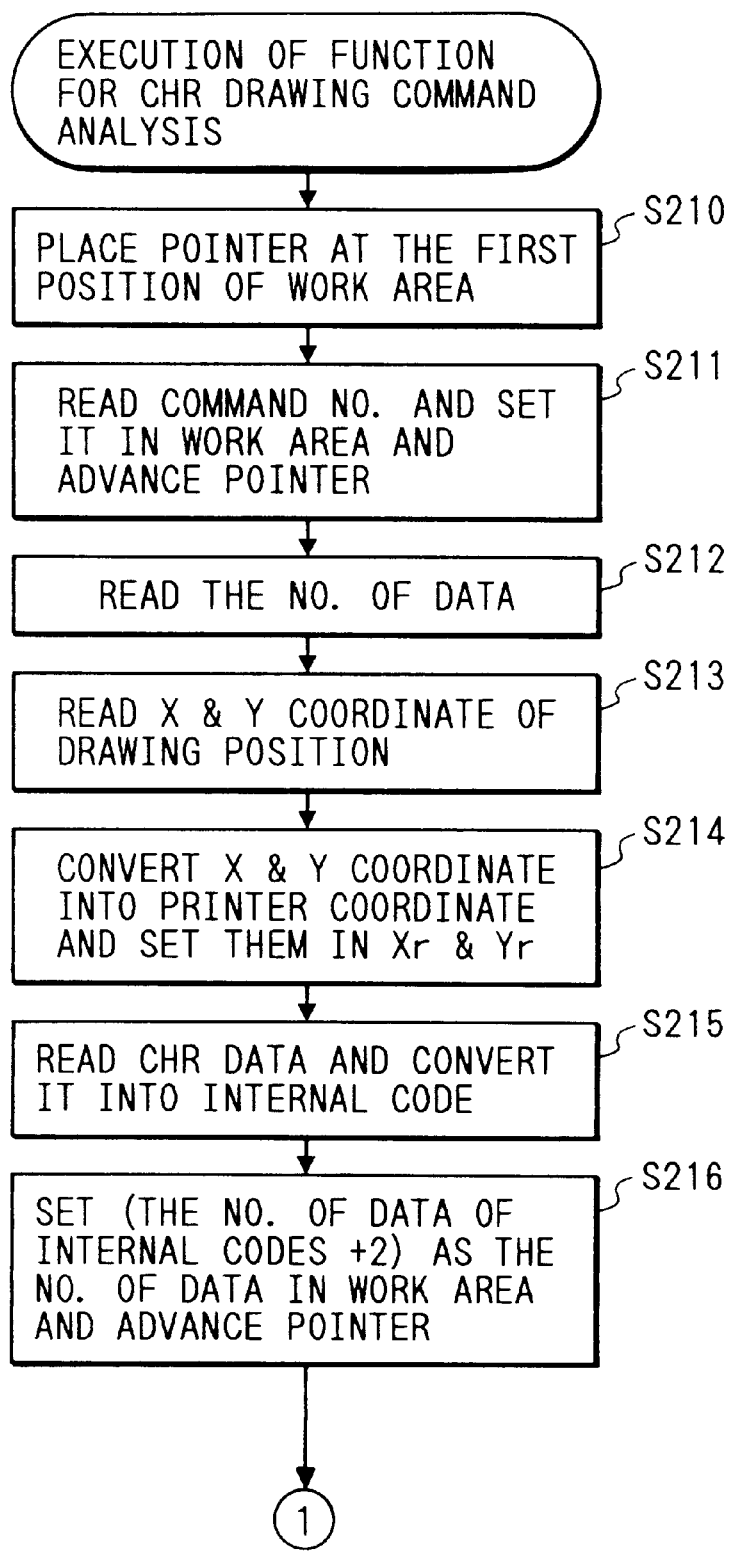
FIG. 63 is a flow chart showing a process upon execution of a character drawing command analysis function in step S34 in FIG. 40.

FIGS. 60 to 62 are flow charts showing the details of the process for setting data in the work area, and setting $X_{MIN}$, $Y_{MIN}$, $X_{MAX}$, and $Y_{MAX}$ in step S600 in FIG. 54, and step S120 in FIG. 57.

In step S150, a pointer is placed at the first position of the work area, and the flow advances to step S151.

In step S151, a command No. is read, and is set in the work area to advance the pointer. The flow then advances to step S152.

In step S152, the number of data is read, and is set in the work area to advance the pointer. The flow then advances to step S153.

In step S153, (the number of data)/2 (the number of coordinate points of a straight line) is set in a constant n, and the flow advances to step S154.

In step S154, X and Y coordinates of coordinate 1 are read, and the flow advances to step S155.

In step S155, the X and Y coordinates of coordinate 1 are converted into printer coordinates, and are respectively set in $X_1$ and $Y_1$. Thereafter, the flow advances to step S156.

In step S156, $X_1$ is set in $X_{MIN}$ and $X_{MAX}$, and $Y_1$ is set in $Y_{MIN}$ and $Y_{MAX}$. The flow then advances to step S157.

In step S157, $X_1$ and $Y_1$ are set in the work area to advance the pointer, and the flow advances to step S158.

In step S158, "1" is set in m, and the flow advances to step S159.

In step S159, m and n (the number of coordinates) are compared with each other.

If m≧n, the process ends.

If n>m, the flow advances to step S160 to increment m by 1, and the flow advances to step S161.

In step S161, X and Y coordinates of coordinate m are read, and the flow advances to step S162.

In step S162, the X and Y coordinates of coordinate m are converted into printer coordinates, and are set in $X_m$ and $Y_m$. The flow then advances to step S163.

In step S163, the values $X_m$ and $X_{MIN}$ are compared with each other.

If $X_m \geq X_{MIN}$, the flow advances to step S165.

If $X_{MIN} > X_m$, the flow advances to step S164 to set the value $X_m$ in $X_{MIN}$, and the flow advances to step S165.

In step S165, the values $X_m$ and $X_{MAX}$ are compared with each other.

If $X_{MAX} \geq X_m$, the flow advances to step S167.

If $X_m > X_{MAX}$, the flow advances to step S166 to set the value $X_m$ in $X_{MAX}$, and the flow advances to step S167.

In step S167, the values $Y_m$ and $Y_{MIN}$ are compared with each other.

If $Y_m \geq Y_{MIN}$, the flow advances to step S169.

If $Y_{MIN} > Y_m$, the flow advances to step S168 to set the value $Y_m$ in $Y_{MIN}$, and the flow advances to step S169.

In step S169, the values $Y_m$ and $Y_{MAX}$ are compared with each other.

If $Y_{MAX} \geq Y_m$, the flow advances to step S171.

If $Y_m > Y_{MAX}$, the flow advances to step S170 to set the value $Y_m$ in $Y_{MAX}$, and the flow advances to step S171.

In step S171, $X_m$ and $Y_m$ are set in the work area to advance the pointer, and the flow returns to step S159.

In this manner, data can be set in the work area, and $X_{MIN}$, $Y_{MIN}$, $X_{MAX}$, and $Y_{MAX}$ can be set.

FIGS. 63 to 66 are flow charts showing a process upon execution of a character drawing command analysis function in step S34 in FIG. 40.

In step S210, a pointer is placed at the first position of the work area, and the flow advances to step S211.

In step S211, a command No. is read, and is set in the work area to advance the pointer. The flow then advances to step S212.

In step S212, the number of data is read, and the flow advances to step S213.

In step S213, X and Y coordinates of a drawing position are read, and the flow advances to step S214.

In step S214, the X and Y coordinates of the drawing position are converted into printer coordinates, and are set in $X_r$ and $Y_r$. Thereafter, the flow advances to step S215.

In step S215, character data is read from the command, and is converted into an internal code. The flow then advances to step S216.

In step S216, (the number of data of the internal code)+2 is set as the number of data in the work area to advance the pointer, and the flow advances to step S217.

In step S217, $X_r$ and $Y_r$ are set in the work area to advance the pointer, and the flow advances to step S218.

In step S218, the internal code is set in the work area, and the flow advances to step S219.

In step S219, a drawing range of a character is computed, and the flow advances to step S220.

In step S220, a clip check process of the drawing range is performed, and the flow advances to step S221.

In step S221, a drawing range flag set in the clip check process of the drawing range is checked.

If the drawing range flag is ERROR, the process ends.

If the drawing range flag is not ERROR, the flow advances to step S222 to compute MIN and MAX band Nos., and the flow then advances to step S223.

In step S223, pointer 1 is placed in the memory development information storage area 13, and the flow advances to step S224.

In step S224, the MIN and MAX band Nos. are set in the memory development information storage area 13 to advance pointer 1, and the flow advances to step S225.

In step S225, pointer 2 is placed at the first position of the work area, and the flow advances to step S226.

In step S226, a command No. is taken out of the work area, and is set in the memory development information storage area 13. The flow then advances to step S227.

In step S227, pointer 1 and pointer 2 are advanced, and the flow advances to step S228.

In step S228, the number of data is taken out of the work area, and is set in the memory development information storage area 13. Thereafter, the flow advances to step S229.

In step S229, pointer 1 and pointer 2 are advanced, and the flow advances to step S230.

In step S230, $X_r$ and $Y_r$ are taken out of the work area, and are set in the memory development information storage area 13. The flow then advances to step S231.

In step S231, pointer 1 and pointer 2 are advanced, and the flow advances to step S232.

In step S232, the internal code is taken out of the work area, and is set in the memory development information storage area 13, thus ending the process.

In this manner, the character drawing command is analyzed, and memory development information for character drawing is generated.

Figure 67:
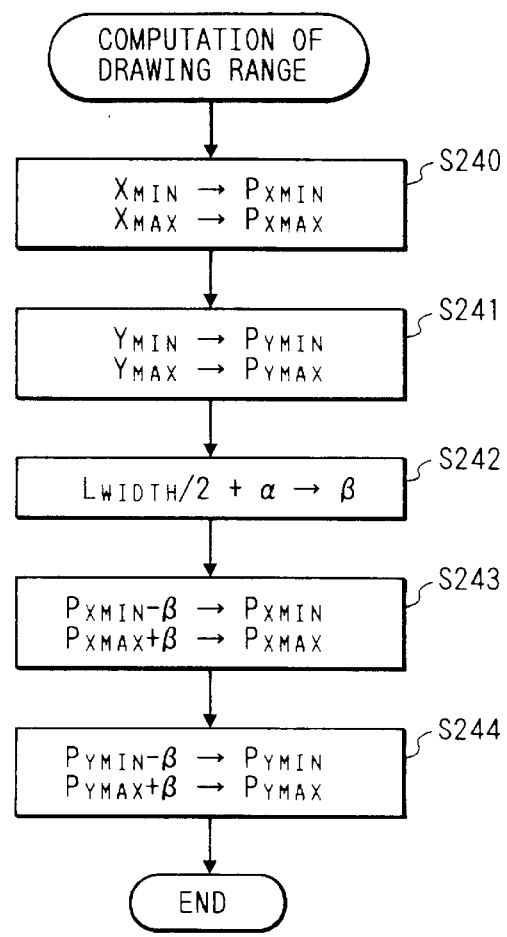
FIG. 67 is a flow chart showing a computation process of a drawing range in step S601 in FIG. 54 and step S121 in FIG. 57.

FIG. 67 is a flow chart showing the details of the process for computing the drawing range (straight line and polygon) in step S601 in FIG. 54 and step S121 in FIG. 57.

In step S240, $X_{MIN}$ is set in $P_{XMIN}$, and $X_{MAX}$ is set in $P_{XMAX}$. The flow then advances to step S241.

In step S241, $Y_{MIN}$ is set in $P_{YMIN}$, and $Y_{MAX}$ is set in $P_{YMAX}$. The flow then advances to step S242.

In step S242, $\alpha$ (a constant equal to or larger than 0) is added to $L_{WIDTH}/2$, and the sum is set in $\beta$. The flow then advances to step S243.

In step S243, $P_{XMIN} - \beta$ is set in $P_{XMIN}$, and $P_{XMAX} + \beta$ is set in $P_{XMAX}$. Thereafter, the flow advances to step S244.

In step S244, $P_{YMIN} - \beta$ is set in $P_{YMIN}$, and $P_{YMAX} + \beta$ is set in $P_{YMAX}$, thus ending the process.

In this manner, the drawing range of a straight line or a polygon can be computed.

Figure 68:
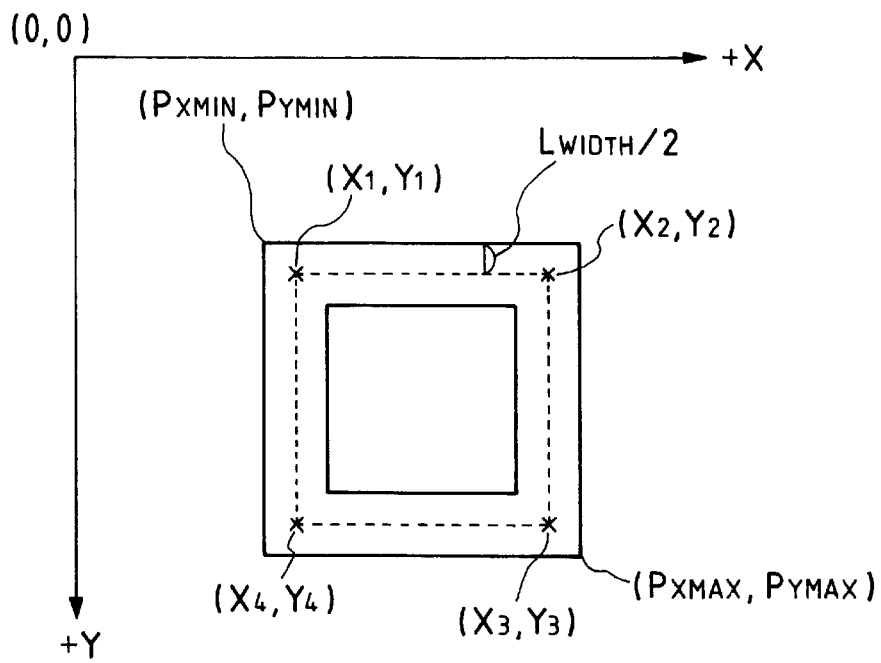
FIG. 68 is a view of a drawing range of a polygon designated by four points $(x_1, y_1)$ to $(x_4, y_4)$.

FIG. 68 shows a drawing range of a polygon designated by four points $(x_1, y_1)$ to $(x_4, y_4)$.

This range is a rectangular area surrounded by $(P_{XMIN}, P_{YMIN})$ and $(P_{XMAX}, P_{YMAX})$, and corresponds to a computation result obtained when the value $\alpha$ is set to be "0" in the process shown in FIG. 67.

Figure 64:
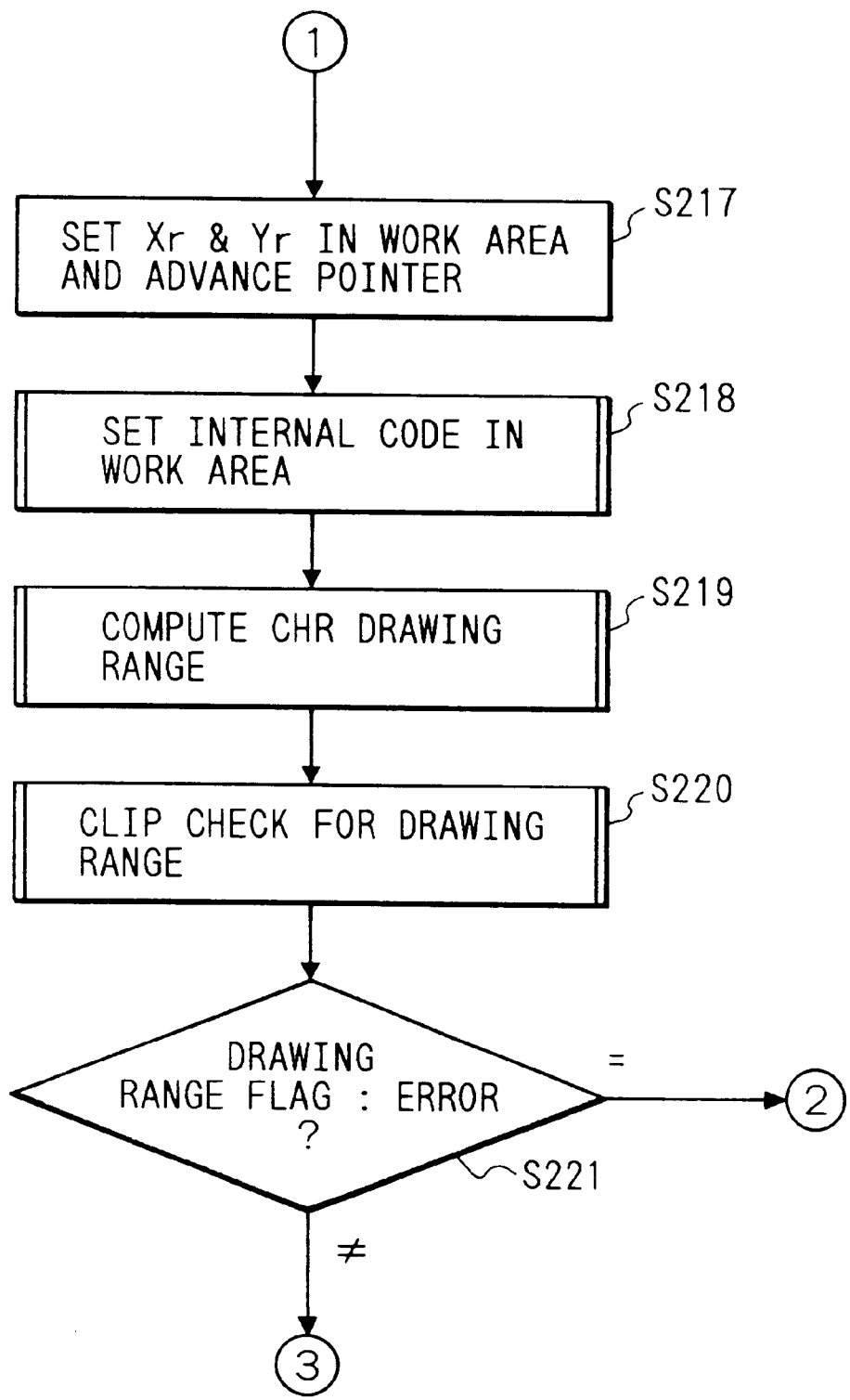
FIG. 64 is a flow chart showing the process upon execution of the character drawing command analysis function in step S34 in FIG. 40.
Figure 69:
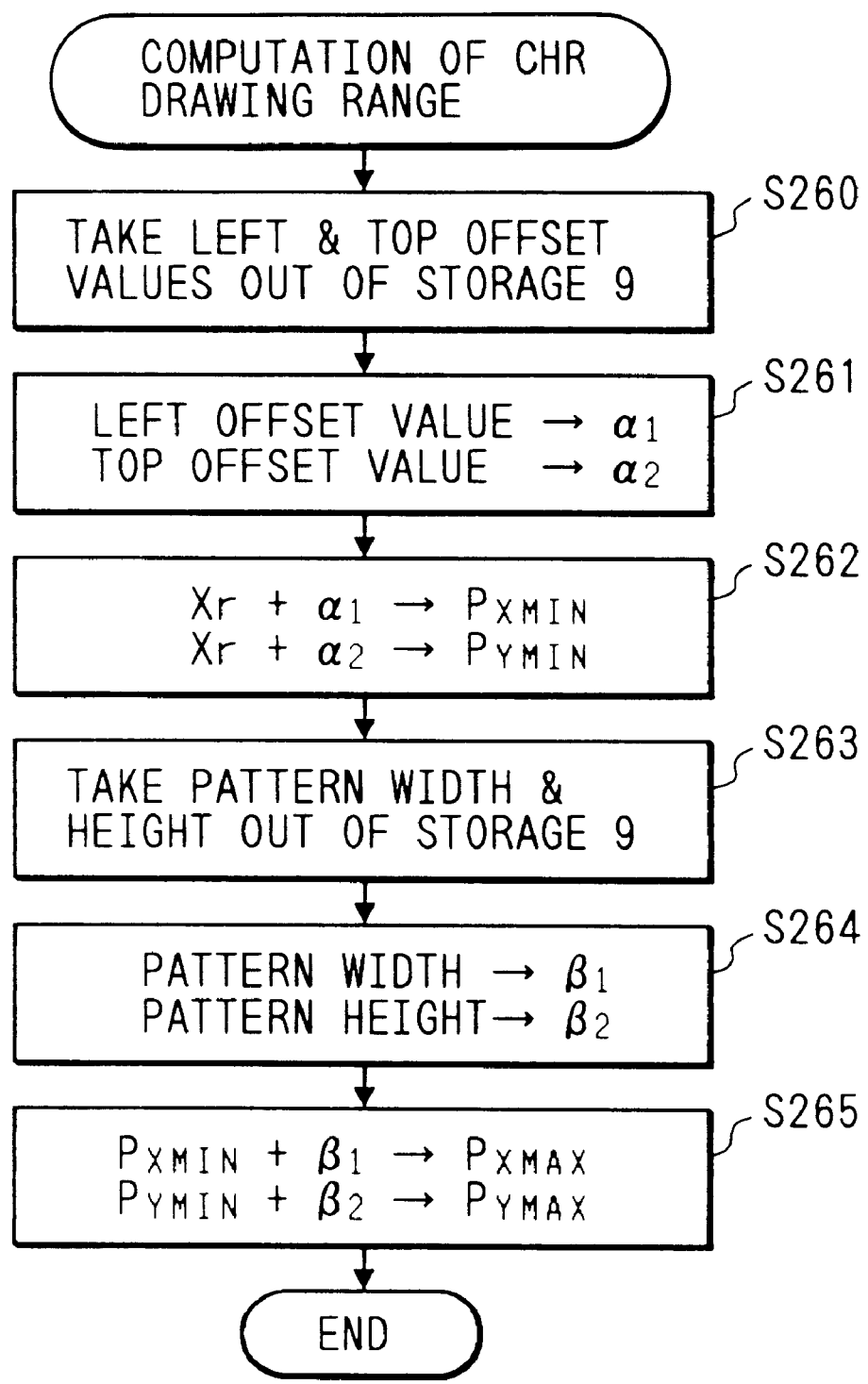
FIG. 69 is a flow chart showing a computation process of a character drawing range in step S220 in FIG. 64.

FIG. 69 is a flow chart showing the details of the process for computing the character drawing range in step S219 in FIG. 64.

In step S260, left and top offset values are taken out from the character information storage 9 (FIG. 24A and 24B), and the flow advances to step S261.

In step S261, the left offset value is set in $\alpha_1$, and the top offset value is set in $\alpha_2$. The flow then advances to step S262.

In step S262, $X_r + \alpha_1$ is set in $P_{XMIN}$, and $Y_r - \alpha_2$ is set in $P_{YMIN}$. The flow then advances to step S263.

In step S263, a pattern width and a pattern height are taken out of the character information storage 9, and the flow advances to step S264.

In step S264, the pattern width is set in $\beta_1$, and the pattern height is set in $\beta_2$. The flow advances to step S265.

In step S265, $P_{XMIN}+\beta_1$ is set in $P_{XMAX}$, and $P_{YMIN}+\beta_2$ is set in $P_{YMAX}$, thus ending the process.

In this manner, a drawing range of a character can be computed.

Figure 70:
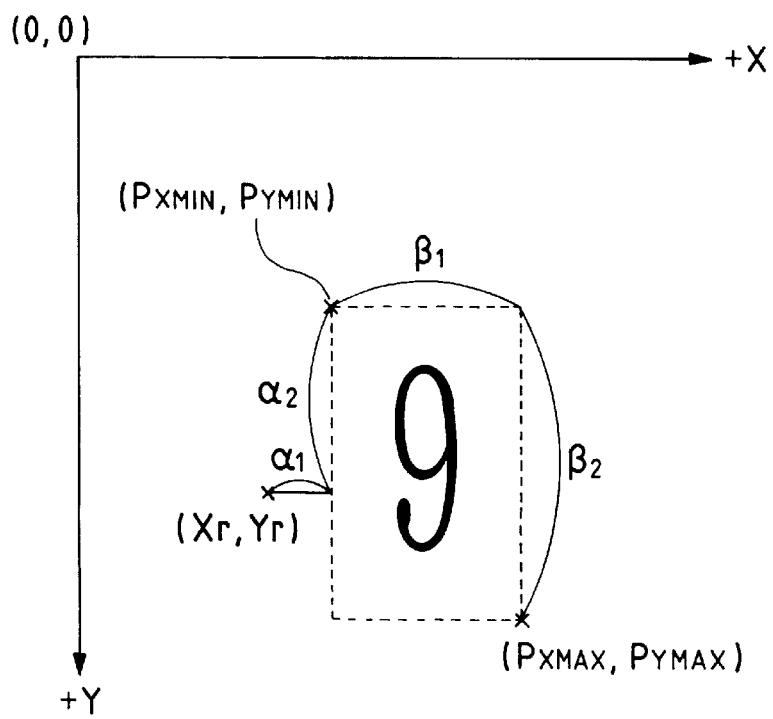
FIG. 70 is a view of a character drawing range.

FIG. 70 shows a character drawing range.

This range is a rectangular area surrounded by ($P_{XMIN}$, $P_{YMIN}$) and ($P_{XMAX}$, $P_{YMAX}$)

Figure 71:
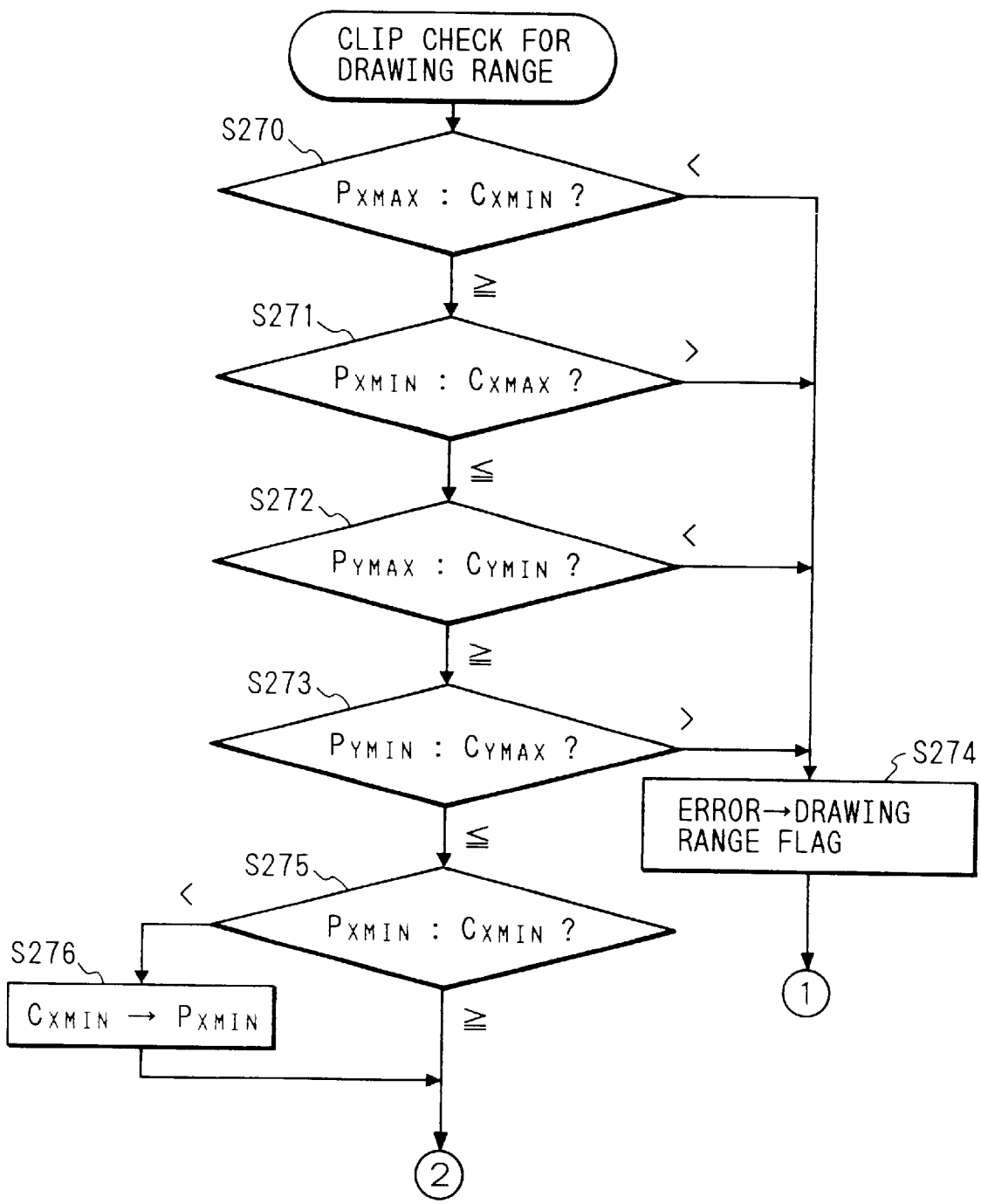
FIG. 71 is a flow chart showing a clip check process of a drawing range in step S602 in FIG. 54, step S122 in FIG. 57, and step S220 in FIG. 64.
Figure 72:
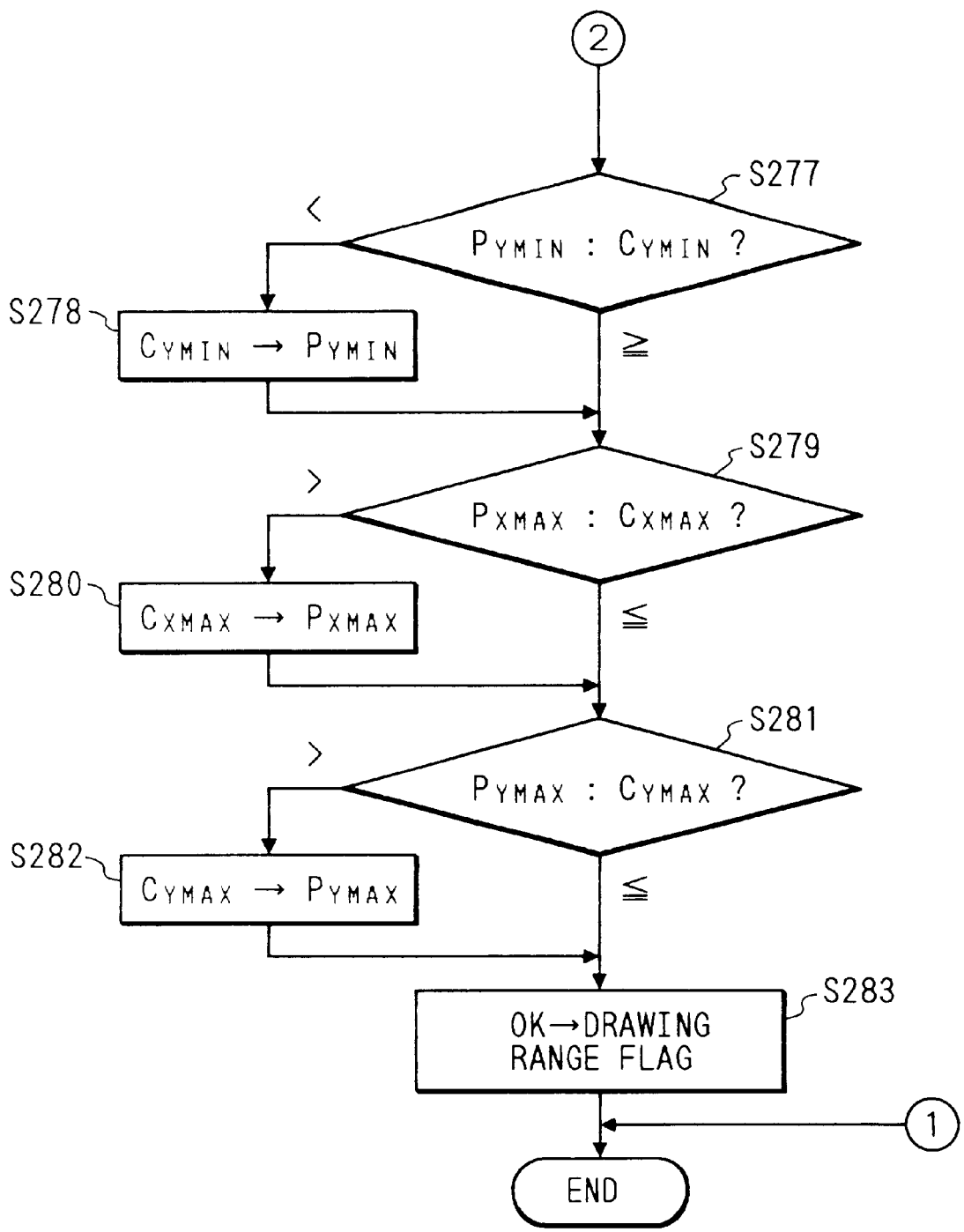
FIG. 72 is a flow chart showing the clip check process of a drawing range in step S602 in FIG. 54, step S122 in FIG. 57, and step S220 in FIG. 64.

FIGS. 71 and 72 are flow charts showing the details of the clip check process of the drawing range in step S602 in FIG. 54, S122 in FIG. 57, and step S220 in FIG. 64.

In step S270, values $P_{XMAX}$ and $C_{XMIN}$ are compared with each other.

If $C_{XMIN}>P_{XMAX}$, the flow advances to step S274, and ERROR is set in the drawing range flag, thus ending the process.

Otherwise, the flow advances to step S271.

In step S271, values $P_{XMIN}$ and $C_{XMAX}$ are compared with each other.

If $P_{XMIN}>C_{XMIX}$, the flow advances to step S274, and ERROR is set in the drawing range flag, thus ending the process.

Otherwise, the flow advances to step S272.

In step S272, values $P_{YMAX}$ and $C_{YMIN}$ are compared with each other.

If $C_{YMIN}>P_{YMAX}$, the flow advances to step S274, and ERROR is set in the drawing range flag, thus ending the process.

Otherwise, the flow advances to step S273.

In step S273, values $P_{YMIN}$ and $C_{YMAX}$ are compared with each other.

If $P_{YMIN}>C_{YMAX}$, the flow advances to step S274, and ERROR is set in the drawing range flag, thus ending the process.

Otherwise, the flow advances to step S275.

In step S275, values $P_{XMIN}$ and $C_{XMIN}$ are compared with each other.

If $C_{XMIN}>P_{XMIN}$, the flow advances to step S276 to set the value $C_{XMIN}$ in $P_{XMIN}$, and the flow advances to step S277.

Otherwise, the flow advances to step S277.

In step S277, values $P_{YMIN}$ and $C_{YMIN}$ are compared with each other.

If $C_{YMIN}>P_{YMIN}$, the flow advances to step S278 to set the value $C_{YMIN}$ in $P_{YMIN}$, and the flow advances to step S279.

Otherwise, the flow advances to step S279.

In step S279, values $P_{XMAX}$ and $C_{XMAX}$ are compared with each other.

If $P_{XMAX}>C_{XMAX}$, the flow advances to step S280 to set the value $C_{XMAX}$ in $P_{XMAX}$, and the flow advances to step S281.

Otherwise, the flow advances to step S281.

In step S281, values $P_{YMAX}$ and $C_{YMAX}$ are compared with each other.

If $P_{YMAX}>C_{YMAX}$, the flow advances to step S282 to set the value $C_{YMAX}$ in $P_{YMAX}$, and the flow advances to step S283.

Otherwise, the flow advances to step S283.

In step S283, OK is set in the drawing range flag, thus ending the process.

In this manner, a common range between the drawing range and a clip area can be obtained.

Figure 73:
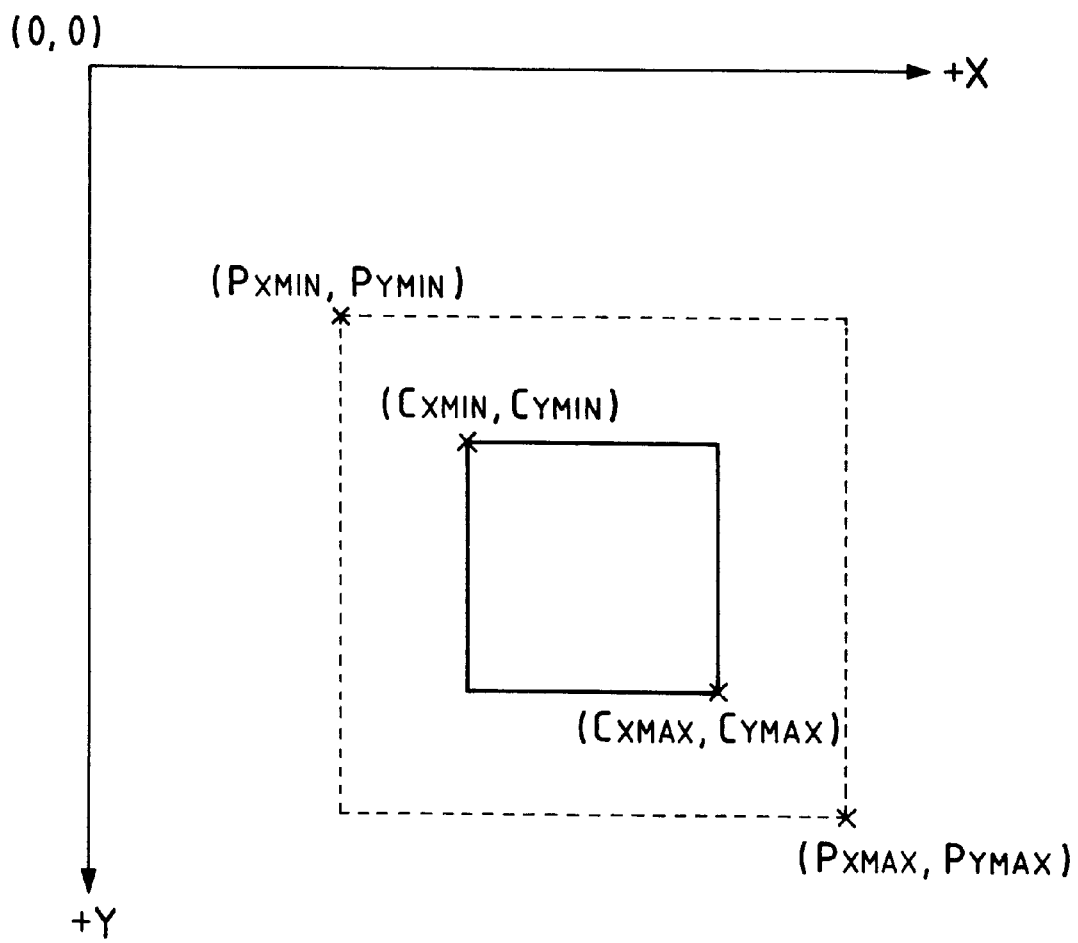
FIG. 73 is a view showing a case wherein a clip area of a rectangular area surrounded by $(C_{XMIN}, C_{YMIN})$ and $(C_{XMAX}, C_{YMAX})$ is set in a drawing range of a rectangular area surrounded by $(P_{XIN}, P_{YMIN})$ and $(P_{XMAX}, P_{YMAX})$.

FIG. 73 shows a case wherein a clip area of a rectangular area surrounded by ($C_{XMIN}$, $C_{YMIN}$) and ($C_{XMAX}$, $C_{YMAX}$) is set for a drawing range of a rectangular area surrounded by ($P_{XMIN}$, $P_{YMIN}$) and ($P_{XMAX}$, $P_{YMAX}$).

With the processes in FIGS. 71 and 72, the drawing range shown in FIG. 68 becomes a rectangular area surrounded by ($C_{XMIN}$, $C_{YMIN}$) and ($C_{XMAX}$, $C_{YMAX}$).

Figure 65:
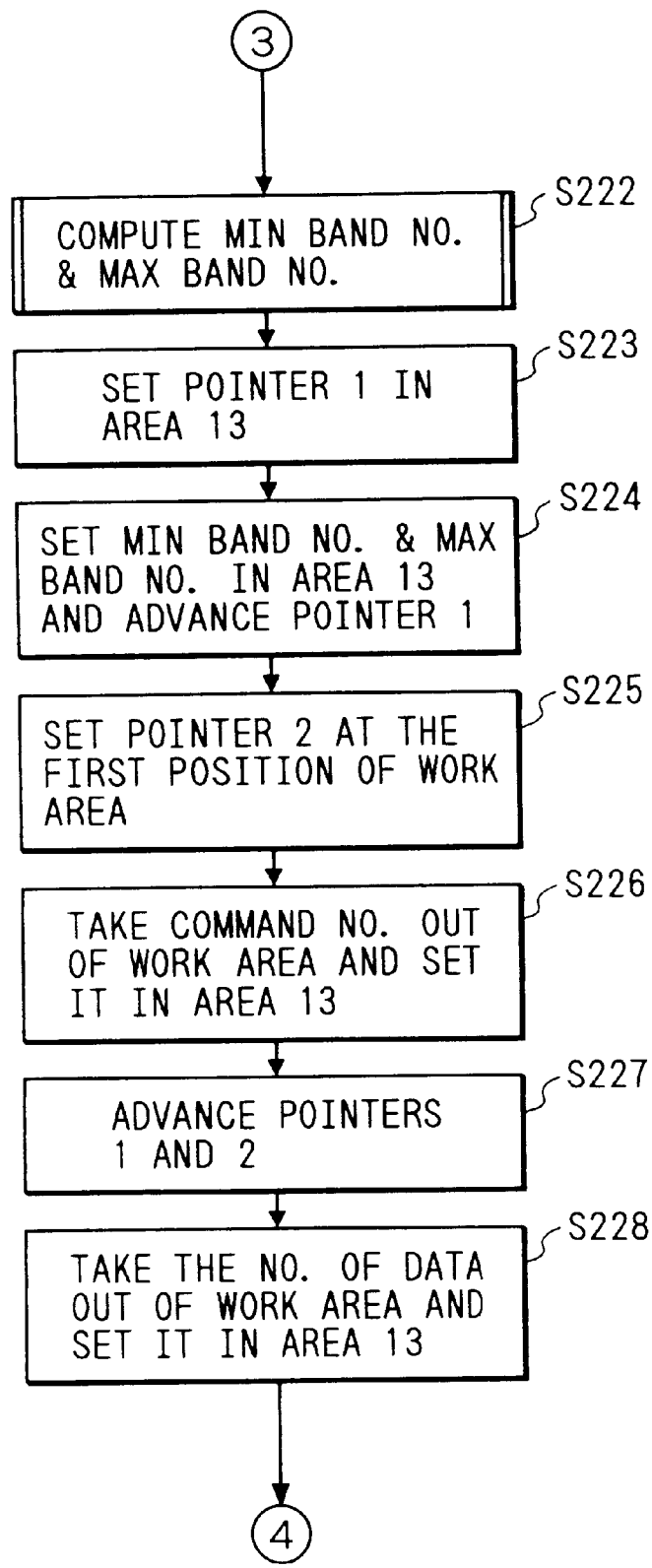
FIG. 65 is a flow chart showing the process upon execution of the character drawing command analysis function in step S34 in FIG. 40.
Figure 66:
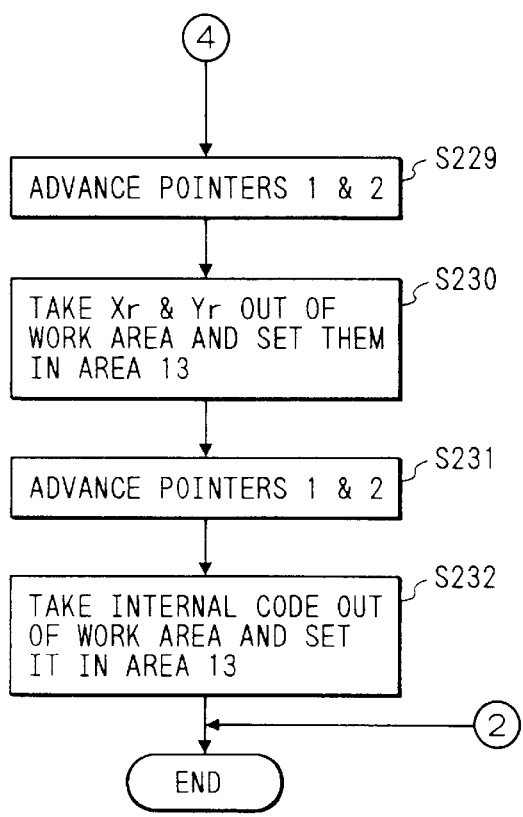
FIG. 66 is a flow chart showing the process upon execution of the character drawing command analysis function in step S34 in FIG. 40.
Figure 74:
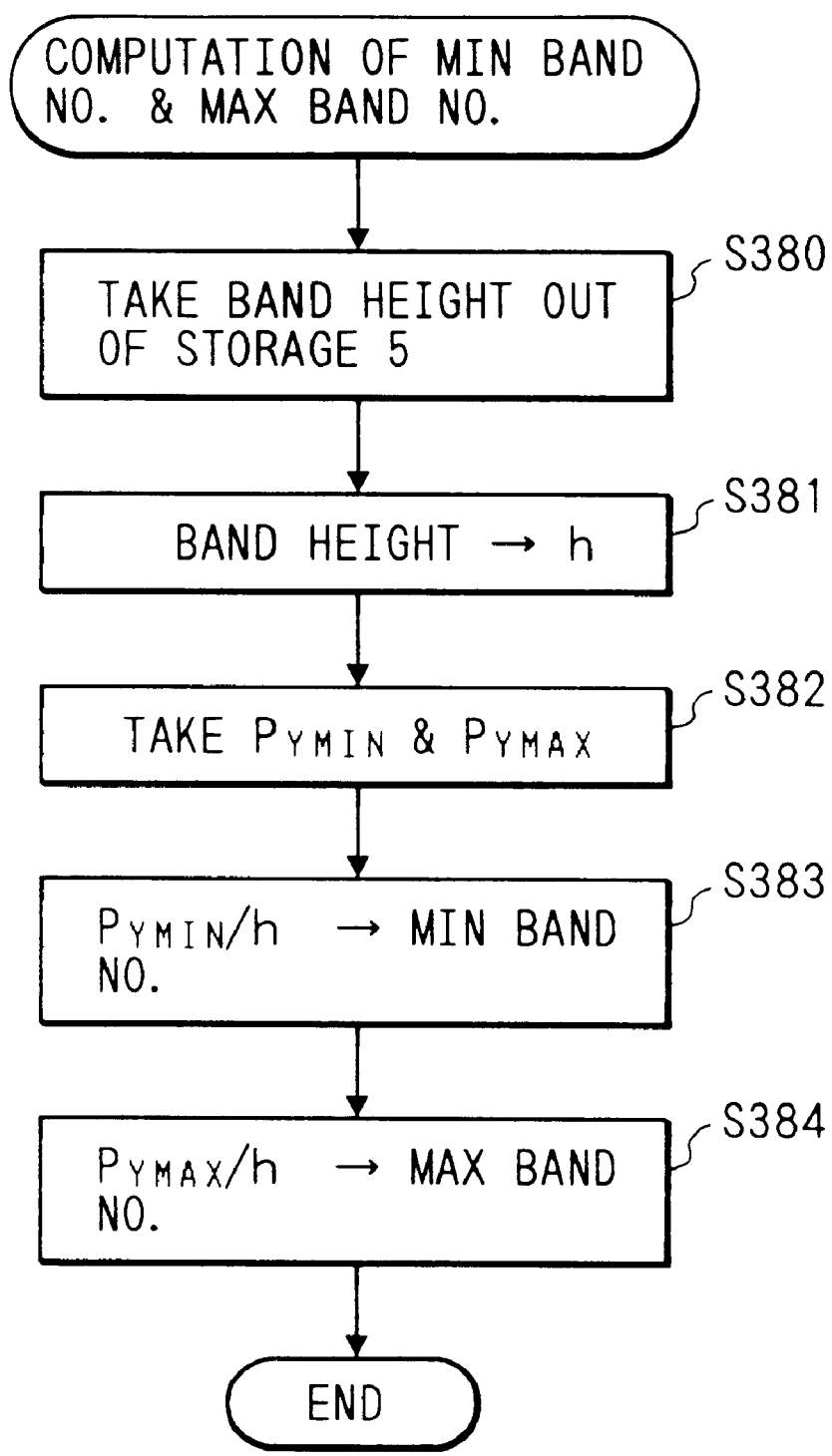
FIG. 74 is a flow chart showing a process for computing MIN band No. and MAX band No. in step S604 in FIG. 55, step S124 in FIG. 58, and step S222 in FIG. 65.

FIG. 74 is a flow chart showing the details of the process for computing the MIN and MAX band Nos. in step S604 in FIG. 55, step S124 in FIG. 58, and step S222 in FIG. 65.

In step S380, a band height (the height of one band) is taken out of the band information storage 5, and the flow advances to step S381.

In step S381, the band height is set in h, and the flow advances to step S382.

In step S382, $P_{YMIN}$ and $P_{YMAX}$ are taken out of drawing range information, and the flow advances to step S383.

In step S383, a quotient of ($P_{YMIN}$/h) is set in the MIN band No., and the flow advances to step S384.

In step S384, a quotient of ($P_{YMAX}$/h) is set in the MAX band No., and the process ends.

In this manner, the MIN and MAX band Nos. can be computed from the drawing range information.

FIGS. 75A and 75B show examples of memory development information for color designation (line, paint, character) generated by analyzing the color designation command shown in FIG. 35 on the basis of the flow charts shown in FIGS. 41 and 42.

FIG. 75A shows an example of memory development information for color designation in the color mode, and FIG. 75B shows an example of memory development information for color designation in the monochrome mode.

In FIGS. 75A and 75B, a command table No. varies depending on color designation memory development information, and is used for identifying each command.

In FIGS. 75A and 75B, the content of a number-of-data parameter is 4.

In FIG. 75A, Y, M, C, and Bk values are density data values of Y (Yellow), M (Magenta), C (Cyan), and Bk (Black) as primary colors of coloring materials (toners or inks). As can be seen from FIG. 75A, even when a color designation command includes color designation data values of a different type, the color designation data values are converted into Y, M, C, and Bk density values upon generation of memory development information after analysis.

In FIG. 75B, a gray scale density value is a Bk (Black) density data value. As can be seen from FIG. 75B, even when a color designation command includes a color designation data value of a different type, the color designation data value is converted into the Bk density data value, and is set at the storage position of the Y density data value. In addition, "0" is set at the storage positions of the M, C, and Bk density data values.

FIG. 76A shows an example of memory development information generated by analyzing the line width designation command shown in FIG. 36A on the basis of the flow chart of FIG. 45, FIG. 76B shows an example of memory development information generated by analyzing the clip area designation command shown in FIG. 36B on the basis of the flow chart of FIG. 46, FIG. 76C shows an example of memory development information generated by analyzing the paint definition designation command shown in FIG. 36C on the basis of the flow chart of FIG. 47, and FIG. 76D shows an example of memory development information generated by analyzing the drawing logic designation command shown in FIG. 36D on the basis of the flow chart of FIG. 48.

In FIGS. 76A to 76D, a command table No. varies depending on memory development information, and is used for identifying each command.

The content of a number-of-data parameter indicates the number of data following the number-of-data parameter.

FIG. 77A shows an example of memory development information generated by analyzing the straight line drawing command shown in FIG. 37 on the basis of the flow charts of FIGS. 54 to 56, and FIG. 77B shows an example of memory development information generated by analyzing the polygon drawing command shown in FIG. 37 on the basis of the flow charts of FIGS. 57 to 59.

In FIGS. 77A and 77B, a command table No. varies depending on memory development information, and is used for identifying each command.

The content of a number-of-data parameter indicates the number of data following the number-of-data parameter.

Since the last parameters in the memory development information for polygon drawing represent a start point (a polygon is closed by returning to the start point), $X_1$ and $Y_1$ are set, as shown in FIG. 77B.

FIG. 78 shows an example of memory development information generated by analyzing the character drawing command shown in FIG. 38 on the basis of the flow charts of FIGS. 63 to 66.

In FIG. 78, a command table No. varies depending on memory development information, and is used for identifying each command.

The content of a number-of-data parameter indicates the number of data following the number-of-data parameter.

Figure 79:
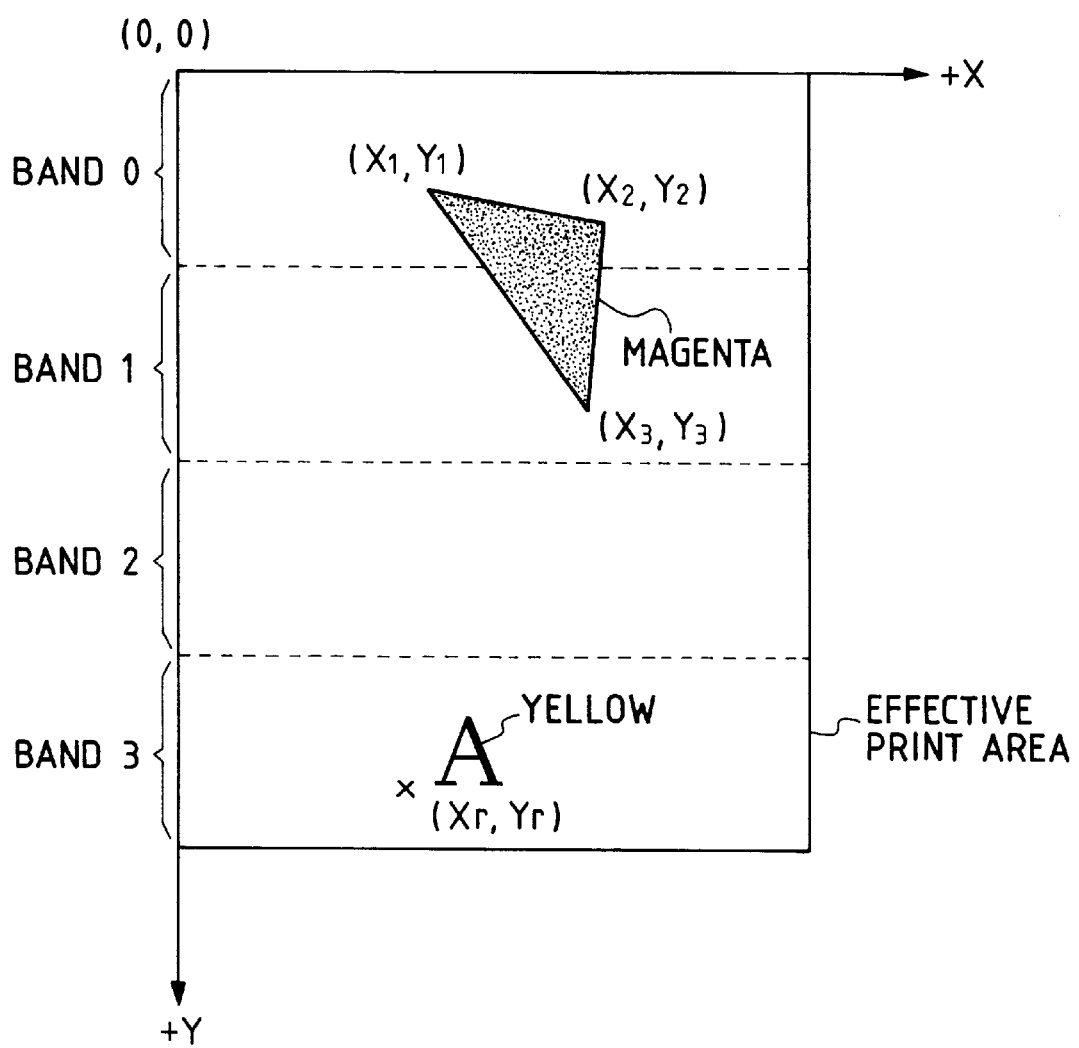
FIG. 79 is a view showing a case wherein one page is divided into four bands, and drawing is performed using Y, M, C, and Bk band memories each having a size corresponding to one band, and some drawing attribute commands and some drawing commands shown in FIGS. 27 to 30.

FIG. 79 shows a case wherein one page is divided into four bands, and drawing is performed using Y, M, C, and Bk band memories each having a size corresponding to one band, and using some drawing attribute commands and some drawing commands shown in FIGS. 35A to 38.

Assume that drawing is performed in the order of a polygon and a character.

Assume that a polygon is set with an inside paint attribute, is not set with an outline attribute, and the paint color is magenta.

Assume that the inside paint color of a character is yellow.

Figure 80:
FIG. 80 is a view of memory development information used in drawing in FIG. 79.

FIGS. 80 and 81 show memory development information used in drawing shown in FIG. 79.

In FIGS. 80 and 81, a required number of information are arranged in an order to be analyzed, which order is the same as a reception order of commands.

Note that a drawing logic designation value "0" in memory development information for drawing logic designation indicates that a drawing logic is "overwrite".

As shown in FIGS. 80 and 81, as for memory development information for drawing attributes, "0" is set in the MIN band No., and "3" is set in the MAX band No., so that the drawing attributes are analyzed in all bands.

If this is not done, drawing attribute information must be added to memory development information of each drawing command, resulting in a large data amount of memory development information.

In memory development information of each drawing command, a minimum band No. where a drawing range is present is set in the MIN band No., and a maximum band No. where the drawing range is present is set in the MAX band No.

For example, "0" is set in the MIN band No. in memory development information of a polygon drawing command, and "1" is set in its MAX band No.

Figure 82:
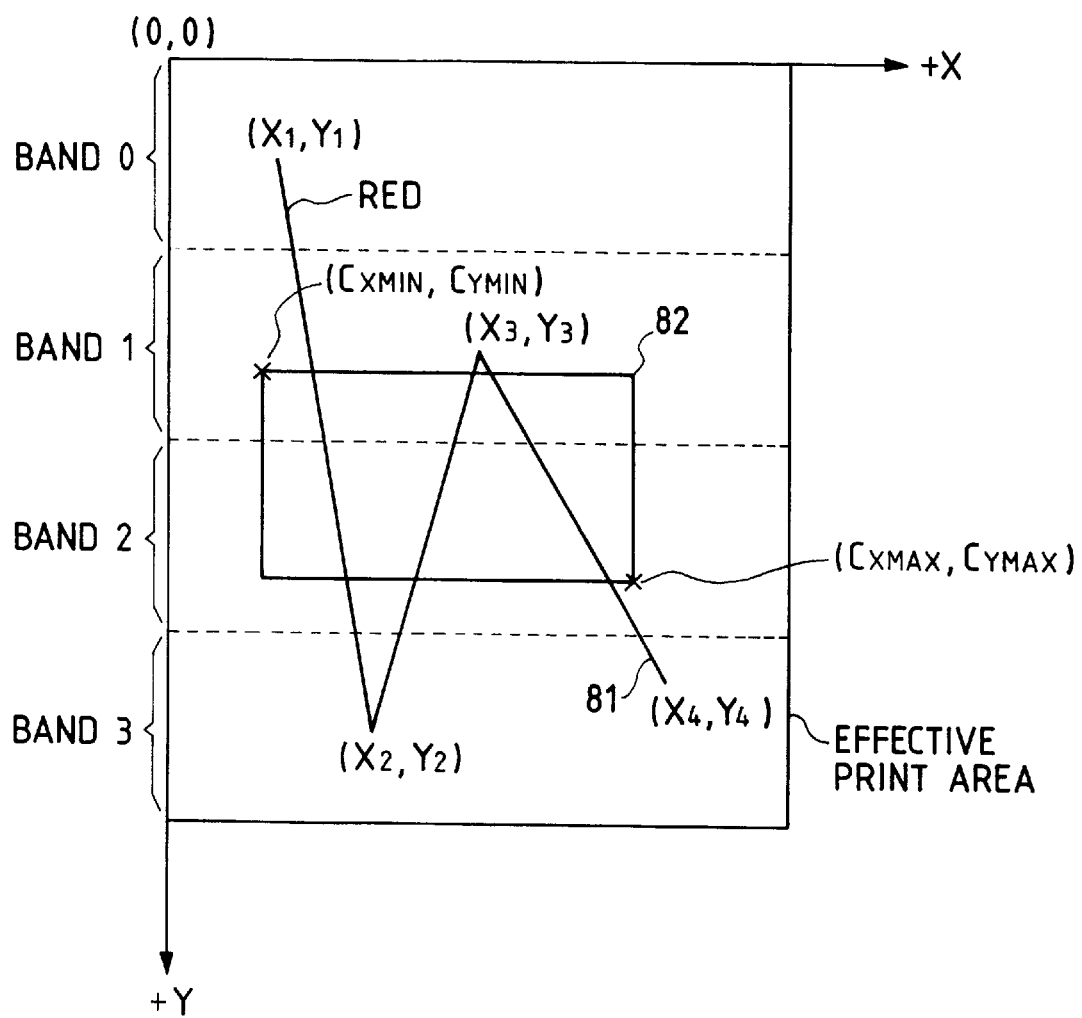
FIG. 82 is a view showing a case wherein one page is divided into four bands, and drawing is performed using Y, M, C, and Bk band memories each having a size corresponding to one band while setting clip area designation for a straight line drawing.

FIG. 82 shows a case wherein one page is divided into four bands, and drawing is performed using Y, M, C, and Bk band memories each having a size corresponding to one band, while setting clip area designation to straight line drawing.

Assume that a line color of a straight line is red (M=100%, Y=100%).

FIG. 83 shows memory development information used in drawing shown in FIG. 82.

In FIG. 83, a required number of information are arranged in an order to be analyzed, which order is the same as a reception order of commands.

A drawing range for straight line drawing extends from band 0 to band 3 with the process in FIG. 67 if the clip area is not taken into consideration.

If the clip area is taken into consideration, the drawing range extends from band 1 to band 2 with the processes in FIGS. 71 and 72.

Therefore, in memory development information of the straight line drawing command, "1" is set in the MIN band No., and "2" is set in the MAX band No.

FIG. 84 shows a command execution jump table 1 (ROM), which stores jump addresses to functions for actually performing pattern development of a drawing on a memory, and jump addresses to functions for designating drawing attributes (setting attributes in internal variables).

Jump addresses are stored in correspondence with command Nos. (0 to n).

FIG. 85 shows a command execution jump table 2 (ROM) in which all jump addresses to functions for performing pattern development of a drawing onto a memory are replaced with jump addresses to skip functions in FIG. 84.

Like in FIG. 84, jump addresses are stored in correspondence with command Nos. (0 to n).

Figure 86:
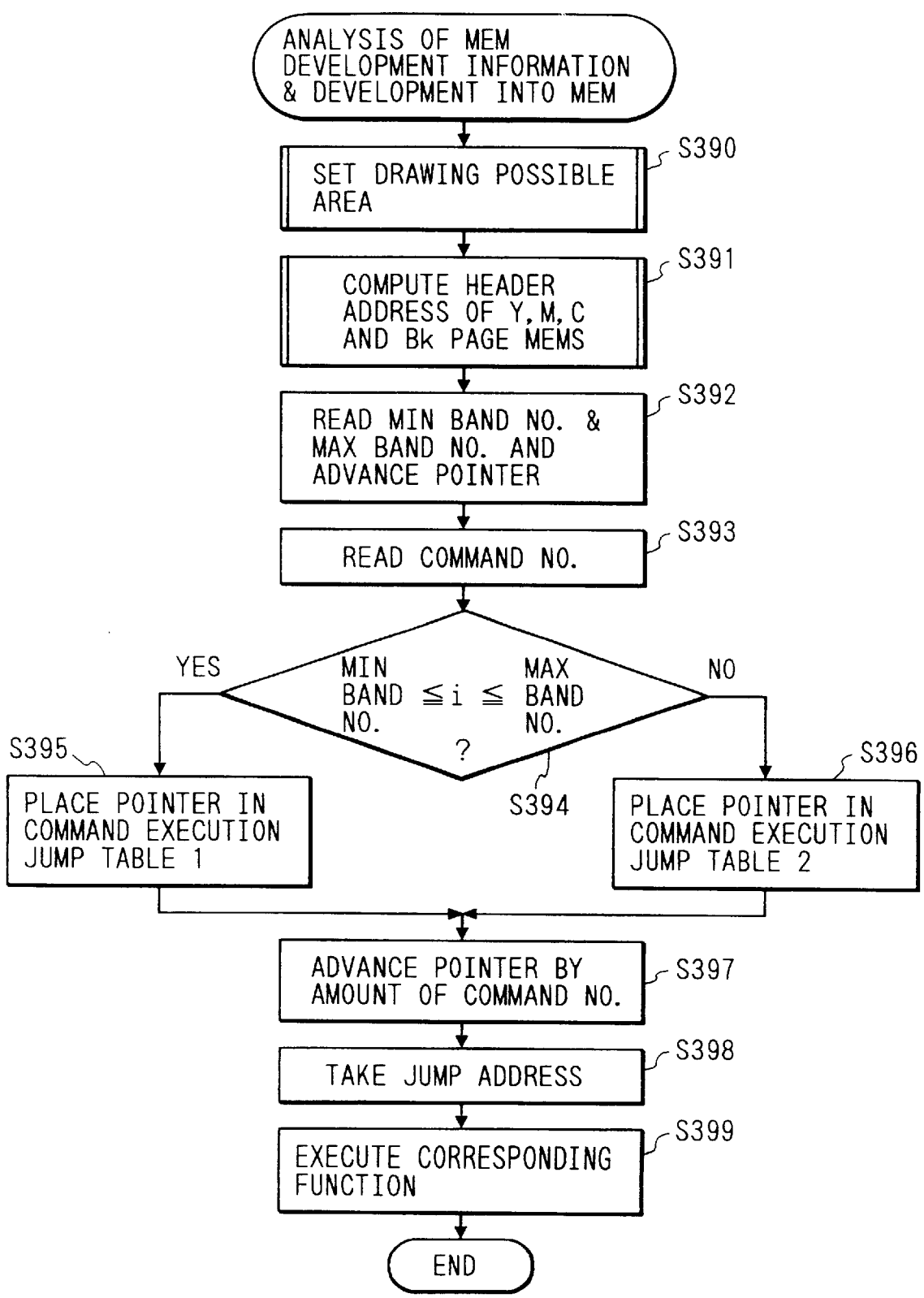
FIG. 86 is a flow chart showing the details of a process in step S12 in FIG. 33.

FIG. 86 is a flow chart showing the details of the process in step S12 in FIG. 33.

In step S390, a drawable range is set in consideration of a clip range (a rectangular area for setting a drawable range of a figure, a character, or the like), and the flow advances to step S391.

In step S391, the header addresses of Y, M, C, and Bk virtual page memories are computed and set, and the flow advances to step S392.

In step S392, MIN and MAX band No. values in memory development information are read, and a pointer is advanced to the next data. Thereafter, the flow advances to step S393.

In step S393, a command No. is read, and the flow advances to step S394.

In step S394, it is checked if MIN band No.≦(present band No.)≦MAX band No. is satisfied.

If YES in step S394, the flow advances to step S395, and a pointer is placed at the first position of the command execution jump table shown in FIG. 84. The flow then advances to step S397.

If NO in step S394, the flow advances to step S396, and a pointer is placed at the first position of the command jump table 2 shown in FIG. 85. The flow then advances to step S397.

In step S397, the pointer in the table is advanced by an amount corresponding to the command No., and the flow advances to step S398.

In step S398, the content (jump address) indicated by the pointer is taken, and the flow advances to step S399.

In step S399, a function indicated by the jump address is executed, thus ending the process.

Figure 87:
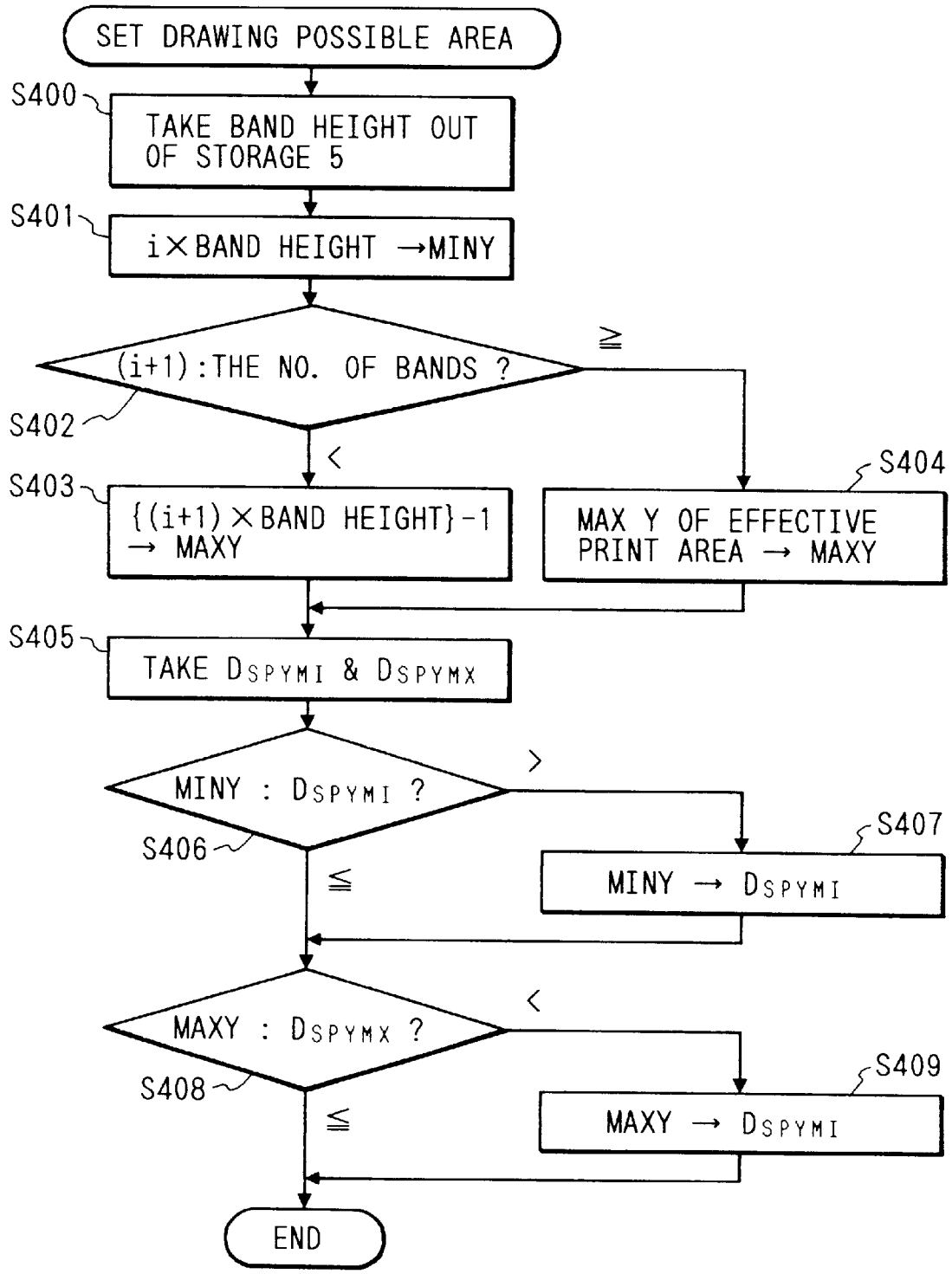
FIG. 87 is a flow chart showing the details of a process in step S390 in FIG. 86.

FIG. 87 is a flow chart showing the details of the process in step S390 in FIG. 86.

In the following description, assume that the Y value of a drawing range, and the value of a clip area are values on the printer coordinate system.

In step S400, band height information [the height (the number of dots or the number of scan lines) of one band] is taken out of the band information storage 5, and the flow advances to step S401.

In step S401, a value (the band height)×i (present band No.) is set in a minimum Y value MINY of a drawable range, and the flow advances to step S402.

In step S402, a value (i+1) is compared with the number of bands.

If the number of bands is larger than the value (i+1), the flow advances to step S403, and a value (the band height)×(i+1)−1 is set in a maximum Y value MAXY of the drawable range. Thereafter, the flow advances to step S405.

Otherwise, the flow advances to step S404, and a maximum Y value of an effective print area of a print sheet is set in the maximum Y value MAXY of the drawable range. Thereafter, the flow advances to step S405.

In step S405, a minimum Y value $D_{SPYMI}$ and a maximum Y value $D_{SPYMX}$ are taken out of information of a clip area (a rectangular area for setting a drawable range of a figure, a character, or the like), and the flow advances to step S406.

In step S406, MINY and $D_{SPYMI}$ are compared with each other.

If MINY>$D_{SPYMI}$, the flow advances to step S407, and the value MINY is set in $D_{SPYMI}$. The flow then advances to step S408.

Otherwise, the flow directly advances to step S408.

In step S408, MAXY and $D_{SPYMX}$ are compared with each other.

If $D_{SPYMX}$>MAXY, the flow advances to step S409, and the value MAXY is set in $D_{SPYMX}$, thus ending the process.

Otherwise, the process ends.

An actual drawable range of a figure, a character, or the like used upon band memory development uses $D_{SPYMI}$ and $D_{SPYMX}$ set in this flow.

Figure 88:
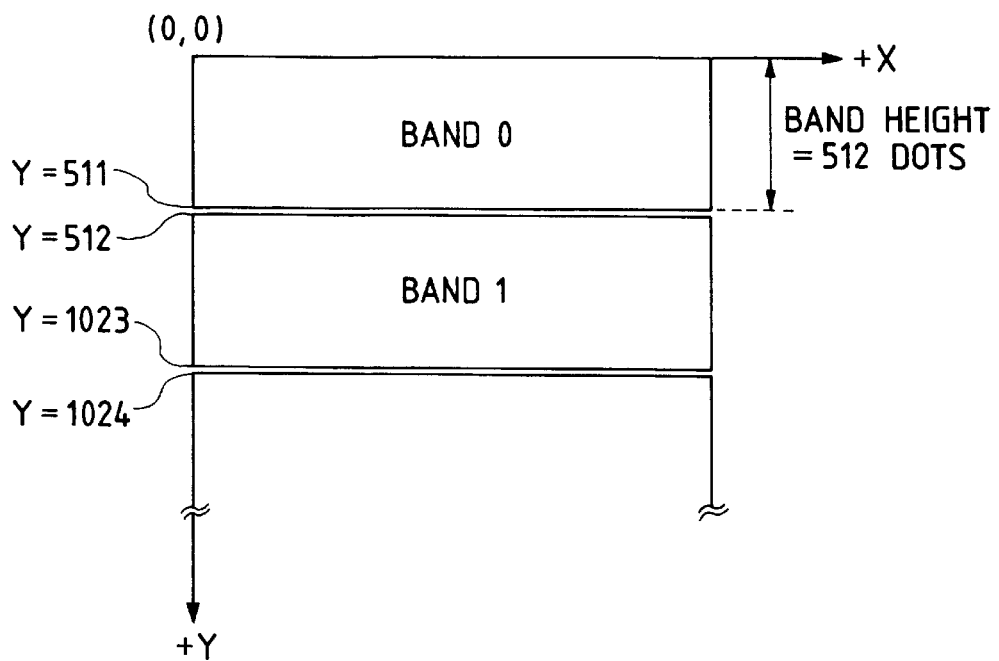
FIG. 88 is a view of a printer coordinate system set when a band height=512 dots.

FIG. 88 shows printer coordinates set when the band height=512 dots.

In this case, as shown in FIG. 88, the value MINY of band 0 is "0", and its value MAXY is "511". The value MINY of band 1 is "512", and its value MAXY is "1,023".

Figure 89:
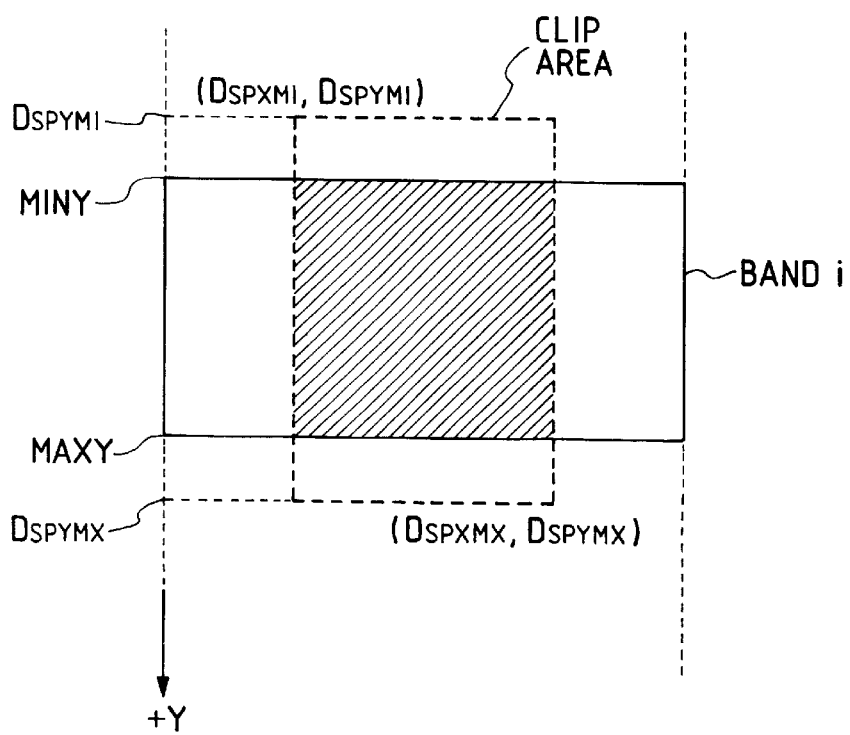
FIG. 89 is a view showing a case wherein a clip area satisfying $D_{SPYMI} < M_{INY}$ and $M_{AXY} < D_{SPYMX}$ for a range where a figure, a character, or the like can be drawn when band No.=i.

FIG. 89 shows a case wherein a clip area satisfying $D_{SPYMI}$<MINY and MAXY<$D_{SPYMX}$ is set for a drawable range of a figure, a character, or the like when band No.=i.

In this case, an actual drawable range of a figure, a character, or the like used in development on each band memory whose band No. corresponds to i is a hatched portion in FIG. 89 according to the above-mentioned process.

In FIG. 89, $D_{SPXMI}$ and $D_{SPXMX}$ are minimum and maximum X values of a clip area.

Figure 90:
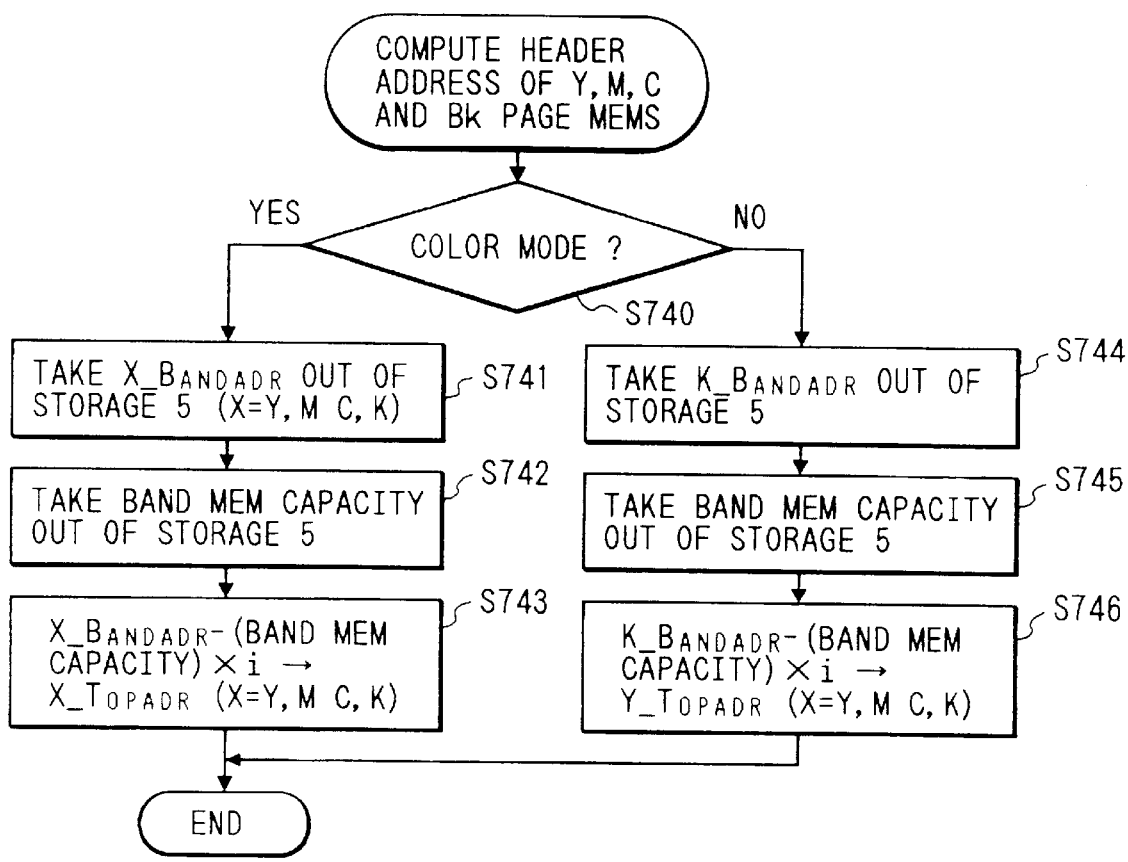
FIG. 90 is a flow chart showing the details of a process in step S391 in FIG. 86.

FIG. 90 is a flow chart showing the details of the process in step S391 in FIG. 86.

In step S740, it is checked if the color mode is set.

If YES in step S740, the flow advances to step S741 to take information X_BANDADR (X=Y, M, C, K) of header addresses of Y, M, C, and Bk band memories out of the band information storage 5, and the flow then advances to step S742.

In step S742, information of a band memory capacity (bytes) is taken out of the band information storage 5, and the flow advances to step S743.

In step S743, header addresses X_TOPADR (X=Y, M, C, K) of Y, M, C, and Bk virtual page memories are calculated by computing X_BANDADR (X=Y, M, C, K)−(band memory capacity)×i (present band No.), thus ending the process.

If it is determined in step S740 that the color mode is not set, the flow advances to step S744 to take information K_BANDADR of a header address of a Bk band memory out of the band information storage 5, and the flow then advances to step S745.

In step S745, information of a band memory capacity (bytes) is taken out of the band information storage 5, and the flow advances to step S746.

In step S746, the header address of each Bk virtual page memory is obtained by computing K_BANDADR−(band memory capacity)×i (present band No.), and is set in Y_TOPADR, thus ending the process.

Figure 91:
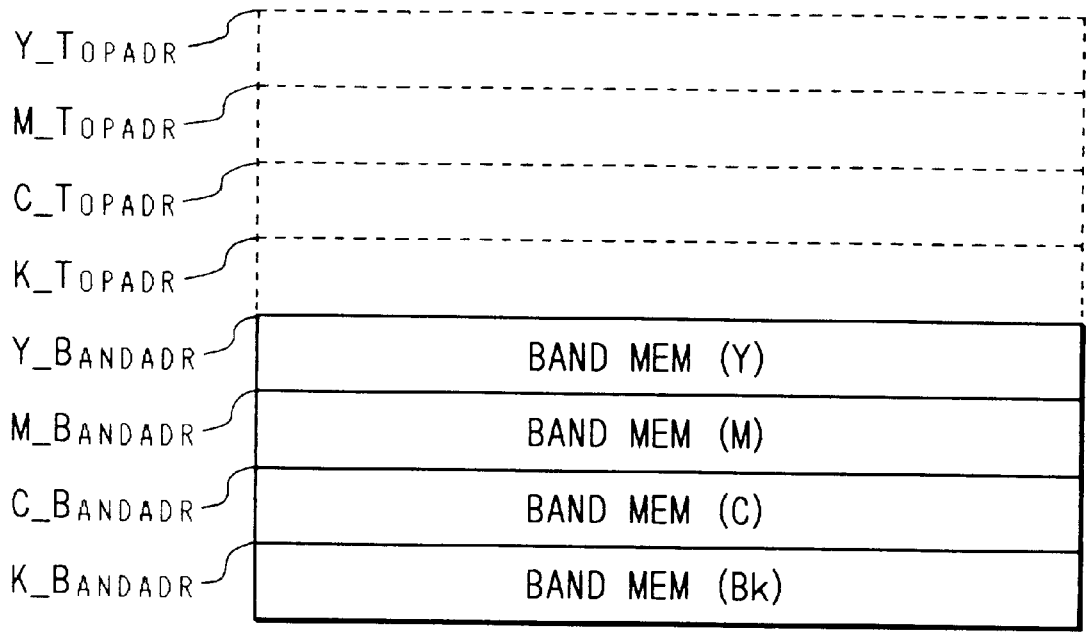
FIG. 91 is a view showing header addresses of Y, M, C, and Bk virtual page memories in a color mode when a drawing is developed on the fifth band (band No.=4) in FIG. 28.

FIG. 91 shows the header addresses of Y, M, C, and Bk virtual page memories when a drawing is developed on the fifth band (band No.=4) in FIG. 28 in the color mode.

The addresses shown in FIG. 91 are obtained by the process shown in FIG. 90.

Figure 92:
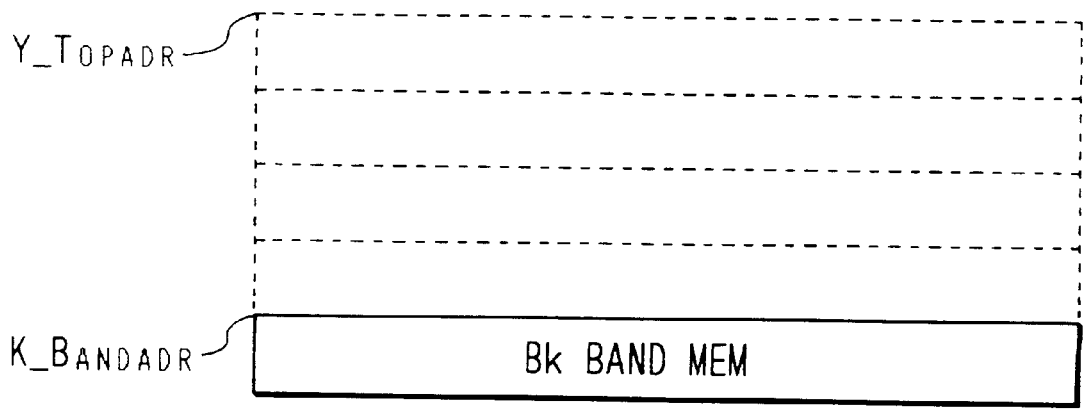
FIG. 92 is a view showing header addresses of a Bk virtual page memory in a monochrome mode when a drawing is developed on the fifth band (band No.=4) in FIG. 28.

FIG. 92 shows the header address of each Bk virtual page memory when a drawing is developed on the fifth band (band No.=4) in FIG. 28 in the monochrome mode.

The addresses shown in FIG. 92 are obtained by the process shown in FIG. 90.

Figure 93:
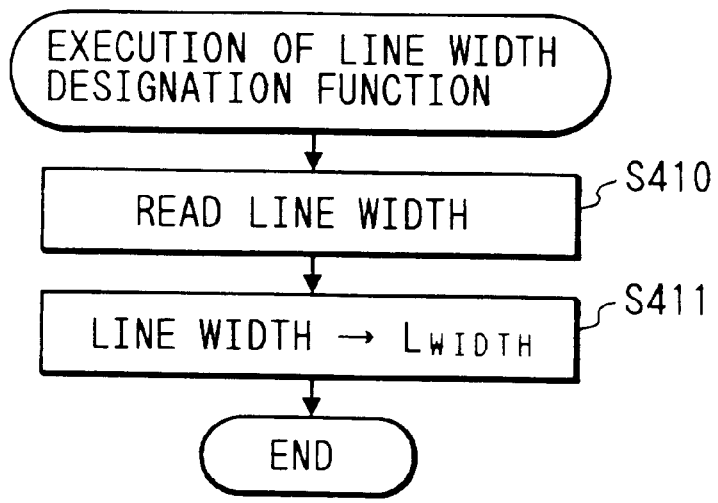
FIG. 93 is a flow chart showing a process upon execution of a line width designation function in step S399 in FIG. 86.

FIG. 93 is a flow chart showing a process upon execution of a line width designation function in step S399 in FIG. 86.

In step S410, a line width value is read from memory development information for line width designation, and the flow advances to step S411.

In step S411, the line width value is set in a variable $L_{WIDTH}$ as line width information used in development of a drawing pattern on a memory upon execution of a drawing function, thus ending the process.

Figure 94:
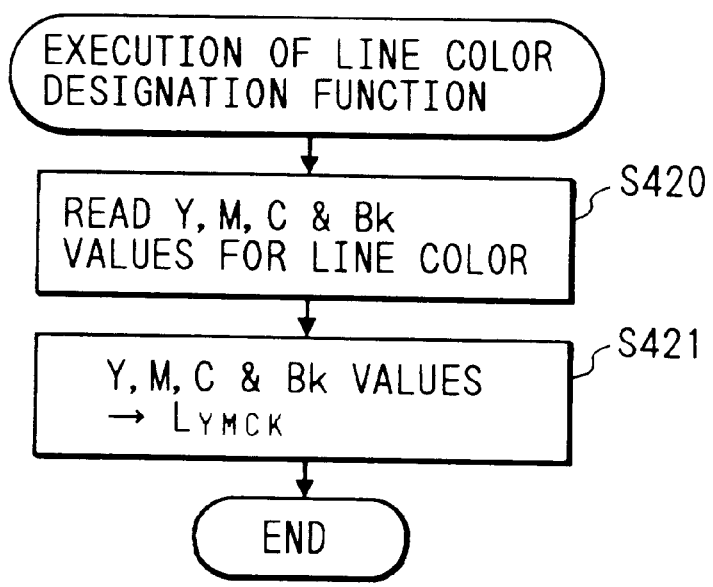
FIG. 94 is a flow chart showing a process upon execution of a line color designation function in step S399 in FIG. 86.

FIG. 94 is a flow chart showing a process upon execution of a line color designation function in step S399 in FIG. 86.

In step S420, Y, M, C, and Bk values of a line color are read from memory development information for line color designation, and the flow advances to step S421.

In step S421, the Y, M, C, and Bk values are set in a variable $L_{YMCK}$ as line color information used in development of a drawing pattern on a memory upon execution of a drawing function, thus ending the process.

Figure 95:
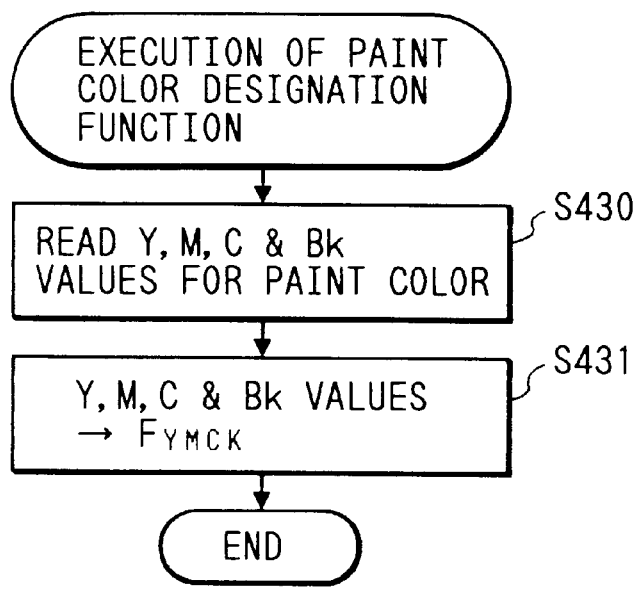
FIG. 95 is a flow chart showing a process upon execution of a paint color designation function in step S399 in FIG. 86.

FIG. 95 is a flow chart showing a process upon execution of a paint color designation function in step S399 in FIG. 86.

In step S430, Y, M, C, and Bk values of a paint color are read from memory development information for paint color designation, and the flow advances to step S431.

In step S431, the Y, M, C, and Bk values are set in a variable $F_{YMCK}$ as paint color information used in development of a drawing pattern on a memory upon execution of a drawing function, thus ending the process.

Figure 96:
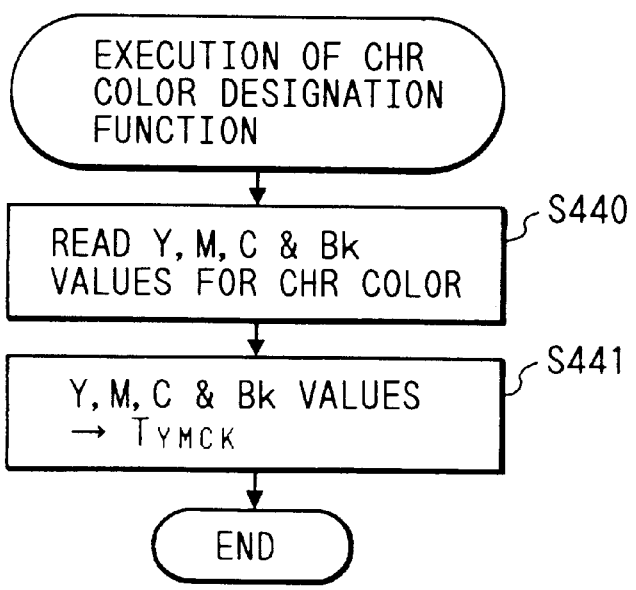
FIG. 96 is a flow chart showing a process upon execution of a character color designation function in step S399 in FIG. 86.

FIG. 96 is a flow chart showing a process upon execution of a character color designation function in step S399 in FIG. 86.

In step S440, Y, M, C, and Bk values of a character color are read from memory development information for character color designation, and the flow advances to step S441.

In step S441, the Y, M, C, and Bk values are set in a variable $T_{YMCK}$ as character color information used in development of a character pattern on a memory upon execution of a character drawing function, thus ending the process.

Figure 97:
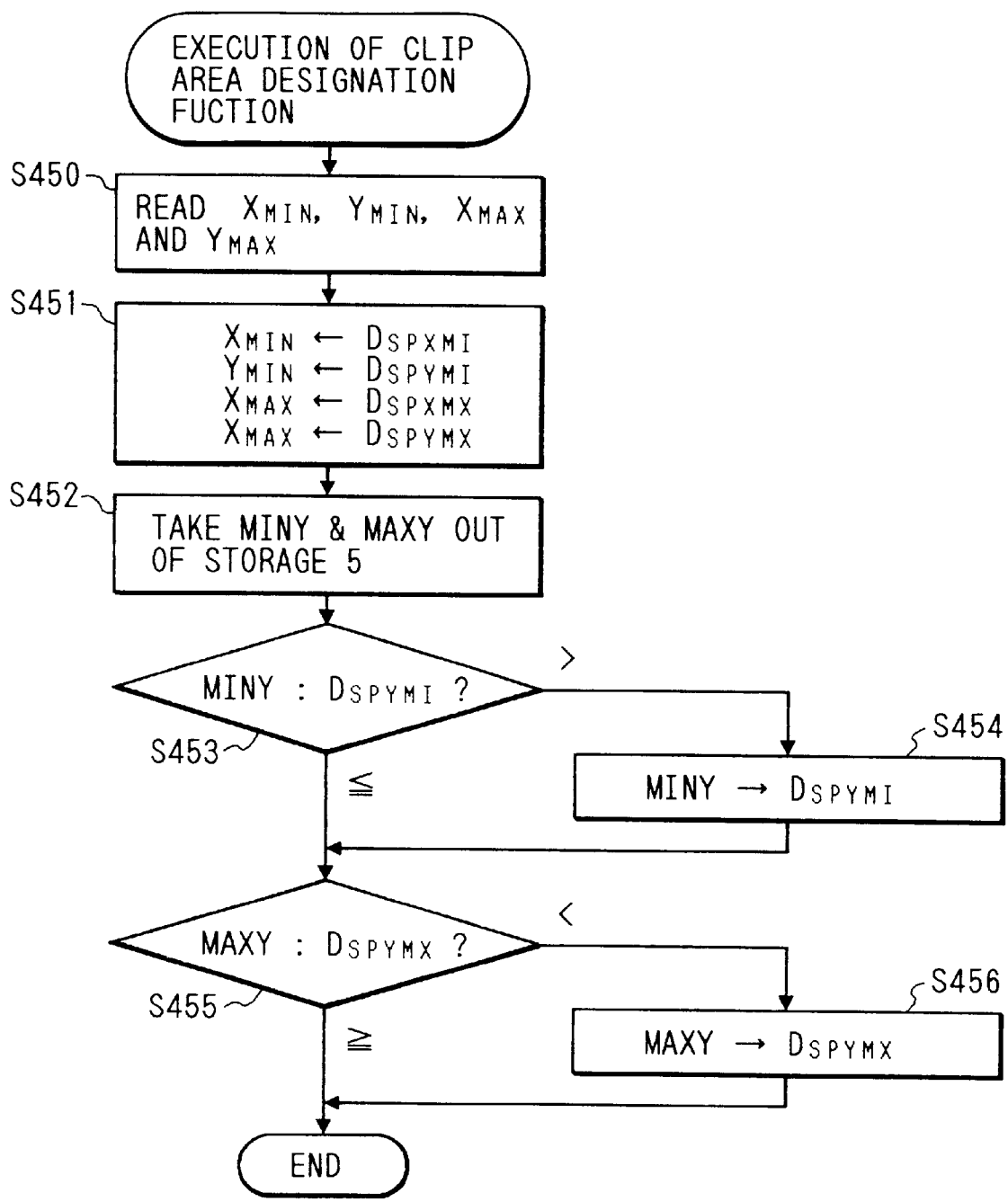
FIG. 97 is a flow chart showing a process upon execution of a clip area designation function in step S399 in FIG. 86.

FIG. 97 is a flow chart showing a process upon execution of a clip area color designation function in step S399 in FIG. 86.

In step S450, values $X_{MIN}$, $Y_{MIN}$, $X_{MAX}$, and $Y_{MAX}$ of a clip area are read from memory development information for clip area designation, and the flow advances to step S451.

In step S451, the values $X_{MIN}$, $Y_{MIN}$, $X_{MAX}$, and $Y_{MAX}$ are respectively set in variables $D_{SPXMI}$, $D_{SPYMI}$, $D_{SPXMX}$, and $D_{SPYMX}$ as clip area information used in development of a drawing pattern on a memory upon execution of a drawing function, and the flow then advances to step S452.

In step S452, values MINY and MAXY (on the printer coordinate system) of a drawing range of a band corresponding to band No. i are taken out of the band information storage 5, and the flow advances to step S453.

In step S453, MINY is compared with $D_{SPYMI}$.

If MINY>$D_{SPYMI}$, the flow advances to step S454 to set the value MINY in $D_{SPYMI}$, and the flow advances to step S455.

Otherwise, the flow advances to step S455.

In step S455, MAXY is compared with $D_{SPYMX}$. If $D_{SPYMX}$>MAXY, the flow advances to step S456 to set the value MAXY in $D_{SPYMX}$, thus ending the process.

Otherwise, the process ends directly.

Figure 98:
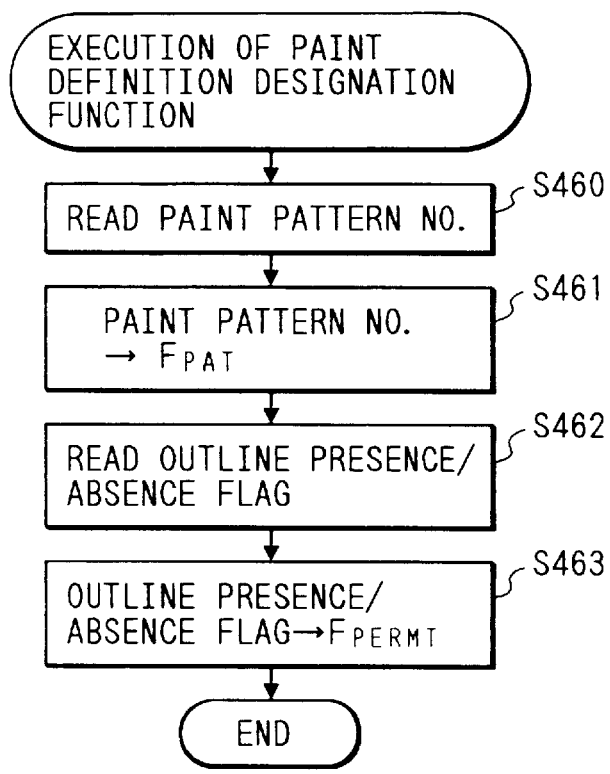
FIG. 98 is a flow chart showing a process upon execution of a paint definition designation function in step S399 in FIG. 86.

FIG. 98 is a flow chart showing the process upon execution of a paint definition designation function in step S399 in FIG. 86.

In step S460, a paint pattern No. is read from memory development information for paint definition designation, and the flow advances to step S461.

In step S461, the paint pattern No. is set in a variable $F_{PAT}$ as paint pattern information used in development of a drawing pattern onto a memory upon execution of a drawing function, and the flow then advances to step S462.

In step S462, an outline presence/absence flag value is read from the memory development information for paint definition designation, and the flow advances to step S463.

In step S463, the outline presence/absence flag value is set in a variable $F_{PERMT}$ as outline presence/absence information used in development of a drawing pattern onto a memory upon execution of a drawing function, thus ending the process.

Figure 99:
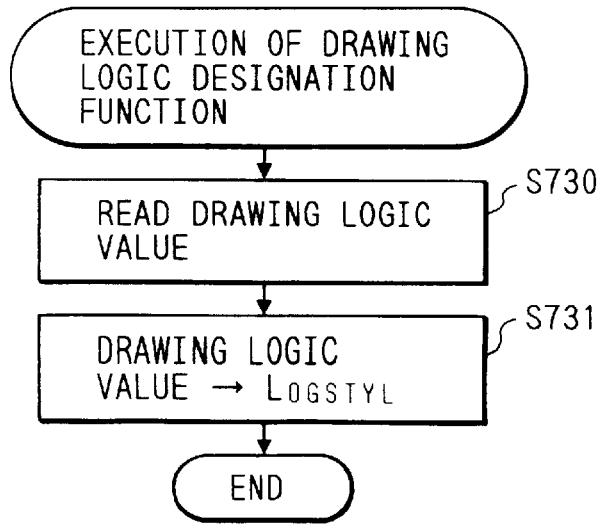
FIG. 99 is a flow chart showing a process upon execution of a drawing logic designation function in step S399 in FIG. 86.

FIG. 99 is a flow chart showing the process upon execution of a drawing logic designation function in step S399 in FIG. 86.

In step S730, a drawing logic value is read from memory development information for drawing logic designation, and the flow advances to step S731.

In step S731, the drawing logic value is set in a variable $L_{OGSTYL}$ as drawing logic information used in development of a drawing pattern onto a memory upon execution of a drawing function, thus ending the process.

Figure 100:
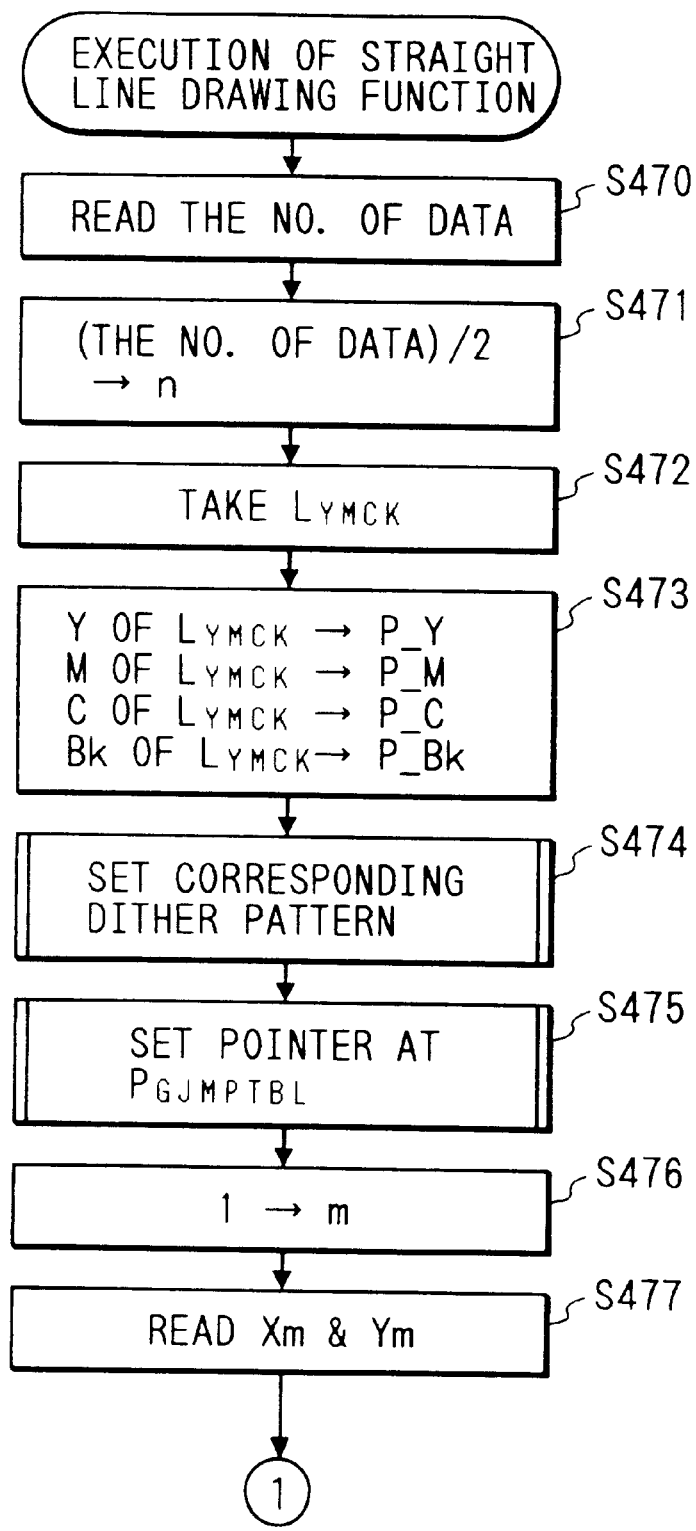
FIG. 100 is a flow chart showing a process upon execution of a straight line drawing function in step S399 in FIG. 86.
Figure 101:
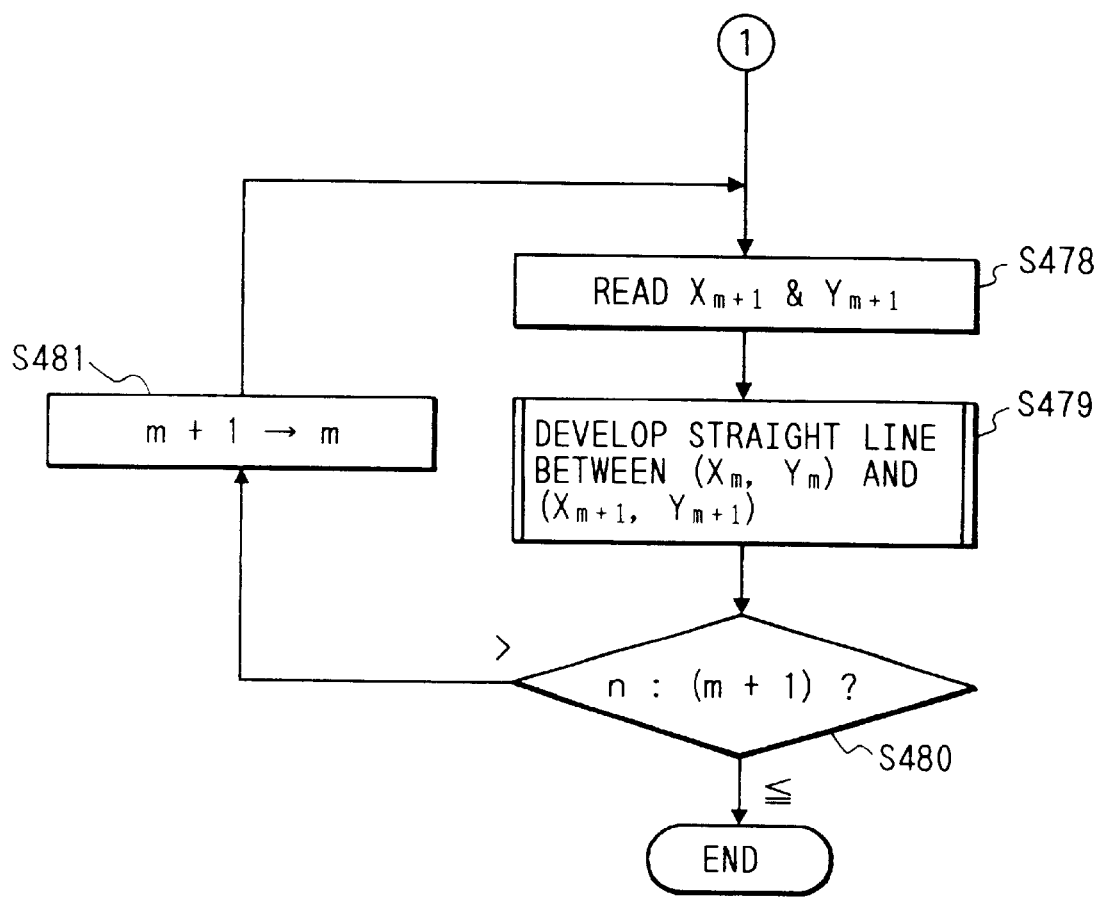
FIG. 101 is a flow chart showing the process upon execution of the straight line drawing function in step S399 in FIG. 86.

FIGS. 100 and 101 are flow charts showing the process upon execution of a straight line drawing function in step S399 in FIG. 86.

In step S470, the number of data is read from memory development information for straight line drawing, and the flow advances to step S471.

In step S471, (the number of data)/2 (the number of coordinate points of a straight line) is set in a constant n, and the flow advances to step S472.

In step S472, the values of line color information $L_{YMCK}$ are taken, and the flow advances to step S473.

In step S473, the Y value of $L_{YMCK}$ is set in P__Y, the M value of $L_{YMCK}$ is set in P__M, the C value of $L_{YMCK}$ is set in P__C, and the Bk value of $L_{YMCK}$ is set in P__Bk. Thereafter, the flow advances to step S474.

In step S474, dither patterns corresponding to the values P__Y, P__M, P__C, and P__Bk obtained in step S473 are set, and the flow advances to step S475.

In step S475, a pointer for accessing a paint function is set at $P_{GJMPTBL}$, and the flow advances to step S476.

In step S476, "1" is set in a constant m, and the flow advances to step S477.

In step S477, a point ($X_m$, $Y_m$) on the printer coordinate system is read from the memory development information for straight line drawing, and the flow advances to step S478.

In step S478, a point ($X_{m+1}$, $Y_{m+1}$) on the printer coordinate system is read from the memory development information for straight line drawing, and the flow advances to step S479.

In step S479, a straight line pattern between the two points ($X_m$, $Y_m$) and ($X_{m+1}$, $Y_{m+1}$) on the printer coordinate system is developed on each band memory, and the flow advances to step S480.

In step S480, n is compared with the value (m+1).

If n>(m+1), the flow advances to step S481 to increment m by 1, and the flow returns to step S478.

Otherwise, the process ends.

In this manner, a straight line drawing pattern can be developed on each band memory on the basis of the memory development information for straight line drawing, line color designation, line width designation, and drawing logic designation.

FIGS. 102 to 105 are flow charts showing the process upon execution of a polygon drawing function in step S399 in FIG. 86.

In step S490, the number of data is read from memory development information for polygon drawing, and the flow advances to step S491.

In step S491, (the number of data)/2 (the number of coordinate points of a polygon) is set in a constant n, and the flow advances to step S492.

In step S492, "1" is set in a constant m, and the flow advances to step S493.

In step S493, a point ($X_m$, $Y_m$) on the printer coordinate system is read from the memory development information for polygon drawing, and the flow advances to step S494.

In step S494, the values $X_m$ and $Y_m$ are set in a storage area in the system work memory, and the flow advances to step S495.

In step S495, the values n and m are compared with each other.

If n>m, the flow advances to step S496 to increment m by 1, and the flow returns to step S493.

Otherwise, the flow advances to step S497.

In step S497, the value of paint pattern information $F_{PAT}$ is compared with "0".

If $F_{PAT}$=0 the flow advances to step S503.

If $F_{PAT}\neq 0$, the flow advances to step S498 to take values of paint color information $F_{YMCK}$, and the flow then advances to step S499.

In step S499, the Y value of $F_{YMCK}$ is set in P__Y, the M value of $F_{YMCK}$ is set in P__M, the C value of $F_{YMCK}$ is set in P__C, and the Bk value of $F_{YMCK}$ is set in P__Bk. Thereafter, the flow advances to step S500.

In step S500, a pointer for accessing a paint function is set at $P_{GJMPTBL}$, and the flow advances to step S501.

In step S501, dither patterns corresponding to the values P__Y, P__M, P__C, and P__Bk obtained in step S499 are set, and the flow advances to step S502.

In step S502, a paint pattern of a polygon is developed on an area surrounded by outline points $(X_1, Y_1), \ldots, (X_n, Y_n)$, which are set in the storage area in the system work memory with the processes in steps S492 to S496, on each band memory, and thereafter, the flow advances to step S503.

In step S503, a value of outline presence/absence information $F_{PERMT}$ is compared with "0".

If $F_{PERMT}=0$, the process ends.

If $F_{PERMT}\neq 0$, the flow advances to step S504 to take values of line color information $L_{YMCK}$, and the flow advances to step S505.

In step S505, the Y value of $L_{YMCK}$ is set in P__Y, the M value of $L_{YMCK}$ is set in P__M, the C value of $L_{YMCK}$ is set in P__C, and the Bk value of $L_{YMCK}$ is set in P__Bk. Thereafter, the flow advances to step S506.

In step S506, dither patterns corresponding to the values P__Y, P__M, P__C, and P__Bk obtained in step S505 are set, and the flow advances to step S507.

In step S507, a pointer for accessing a paint function is set at $P_{GJMPTBL}$, and the flow advances to step S508.

In step S508, "1" is set in a constant m, and the flow advances to step S509.

In step S509, coordinates $X_m$ and $Y_m$ of an outline point of a polygon are taken out of the storage area in the system work memory, and the flow advances to step S510.

In step S510, coordinates $X_{m+1}$ and $Y_{m+1}$ of an outline point of the polygon are taken out of the storage area in the system work memory, and the flow advances to step S511.

In step S511, a straight line pattern between the two points $(X_m, Y_m)$ and $(X_{m+1}, Y_{m+1})$ on the printer coordinate system is developed on each band memory, and the flow advances to step S512.

In step S512, n is compared with (m+1).

If n>(m+1), the flow advances to step S513 to increment m by 1, and the flow returns to step S510.

Otherwise, the process ends.

In this manner, a drawing pattern of a polygon can be developed on each band memory on the basis of memory development information for polygon drawing, paint definition designation, line color designation, paint color designation, and drawing logic designation.

Figure 106:
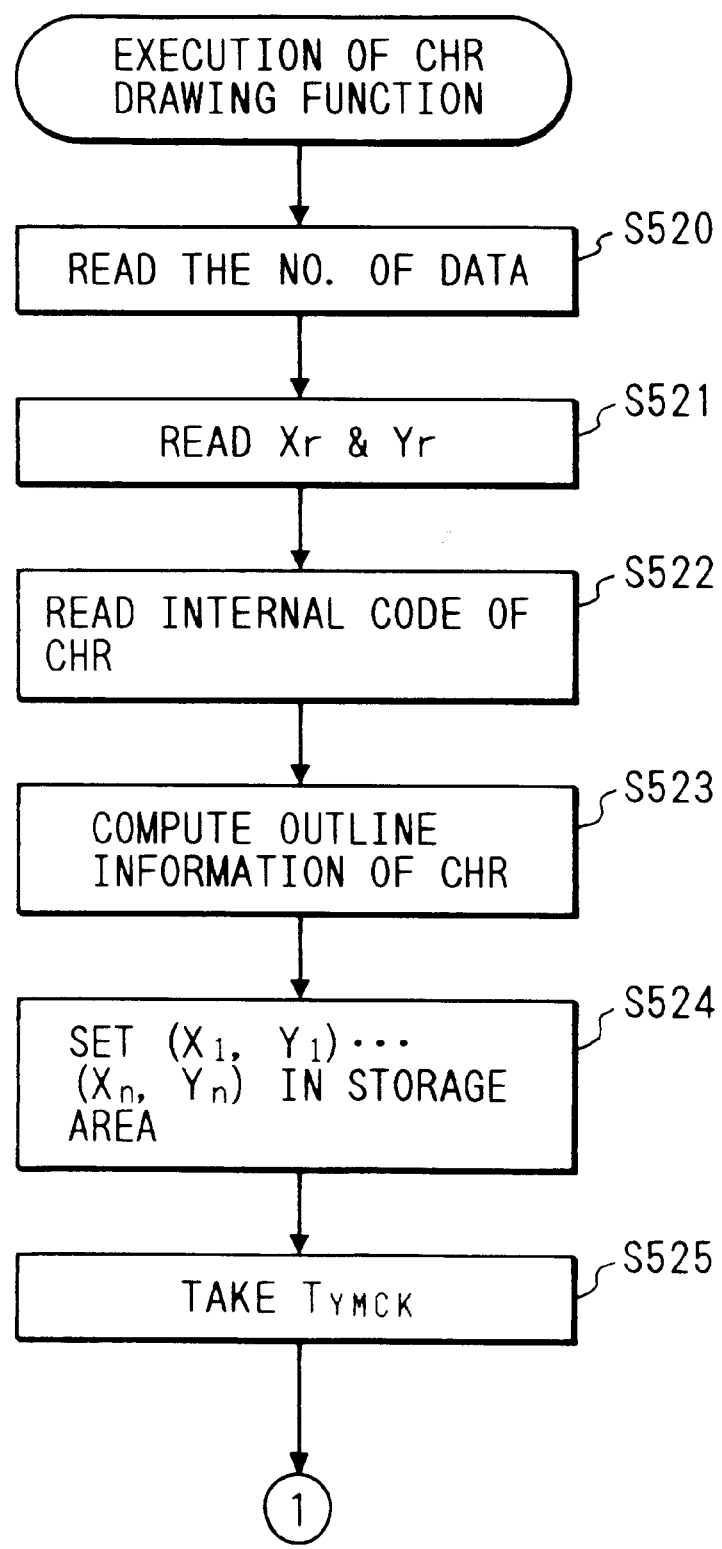
FIG. 106 is a flow chart showing a process upon execution of a character drawing function in step S399 in FIG. 86.
Figure 107:
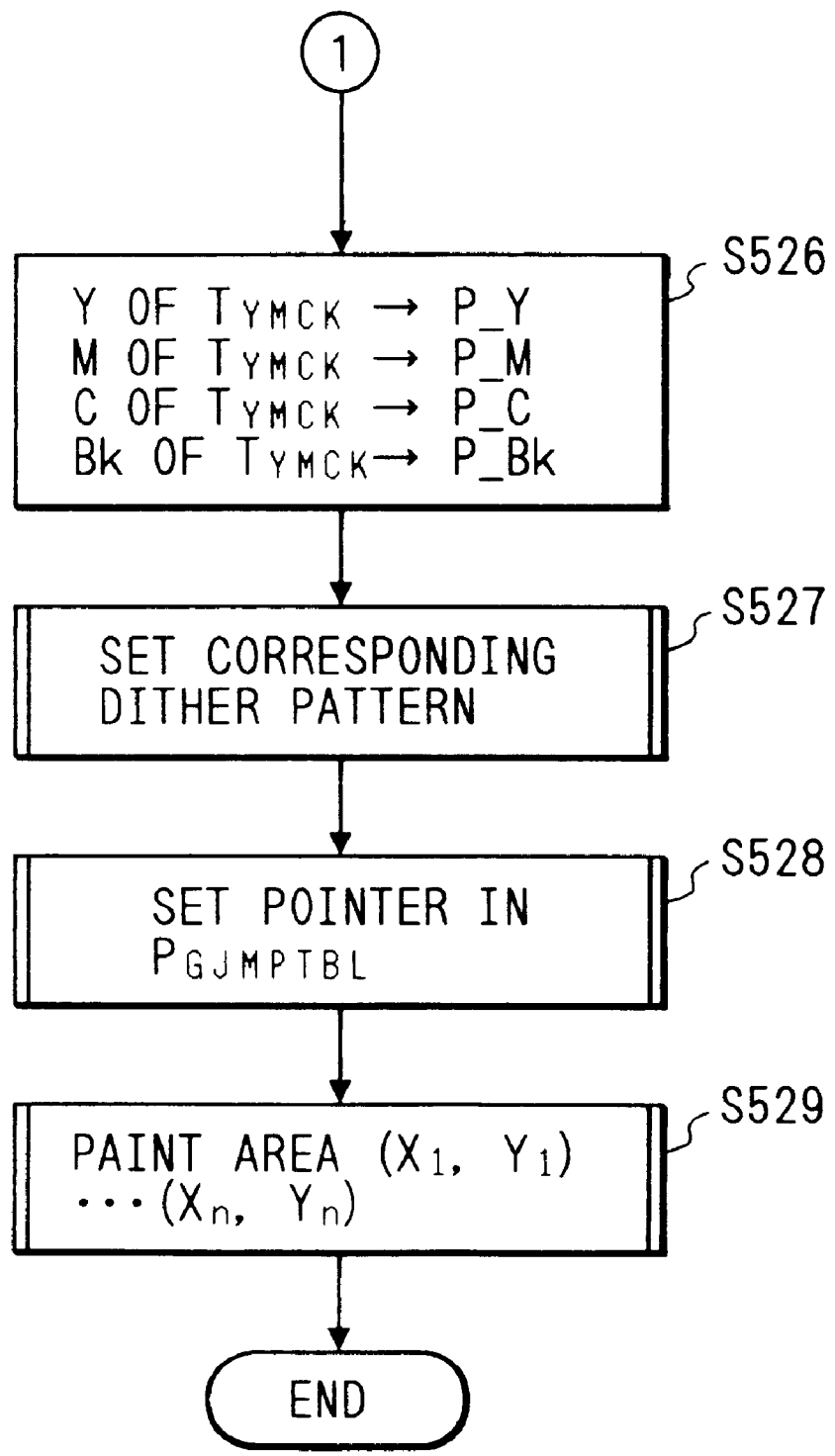
FIG. 107 is a flow chart showing the process upon execution of the character drawing function in step S399 in FIG. 86.

FIGS. 106 and 107 are flow charts showing the process upon execution of a character drawing function in step S399 in FIG. 86.

In step S520, the number of data is read from memory development information for character drawing, and the flow advances to step S521.

In step S521, X and Y coordinates $X_r$ and $Y_r$ of a drawing position are read from the memory development information for character drawing, and the flow advances to step S522. In step S522, an internal code of a character is read from the memory development information for character drawing, and the flow advances to step S523.

In step S523, outline information (coordinate points) of the character to be printed is computed on the basis of values of $X_r$, $Y_r$, and the internal code, and the flow advances to step S524.

In step S524, the outline information including $(X_1, Y_1), \ldots, (X_n, Y_n)$ of the character computed in step S523 is set in the storage area in the system work memory, and the flow advances to step S525.

In step S525, values of character color information $T_{YMCK}$ are taken, and the flow advances to step S526.

In step S526, the Y value of $T_{YMCK}$ is set in P__Y, the M value of $T_{YMCK}$ is set in P__M, the C value of $T_{YMCK}$ is set in P__C, and the Bk value of $T_{YMCK}$ is set in P__Bk. Thereafter, the flow advances to step S527.

In step S527, dither patterns corresponding to the values P__Y, P__M, P__C, and P__Bk obtained in step S526 are set, and the flow advances to step S528.

In step S528, a pointer for accessing a paint function is set at $P_{GJMPTBL}$, and the flow advances to step S529.

In step S529, a character pattern is developed on each band memory on the basis of the outline information $(X_1, Y_1), \ldots, (X_n, Y_n)$ of the character in the storage area in the system work memory, thus ending the process.

In this manner, a character pattern can be developed on each band memory on the basis of memory development information for character drawing, character color designation, and drawing logic designation.

Figure 108:
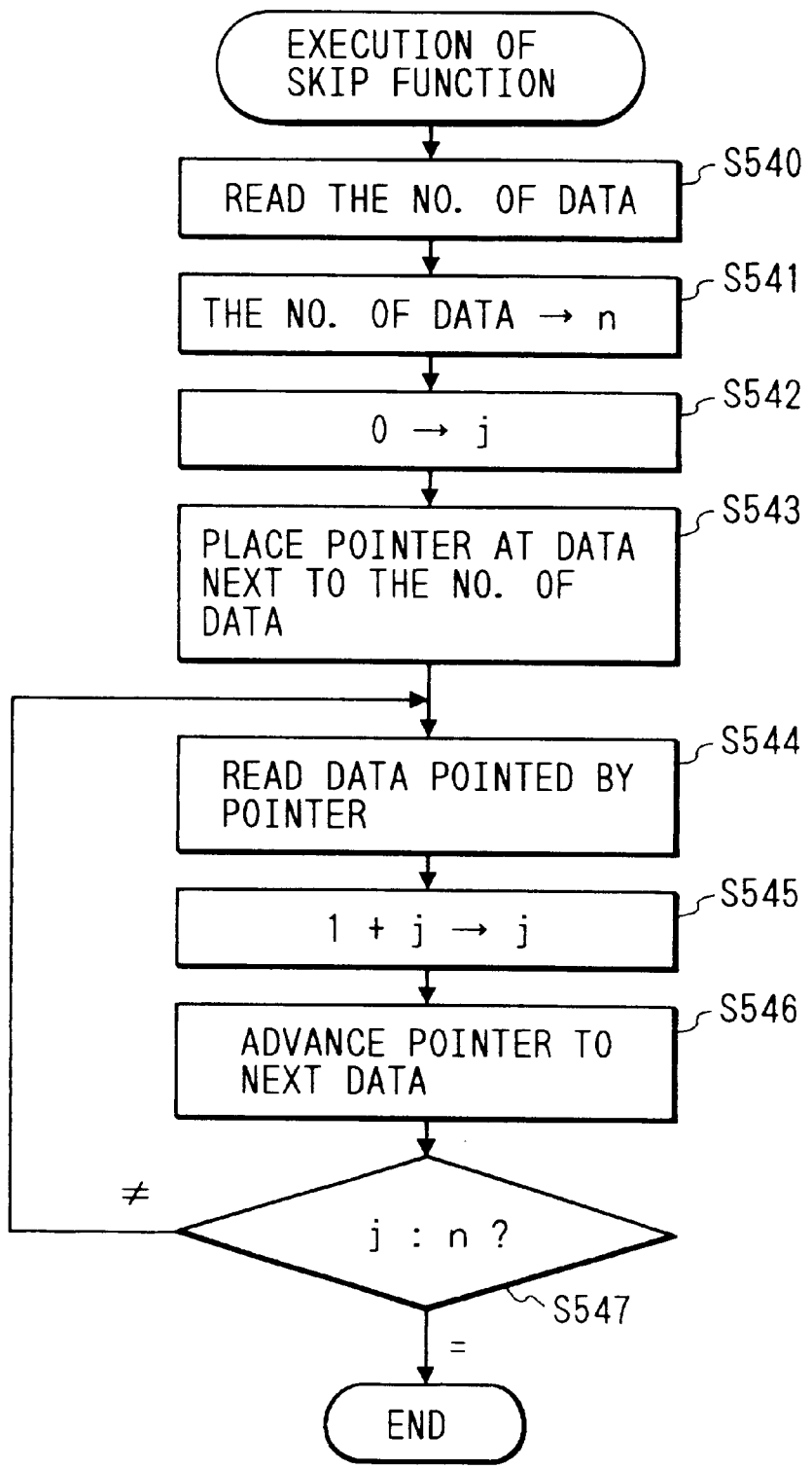
FIG. 108 is a flow chart showing a process upon execution of a skip function in step S399 in FIG. 86.

FIG. 108 is a flow chart showing the process upon execution of a skip function in step S399 in FIG. 86.

In step S540, the number of data is read from memory development information, and the flow advances to step S541.

In step S541, the number of data is set in a constant n, and the flow advances to step S542.

In step S542, "0" is set in a constant j, and the flow advances to step S543.

In step S543, a pointer is placed at data next to the number-of-data parameter, and the flow advances to step S544.

In step S544, data indicated by the pointer is read, and the flow advances to step S545.

In step S545, the constant j is incremented by 1, and the flow advances to step S546.

In step S546, the pointer is advanced to the next data, and the flow then advances to step S547.

In step S547, the constant j is compared with the number n of data. If the two values are not equal to each other, the flow returns to step S544.

If the two values are equal to each other, the process ends.

In this manner, memory development information for drawing can be skipped.

Figure 109:
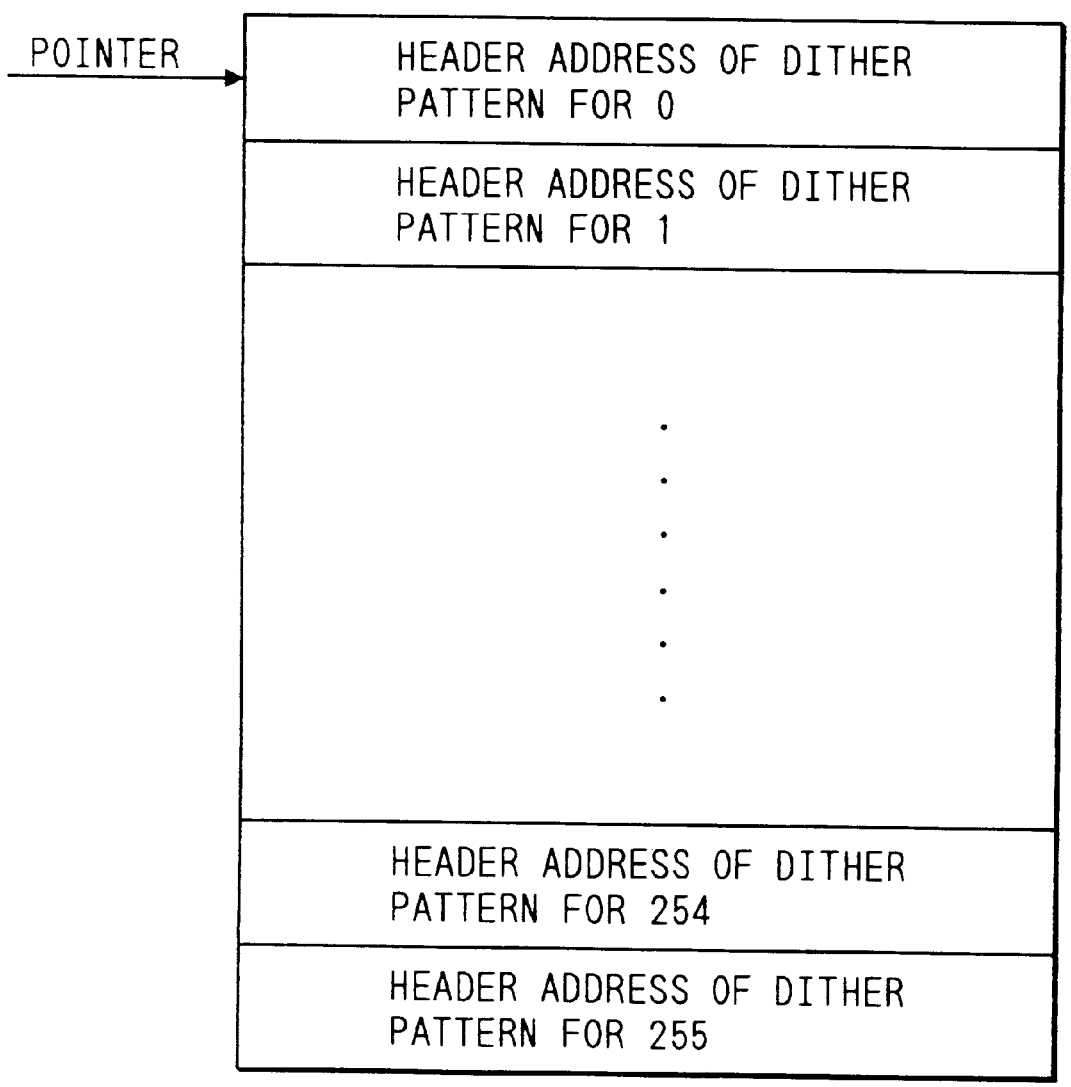
FIG. 109 shows an example of a dither pattern address table 21.

FIG. 109 shows an example of the dither pattern address table 21 in the dither pattern storage 20 shown in FIGS. 24A and 24B.

The dither pattern address table stores header addresses of areas which store dither patterns corresponding to Y, M, C, and Bk density values.

In this embodiment, each of the Y, M, C, and Bk density values ranges from 0 to 255.

The dither pattern address table includes four tables corresponding to Y, M, C, and Bk, respectively, and this means that different dither patterns may be used even when the Y, M, C, and Bk density values have the same value.

Figure 110A:
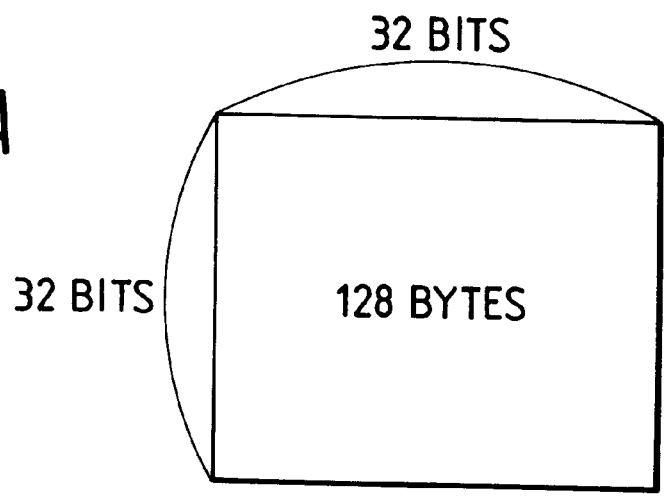
FIGS. 110A and 110B are views of examples of a dither pattern.
Figure 110B:
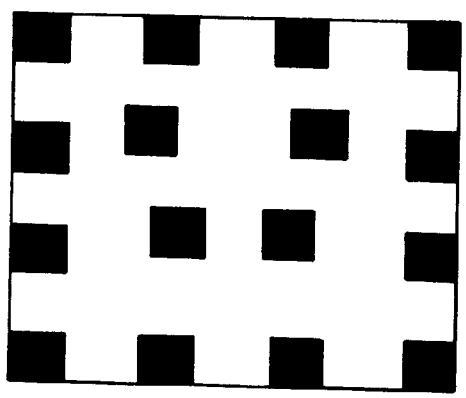

FIGS. 110A and 110B show an example of a dither pattern stored in the dither pattern storage 20 shown in FIGS. 24A and 24B.

FIG. 110A shows that a dither pattern has a size of 32 dots×32 dots, and has a memory capacity of 128 bytes.

FIG. 110B shows an example of a dither pattern when the Y, M, C, and Bk density values are 51 (dot portions=20%).

Figure 103:
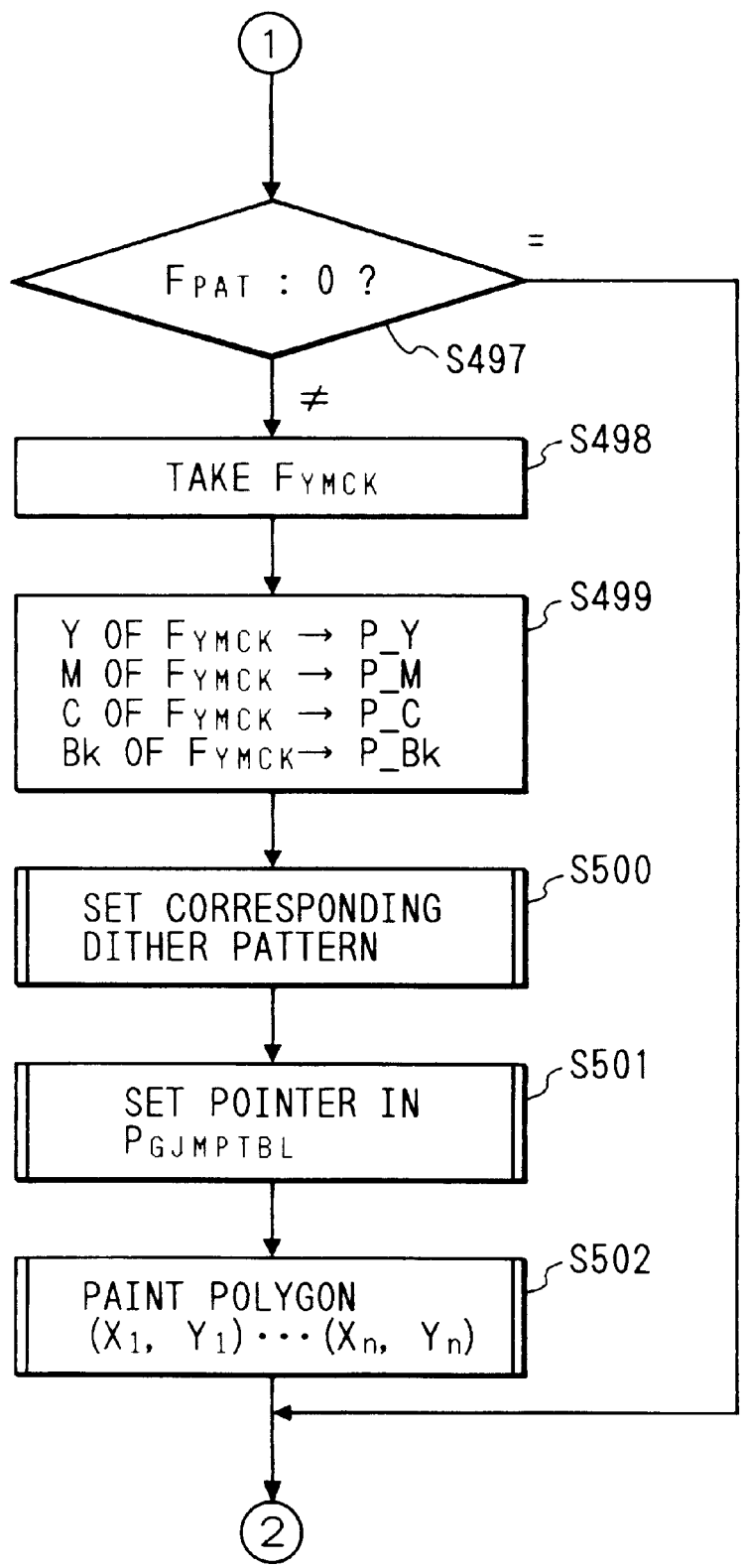
FIG. 103 is a flow chart showing the process upon execution of the polygon drawing function in step S399 in FIG. 86.
Figure 104:
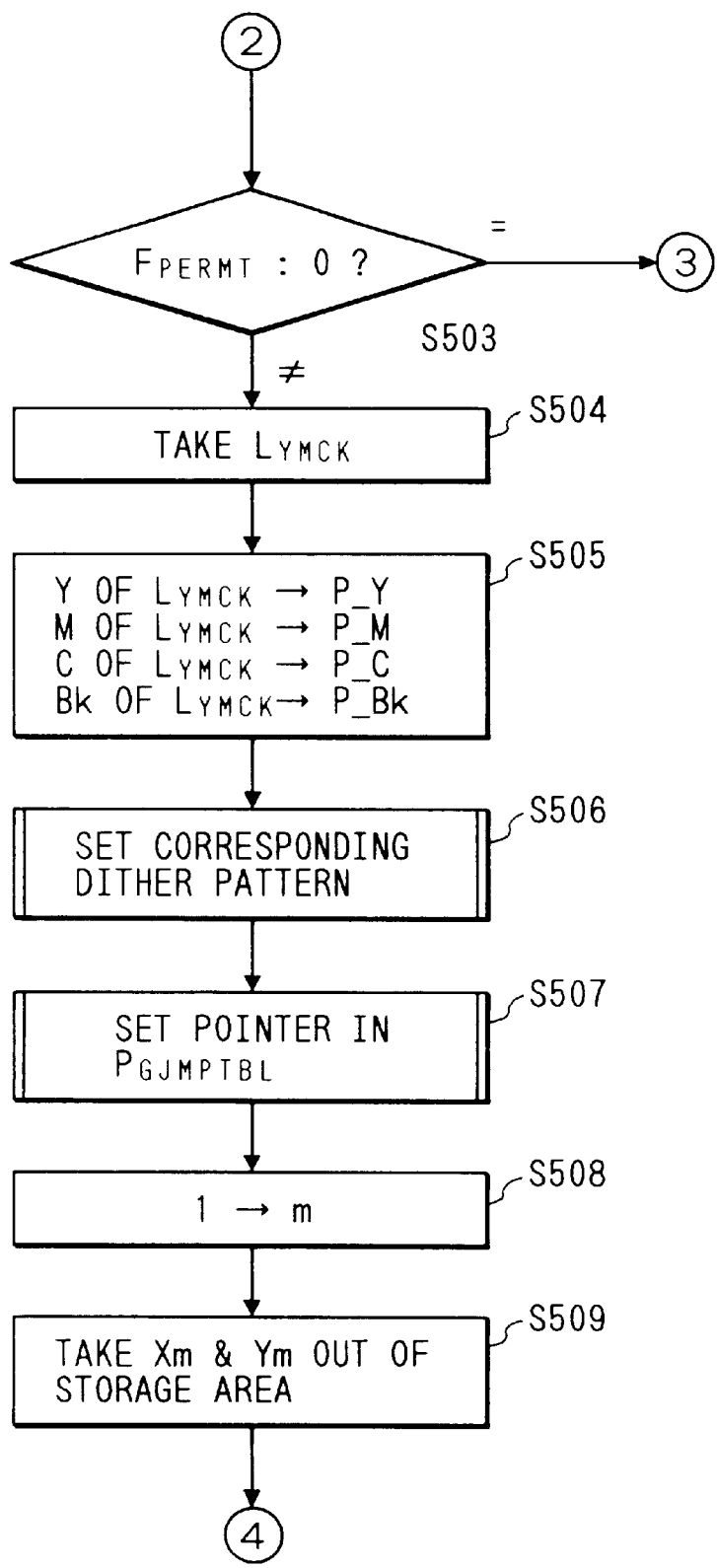
FIG. 104 is a flow chart showing the process upon execution of the polygon drawing function in step S399 in FIG. 86.
Figure 111:
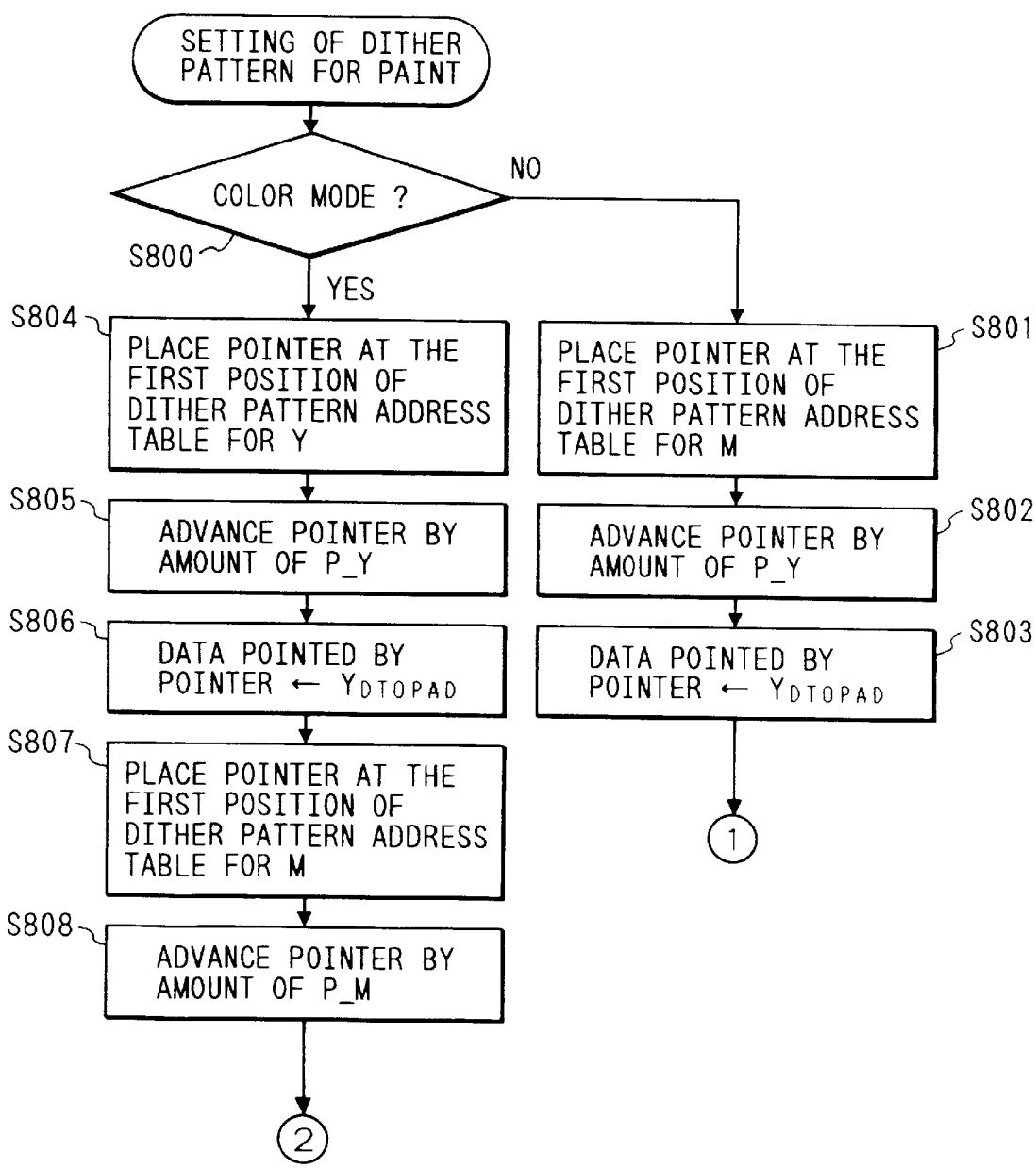
FIG. 111 is a flow chart showing a process in step S474 in FIG. 100, step S500 in FIG. 103, step S506 in FIG. 104, and step S527 in FIG. 107.
Figure 112:
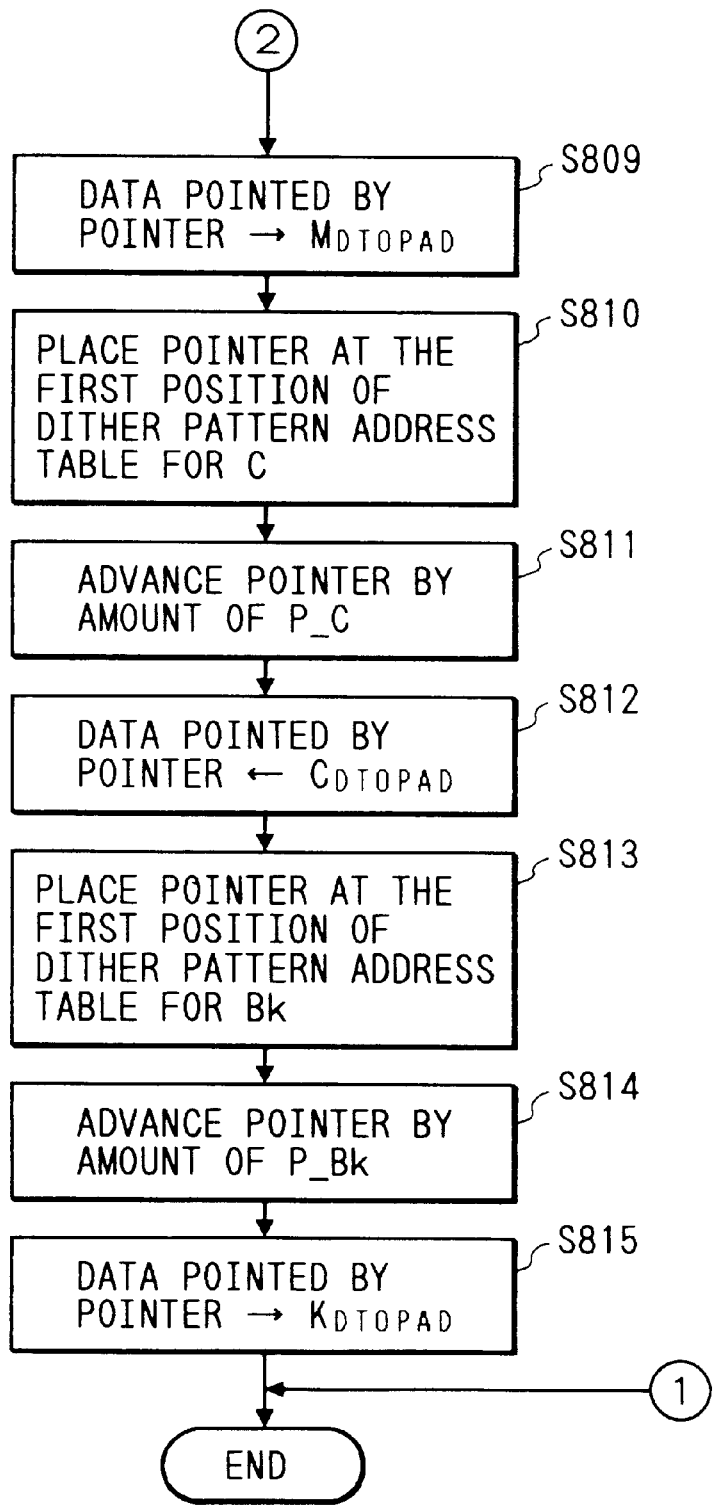
FIG. 112 is a flow chart showing a process in step S474 in FIG. 100, step S500 in FIG. 103, step S506 in FIG. 104, and step S527 in FIG. 107.

FIGS. 111 and 112 are flow charts showing the process in step S474 in FIG. 100, step S500 in FIG. 103, step S506 in FIG. 104, and step S527 in FIG. 107.

It is checked in step S800 if the color mode is set.

If NO in step S800, the flow advances to step S801, and a pointer is placed at the first position of an M dither pattern address table (FIG. 109). The flow then advances to step S802.

In step S802, the pointer is advanced by an amount corresponding to the value P_Y, and the flow advances to step S803.

In step S803, the content indicated by the pointer is set in $Y_{DTOPAD}$, and the process ends.

If it is determined in step S800 that the color mode is set, the flow advances to step S804, and a pointer is placed at the first position of a Y dither pattern address table (FIG. 109). Thereafter, the flow advances to step S805.

In step S805, the pointer is advanced by an amount corresponding to the value P_Y, and the flow advances to step S806.

In step S806, the content indicated by the pointer is set in $Y_{DTOPAD}$, and the flow advances to step S807.

In step S807, a pointer is placed at the first position of an M dither pattern address table (FIG. 109). Thereafter, the flow advances to step S808.

In step S808, the pointer is advanced by an amount corresponding to the value P_M, and the flow advances to step S809.

In step S809, the content indicated by the pointer is set in $M_{DTOPAD}$, and the flow advances to step S810.

In step S810, a pointer is placed at the first position of a C dither pattern address table (FIG. 109). Thereafter, the flow advances to step S811.

In step S811, the pointer is advanced by an amount corresponding to the value P_C, and the flow advances to step S812.

In step S812, the content indicated by the pointer is set in $C_{DTOPAD}$, and the flow advances to step S813.

In step S813, a pointer is placed at the first position of a Bk dither pattern address table (FIG. 109). Thereafter, the flow advances to step S814.

In step S814, the pointer is advanced by an amount corresponding to the value P_Bk, and the flow advances to step S815.

In step S815, the content indicated by the pointer is set in $K_{DTOPAD}$, and the process ends.

In this manner, the header addresses of the areas for storing dither patterns used in the paint process can be obtained in correspondence with the Y, M, C, and Bk density values, and can be set in variables.

In this embodiment, an M dither pattern is used as one used in the monochrome mode, and the header address of the storage area is set in the storage variable $Y_{DTOPAD}$ of a Y dither pattern.

Figure 113:
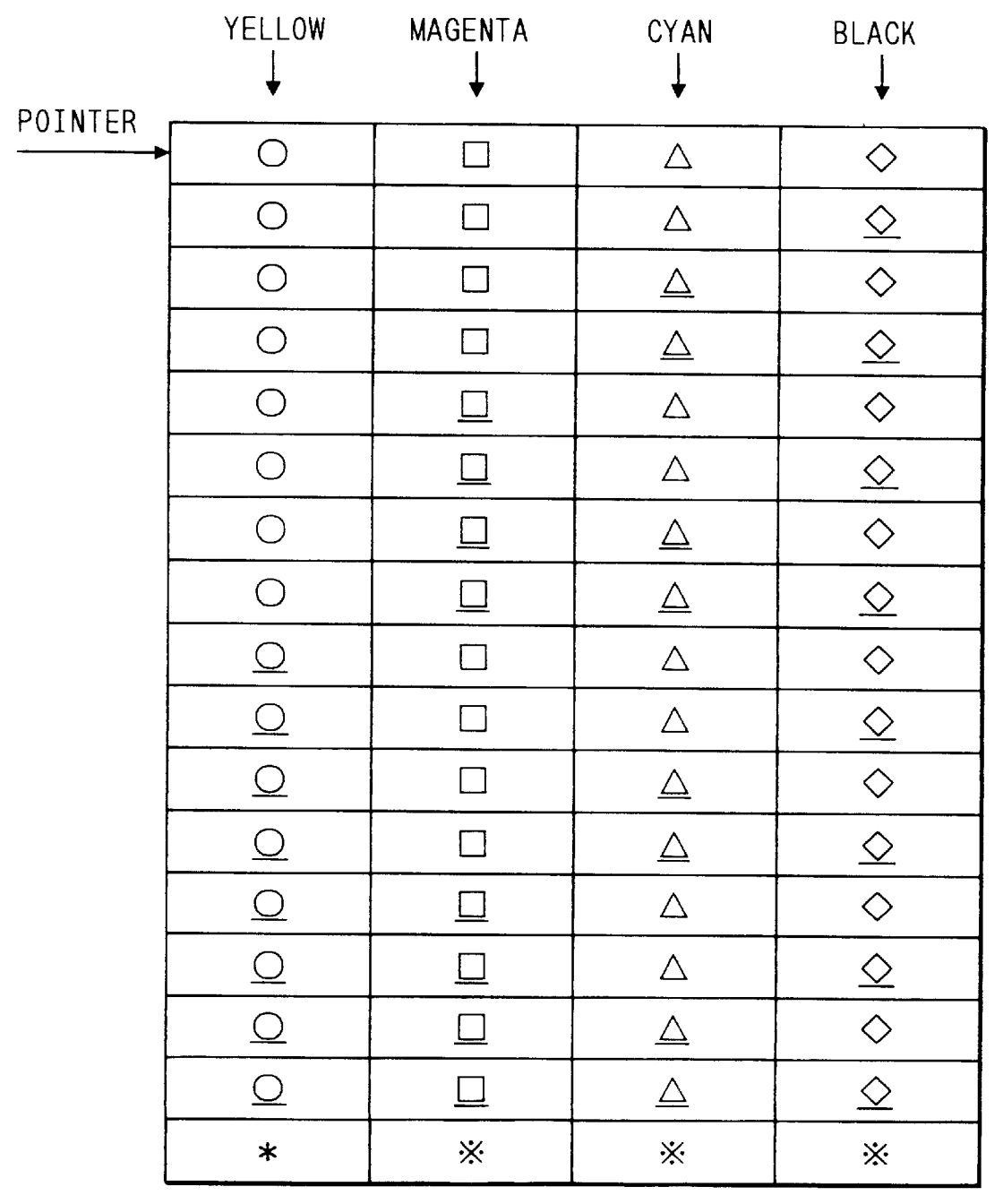

FIG. 113 shows an example of a table with a drawing logic of "overwrite" of the paint function address storage table 23 in the memory development table storage 22 shown in FIGS. 24A and 24B.

As shown in FIG. 113, this table stores jump addresses to paint functions onto development memories in units of Y, M, C, and Bk.

Note that the paint function is used for executing a paint process on a memory for one scan line. ○, □, △, and ◇ indicate jump addresses to clear paint functions onto development memories, and are respectively those for development onto Y, M, C, and Bk band memories.

○, □, △, and ◇ indicate jump addresses to overwrite paint functions onto development memories, and are respectively those for development onto Y, M, C, and Bk band memories.

✱ indicates a jump address to an overwrite paint function onto a development memory in the monochrome mode.

✖ indicates a jump address to a dummy process function.

The dummy process function is a function for executing no process.

In an overwrite process, if Y and C values of Y, M, C, and Bk density values are not "0", and M and Bk values are "0", portions to be painted by M and Bk must be cleared.

This is because the contents of the Y, M, C, and Bk memories are logically ORed, and the OR is printed on a print sheet.

FIG. 114 shows an example of a table with a drawing logic of "transparent" of the paint function address storage table 23 in the memory development table storage 22 shown in FIGS. 24A and 24B.

As shown in FIG. 114, this table stores jump addresses to paint functions onto development memories in units of Y, M, C, and Bk.

Note that the paint function is used for executing a paint process on a memory for one scan line.

V, W, X, and Z indicate jump addresses to reverse paint functions onto development memories, and are respectively those for development onto Y, M, C, and Bk band memories.

V, W, X, and Z indicate jump addresses to transparent paint functions onto development memories, and are respectively those for development onto Y, M, C, and Bk band memories.

◉ indicates a jump address to a transparent paint function onto a development memory in the monochrome mode.

✖ indicates a jump address to a dummy process function.

The dummy process function is a function for executing no process.

In a transparent process, if Y and C values of Y, M, C, and Bk density values are not "0", and M and Bk values are "0", paint processes of M and Bk must be performed by ANDing reverse patterns of paint patterns on the memories.

This is because the contents of the Y, M, C, and Bk memories are logically ORed, and the OR is printed on a print sheet.

Figure 115:
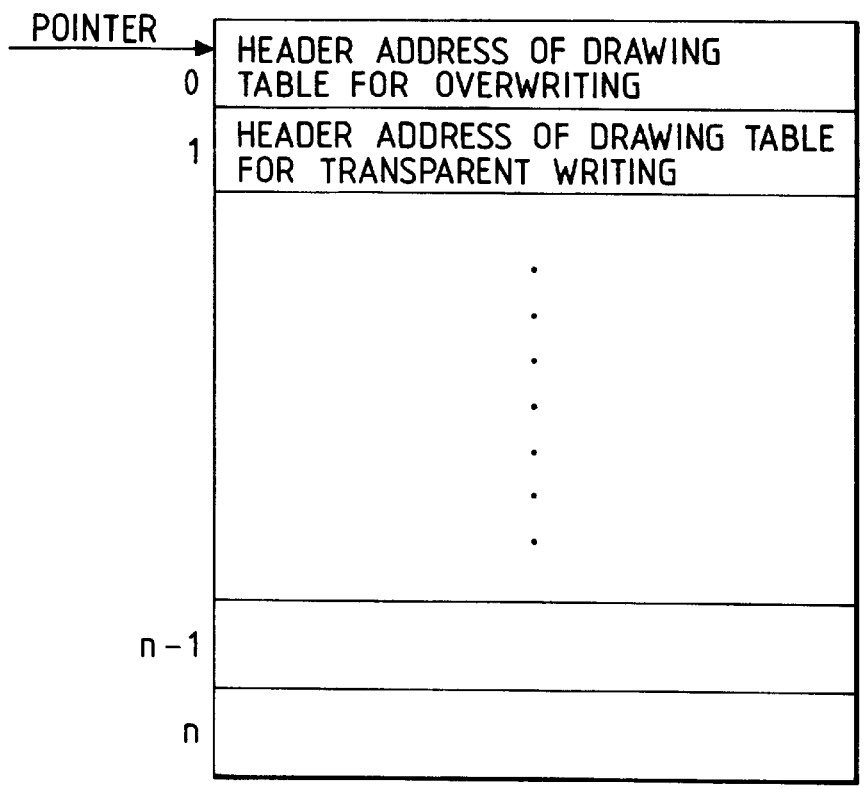
FIG. 115 shows an example of a drawing logic table address storage table 24.

FIG. 115 shows an example of the drawing logic table address storage table 24 in the memory development table storage 22 shown in FIGS. 24A and 24B.

This table stores header addresses of the paint function address storage tables 23 corresponding to drawing logics shown in, e.g., FIGS. 113 and 114.

The table stores addresses in correspondence with the values of drawing logic information $L_{OGSTYL}$. When the value $L_{OGSTYL}$ is "0", the drawing logic is "overwrite", and the content indicated by a pointer at the first position of the table is the header address of FIG. 113.

When the value $L_{OGSTYL}$ is "1", the drawing logic is "transparent", and the content indicated by a pointer at the first position of the table is the header address of FIG. 114.

The table can store addresses corresponding to n types of drawing logics.

FIGS. 116A and 116B show an example of the BITSET flag used in the process in step S475 in FIG. 100, step S501 in FIG. 103, step S507 in FIG. 104, and step S528 in FIG. 107.

As shown in FIG. 116A, the BITSET flag consists of 8 bits, and information indicating whether or not a Bk, C, M, or Y density value is "0" is set in each of bits 0, 1, 2, and 3.

More specifically, if the density value is "0", the corresponding bit is OFF; if it is not "0", the corresponding bit is ON.

For example, if Y and C values of Y, M, C, and Bk density values are not "0", and M and Bk values are "0", the flag value becomes "10".

Bit 4 is ON in the monochrome mode, as shown in FIG. 116B.

In the monochrome mode, bits other than bit 4 are set to be "0", and the flag value becomes "16".

Figure 117:
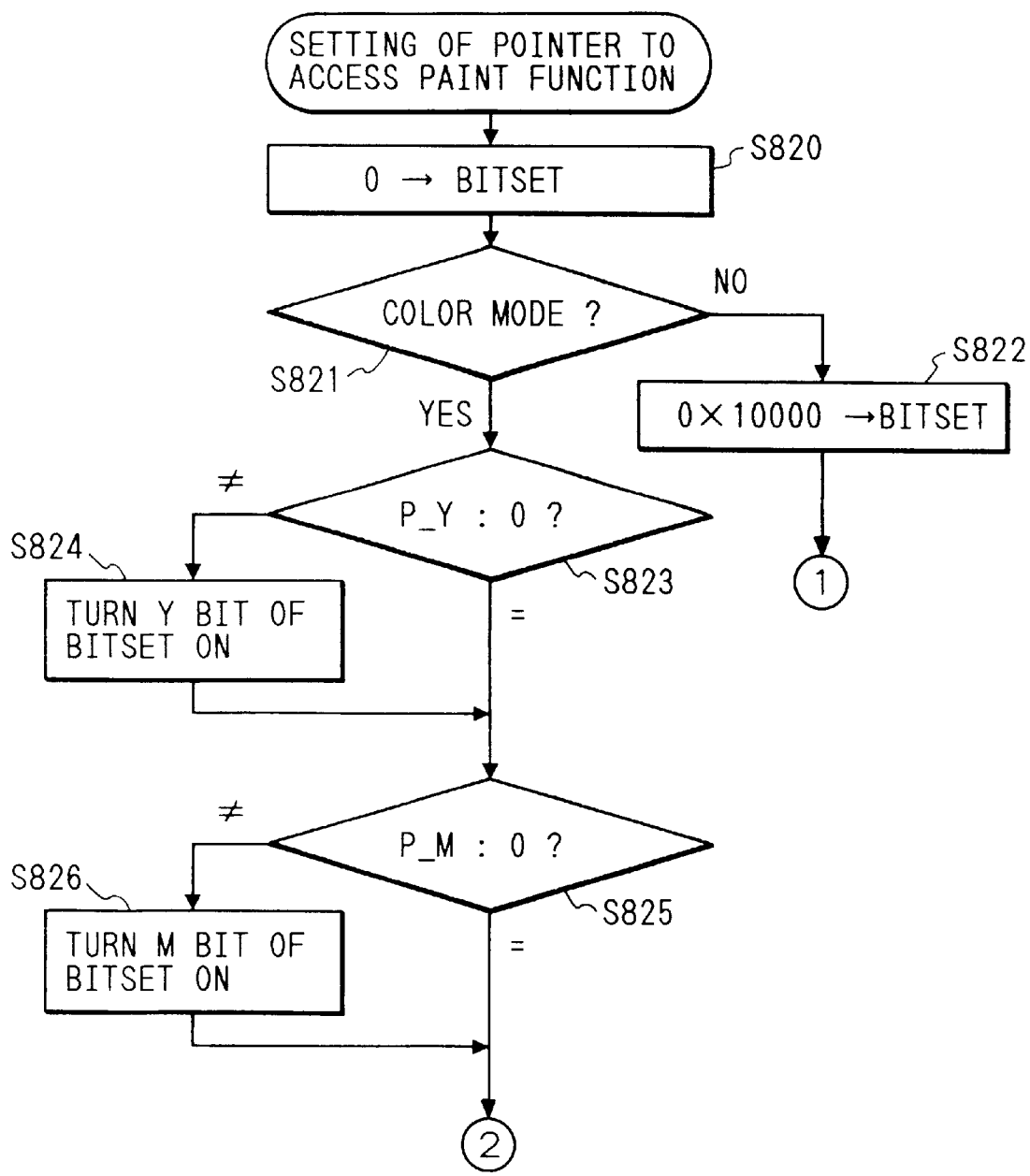
FIG. 117 is a flow chart showing a process in step S475 in FIG. 100, step S501 in FIG. 103, step S507 in FIG. 104, and step S528 in FIG. 107.
Figure 118:
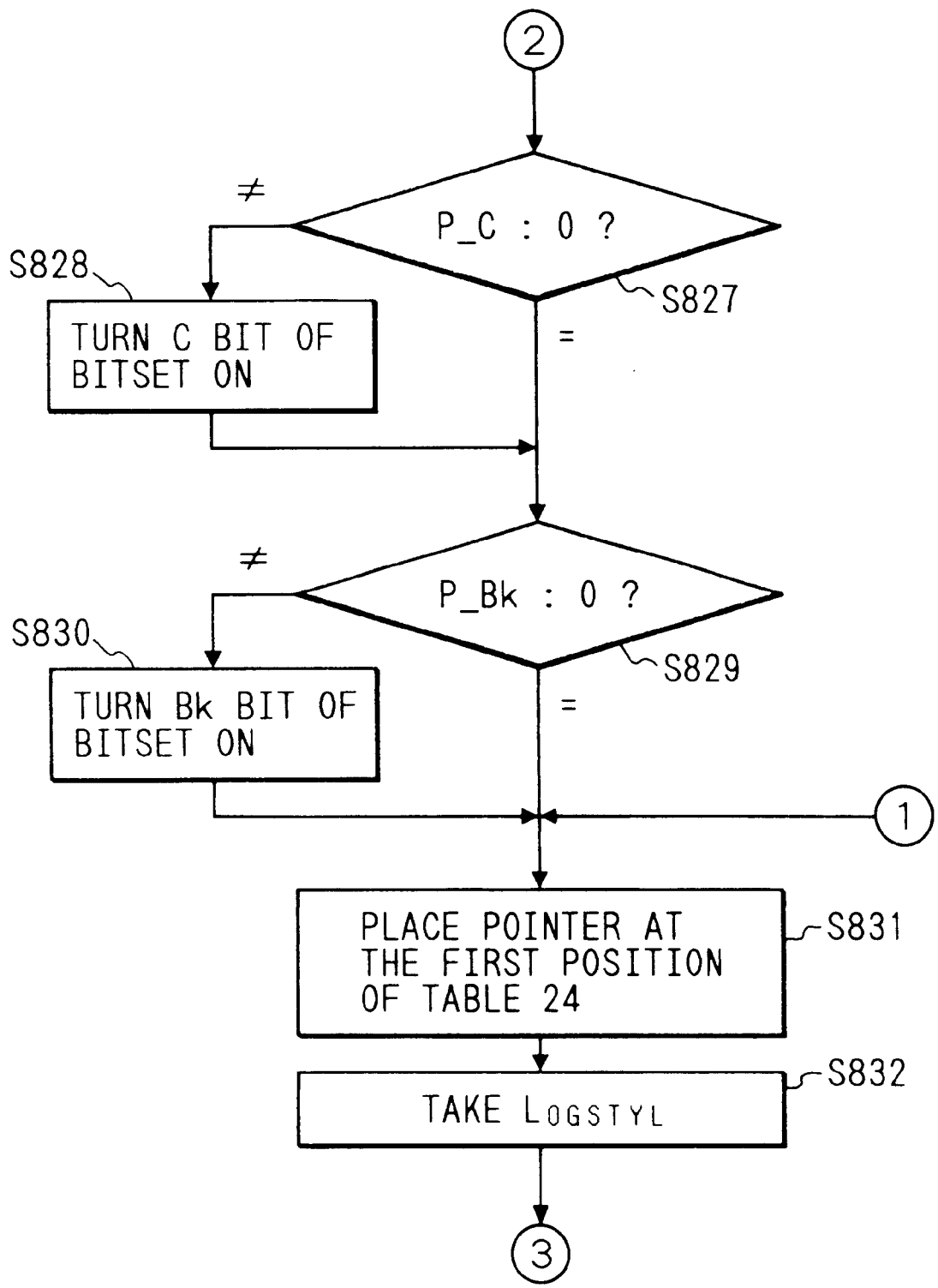
FIG. 118 is a flow chart showing the process in step S475 in FIG. 100, step S501 in FIG. 103, step S507 in FIG. 104, and step S528 in FIG. 107.
Figure 119:
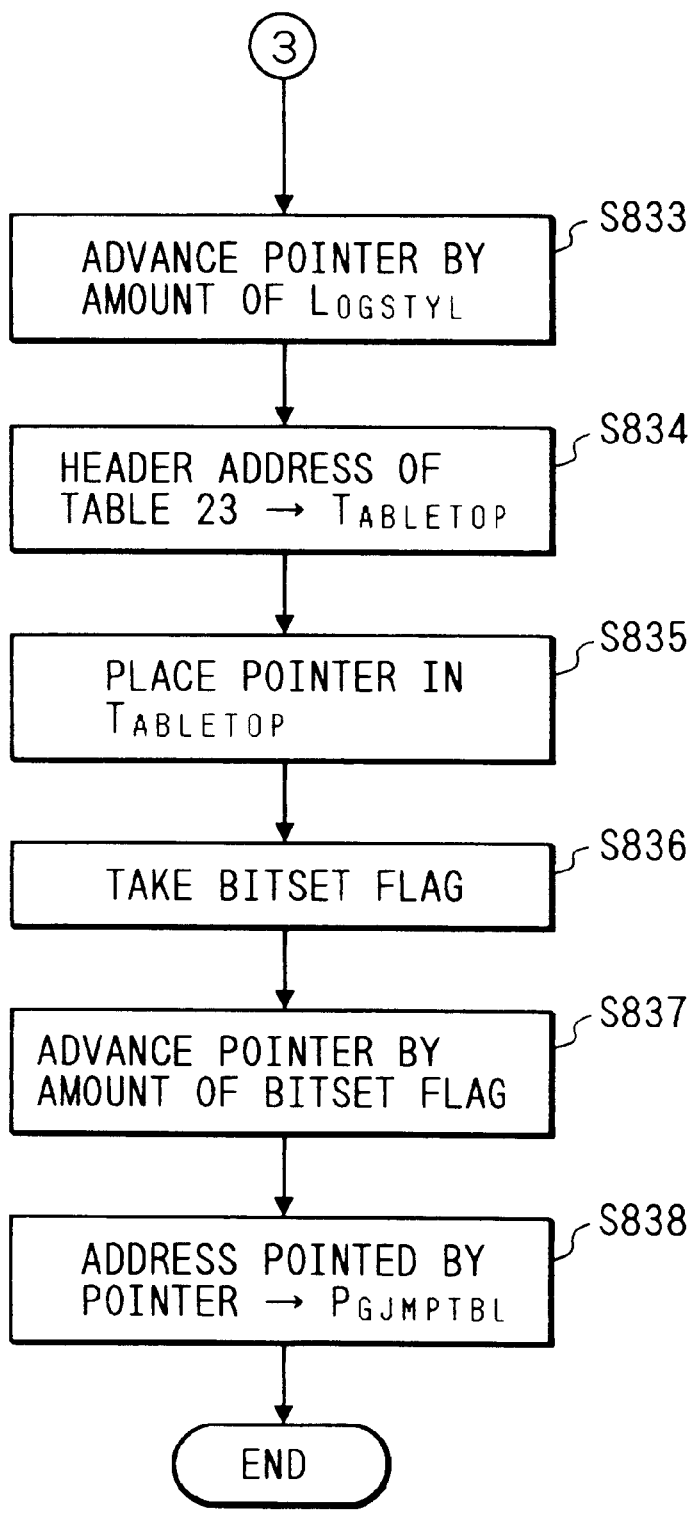
FIG. 119 is a flow chart showing the process in step S475 in FIG. 100, step S501 in FIG. 103, step S507 in FIG. 104, and step S528 in FIG. 107.

FIGS. 117 to 119 are flow charts showing the process in step S475 in FIG. 100, step S501 in FIG. 103, step S507 in FIG. 104, and step S528 in FIG. 107.

In step S820, the content of the BITSET flag is cleared, and the flow advances to step S821.

In step S821, it is checked if the color mode is set.

If NO in step S821, the flow advances to step S822, and "0x1000" is set in the BITSET flag, i.e., bit 4 alone is set ON. The flow then advances to step S831.

If YES in step S821, the flow advances to step S823, and the value P_Y is compared with "0".

If P_Y=0, the flow advances to step S825.

If P_Y≠0, the flow advances to step S824, and a Y bit (bit 3) of the BITSET flag is set ON. The flow then advances to step S825.

In step S825, the value P_M is compared with "0".

If P_M=0, the flow advances to step S827.

If P_M×0, the flow advances to step S826, and an M bit (bit 2) of the BITSET flag is set ON. The flow then advances to step S827.

In step S827, the value P_C is compared with "0".

If P_C=0, the flow advances to step S829.

If P_C≠0, the flow advances to step S828, and a C bit (bit 1) of the BITSET flag is set ON. The flow then advances to step S829.

In step S827, the value P_Bk is compared with "0".

If P_Bk=0, the flow advances to step S831.

If P_Bk≠0, the flow advances to step S830, and a Bk bit (bit 0) of the BITSET flag is set ON. The flow then advances to step S831.

In step S831, a pointer is placed at the first position of the drawing logic table address storage table 24, and the flow advances to step S832.

In step S832, drawing logic information $L_{OGSTYL}$ is taken, and the flow advances to step S833.

In step S833, the pointer is advanced by an amount corresponding to the value $L_{OGSTYL}$, and the flow advances to step S834.

In step S834, the content indicated by the pointer (the header address of the paint function address storage table 23) is set in $T_{ABLETOP}$, and the flow advances to step S835.

In step S835, a pointer is placed in $T_{ABLETOP}$, and the flow advances to step S836.

In step S836, the value of the BITSET flag is taken, and the flow advances to step S837.

In step S837, the pointer is advanced by an amount corresponding to the taken value, and the flow advances to step S838.

In step S838, the address indicated by the pointer is set in $P_{GJMPTBL}$, thus ending the process.

In this manner, the jump address to a paint function in the paint function address storage table 23 corresponding to the drawing logic shown in, e.g., FIGS. 113 and 114 can be accessed on the basis of drawing logic information in correspondence with the Y, M, C, and Bk density values (0 or not 0) according to the value of the BITSET flag.

Also, the jump address to a paint function in the monochrome mode can be accessed.

FIG. 120 shows an example of a straight line connecting two points $(X_m, Y_m)$ and $(X_{m+1}, Y_{m+1})$ on the printer coordinate system.

In consideration of a line width $L_{WIDTH}$, drawing of a straight line can be regarded as a paint process of an area surrounded by four points $(X_1, Y_1)$, $(X_2, Y_2)$, $(X_3, Y_3)$, and $(X_4, Y_4)$. An angle e indicates the inclination of a straight line from the horizontal right direction.

Figure 105:
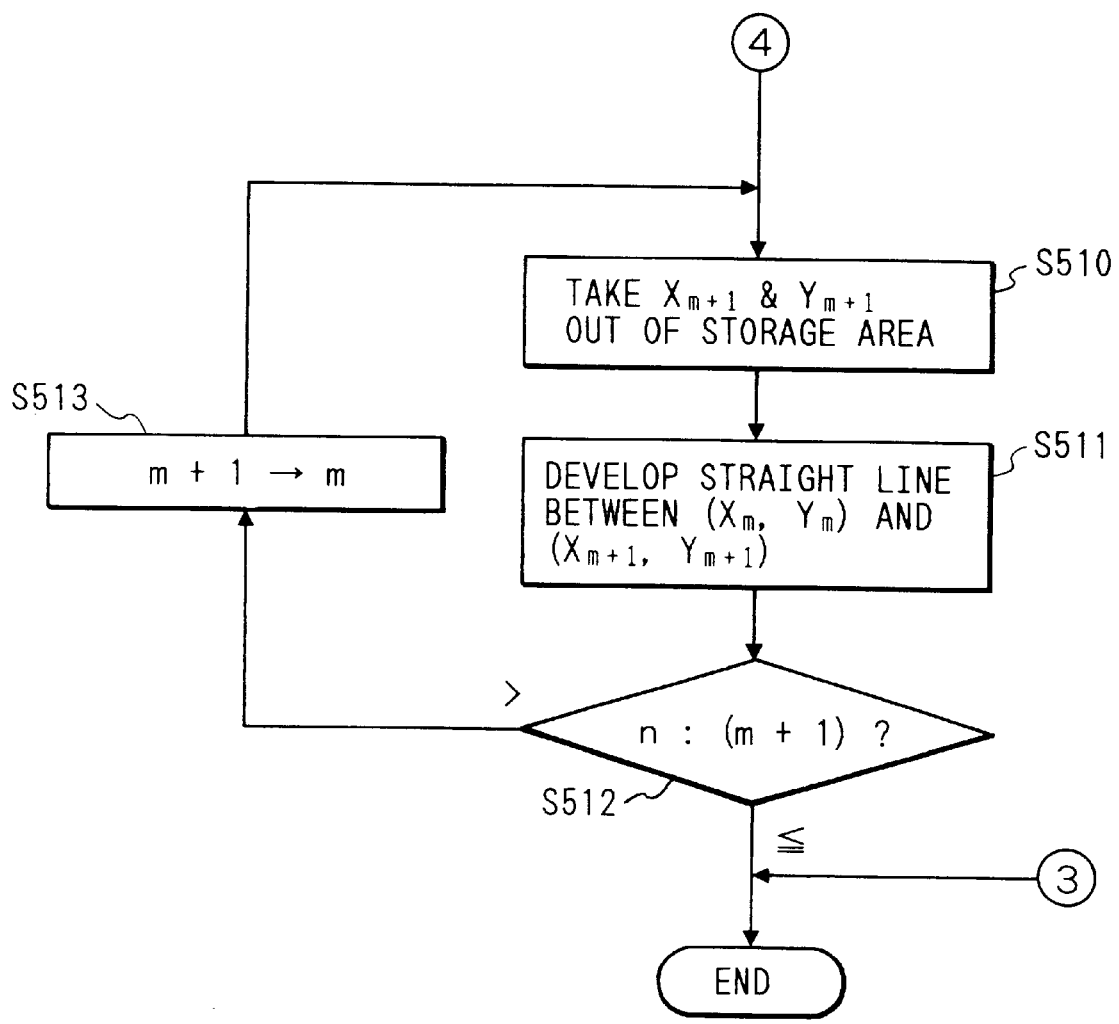
FIG. 105 is a flow chart showing the process upon execution of the polygon drawing function in step S399 in FIG. 86.
Figure 121:
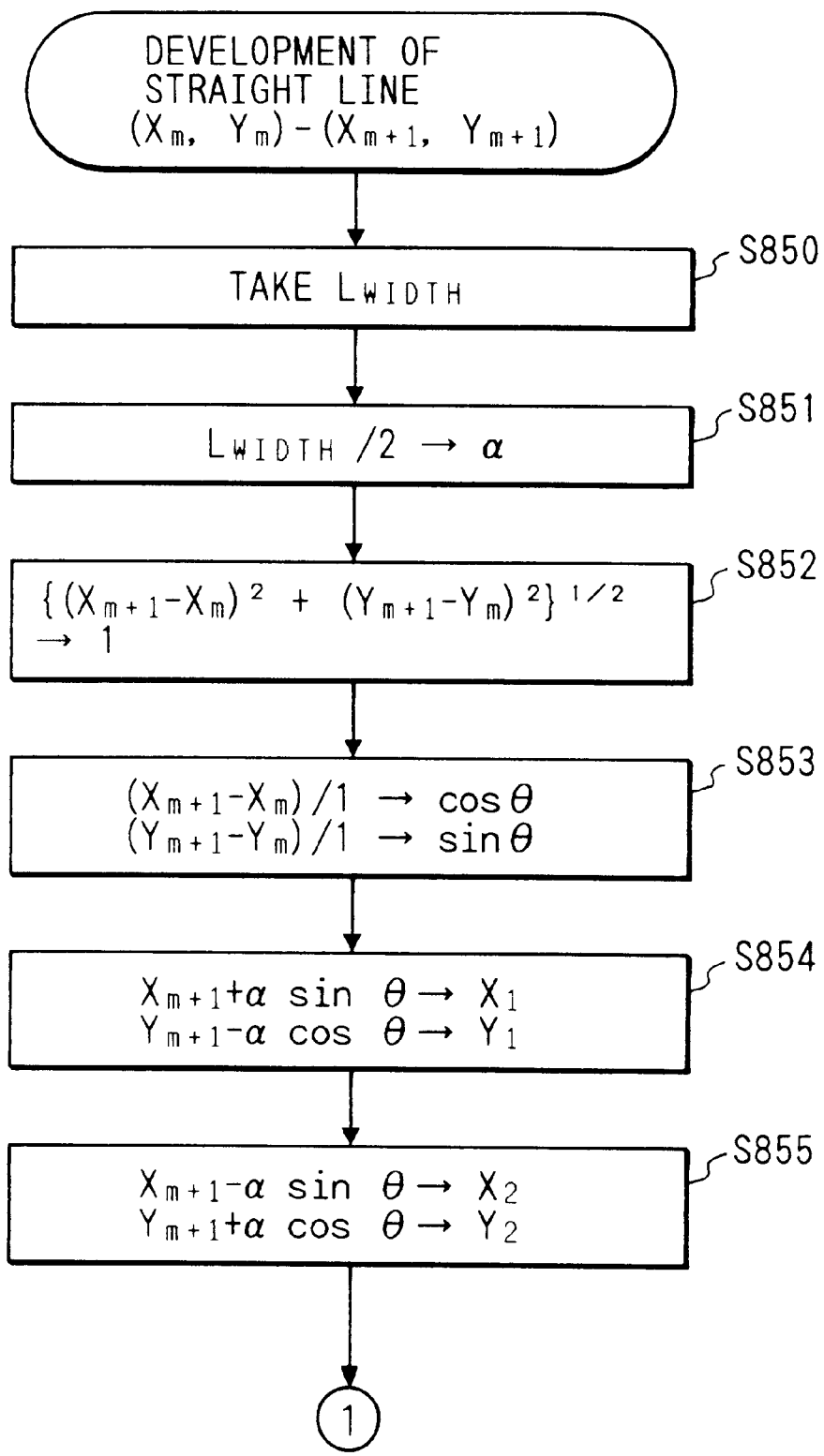
Figure 122:
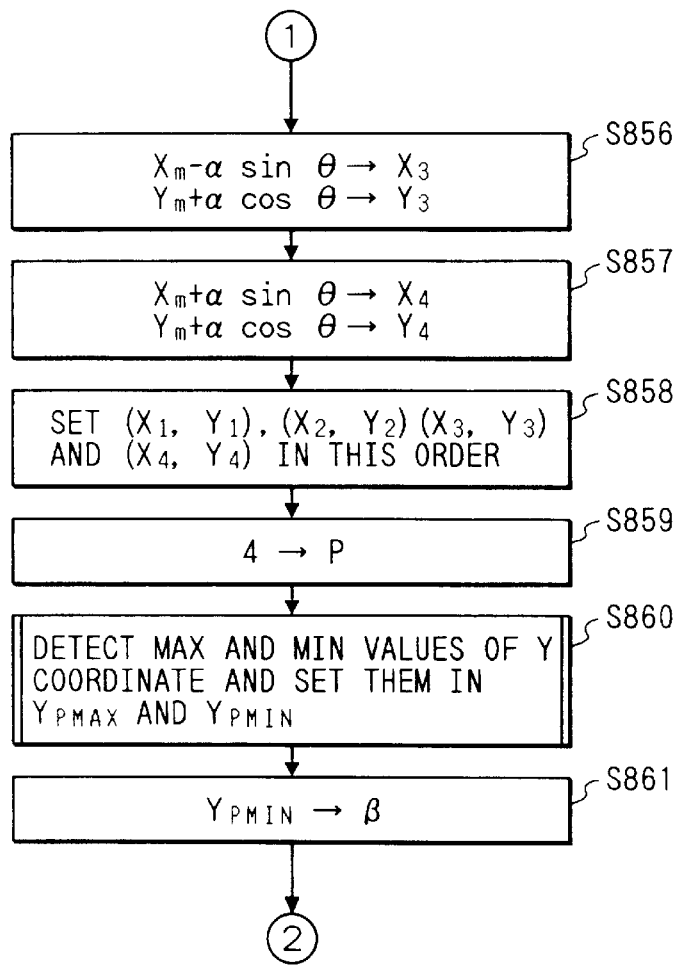

FIGS. 121 to 123 are flow charts showing the process in step S479 in FIG. 101 and step S511 in FIG. 105 on the basis of FIG. 120.

In step S850, line width information $L_{WIDTH}$ is taken, and the flow advances to step S851.

In step S851, a quotient of $L_{WIDTH}/2$ is set in α, and the flow advances to step S852.

In step S852, $\{(X_{m+1}-X_m)^2+(Y_{m+1}-Y_m)^2\}^{1/2}$ is set in l, and the flow advances to step S853.

In step S853, a quotient of $(X_{m+1}-X_m)/l$ is set in cos θ, and a quotient of $(Y_{m+1}-Y_m)/l$ is set in sin θ. Thereafter, the flow advances to step S854.

In step S854, a sum of $X_{m+1}+α \sin θ$ is set in $X_1$, and a difference of $Y_{m+1}-α \cos θ$ is set in $Y_1$. The flow then advances to step S855.

In step S855, a difference of $X_{m+1}-α \sin θ$ is set in $X_2$, and a sum of $Y_{m+1}+α \cos θ$ is set in $Y_2$. The flow then advances to step S856.

In step S856, a difference of $X_m-α \sin θ$ is set in $X_3$, and a sum of $Y_m+α \cos θ$ is set in $Y_3$. The flow then advances to step S857.

In step S857, the sum of $X_m+α \sin θ$ is set in $X_4$, and the sum of $Y_m+α \cos θ$ is set in $Y_4$. The flow then advances to step S858.

In step S858, $(X_1, Y_1)$, $(X_2, Y_2)$, $(X_3, Y_3)$, and $(X_4, Y_4)$ are set in the storage area of the system work memory in the order named, and the flow advances to step S859.

In step S859, "4" (the number of coordinate points in step S858) is set in a constant p, and the flow advances to step S860.

In step S860, the minimum and maximum values of Y coordinates set in the storage area of the system work memory in step S858 are detected, and are respectively set in $Y_{PMIN}$ and $Y_{PMAX}$. The flow then advances to step S861.

In step S861, the value $Y_{PMIN}$ is set in a variable β, and the flow advances to step S862.

In step S862, a paint process for one scan line corresponding to the Y coordinate value β is performed, and the flow advances to step S863.

In step S863, the values β and $Y_{PMAX}$ are compared with each other.

If $β=Y_{PMAX}$, the process ends.

If $\beta \neq Y_{PMAX}$, the flow advances to step S864 to increment the value $\beta$ by 1, and the flow returns to step S862.

In this manner, a straight line connecting two points $(X_m, Y_m)$ and $(X_{m+1}, Y_{m+1})$ on the printer coordinate system can be developed on each band memory.

FIG. 124 shows a polygon defined by five points $(X_1, Y_1)$ to $(X_5, Y_5)$ on the printer coordinate system.

A paint process of a portion inside this polygon is realized by a paint process of an area surrounded by five points $(X_1, Y_1)$ to $(X_5, Y_5)$.

FIG. 125 shows a character "E" constituted by outline points $(X_1, Y_1)$ to $(X_{12}, Y_{12})$ on the printer coordinate system.

A paint process of a portion inside this character is realized by a paint process of an area surrounded by 12 points $(X_1, Y_1)$ to $(X_{12}, Y_{12})$.

FIG. 126 is a flow chart showing the process in step S502 in FIG. 103 and step S529 in FIG. 107 in the paint process of a portion inside the polygon or character shown in FIG. 124 or 125.

In step S870, n (the number of outline points) is set in a constant p, and the flow advances to step S871.

Figure 102:
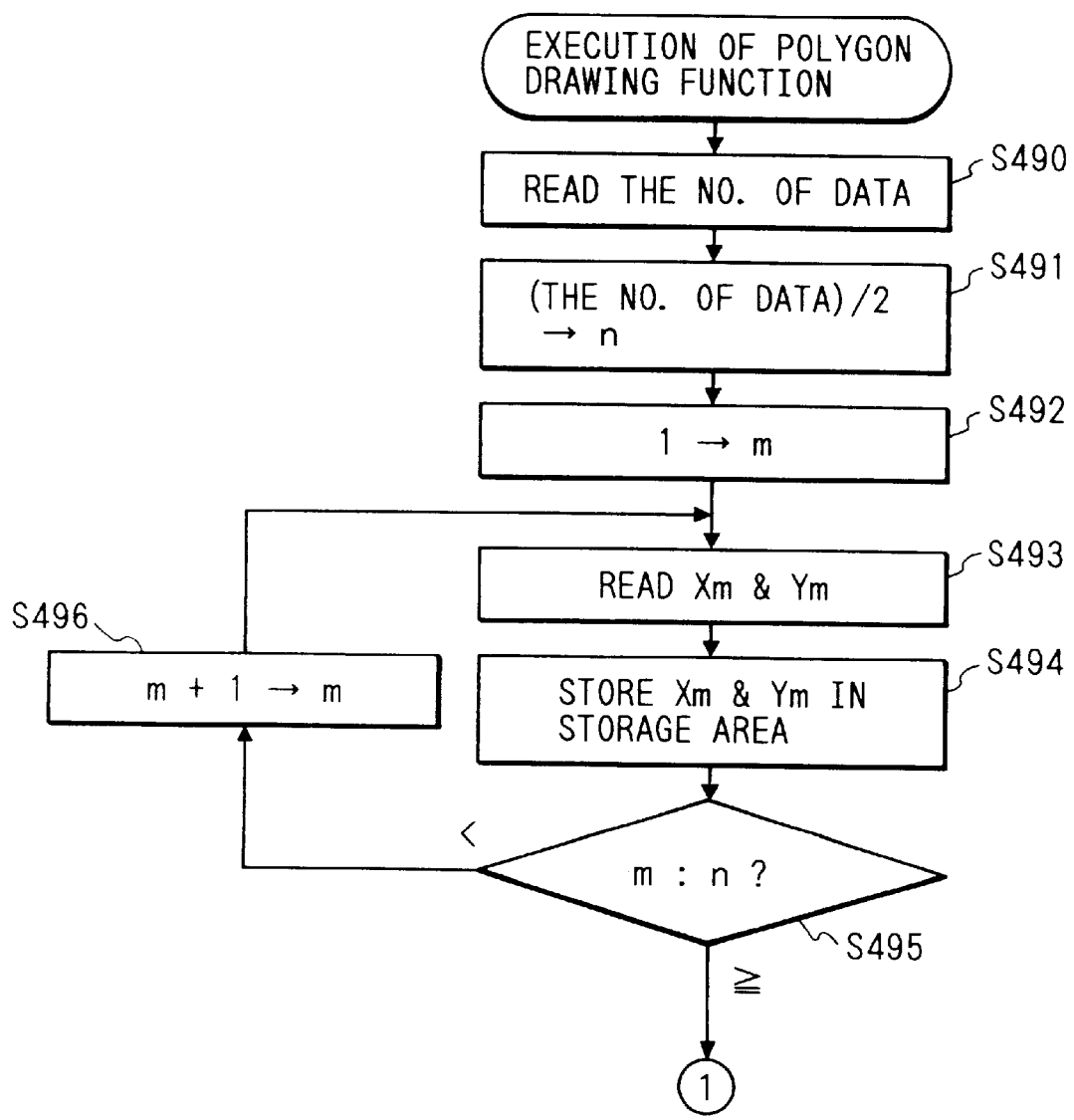
FIG. 102 is a flow chart showing a process upon execution of a polygon drawing function in step S399 in FIG. 86.

In step S871, the minimum and maximum values of Y coordinates set in the storage area in the system work memory in step S494 in FIG. 102 or step S524 in FIG. 106 are detected, and are respectively set in $Y_{PMIN}$ and $Y_{PMAX}$. Thereafter, the flow advances to step S872.

In step S872, the value $Y_{PMIN}$ is set in a variable $\beta$, and the flow advances to step S873.

In step S873, a paint process for one scan line corresponding to the Y coordinate value $\beta$ is performed, and the flow advances to step S874.

In step S874, the values $\beta$ and $Y_{PMAX}$ are compared with each other.

If $\beta = Y_{PMAX}$, the process ends.

If $\beta \neq Y_{PMAX}$, the flow advances to step S875 to increment the value $\beta$ by 1, and the flow returns to step S873.

In this manner, a paint pattern of a region surrounded by n outline points $(X_1, Y_1)$ to $(X_n, Y_n)$ on the printer coordinate system can be developed on each band memory.

Figure 127:
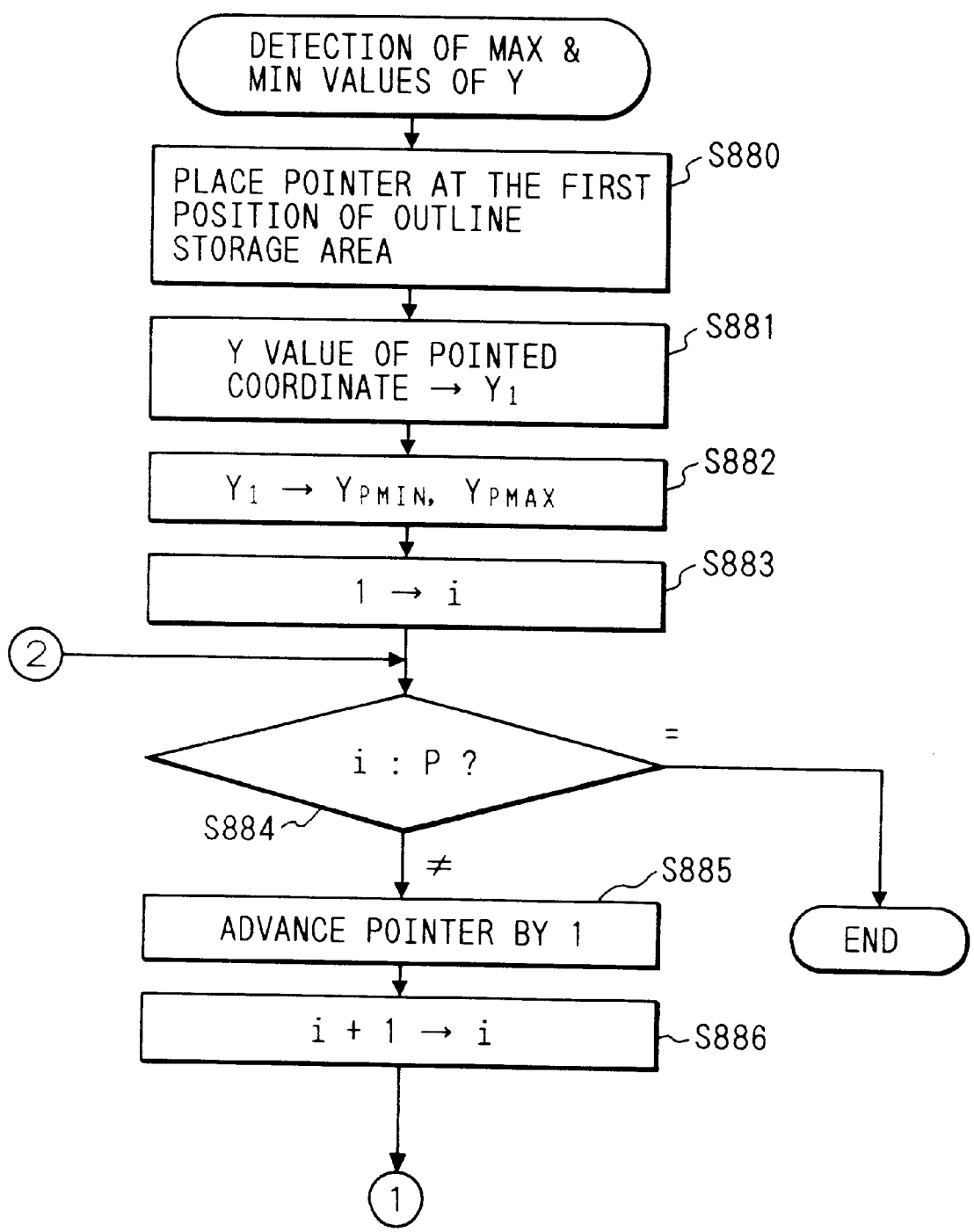
Figure 128:
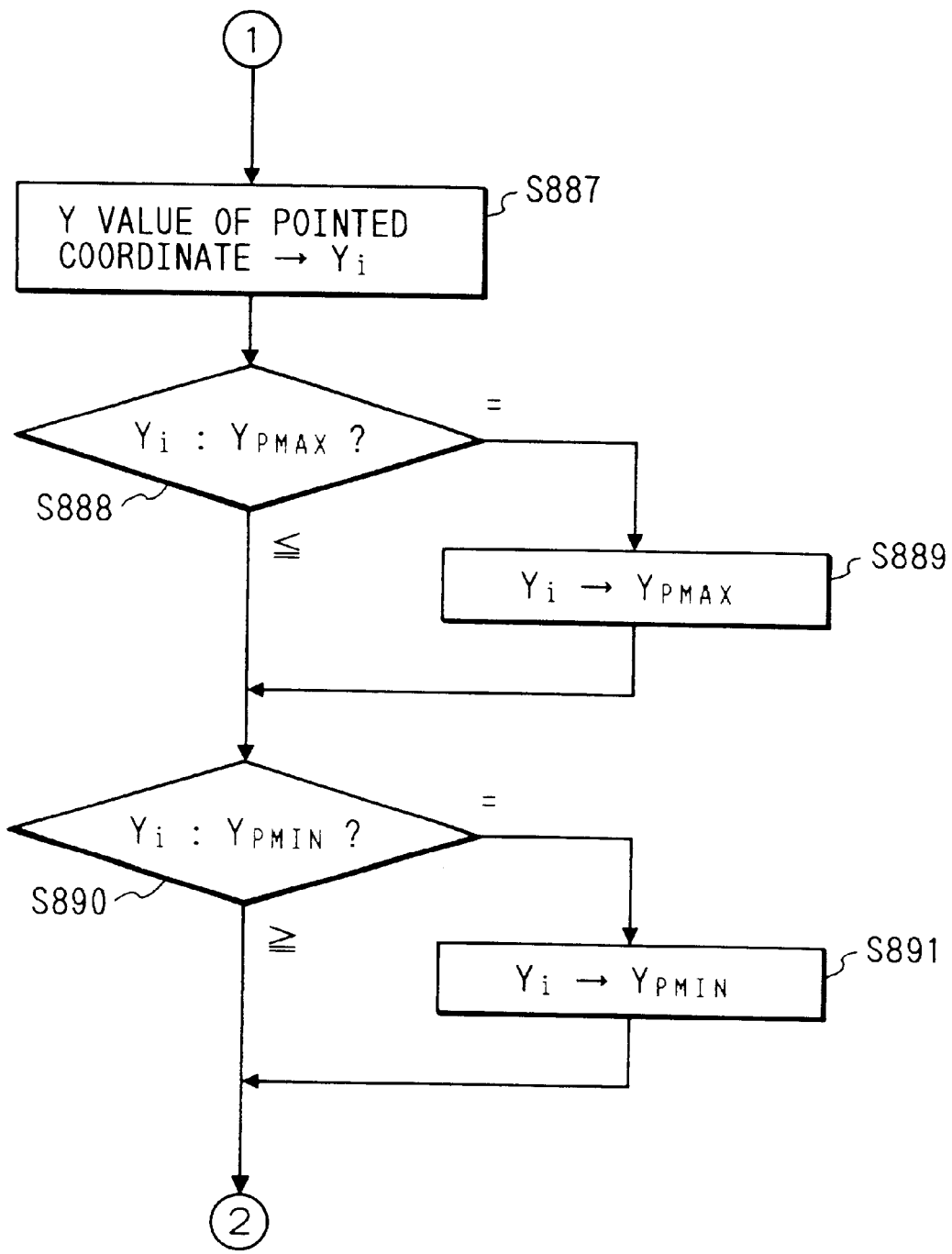
Figure 129:
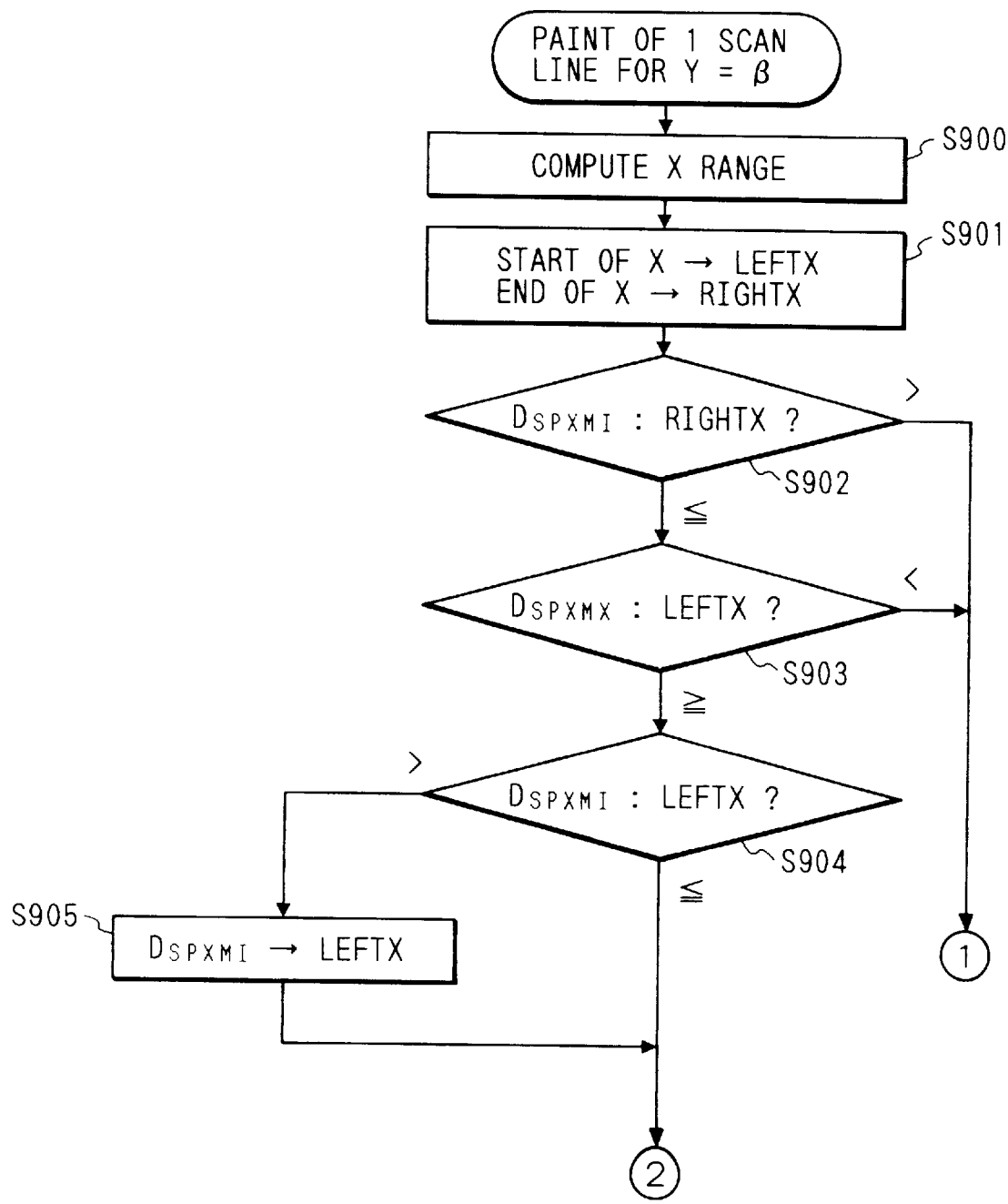
Figure 130:
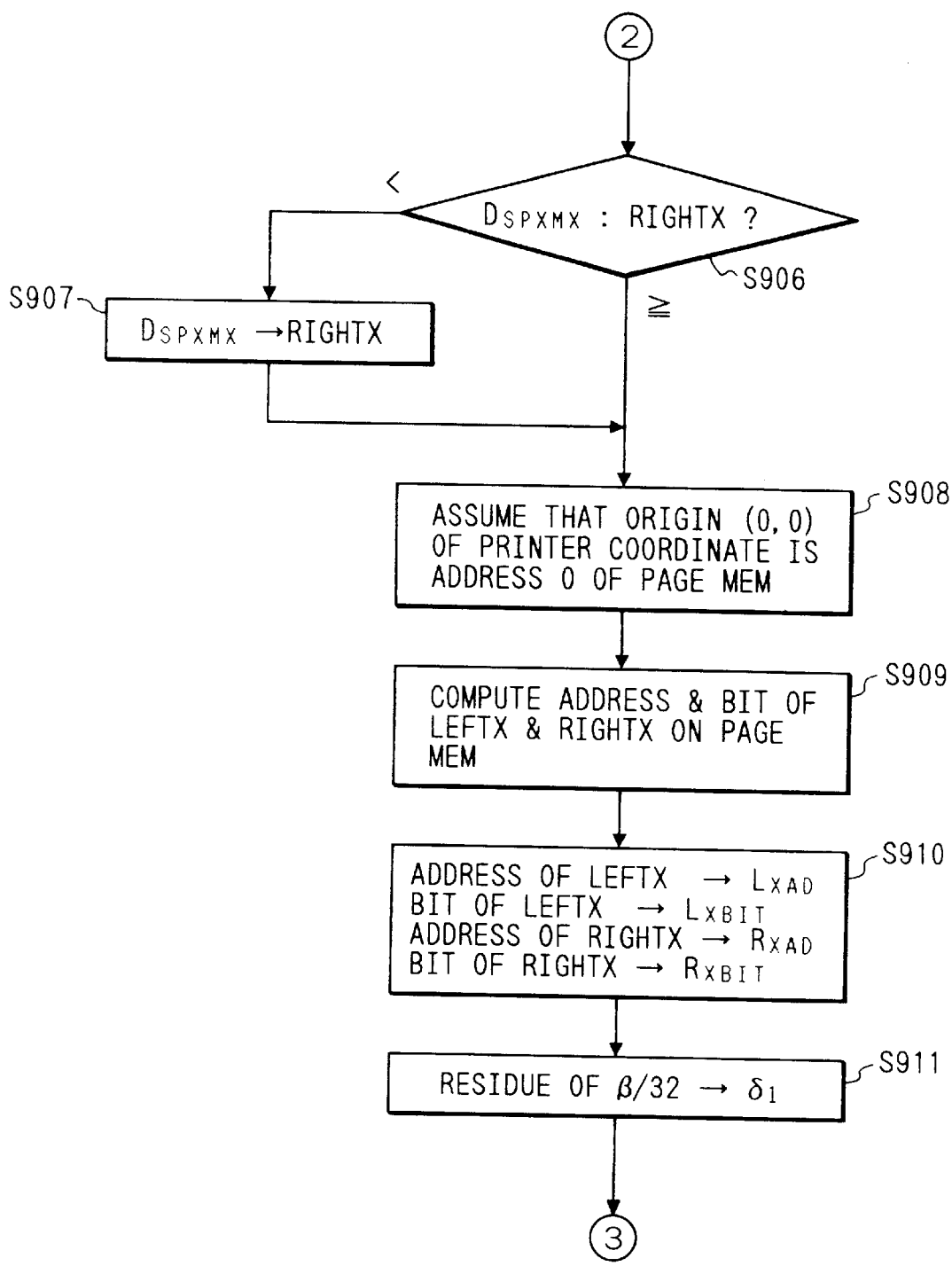

FIGS. 127 and 128 are flow charts showing the process in step S860 in FIG. 122 and step S871 in FIG. 126.

In step S880, a pointer is placed at the first position of the outline point storage area of the system work memory, and the flow advances to step S881.

In step S881, the Y value of a coordinate indicated by the pointer is set in $Y_1$, and the flow advances to step S882.

In step S882, the value $Y_1$ is set in $Y_{PMIN}$ and $Y_{PMAX}$ and the flow advances to step S883.

In step S883, "1" is set in a variable i, and the flow advances to step S884.

In step S884, i is compared with a constant p.

If i=p, the process ends.

If i≠p, the flow advances to step S885 to advance the pointer by 1, and the flow then advances to step S886.

In step S886, the value i is incremented by 1, and the flow advances to step S887.

In step S887, the Y value of a coordinate indicated by the pointer is set in $Y_i$, and the flow advances to step S888.

In step S888, the values $Y_i$ and $Y_{PMAX}$ are compared with each other.

If $Y_i > Y_{PMAX}$ the flow advances to step S889, and $Y_i$ is set in $Y_{PMAX}$. The flow then advances to step S890.

Otherwise, the flow advances to step S890.

In step S890, the values $Y_i$ and $Y_{PMIN}$ are compared with each other.

If $Y_{PMIN} > Y_i$, the flow advances to step S891, and $Y_i$ is set in $Y_{PMIN}$. The flow then returns to step S884.

Otherwise, the flow returns to step S884.

In this manner, the minimum and maximum values of the Y coordinates set in the storage area in the system work memory are detected, and can be respectively set in $Y_{PMIN}$ and $Y_{PMAX}$.

FIGS. 129 to 132 are flow charts showing the process in step S862 in FIG. 123 and step S873 in FIG. 126.

In step S900, an X range on one scan line to be painted is computed, and the flow advances to step S901.

In step S901, the X coordinate on the printer coordinate system corresponding to the paint start point of the range computed in step S900 is set in LEFTX, and the X coordinate on the printer coordinate system corresponding to the paint end point is set in RIGHTX. The flow then advances to step S902.

In step S902, $D_{ISPXMI}$ as clip area information is compared with the value RIGHTX.

If $D_{ISPXMI} >$ RIGHTX, since the paint range falls outside the range of the clip area, the process ends.

Otherwise, the flow advances to step S903, and $D_{SPXMX}$ as clip area information is compared with the value LEFTX.

If LEFTX$>D_{SPXMX}$, since the paint range falls outside the range of the clip area, the process ends.

Otherwise, the flow advances to step S904, and $D_{SPXMI}$ as clip area information is compared with the value LEFTX.

If $D_{SPXMI} >$ LEFTX, the flow advances to step S905, and the value $D_{SPXMI}$ is set in LEFTX. The flow then advances to step S906.

Otherwise, the flow advances to step S906.

In step S906, $D_{SPXMX}$ as clip area information is compared with the value RIGHTX.

If RIGHTX$>D_{SPXMX}$, the flow advances to step S907, and the value $D_{SPXMX}$ is set in RIGHTX. The flow then advances to step S908.

Otherwise, the flow advances to step S908.

In step S908, the origin (0, 0) of the printer coordinate system is assumed as address 0 of a page memory, and the flow advances to step S909.

In step S909, the addresses and bits of LEFTX and RIGHTX on the page memory are computed under the assumption in step S908, and the flow advances to step S910.

In this case, an address is based on a 4-byte boundary.

More specifically, an address is updated every 4 bytes, and a bit assumes a value ranging from 0 to 31.

This is because a dither pattern has a 4-byte width, as shown in FIG. 110A, and the reference position of the pattern (the start position of development of the pattern on a memory) is the origin (0, 0) of the printer coordinate system.

In step S910, the address and bit of LEFTX computed in step S909 are respectively set in $L_{XAD}$ and $L_{XBIT}$, and the address and bit of RIGHTX are respectively set in $R_{XAD}$ and $R_{XBIT}$. Thereafter, the flow advances to step S911.

In step S911, a residue of the Y coordinate value $\beta/32$ is set in $\delta_1$, and the flow advances to step S912.

The process in step S911 indicates that a dither pattern shown in FIG. 110A has a height of 32 scan lines (dots), and a dither pattern used when the Y coordinate=β is the ($δ_1$)-th pattern from the uppermost scan line.

In step S912, a product of the value $δ_1$×4 is set in $δ_2$, and the flow advances to step S913.

Note that $δ_2$ indicates a moving amount (the number of bytes) from the header address of a dither pattern to an address where a dither pattern used when the Y coordinate=β is stored.

In step S913, it is checked if the color mode is set.

If NO in step S913, the flow advances to step S914, and a sum of $Y_{DTOPAD}$, where the header address of a dither pattern has already been stored, and $δ_2$ is set in $Y_{DAD}$, The flow then advances to step S915.

Note that $Y_{DAD}$ is set with the storage address of a dither pattern used when the Y coordinate value=β.

In step S915, a pointer is set in $P_{GJMPTBL}$, and the flow advances to step S916.

In step S916, the content indicated by the pointer (the jump address to a paint function) is taken, and the flow advances to step S917.

Note that the content indicated by the pointer is, Ie.g., ✳ in FIG. 113 or ⊙ in FIG. 114.

In step S917, a function indicated by the jump address is executed, and the process ends.

If it is determined in step S913 that the color mode is set, the flow advances to step S918, sums of $δ_2$ and $Y_{DTOPAD}$, $M_{DTOPAD}$, $C_{DTOPAD}$, and $K_{DTOPAD}$, where the header address of dither patterns have already been stored, are respectively set in $Y_{DAD}$, $M_{DAD}$, $C_{DAD}$, and $K_{DAD}$. The flow then advances to step S919.

Note that $Y_{DAD}$, $M_{DAD}$, $C_{DAD}$, and $K_{DAD}$ are set with the storage addresses of Y, M, C, and Bk dither patterns used when the Y coordinate value=β.

In step S919, a pointer is placed in $P_{GJMPTBL}$, and the flow advances to step S920.

In step S920, "1" is set in a variable s, and the flow advances to step S921.

In step S921, the content indicated by the pointer (the jump address to a paint function) is taken, and the flow advances to step S922.

In step S922, a function indicated by the jump address is executed, and the flow advances to step S923.

In step S923, the pointer is incremented by 4 bytes, and the flow advances to step S924.

In step S924, the value s is compared with 4.

If s=4, the process ends.

If s≠4, the flow advances to step S924 to increment s by 1, and the flow returns to step S921.

In this manner, dither patterns used in the paint process are taken out of storage addresses of dither patterns corresponding to the Y, M, C, and Bk density values in advance, and the paint process of a scan line corresponding to the Y coordinate value β can be performed by accessing the paint function address storage table in the memory development table storage 22 shown in FIGS. 24A and 24B.

FIG. 133 shows the arrangement of LEFTX (○) and RIGHTX (□) and the positions of $Y_{PMIN}$ and $Y_{PMAX}$ when the straight line shown in FIG. 120 is drawn by the process shown in FIGS. 121 to 123.

FIG. 134 shows the arrangement of LEFTX (○) and RIGHTX (□) and the positions of $Y_{PMIN}$ and $Y_{PMAX}$ when a portion inside the polygon shown in FIG. 124 is painted by the process shown in FIG. 126.

FIG. 135 shows the arrangement of LEFTX (○) and RIGHTX (□) and the positions of $Y_{PMIN}$ and $Y_{PMAX}$ when a portion inside the character shown in FIG. 125 is painted by the process shown in FIG. 126.

FIGS. 136 and 137 are flow charts showing a process for executing a clear paint function indicated by ○ in the paint function address storage table 23 shown in FIG. 113, of the process in step S922 in FIG. 132.

In step S930, the Y virtual page memory address $Y\_T_{OPADR}$ obtained by the process in FIG. 90 is taken, a sum of $Y\_T_{OPADR}+L_{XAD}$ is set in $L_{XAD}$, and a sum of $Y\_T_{OPADR}+R_{XAD}$ is set in $R_{XAD}$. The flow then advances to step S931.

Note that $L_{XAD}$ and $R_{XAD}$ obtained in step S930 are the addresses of a memory on which a pattern is actually developed.

In step S931, $L_{XAD}$ and $R_{XAD}$ are compared with each other.

If $L_{XAD}=R_{XAD}$, the flow advances to step S932 to clear bits between $L_{XBIT}$ of the address $L_{XAD}$ and $R_{XBIT}$, thus ending the process.

If $L_{LAD}\neq R_{XAD}$, the flow advances to step S933 to clear bits between $L_{XBIT}$ of the address $L_{XAD}$ and $L_{XAD}+4$ (bytes), and the flow advances to step S934.

In step S934, a sum of $L_{XAD}+4$ (bytes) is set in $L_{XAD}$, and the flow advances to step S935.

In step S935, $L_{XAD}$ and $R_{XAD}$ are compared with each other.

If $L_{XAD}=R_{XAD}$ the flow advances to step S932 to clear bits between $L_{XBIT}$ of the address $L_{XAD}$ and $R_{XBIT}$, thus ending the process.

If $L_{XAD}\neq R_{XAD}$, the flow advances to step S936 to clear bits between $L_{XAD}$ and $L_{XAD}+4$ (bytes), and the flow advances to step S937.

In step S937, a sum of $L_{XAD}+4$ (bytes) is set in $L_{XAD}$ and the flow returns to step S935.

In this manner, the clear paint function indicated by ○ in the paint function address storage table 23 in FIG. 113 can be executed.

Similarly, clear paint functions indicated by □, △, and ◇ can be executed by changing the virtual page memory address.

FIGS. 138 and 139 are flow charts showing a process for executing an overwrite paint function indicated by ◎ in the paint function address storage table 23 shown in FIG. 113, of the process in step S922 in FIG. 132.

In step S940, the Y virtual page memory address $Y\_T_{OPADR}$ obtained by the process in FIG. 90 is taken, a sum of $Y\_T_{OPADR}+L_{XAD}$ is set in $L_{XAD}$, and a sum of $Y\_T_{OPADR}+R_{XAD}$ is set in $R_{XAD}$. The flow then advances to step S941.

Note that $L_{XAD}$ and $R_{XAD}$ obtained in step S940 are the addresses of a memory on which a pattern is actually developed.

In step S941, the content (4 bytes) at the address $Y_{DAD}$ is taken, and is set as a dither pattern to be developed in $Y_{DTPATN}$. The flow then advances to step S942.

In step S942, $L_{XAD}$ and $R_{XAD}$ are compared with each other.

If $L_{XAD}=R_{XAD}$ the flow advances to step S950 to clear bits between $L_{XBIT}$ of the address $L_{XAD}$ and $R_{XBIT}$, and the flow advances to step S951.

In step S951, the pattern in the $Y_{DPATN}$ is logically ORed on a memory between the $L_{XBIT}$ of the address $L_{XAD}$ and $R_{XBIT}$, thus ending the process.

If it is determined in step S942 that $L_{XAD} \neq R_{XAD}$, the flow advances to step S943 to clear bits between $L_{XBIT}$ of the address $L_{XAD}$ and $L_{XAD}+4$ (bytes), and the flow advances to step S944.

In step S944, the pattern in the $Y_{DPATN}$ is logically ORed on a memory between the $L_{XBIT}$ of the address $L_{XAD}$ and $L_{XAD}+4$ (bytes), and the flow advances to step S945.

In step S945, a sum of $L_{XAD}+4$ (bytes) is set in $L_{XAD}$, and the flow advances to step S946.

In step S946, $L_{XAD}$ is compared with $R_{XAD}$.

If $L_{XAD}=R_{XED}$, the flow advances to step S950 to clear bits between $L_{XBIT}$ of the address $L_{XAD}$ and $R_{XBIT}$, and the flow advances to step S951.

In step S951, the pattern in the $Y_{DPATN}$ is logically ORed on a memory between the $L_{XBIT}$ of the address $L_{XAD}$ and $R_{XBIT}$, thus ending the process.

If $L_{XAD} \neq R_{XAD}$, the flow advances to step S947 to clear bits between $L_{XAD}$ and $L_{XAD}+4$ (bytes), and the flow advances to step S948.

In step S948, the pattern in the $Y_{DPATN}$ is logically ORed on a memory between the $L_{XBIT}$ of the address $L_{XAD}$ and $L_{XAD}+4$ (bytes), and the flow advances to step S949.

In step S949, a sum of $L_{XAD}+4$ (bytes) is set in $L_{XAD}$, and the flow returns to step S946.

In this manner, an overwrite paint function indicated by ◯ in the paint function address storage table 23 in FIG. 113 can be executed.

Figure 131:
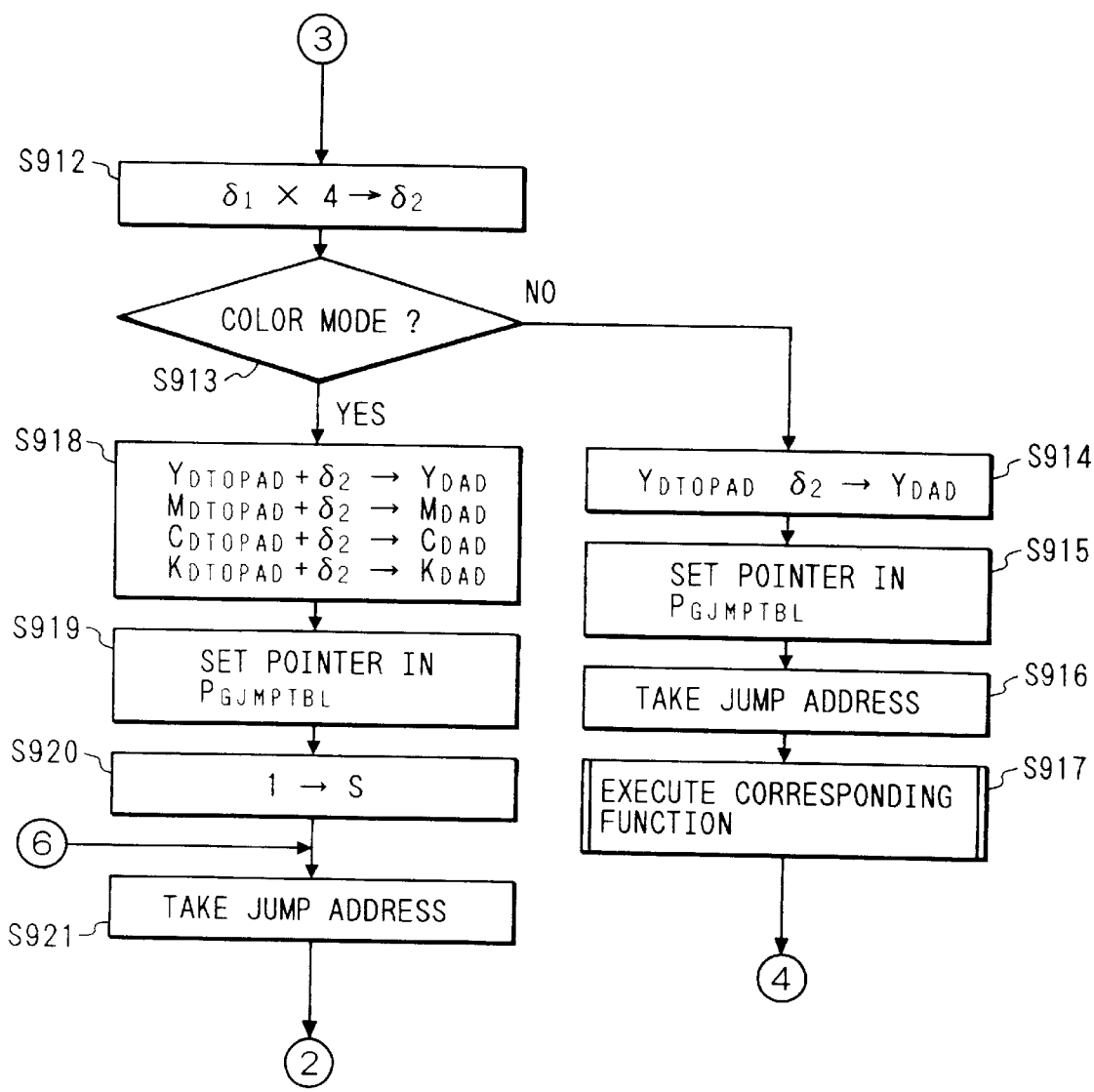

With the same process, an overwrite paint function indicated by ✱ in the paint function address storage table 23 in FIG. 113, of the process in step S917 in FIG. 131 can be executed.

Similarly, overwrite paint functions indicated by ▢ and ◇ can be executed by changing the virtual page memory address.

FIGS. 140 and 141 are flow charts showing a process for executing a reverse paint function indicated by W in the paint function address storage table 23 shown in FIG. 114, of the process in step S922 in FIG. 132.

In step S960, the Y virtual page memory address $Y\_T_{OPADR}$ obtained by the process in FIG. 90 is taken, a sum of $Y\_T_{OPADR}+L_{XAD}$ is set in $L_{XAD}$, and a sum of $Y\_T_{OPADR}+R_{XAD}$ is set in $R_{XAD}$. The flow then advances to step S961.

Note that $L_{XAD}$ and $R_{XAD}$ obtained in step S960 are the addresses of a memory on which a pattern is actually developed.

In step S961, the content (4 bytes) at the address YDAD is taken, and is set as a dither pattern to be developed in $Y_{DTPATN}$. The flow then advances to step S962.

In step S962, a pattern obtained by inverting the bits of $Y_{DTPATN}$ is set in $Y_{RPATN}$, and the flow advances to step S963.

In step S963, $L_{XAD}$ and $R_{XAD}$ are compared with each other.

If $L_{XAD}=R_{XAD}$ the flow advances to step S969 to logically AND the pattern in $Y_{RPATN}$ on a memory between $L_{XBIT}$ of the address $L_{XAD}$ and $R_{XBIT}$, thus ending the process.

If $L_{XAD} \neq R_{XAD}$ in step S963, the flow advances to step S964 to logically AND the pattern in $Y_{RPATN}$ on a memory between $L_{XBIT}$ of the address $L_{XAD}$ and $L_{XAD}+4$ (bytes), and the flow advances to step S965.

In step S965, a sum of $L_{XAD}+4$ (bytes) is set in $L_{XAD}$, and the flow advances to step S966.

In step S966, $L_{XAD}$ and $R_{XAD}$ are compared with each other.

If $L_{XAD}=R_{XAD}$, the flow advances to step S969 to logically AND the pattern in $Y_{RPATN}$ on a memory between $L_{XBIT}$ of the address $L_{XAD}$ and $R_{XBIT}$, thus ending the process.

If $L_{XAD} \neq R_{XAD}$ the flow advances to step S967 to logically AND the pattern in $Y_{RPATN}$ on a memory between $L_{XBIT}$ of the address $L_{XAD}$ and $L_{XAD}+4$ (bytes), and the flow advances to step S968.

In step S968, a sum of $L_{XAD}+4$ (bytes) is set in $L_{XAD}$, and the flow returns to step S966.

In this manner, the reverse paint function indicated by W in the paint function address storage table 23 in FIG. 114 can be executed.

Similarly, reverse paint functions indicated by V, X, and Z can be executed by changing the virtual page memory address.

FIGS. 142 and 143 are flow charts showing a process for executing a transparent paint function indicated by $\underline{W}$ in the paint function address storage table 23 shown in FIG. 114, of the process in step S922 in FIG. 132.

In step S970, the Y virtual page memory address $Y\_T_{OPADR}$ obtained by the process in FIG. 90 is taken, a sum of $Y\_T_{OPADR}+L_{XAD}$ is set in $L_{XAD}$, and a sum of $Y\_T_{OPADR}+R_{XAD}$ is set in $R_{XAD}$. The flow then advances to step S971.

Note that $L_{XAD}$ and $R_{XAD}$ obtained in step S970 are the addresses of a memory on which a pattern is actually developed.

In step S971, the content (4 bytes) at the address $Y_{DAD}$ is taken, and is set as a dither pattern to be developed in $Y_{DTPATN}$. The flow then advances to step S972.

In step S972, a pattern obtained by inverting the bits of $Y_{DTPATN}$ is set in $Y_{RPATN}$, and the flow advances to step S973.

In step S973, $L_{XAD}$ and $R_{XAD}$ are compared with each other.

If $L_{XAD}=R_{XAD}$, the flow advances to step S981 to logically AND the pattern in $Y_{RPATN}$ on a memory between $L_{XBIT}$ of the address $L_{XAD}$ and $R_{XBIT}$, and the flow then advances to step S982.

In step S982, the pattern in $Y_{DTPATN}$ is logically ORed on a memory between $L_{XBIT}$ of the address $L_{XAD}$ and $R_{XBIT}$, thus ending the process.

If $L_{XAD} \neq R_{XAD}$ in step S973, the flow advances to step S974 to logically AND the pattern in $Y_{RPATN}$ on a memory between $L_{XBIT}$ of the address $L_{XAD}$ and $L_{XAD}+4$ (bytes), and the flow then advances to step S975.

In step S975, the pattern in $Y_{DTPATN}$ is logically ORed on a memory between $L_{XBIT}$ of the address $L_{XAD}$ and $L_{XAD}+4$ (bytes), and the flow then advances to step S976.

In step S976, a sum of $L_{XAD}+4$ (bytes) is set in $L_{XAD}$, and the flow advances to step S977.

In step S977, $L_{XAD}$ and $R_{XAD}$ are compared with each other.

If $L_{XAD}=R_{XAD}$, the flow advances to step S981 to logically AND the pattern in $Y_{RPATN}$ on a memory between $L_{XBIT}$ of the address $L_{XAD}$ and $R_{XBIT}$, and the flow then advances to step S982.

In step S982, the pattern in $Y_{DTPATN}$ is logically ORed on a memory between $L_{XBIT}$ of the address $L_{XAD}$ and $R_{XBIT}$, thus ending the process.

If $L_{XAD} \neq R_{XAD}$, the flow advances to step S978 to logically AND the pattern in $Y_{RPATN}$ on a memory between $L_{XAD}$ and $L_{XAD}+4$ (bytes), and the flow advances to step S979.

In step S979, the pattern in $Y_{DPATN}$ is logically ORed on a memory between $L_{XBIT}$ of the address $L_{XAD}$ and $L_{XAD}$+4 (bytes), and the flow advances to step S980.

In step S980, a sum of $L_{XAD}$+4 (bytes) is set in $L_{XAD}$, and the flow returns to step S977.

In this manner, the transparent paint function indicated by W in the paint function address storage table 23 in FIG. 114 can be executed.

With the same process, a transparent paint function indicated by ◯ in the paint function address storage table 23 in FIG. 114, of the process in step S917 in FIG. 131 can be executed.

Similarly, transparent paint functions indicated by V, X, and Z can be executed by changing the virtual page memory address.

FIG. 144 shows examples of paint results using the paint functions of the processes shown in FIGS. 136 to 143.

$Y_{DTPATN}$ and $Y_{RPATN}$ are 32-bit patterns. In these patterns, a black portion indicates a bit ON state, and a white portion indicates a bit OFF state.

FIG. 144 shows paint results using the pattern $Y_{DTPATN}$ between $L_{XBIT}$ of the address $L_{XAD}$ and $R_{XBIT}$ of the address $R_{XAD}$ on a memory after the process.

After a clear & paint process, all bits in a painted portion are OFF.

After an overwriting & paint process, the content of a memory before the process is cleared, and the pattern $Y_{DTPATN}$ is developed.

After a reverse & paint process, the pattern $Y_{RPATN}$ is logically ANDed with the memory content before the process.

After a transparent paint process, the pattern $Y_{RPATN}$ is logically ANDed with the memory content before the process, and the pattern $Y_{DTPATN}$ is logically ORed with the AND result.

In this embodiment, Y, M, C, and Bk development memories are used. However, the present invention can be applied to other cases, e.g., R, G, and B development memories.

In this case, the paint function address storage table shown in FIG. 113 is rewritten, as shown in FIG. 145.

As shown in FIG. 145, jump addresses to paint functions on development memories are stored in units of R, G, and B.

Note that a paint function is one for executing a paint process on a memory for one scan line.

◯, □, and Δ indicate jump addresses to clear paint functions onto development memories, and are respectively those for development onto R, G, and B band memories.

◯, □, and Δ indicate jump addresses to overwrite paint functions onto development memories, and are respectively those for development onto R, G, and B band memories.

∗ indicates a jump address to an overwrite paint function onto a development memory in the monochrome mode.

✕ indicates a jump address to a dummy process function.

The dummy process function is a function for executing no process.

In the above-mentioned case, the BITSET flag shown in FIGS. 116A and 116B is replaced, as shown in FIGS. 146A and 146B.

As shown in FIG. 146A, the BITSET flag consists of 8 bits, and information indicating whether or not a B, G, or R density or brightness value is "0" is set in each of bits 0, 1, and 2.

More specifically, if the density or brightness value is "0", the corresponding bit is OFF; if it not "0", the corresponding bit is ON.

For example, when an R value of R, G, and B density or brightness value is not "0", and G and B values are "0", the flag value becomes "4".

Bit 3 is ON in the monochrome mode, as shown in FIG. 146B.

In the monochrome mode, bits other than bit 3 are "0", and the flag value becomes "8".

FIG. 147 shows an example wherein one scan line of a certain Y coordinate includes two portions to be painted in a polygon.

In this case, as shown in FIG. 147, the X ranges of the two paint portions are defined as LEFTX1 to RIGHTX1, and LEFTX2 to RIGHTX2, and can be coped with by adopting the above-mentioned process.

Of course, the same applies to three or more portions to be painted.

The processes in step S913 and steps S914 to S917 in FIG. 131 can be omitted.

This is because jump addresses to the dummy process function are stored at the end of the tables shown in FIGS. 113 and 114.

More specifically, a paint process for one scan line can be performed regardless of the color or monochrome mode.

What is claimed is:

1. An image processing apparatus comprising:

input means for inputting coded recording data;

table storing means for storing a table of a plurality of sets of memory addresses, wherein each set includes memory addresses of paint functions each corresponding to a respective one color element, each set corresponds to a respectively unique combination of types of paint processes for respective color elements, and each of the paint processes corresponds to a paint method and presence or absence of a corresponding color element;

determination means for determining a specified paint method;

judging means for judging presence or absence of each color element;

pointer control means for controlling a pointer for the table to point to one of the plurality of sets of memory addresses in accordance with the specified paint method and the presence or absence of each color element; and developing means for developing an image of one scan line into a memory by executing each of the paint functions, stored at the addresses included in one of the plurality of sets pointed to by the pointer, for respective color elements.

2. An image processing apparatus according to claim 1, wherein said table storing means has a plurality of tables each corresponding to a respective one of a plurality of paint methods.

3. An apparatus according to claim 1, further comprising output means for outputting the image developed by said developing means.

4. An apparatus according to claim 1, further comprising print means for printing the image developed by said developing means.

5. An apparatus according to claim 4, wherein said print means comprises an ink jet printer.

6. An apparatus according to claim 1, wherein said apparatus comprises an ink jet printer.

7. An apparatus according to claim 1, further comprising mode determination means for determining a set mode, wherein the table stored in said table storing means comprises a memory address of a paint function corresponding to monochrome image data, and said pointer control means controls the pointer for the table to point to the memory address of the paint function corresponding to the monochrome image data, if the set mode is a monochrome mode.

8. An image processing method for an image processing apparatus for receiving coded recording information in units of pages, and recording and outputting an image on a recording medium, comprising:

inputting coded recording data;

storing in a table a plurality of sets of memory addresses, wherein each set includes memory addresses of paint functions each corresponding to a respective one color element, each set corresponds to a respectively unique combination of types of paint processes for respective color elements, and each of the paint processes corresponds to a paint method and presence or absence of a corresponding color element;

determining a specified paint method;

judging presence or absence of each color element;

controlling a pointer for the table to point to one of the plurality of sets of memory addresses in accordance with the specified paint method and the presence or absence of each color element; and developing an image of one scan line into a memory by executing each of the paint functions, stored at the addresses included in one of the plurality of sets pointed to by the pointer, for respective color elements.

9. An image processing method according to claim 8, wherein said method uses a plurality of tables each corresponding to a respective one of a plurality of paint methods.

10. A method according to claim 8, further comprising an output step of outputting the image developed by said developing step.

11. A method according to claim 8, further comprising a print step of printing the image developed by said developing step.

12. A method according to claim 11, wherein said print step prints with an ink jet printer.

13. A method according to claim 8, wherein said image processing apparatus comprises an ink jet printer.

14. A method according to claim 8, further comprising a mode determination step of determining a set mode, wherein the table comprises a memory address of a paint function corresponding to monochrome image data, and in said pointer control step, the pointer for the table is controlled to point to the memory address of the paint function corresponding to the monochrome image data, if the set mode is a monochrome mode.

* * * * *

UNITED STATES PATENT AND TRADEMARK OFFICE
CERTIFICATE OF CORRECTION

PATENT NO. : 6,331,897 B1
DATED : December 18, 2001
INVENTOR(S) : Shuichi Kumada It is certified that error appears in the above-identified patent and that said Letters Patent is hereby corrected as shown below:

Title page,
Item [56], U.S. PATENT DOCUMENTS,
"Havuki" should read -- Haruki --; and
"Franulin et al." should read -- Franklin et al. --.

Drawings,
Sheet 32, FIG. 41, "AMOUN" should read -- AMOUNT --.

Column 5,
Line 46, "$\beta=Y_{MAX}$" should read -- $\beta=Y_{PMAX}$ --.

Column 10,
Line 11, "$(P_{XIN}, P_{YMIN})$" should read -- $P_{XMIN}, P_{YMIN})$ --.

Column 13,
Line 41, "25B" should read -- 24B --.

Column 22,
Line 6, "B, and B" should read -- G, and B --.

Column 27,
Line 10, "S122" should read -- step S122 --; and
Line 20, "$C_{XMIX}$," should read -- $C_{XMAX}$, --.

Column 31,
Line 38, "an d" should read -- and --.

Column 33,
Line 25, "If" should read -- ¶ If --.

Column 35,
Line 20, "$L_{YMCK}$," should read -- $L_{YMCK}$ --; and
Line 60, "In" should read -- ¶ In --.

UNITED STATES PATENT AND TRADEMARK OFFICE
CERTIFICATE OF CORRECTION

PATENT NO. : 6,331,897 B1
DATED : December 18, 2001
INVENTOR(S) : Shuichi Kumada It is certified that error appears in the above-identified patent and that said Letters Patent is hereby corrected as shown below:

Column 38,
Line 2, "○" should read -- ¶ ○ --; and
Line 58, "When" should read -- ¶ When --.

Column 39,
Line 38, "P_M×0," should read -- P_M≠0, --; and
Line 46, "step S827," should read -- step S829, --.

Column 40,
Line 21, "angle e" should read -- angle θ --.

Column 43,
Line 22, "Ie.g.," should read -- e.g., --; and
Line 50, "step S924" should read -- step S925 --.

Column 44,
Line 22, "$L_{LAD \neq RXAD}$," should read -- $L_{XAD} \neq R_{XAD}$, --;
Line 29, "$L_{XAD}=R_{XAD}$" should read -- $L_{XAD}=R_{XAD}$, --;
Line 36, "$L_{XAD}$" should read -- $L_{XAD}$, --;
Line 49, "Y ....$T_{OPADR}$" should read -- Y_$T_{OPADR}$ --;
Line 62, "$L_{XAD}=R_{XAD}$" should read -- $L_{XAD}=R_{XAD}$, --; and
Line 65, "$Y_{DPATN}$" should read -- $Y_{DTPATN}$ --.

Column 45,
Lines 5, 14 and 21, "$Y_{DPATN}$" should read -- $Y_{DTPATN}$ --.
Line 11, "$L_{XAD}=R_{XED}$," should read -- $L_{XAD}=R_{XAD}$, --;
Line 44, "Y̅T $_{OPADR}+R_{XAD}$" should read -- Y_T $_{OPADR}+R_{XAD}$ --;
Line 49, "YDAD" should read -- $Y_{DAD}$ --; and
Line 58, "$L_{XAD}=R_{XAD}$" should read -- $L_{XAD}=R_{XAD}$, --.

Column 46,
Line 6, "$L_{XAD} \neq R_{XAD}$" should read -- $L_{XAD} \neq R_{XAD}$, --;

UNITED STATES PATENT AND TRADEMARK OFFICE
CERTIFICATE OF CORRECTION

PATENT NO.    : 6,331,897 B1
DATED         : December 18, 2001
INVENTOR(S)   : Shuichi Kumada It is certified that error appears in the above-identified patent and that said Letters Patent is hereby corrected as shown below:

Column 47,
Line 66, "not" should read -- is not --.

Signed and Sealed this

Twenty-third Day of September, 2003

JAMES E. ROGAN
*Director of the United States Patent and Trademark Office*